US010155846B2

(12) United States Patent
Fuji et al.

(10) Patent No.: US 10,155,846 B2
(45) Date of Patent: Dec. 18, 2018

(54) POLYCARBONATE RESIN

(71) Applicant: Mitsubishi Chemical Corporation, Chiyoda-ku (JP)

(72) Inventors: Michiaki Fuji, Mie (JP); Kiminori Kawakami, Kanagawa (JP); Kazuki Fukumoto, Kanagawa (JP); Hisatoshi Uehara, Kanagawa (JP); Kenichi Satake, Kanagawa (JP); Tomoko Maeda, Kanagawa (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/626,633

(22) Filed: Jun. 19, 2017

(65) Prior Publication Data

US 2017/0283550 A1 Oct. 5, 2017

Related U.S. Application Data

(63) Continuation of application No. PCT/JP2015/085565, filed on Dec. 18, 2015.

(30) Foreign Application Priority Data

Dec. 19, 2014 (JP) ................................ 2014-257435

(51) Int. Cl.

| | |
|---|---|
| ***C08G 63/02*** | (2006.01) |
| ***C08G 64/16*** | (2006.01) |
| ***C08G 63/64*** | (2006.01) |
| ***C08G 63/66*** | (2006.01) |
| ***C08G 64/30*** | (2006.01) |
| ***C08G 18/67*** | (2006.01) |
| ***C08G 64/02*** | (2006.01) |
| ***C08G 18/08*** | (2006.01) |
| ***C09D 175/06*** | (2006.01) |
| ***C08G 18/44*** | (2006.01) |
| ***C09J 175/06*** | (2006.01) |
| *D01F 6/70* | (2006.01) |

(52) U.S. Cl.

CPC ..... *C08G 64/1608* (2013.01); *C08G 18/0823* (2013.01); *C08G 18/44* (2013.01); *C08G 18/672* (2013.01); *C08G 63/64* (2013.01); *C08G 63/66* (2013.01); *C08G 64/0208* (2013.01); *C08G 64/305* (2013.01); *C09D 175/06* (2013.01); *C09J 175/06* (2013.01); *C08G 2190/00* (2013.01); *C08G 2310/00* (2013.01); *D01F 6/70* (2013.01)

(58) Field of Classification Search

USPC ........................................ 528/201, 196, 198

See application file for complete search history.

(56) References Cited

U.S. PATENT DOCUMENTS

2006/0149024 A1 7/2006 Ono et al.
2007/0244227 A1 10/2007 Eipper et al.

(Continued)

FOREIGN PATENT DOCUMENTS

DE 36 42 999 A1 6/1988
DE 38 40 132 A1 5/1990

(Continued)

OTHER PUBLICATIONS

Extended European Search Report dated Nov. 9, 2017 in European Patent Application No. 15870097.1.

(Continued)

*Primary Examiner* — Terressa Boykin

(74) *Attorney, Agent, or Firm* — Oblon, McClelland, Maier & Neustadt, L.L.P.

(57) ABSTRACT

The present invention relates to a polycarbonate resin containing, in the molecule, a structure represented by the following formula (1):

(1)

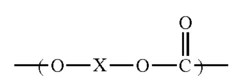

wherein X has a structure represented by any one of the following formula (2) to (4):

(2)

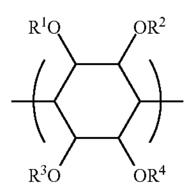

(3)

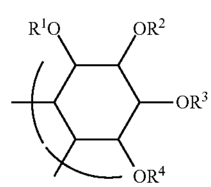

(4)

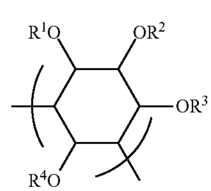

wherein each of $R^1$ to $R^4$ independently represents a hydrogen atom or an organic group having a carbon number of 1 to 30; the organic group may have an arbitrary substituent, and any two or more members of $R^1$ to $R^4$ may combine with each other to form a ring, which is excellent in heat resistance, transparency, light resistance, weather resistance and mechanical strength.

19 Claims, 43 Drawing Sheets

(56) References Cited

U.S. PATENT DOCUMENTS

| | | | |
|---|---|---|---|
| 2010/0190953 | A1 | 7/2010 | Fuji et al. |
| 2011/0257362 | A1 | 10/2011 | Fuji et al. |
| 2014/0296473 | A1 | 10/2014 | Fuji et al. |

FOREIGN PATENT DOCUMENTS

| | | | |
|---|---|---|---|
| JP | 2006-28441 | A | 2/2006 |
| JP | 2006-232897 | A | 9/2006 |
| JP | 2008-24919 | A | 2/2008 |
| JP | 2008-509261 | A | 3/2008 |
| JP | 2008-274203 | A | 11/2008 |
| WO | WO 2004/111106 | A1 | 12/2004 |

OTHER PUBLICATIONS

International Search Report and Written Opinion dated Mar. 8, 2016 in corresponding PCT/JP2015/085565 (with English translation of Search Report and English translation of category of cited documents).

M. A. Mannan et al., Polymer Preprints, Japan, vol. 50, No. 2, 2001, the society of Polymer Science, p. 249 (with partial English translation).

Atsushi Sudo et al., Synthesis of High-Performance Polyurethanes with Rigid 5-6-5-Fused Ring System in the Main Chain from Naturally Occurring myo-Inositol, Journal of Polymer Science Part A, Polymer Chemistry 2013, 51, pp. 3956-3963.

Atsushi Sudo et al., Polymer Preprints, Japan, vol. 62, No. 1, 2013, pp. 396 to 398(with English abstract).

Atsushi Sudo et al., Polymer Preprints, Japan, vol. 62, No. 2, 2013, pp. 5305 to 5306 (with English abstract).

Polymer, The Society of Polymer Science, vol. 61, April issue, 204 (2012), 4 pages (with Partial translation, 3 pages).

Polycarbonate Resin Handbook, Aug. 28, 1992, issued by Nikkan Kogyo Shimbun Ltd., edited by Seiichi Homma, 9 pages, (with partial English translation, 3 pages).

1H-NMR SPECTRUM OF EXAMPLE 1

1H-NMR SPECTRUM OF EXAMPLE 2

1H-NMR SPECTRUM OF EXAMPLE 3

1H-NMR SPECTRUM OF EXAMPLE 4

1H-NMR SPECTRUM OF EXAMPLE 5

IH-NMR SPECTRUM OF EXAMPLE 6

1H-NMR SPECTRUM OF EXAMPLE 7

$^{1}$H-NMR SPECTRUM OF DCMI MONOMER

1H-NMR SPECTRUM OF IN1

1H-NMR SPECTRUM OF IN2

1H-NMR SPECTRUM OF IN4

1H-NMR SPECTRUM OF IN12

1H-NMR SPECTRUM OF IN16

1H-NMR SPECTRUM OF IN37

1H-NMR SPECTRUM OF OEM

1H-NMR SPECTRUM OF IN44

1H-NMR SPECTRUM OF OEH (ppm)

1H-NMR SPECTRUM OF IN45

1H-NMR SPECTRUM OF IN57

1H-NMR SPECTRUM OF IN58

1H-NMR SPECTRUM OF EXAMPLE 8

1H-NMR SPECTRUM OF EXAMPLE 18

1H-NMR SPECTRUM OF EXAMPLE 22

1H-NMR SPECTRUM OF EXAMPLE 25

1H-NMR SPECTRUM OF EXAMPLE 26

1H-NMR SPECTRUM OF EXAMPLE 28

1H-NMR SPECTRUM OF EXAMPLE 29

1H-NMR SPECTRUM OF EXAMPLE 30

1H-NMR SPECTRUM OF EXAMPLE 31

1H-NMR SPECTRUM OF EXAMPLE 32

1H-NMR SPECTRUM OF EXAMPLE 33

1H-NMR SPECTRUM OF EXAMPLE 34

1H-NMR SPECTRUM OF EXAMPLE 35

1H-NMR SPECTRUM OF EXAMPLE 37

1H-NMR SPECTRUM OF EXAMPLE 39

1H-NMR SPECTRUM OF EXAMPLE 42

1H-NMR SPECTRUM OF EXAMPLE 45

1H-NMR SPECTRUM OF EXAMPLE 46

1H-NMR SPECTRUM OF EXAMPLE 47

1H-NMR SPECTRUM OF EXAMPLE 49

1H-NMR SPECTRUM OF EXAMPLE 50

1H-NMR SPECTRUM OF EXAMPLE 53

1H-NMR SPECTRUM OF EXAMPLE 54

POLYCARBONATE RESIN

TECHNICAL FIELD

The present invention relates to a polycarbonate resin made from a biomass raw material and excellent in the heat resistance, transparency, light resistance, weather resistance and mechanical strength. The polycarbonate resin as used in the present invention is sufficient if it is a polymer having a carbonate bond, and indicates a polycarbonate resin in a broad sense, encompassing those having a hydroxy group at both terminals, such as polycarbonate diol and polyester carbonate resin.

BACKGROUND ART

A polycarbonate resin is generally produced by using bisphenols as a monomer component and is widely utilized as a so-called engineering plastic in the fields of electric/electronic parts, automotive parts, medical parts, building materials, films, sheets, bottles, optical recording mediums, lenses, etc. by taking advantage of its superiority such as transparency, heat resistance and mechanical strength. In addition, a polycarbonate diol is utilized as a raw material of polyurethane, etc., for example, by reacting it with an isocyanate compound.

However, a conventional polycarbonate resin causes deterioration in hue, transparency and mechanical strength when it is used in a place exposed to ultraviolet ray or visible light for a long time, and its usage at outdoors or near a lighting unit is therefore limited.

In order to solve such a problem, a method of adding a benzophenone-based ultraviolet absorber, a benzotriazole-based ultraviolet absorber, or a benzoxazine-based ultraviolet absorber to a polycarbonate resin is widely known (for example, Non-Patent Document 1).

However, addition of such an ultraviolet absorber poses a problem, for example, causes the resin to deteriorate in its original hue, heat resistance and transparency or to volatilize during molding and contaminate the mold, although the hue, etc. after ultraviolet irradiation may be improved.

The bisphenol compound used for a conventional polycarbonate resin has a benzene ring structure and therefore shows a large ultraviolet absorption, and this leads to deterioration in light resistance of the polycarbonate resin.

It is expected that when an aliphatic or alicyclic dihydroxy compound having no benzene ring structure in the molecular framework or a cyclic dihydroxy compound having an ether bond in the molecule, such as isosorbide, is used for a raw material monomer, the light resistance is improved in principle. Among others, a polycarbonate resin produced by using, as a raw material monomer, isosorbide obtained from biomass resources has excellent heat resistance and mechanical strength, and from the viewpoint of effective utilization of non-exhaustible resources as well, many investigations are being made thereon in recent years (for example, Patent Documents 1 to 5).

As for the polycarbonate resin using only isosorbide, a resin having such high heat resistance that the glass transition temperature (hereinafter, sometimes simply referred to as Tg) exceeds 160° C. is obtained (Patent Document 5). However, this polycarbonate resin has a drawback in that the impact resistance is low and the water absorptivity is high. In order to solve these problems, it has been proposed to achieve improvement by copolymerizing an aliphatic dihydroxy compound or an alicyclic dihydroxy compound (Patent Documents 1 to 4). However, copolymerization with such a dihydroxy compound produces a dilemma in that not only the heat resistance is sacrificed but also the utilization of biomass resources declines.

Inositol is a cyclic polyhydric alcohol obtained from biomass resources and is expected to form a polymer when coupled with a compound reacting with a hydroxy group. Non-Patent Documents 2 and 3 have reported that when a polyurethane was synthesized from an inositol derivative, the heat resistance was enhanced.

A polyurethane is obtained by reacting a polyhydric alcohol and a diisocyanate under relatively mild conditions of 100° C. or less and has no problem in reacting even with a compound having a secondary hydroxyl group, such as inositol derivative. However, it is generally known that an aliphatic dihydroxy compound having a secondary hydroxyl group is reduced in the polymerization reactivity due to its low acidity and steric hindrance and hardly provides a high-molecular-weight polycarbonate resin (Non-Patent Document 4).

Furthermore, in the case of a polyurethane, not only a tri- or higher functional structure, if any, does not become a serious problem but also the heat resistance can be enhanced by positively forming a network (Non-Patent Document 3). On the other hand, in the case of a thermoplastic resin typified by a polycarbonate resin, there is a problem that when a tri- or higher functional structure is coupled, gelling proceeds and gives rise to an insoluble matter or a defect.

BACKGROUND ART LITERATURE

Patent Document

Patent Document 1: International Publication No. 2004/111106

Patent Document 2: JP-A-2006-28441

Patent Document 3: JP-A-2006-232897

Patent Document 4: JP-A-2008-24919

Patent Document 5: JP-A-2008-274203

Non-Patent Document

Non-Patent Document 1: Polycarbonate Resin Handbook (Aug. 28, 1992, issued by Nikkan Kogyo Shimbun Ltd., edited by Seiichi Homma)

Non-Patent Document 2: Journal of Polymer Science, Part A 51.3956 (2013)

Non-Patent Document 3: Proceedings of the Society of Polymer Science, Japan, 2013, 62, 396-398

Non-Patent Document 4: Polymer, Vol. 61, April issue, 204 (2012)

SUMMARY OF THE INVENTION

Problems that the Invention is to Solve

An object of the present invention is to provide a polycarbonate resin excellent in heat resistance, chemical resistance, abrasion resistance, transparency, light resistance, weather resistance and mechanical strength.

Means for Solving the Problems

As a result of intensive studies, the inventors of the present invention have found that when a specific structure is introduced into a polycarbonate resin by using, as a raw material monomer, an inositol derivative, etc. having a specific structure, a polycarbonate resin excellent in heat resistance, transparency, light resistance, weather resistance and mechanical strength can be obtained. The present invention has been accomplished based on this finding.

That is, the gist of the present invention resides in the followings.

[1] A polycarbonate resin comprising a structure represented by the following formula (1) in the molecule:

[Chem. 1]

(1)

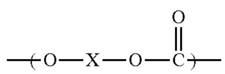

(In the formula (1), X has a structure represented by any one of the following formulae (2) to (4). In the formulae (2) to (4), each of $R^1$ to $R^4$ independently represents a hydrogen atom or an organic group having a carbon number of 1 to 30. The organic group may have an arbitrary substituent, and any two or more members of $R^1$ to $R^4$ may combine with each other to form a ring).

[Chem. 2]

(2)

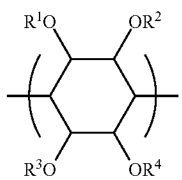

(3)

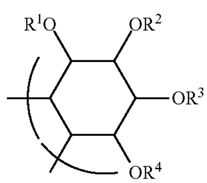

(4)

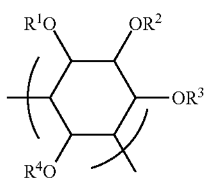

[2] A polycarbonate resin comprising a structure represented by the following formula (1) in the molecule:

[Chem. 3]

(1)

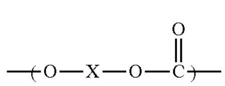

(In the formula (1), X has a structure represented by any one of the following formulae (2) to (4). In the formulae (2) to (4), each of $R^1$ to $R^4$ independently represents an organic group having a carbon number of 1 to 30. The organic group may have an arbitrary substituent, and any two or more members of $R^1$ to $R^4$ may combine with each other to form a ring).

[Chem. 4]

(2)

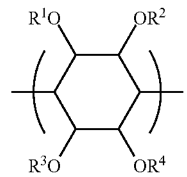

(3)

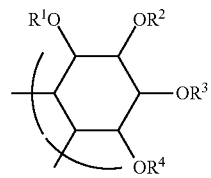

(4)

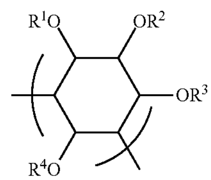

[3] The polycarbonate resin according to [1] or [2], wherein X in the formula (1) is a structure represented by the formula (2).

[4] The polycarbonate resin according to any one of [1] to [3], wherein each of $R^1$ and $R^2$ and $R^3$ and $R^4$ in the formulae (2) to (4) mutually forms a ring via an acetal bond.

[5] The polycarbonate resin according to [4], wherein the cyclohexane ring in the formulae (2) to (4) is an inositol residue derived from myo-inositol.

[6] The polycarbonate resin according to [5], wherein X in the formula (1) is a structure represented by the following formula (5):

[Chem. 5]

(5)

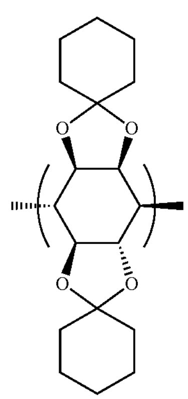

[7] The polycarbonate resin according to [6], wherein in all myo-inositol derivative compounds obtained by hydrolyzing the polycarbonate resin, the ratio of a compound having a structure represented by the following formula (6) is 90 mol % or more and the ratio of a total of a compound represented by the following structural formula (7) and a compound represented by the following structural formula (8) is 5 mol % or less:

[Chem. 6]

(6)

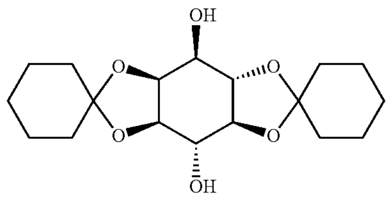

(7)

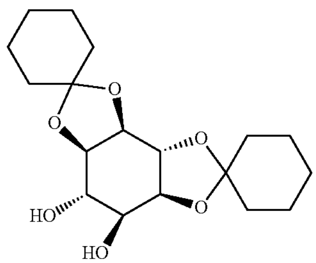

(8)

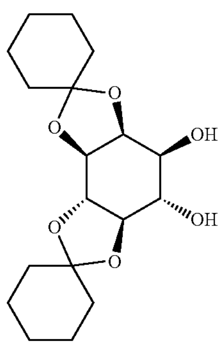

[8] The polycarbonate resin according to [1] or [2], wherein X in the formula (1) is a structure represented by the formula (4) and $R^1$, $R^3$ and $R^4$ in the formula (4) form a ring.

[9] The polycarbonate resin according to [8], wherein the cyclohexane ring in the formula (4) is an inositol residue derived from myo-inositol.

[10] The polycarbonate resin according to any one of [1] to [9], wherein the midpoint glass transition initiation temperature Tmg is 100° C. or more.

[11] The polycarbonate resin according to any one of [1] to [10], wherein the reduced viscosity is from 0.20 to 1.50 dl/g.

[12] The polycarbonate resin according to any one of [1] to [11], wherein when all carbonate repeating units are assumed to be 100, the polycarbonate resin contains 80 or less of a structure represented by the formula (1) as a repeating unit.

[13] The polycarbonate resin according to any one of [1] to [12], wherein the polycarbonate resin has from 0.1 to 50 mass % of a structural unit derived from an aliphatic dihydroxy compound and/or an alicyclic dihydroxy compound.

[14] The polycarbonate resin according to any one of [1] to [13], wherein the polycarbonate resin contains from 5 to 80 mass % of a structural unit derived from isosorbide.

[15] The polycarbonate resin according to any one of [1] to [14], wherein the polycarbonate resin contains from 0.1 to 50 mass % of a structural unit derived from an aliphatic dihydroxy compound having a primary hydroxyl group.

[16] The polycarbonate resin according to any one [1] to [15], wherein the polycarbonate resin contains from 0.1 to 50 mass % of a structural unit derived from an alicyclic dihydroxy compound having a primary hydroxyl group.

[17] The polycarbonate resin according to any one of [1] to [16], wherein the polycarbonate resin contains from 40 to 95 mass % of a structural unit derived from a compound represented by the following formula (9):

[Chem. 7]

(9)

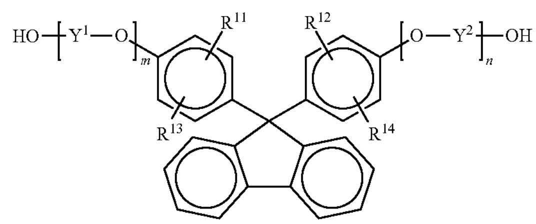

(In the formula (9), each of $R^{11}$ to $R^{14}$ independently represents a hydrogen atom, a substituted or unsubstituted alkyl group having a carbon number of 1 to 20, a substituted or unsubstituted cycloalkyl group having a carbon number of 6 to 20, or a substituted or unsubstituted aryl group having a carbon number of 6 to 20, each of $Y^1$ and $Y^2$ independently represents a substituted or unsubstituted alkylene group having a carbon number of 2 to 10, a substituted or unsubstituted cycloalkylene group having a carbon number of 6 to 20, or a substituted or unsubstituted arylene group having a carbon number of 6 to 20, and each of m and n is independently an integer of 0 to 5).

[18] The polycarbonate resin according to any one of [1] to [17], wherein the polycarbonate resin contains from 50 to 80 mol % of a structural unit derived from a compound represented by the following formula (10), relative to structural units derived from all dihydroxy compounds in the polycarbonate resin:

[Chem. 8]

(10)

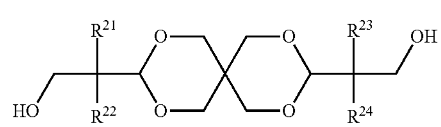

(In the formula (10), each of $R^{21}$ to $R^{24}$ independently represents a hydrogen atom, a substituted or unsubstituted alkyl group having a carbon number of 1 to 20, a substituted or unsubstituted cycloalkyl group having a carbon number of 5 to 20, or a substituted or unsubstituted aryl group having a carbon number of 6 to 20).

[19] The polycarbonate resin according to any one of [1] to [18], wherein the polycarbonate resin contains from 1 to 40 mass % of a structure represented by the following formula (11) and/or a structure represented by the following formula (12):

[Chem. 9]

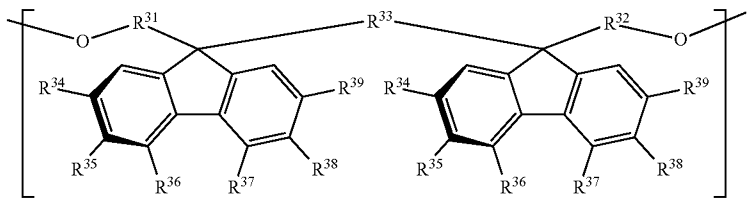

(11)

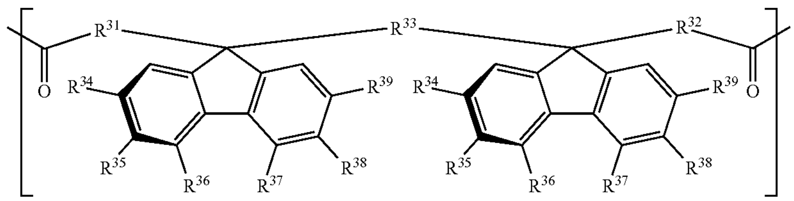

(12)

(In the formulae (11) and (12), each of $R^{31}$ to $R^{33}$ independently represents a direct bond, an alkylene group having a carbon number of 1 to 4, which may have a substituent, and each of $R^{34}$ to $R^{39}$ independently represents a hydrogen atom, an alkyl group having a carbon number of 1 to 10, which may have a substituent, an aryl group having a carbon number of 4 to 10, which may have a substituent, an acyl group having a carbon number of 1 to 10, which may have a substituent, an alkoxy group having a carbon number of 1 to 10, which may have a substituent, an aryloxy group having a carbon number of 4 to 10, which may have a substituent, an amino group which may have a substituent, an alkenyl group having a carbon number of 2 to 10, which may have a substituent, an alkynyl group having a carbon number of 2 to 10, which may have a substituent, a sulfur atom having a substituent, a silicon atom having a substituent, a halogen atom, a nitro group, or a cyano group, provided that $R^{34}$ to $R^{39}$ may be the same as or different from each other and at least two adjacent groups out of $R^{34}$ to $R^{39}$ may combine with each other to form a ring).

Effect of Invention

The polycarbonate resin of the present invention is excellent in heat resistance, transparency, light resistance, weather resistance and mechanical strength and can therefore provide a molded article excellent in heat resistance, transparency, light resistance, weather resistance and mechanical strength by applying it to a molding material in various molding fields such as injection molding field, extrusion molding field and compression molding field. In addition, a polyurethane obtained by using the polycarbonate resin of the present invention as a raw material and reacting it with a polyisocyanate has a characteristic excellent in chemical resistance, abrasion resistance and mechanical strength, and can be applied to usage requiring durability against physical external factors, such as coating material, coating agent and adhesive.

MODE FOR CARRYING OUT THE INVENTION

Figure 1:
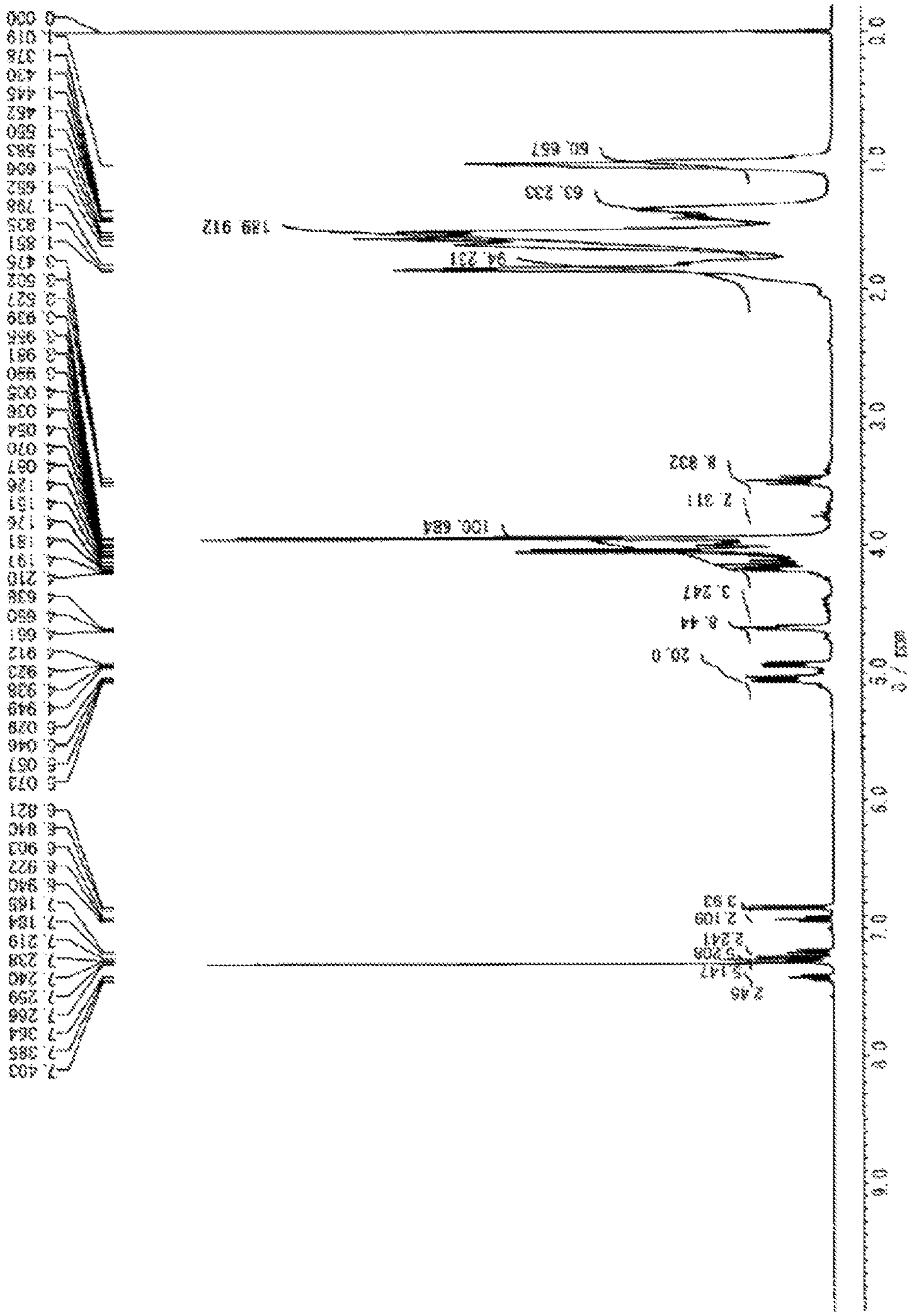
FIG. 1 is an NMR chart of the polycarbonate copolymer obtained in Example 1.

Although the mode for carrying out the present invention is described in detail below, the following descriptions of constituent elements are an example (representative example) of the embodiment of the present invention and as long as its gist is observed, the present invention is not limited to the contents below.

In the present invention, the carbon number of various substituents indicates, when the substituent further has a substituent, the total carbon number including the carbon number of the substituent.

Furthermore, in the present invention, mass % and wt % have the same meanings as parts by mass and parts by weight, respectively.

[Structure of Polycarbonate Resin]

<Structure (1)>

The polycarbonate resin of the present invention is characterized by containing, in the molecule, a structure represented by the following formula (1):

[Chem. 10]

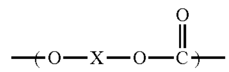

(1)

(In the formula (1), X has a structure represented by any one of the following formulae (2) to (4). In the formulae (2) to (4), each of $R^1$ to $R^4$ independently represents a hydrogen atom or an organic group having a carbon number of 1 to 30. The organic group may have an arbitrary substituent, and any two or more members of $R^1$ to $R^4$ may combine with each other to form a ring):

[Chem. 11]

(2)

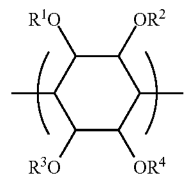

(3)

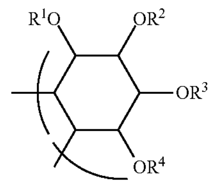

(4)

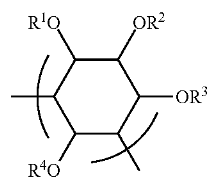

Hereinafter, the structure represented by the formula (1) is sometimes referred to as "structure (1)"; the structure represented by the formula (1) wherein X is a structure represented by the formula (2) is sometimes referred to as "structure (1-2)"; the structure represented by the formula (1) wherein X is a structure represented by the formula (3) is sometimes referred to as "structure (1-3)"; and the structure represented by the formula (1) wherein X is a structure represented by the formula (4) is sometimes referred to as "structure (1-4)". In addition, the structure represented by the formula (1) wherein X is a structure represented by the later-described the formula (5) is sometimes referred to as "structure (1-5)".

The structure (1), preferably structures (1-2) to (1-5), more preferably structure (1-5), is introduced into a polycarbonate resin through a raw material dihydroxy compound itself having excellent heat resistance, and the heat resistance of the polycarbonate resin can be enhanced by introducing such a structure into the polycarbonate resin.

In addition, the polycarbonate resin of the present invention can be excellent in light resistance and weather resistance by taking a structure wherein a ring structure having aromaticity is not contained as a main chain. Furthermore, specific optical properties can also be imparted by introducing a ring having specific aromaticity.

In the formulae (2) to (4), $R^1$ to $R^4$ are preferably an organic group having a carbon number of 1 to 30, which may have a substituent. The organic group having a carbon number of 1 to 30 of $R^1$ to $R^4$ includes, for example, an alkyl group such as methyl group, ethyl group, propyl group, butyl group, pentyl group, hexyl group, heptyl group, octyl group, nonyl group, decyl group, undecyl group and dodecyl group, a cycloalkyl group such as cyclopentyl group and cyclohexyl group, a linear or branched chain alkenyl group such as vinyl group, propenyl group and hexenyl group, a cyclic alkenyl group such as cyclopentenyl group and cyclohexenyl group, an alkynyl group such as ethynyl group, methylethynyl group and 1-propynyl group, a cyclohexylalkyl group (i.e., an alkyl group having a cyclohexyl group as a substituent) such as cyclohexylmethyl group and cyclohexylethyl group, an aryl group such as phenyl group, naphthyl group and toluyl group, an alkoxyphenyl group (i.e., a phenyl group having an alkoxy group as a substituent) such as methoxyphenyl group, an aralkyl group such as benzyl group and phenylethyl group, and a heterocyclic group such as thienyl group, a pyridyl group and a furyl group. Among these, in view of stability of the polymer itself, an alkyl group, a cycloalkyl group, an aryl group, an aralkyl group, etc. are preferred, and in view of light resistance and weather resistance of the polymer itself, an alkyl group and a cycloalkyl group are more preferred.

In the case where the organic group has a substituent, the substituent is not particularly limited as long as it does not greatly impair excellent physical properties of the polycarbonate resin of the present invention, and the substituent includes, in addition to the above-described organic group having a carbon number of 1 to 30, an alkoxy group, a hydroxyl group, an amino group, a carboxyl group, an ester group, a halogen atom, a thiol group, a thioether group, an organosilicon group, etc. The organic group of $R^1$ to $R^4$ may have two or more of these substituents and in this case, two or more substituents may be the same or different.

Two or more members, preferably two or three members, of $R^1$ to $R^4$ may combine with each other to form a ring and from the viewpoint of enhancing heat resistance of the polycarbonate resin, it is particularly preferable for each of $R^1$ and $R^2$ and the pair $R^3$ and $R^4$ to mutually form a ring via an acetal bond.

Above all, X in the formula (1) is preferably a structure represented by the formula (2) from the viewpoint of enhancing heat resistance of the polycarbonate resin, and it is more preferred that in the formula (2), each of the pair $R^1$ and $R^2$ and the pair $R^3$ and $R^4$ mutually forms a ring via an acetal bond.

Preferable examples of the structure in which each of $R^1$ and $R^2$ and $R^3$ and $R^4$ forms a ring via an acetal bond include those represented by the following structural formulae, and among these, in view of heat resistance, a cyclohexylidene group is more preferred.

[Chem. 12]

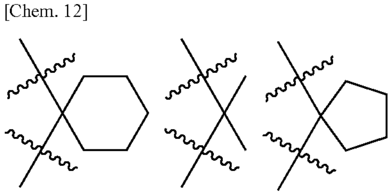

-continued

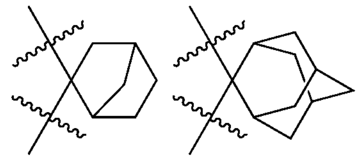

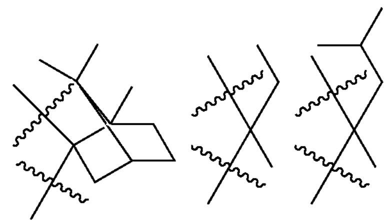

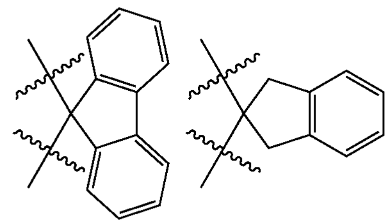

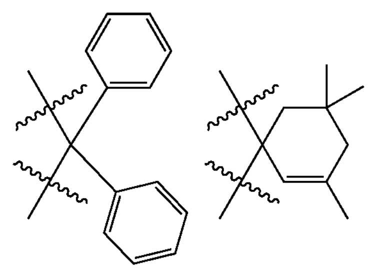

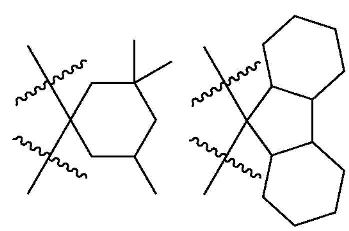

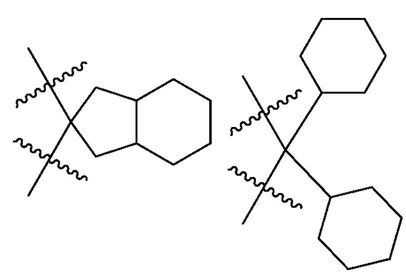

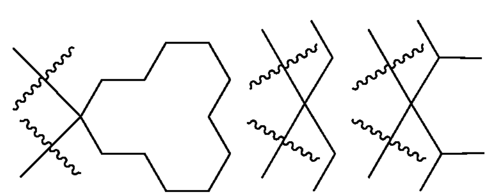

-continued

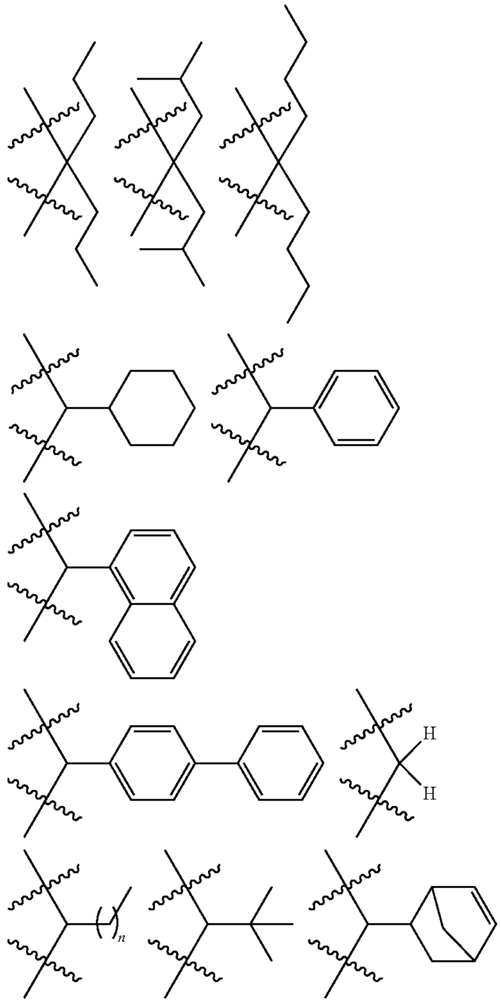

n = 0-20

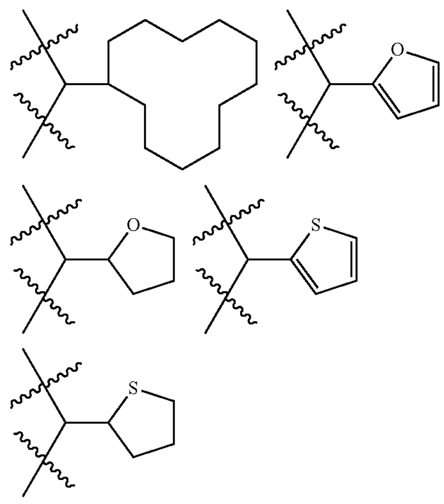

Above all, X in structure (1) is preferably a structure represented by the following formula (5) in which each of $R^1$ and $R^2$ and $R^3$ and $R^4$ forms a ring via an acetal bond of the cyclohexylidene group and the cyclohexane ring as a main chain is a combination of inositol residues derived from myo-inositol.

[Chem. 13]

(5)

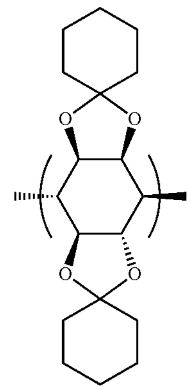

The polycarbonate resin of the present invention may contain, as the structure (1), only structure (1-2), only structure (1-3), or only structure (1-4), may contain any two structures of structures (1-2), (1-3) and (1-4), or may contain three structures of structure (1-2), structure (1-3) and structure (1-4) at the same time. Among a plurality of structures (1) possessed by the polycarbonate resin of the present invention, each of $R^1$ to $R^4$ of X may be the same or different.

Structure (1-2), structure (1-3) and structure (1-4) can be introduced into the polycarbonate resin by using respectively dihydroxy compounds represented by the following formulae (2A), (3A) and (4A) as a raw material dihydroxy compound in the later-described production method of the polycarbonate resin of the present invention, and structure (1-5) can be introduced into the polycarbonate resin by using a dihydroxy compound represented by the later-described formula (6).

[Chem. 14]

(2A)

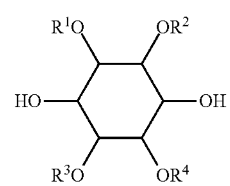

(3A)

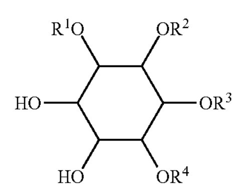

(4A)

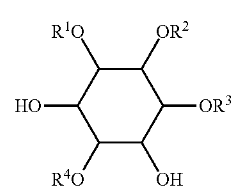

(in the formulae (2A) to (4A), $R^1$ to $R^4$ have the same meanings as $R^1$ to $R^4$ respectively in the formulae (2) to (4)).

In the polycarbonate resin of the present invention, the cyclohexane ring particularly in structures (1-2), (1-3) and (1-4) is preferably an inositol residue derived from inositol. Specific examples of the inositol include all-cis-inositol, epi-inositol, allo-inositol, muco-inositol, myo-inositol, neo-inositol, chiro-D-inositol, chiro-L-inositol, and scyllo-inositol.

In view of ease of obtaining the raw material, the cyclohexane ring is preferably an inositol residue derived from myo-inositol, in other words, structures (1-2), (1-3) and (1-4) in the polycarbonate resin of the present invention are preferably introduced by using myo-inositol and/or a derivative thereof as a raw material dihydroxy compound in the later-described production method of the polycarbonate resin of the present invention.

In this case, it is preferred that in all myo-inositol derivative compounds obtained by hydrolyzing the polycarbonate resin of the present invention, the ratio of a compound (hereinafter, sometimes referred to as "dihydroxy compound (6)") having a structure represented by the following formula (6) is 90 mol % or more and the ratio of a total of a compound (hereinafter, sometimes referred to as "dihydroxy compound (7)") represented by the following structural formula (7) and a compound (hereinafter, sometimes referred to as "dihydroxy compound (8)") represented by the following structural formula (8) is 5 mol % or less.

[Chem.15]

(6)

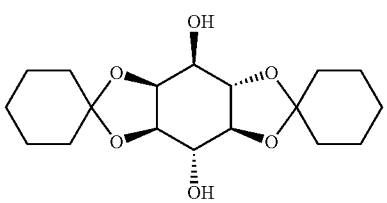

(7)

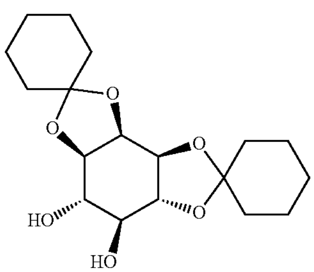

(8)

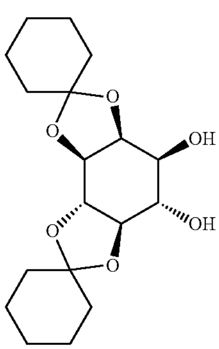

More specifically, in the later-described production method of the polycarbonate resin of the present invention, from the viewpoint of ease of molding, the myo-inositol used as a raw material dihydroxy compound is preferably a compound having, as isomers, 90 mol % or more of a dihydroxy compound (6) and having a total content (content ratio) of a dihydroxy compound (7) and a dihydroxy compound (8) of 5 mol % or less.

As for the more preferable ratio of isomers, the content of dihydroxy compound (6) is 90 mol % or more, and the total content (content ratio) of dihydroxy compound (7) and dihydroxy compound (8) is 0.01 mol % or less.

In the formulae (5) to (8), each cyclohexane ring may have a substituent exemplified as the substituent which may be substituted on the organic group $R^1$ to $R^4$ in the formulae (2) to (4), at an arbitrary position and with an arbitrary number and arbitrary combination of substituents.

When all carbonate repeating units are assumed to be 100, the polycarbonate resin of the present invention preferably contains, as a repeating unit, 80 or less of structure (1), preferably structure (1-2), more preferably structure (1-5). When the proportion above is 80 or less, this allows for introduction of other repeating units and consequently, other properties such as optical properties can be introduced.

In this viewpoint, the proportion of structure (1), preferably structure (1-2), more preferably structure (1-5), is more preferably 70 or less, still more preferably 60 or less. On the other hand, in view of effectively obtaining the above-described effects due to introduction of structure (1), the proportion of structure (1), preferably structure (1-2), more preferably structure (1-5), is preferably 1 or more, more preferably 5 or more, and still more preferably 10 or more.

In addition to enhancement of heat resistance of the polycarbonate resin, from the viewpoint of improving brittleness, it is preferred that X in the formula (1) is a structure represented by the formula (4) and $R^1$, $R^3$ and $R^4$ in the formula (4) form a ring.

Although the method for forming the ring is not particularly limited as long as it does not greatly impair excellent physical properties of the polycarbonate resin of the present invention, an ortho ester type represented by the following formula (YY) is preferred. In the following formula, $R^2$ represents the organic group above, and R represents the organic group above or a hydrogen atom.

[Chem. 16]

(YY)

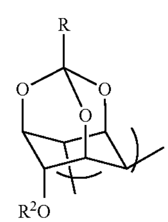

Among others, in view of ease of synthesis, R in the formula (YY) is preferably a hydrogen atom or an alkyl group, more preferably a hydrogen atom or a methyl group.

In addition, although $R^2$ in the formula (YY) is not particularly limited as long as it does not greatly impair excellent physical properties of the polycarbonate resin of the present invention, from the viewpoint of improving both heat resistance and brittleness, $R^2$ is preferably a benzyl group or a cyclohexylmethyl group.

In the formula (YY), the cyclohexane ring is preferably an inositol residue derived from inositol. Specific examples of the inositol are as described above, and the ring is preferably introduced by using myo-inositol as a raw material dihydroxy compound.

Specific examples of the formula (YY) include the following YY1 to YY10, and among these, YY1, YY2 and YY3 are preferred from the viewpoint of improving both heat resistance and brittleness.

[Chem. 17]

YY1

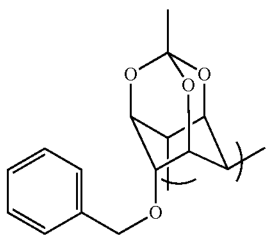

YY2

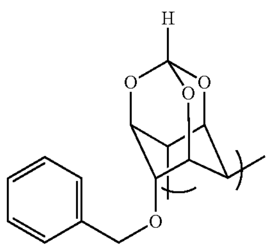

YY3

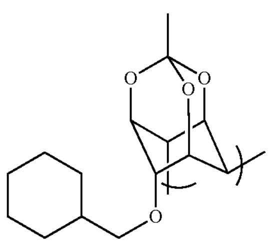

YY4

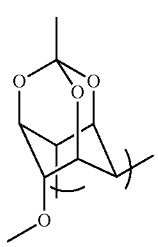

YY5

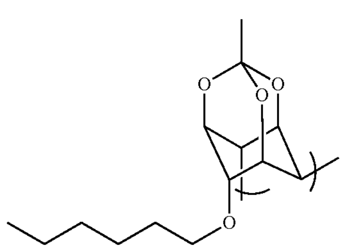

-continued

YY6

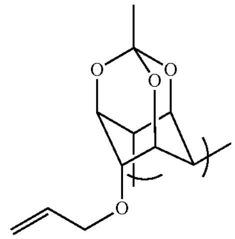

YY7

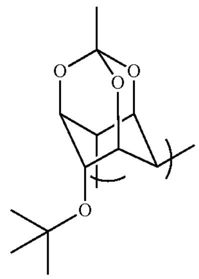

YY8

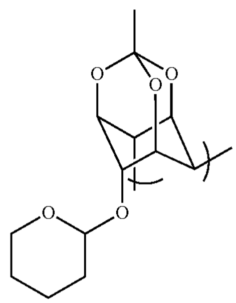

YY9

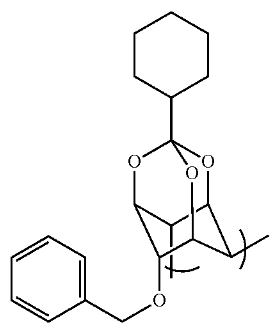

YY10

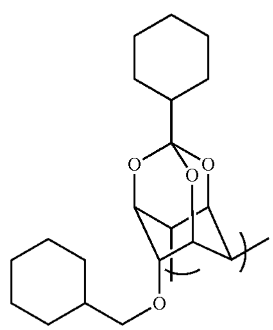

Another embodiment of the present invention relates to a novel monomer excellent in low water absorptivity. Monomers represented by the following structural formulae not only elevate Tg of a resin obtained by polymerizing the monomer but also have an excellent effect in terms of low water absorptivity for the reason that the oxygen content is low, despite a biomonomer. A resin obtained by polymerizing such a monomer can exert the effect on a polyester, a polyether, a polyacrylate, etc. as well as on the polycarbonate resin of the present invention.

The present invention is not limited to the following structures, and the monomer is sufficient if it has a lower oxygen content in the composition formula than that in the monomers represented by the formulae (6) to (8).

[Chem. 18]

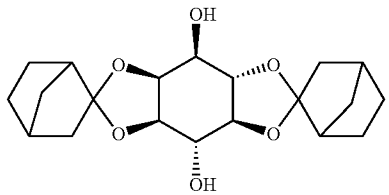

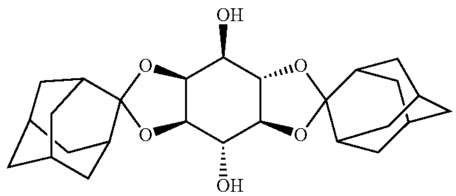

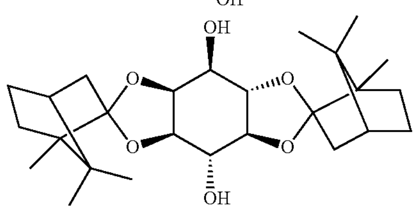

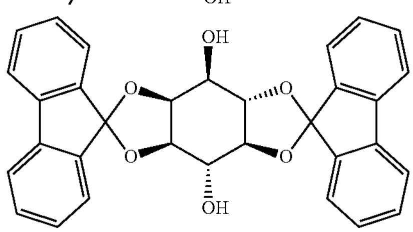

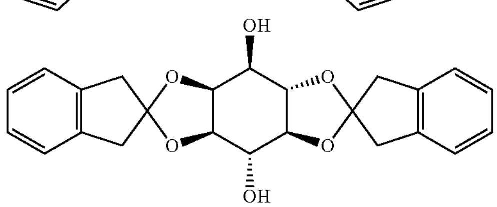

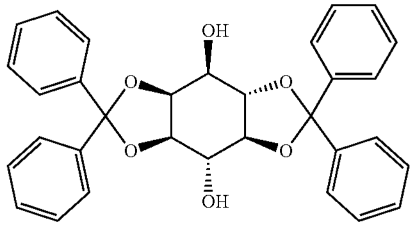

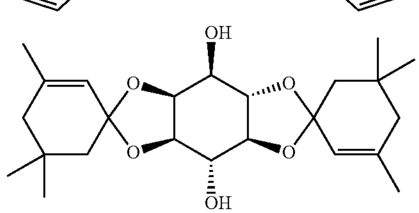

-continued

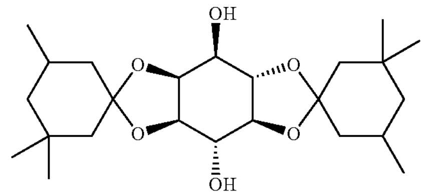

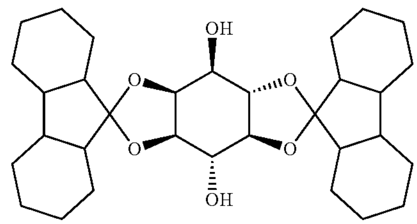

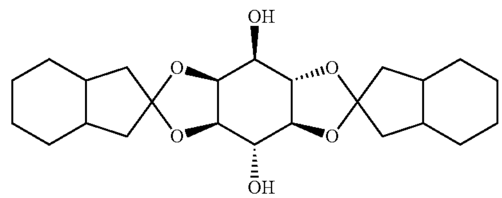

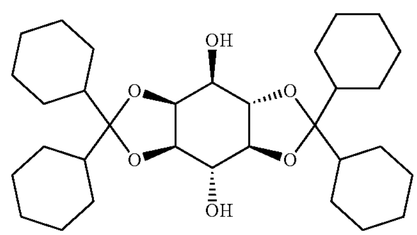

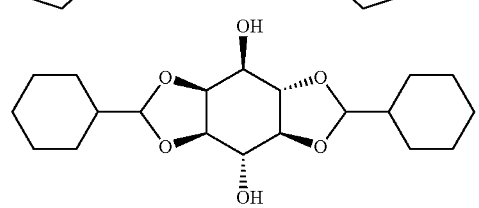

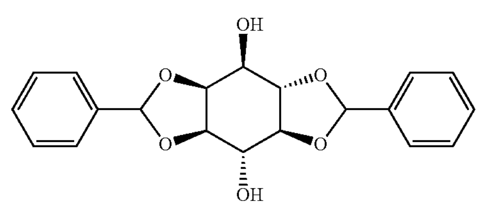

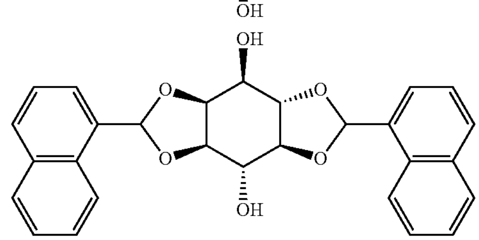

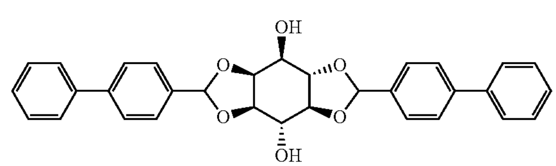

-continued

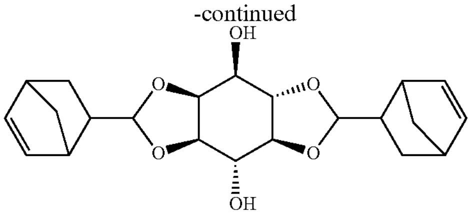

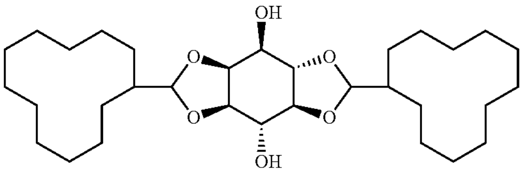

Another embodiment of the present invention relates to a novel monomer having excellent flexibility. Monomers represented by the following structural formulae not only elevates Tg of a resin obtained by polymerizing the monomer but also has an excellent effect in terms of flexibility for the reason that the rigidity is low or for the reason that the asymmetry is low. A resin obtained by polymerizing such a monomer can exert the effect on a polyester, a polyether, a polyacrylate, etc. as well as on the polycarbonate resin of the present invention.

The present invention is not limited to the following structures, and the monomer is sufficient if it is a monomer using, as a raw material, a linear or branched ketone having a carbon number of 3 or more or a linear or branched aldehyde having a carbon number of 2 or more.

[Chem. 19]

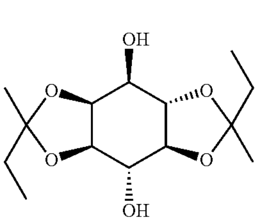

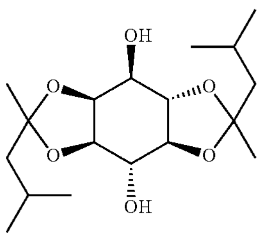

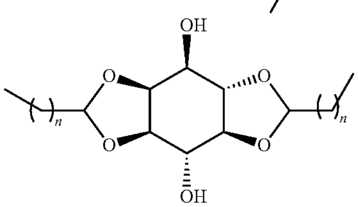

n = 0~20

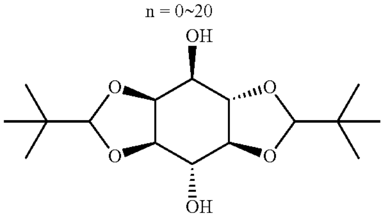

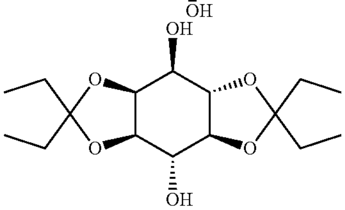

-continued

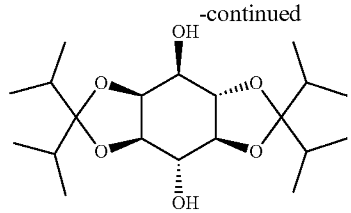

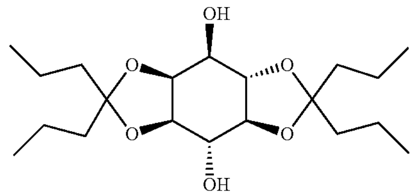

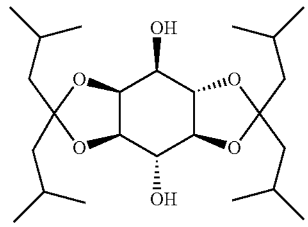

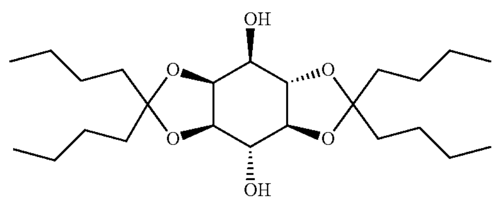

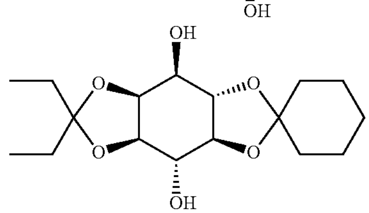

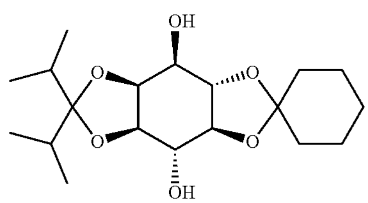

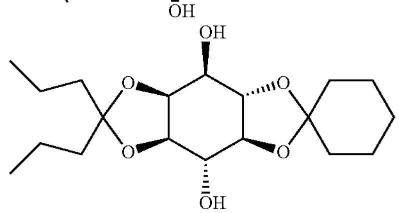

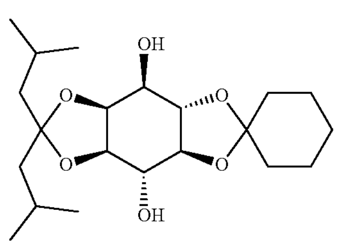

-continued

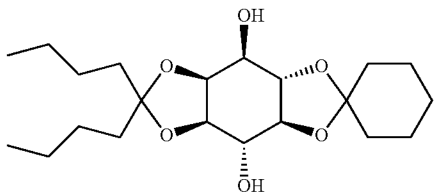

Another embodiment of the present invention relates to a novel monomer having excellent thermal stability (inhibition of decomposition by heat). Monomers represented by the following structural formulae not only elevate Tg of a resin obtained by polymerizing the monomer but also have an excellent effect in terms of thermal stability by virtue of acetal bond. A resin obtained by polymerizing such a monomer can exert the effect on a polyester, a polyether, a polyacrylate, etc. as well as on the polycarbonate resin of the present invention.

The present invention is not limited to the following structures, and the monomer is sufficient if it is a monomer using an alicyclic aldehyde and an aromatic aldehyde as raw materials.

[Chem. 20]

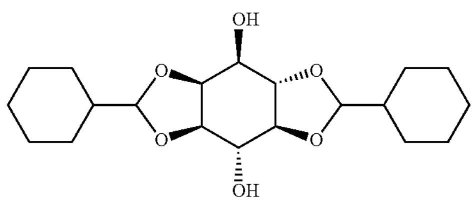

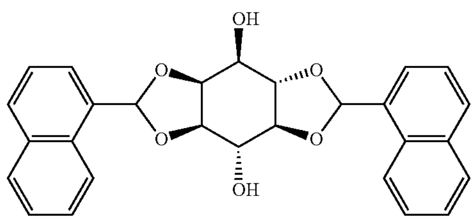

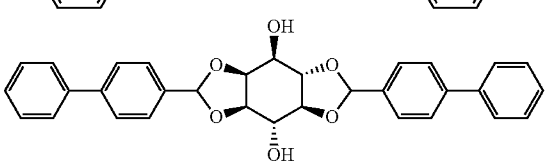

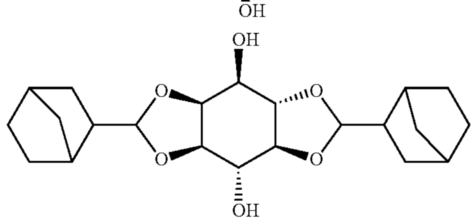

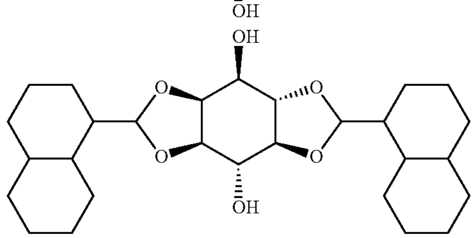

-continued

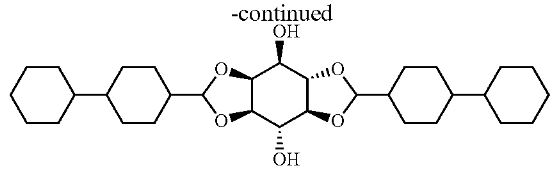

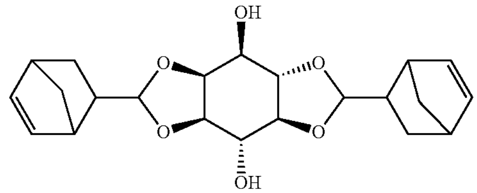

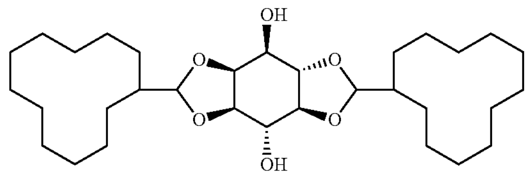

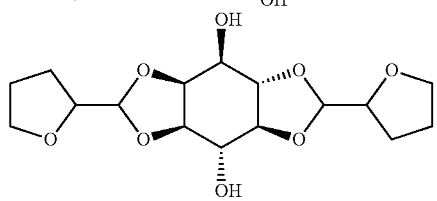

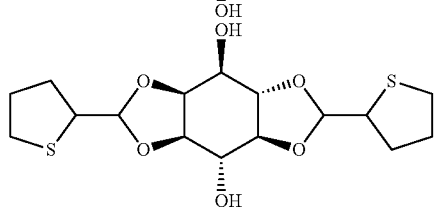

<Other Structures>

The polycarbonate resin of the present invention may contain a structural unit derived from other dihydroxy compounds, besides the structure (1).

For example, the polycarbonate resin of the present invention may contain one member or two or more members of structural units derived from an aliphatic dihydroxy compound and/or an alicyclic dihydroxy compound. Containing such a dihydroxy compound is preferred in that other properties such as optical properties can be introduced.

The aliphatic dihydroxy compound includes a linear aliphatic dihydroxy compound and a branched aliphatic dihydroxy compound.

The linear aliphatic dihydroxy compound includes, for example, ethylene glycol, 1,3-propanediol, 1,2-propanediol, 1,4-butanediol, 1,3-butanediol, 1,2-butanediol, 1,5-heptanediol, 1,6-hexanediol, 1,10-decanediol, and 1,12-dodecanediol.

The dihydroxy compound of a branched aliphatic hydrocarbon includes, for example, neopentyl glycol and hexylene glycol.

The alicyclic dihydroxy compound includes, for example, 1,2-cyclohexanediol, 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, 1,3-adamantanedimethanol, and a dihydroxy compound derived from a terpene compound, such as limonene.

Among these dihydroxy compounds, from the viewpoint of imparting flexibility and excellent toughness to the obtained polycarbonate resin, an aliphatic dihydroxy compound having a primary hydroxyl group, such as ethylene glycol, 1,3-propanediol, 1,4-butanediol, 1,6-hexanediol, 1,10-decanediol and 1,12-dodecanediol, and an alicyclic dihydroxy compound having a primary hydroxyl group, such as 1,4-cyclohexanedimethanol and tricyclodecanedimethanol, are preferred.

In the case where the polycarbonate resin of the present invention contains a structural unit derived from an aliphatic dihydroxy compound and/or an alicyclic dihydroxy compound, among others, a structural unit derived from an aliphatic dihydroxy compound and/or an alicyclic dihydroxy compound each containing a primary hydroxyl group, from the viewpoint of imparting flexibility and excellent toughness to the obtained polycarbonate resin, the content of the structural unit is preferably 0.1 mass % or more, more preferably 1 mass % or more, still more preferably 3 mass % or more. The content is preferably 50 mass % or less, more preferably 30 mass % or less, still more preferably 20 mass % or less, yet still more preferably 16 mass % or less, and even yet still more preferably 10 mass % or less.

The polycarbonate resin of the present invention may contain a structural unit derived from isosorbide. Isosorbide is obtained by dehydration condensation of sorbitol produced from various starches existing abundantly as a plant-derived resource and being easily available and is preferred as a structural unit of the polycarbonate resin in view of availability, ease of production, weather resistance, optical properties, moldability, heat resistance and carbon neutrality.

In the case where the polycarbonate resin of the present invention contains a structural unit derived from isosorbide, in view of optical properties, mechanical properties, heat resistance, etc., the content of the structural unit is preferably 5 mass % or more, more preferably 10 mass % or more, still more preferably 20 mass % or more. The content is preferably 80 mass % or less, more preferably 70 mass % or less, still more preferably 65 mass % or less.

The polycarbonate resin of the present invention may contain one member or two or more members of structural units derived from a compound (hereinafter, sometimes referred to as "dihydroxy compound (9)") represented by the following formula (9), and excellent optical properties can be imparted by containing a structural unit derived from the dihydroxy compound (9).

[Chem. 21]

(9)

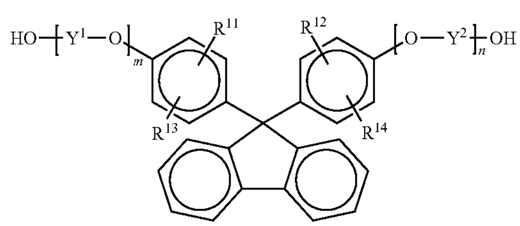

(in the formula (9), each of $R^{11}$ to $R^{14}$ independently represents a hydrogen atom, a substituted or unsubstituted alkyl group having a carbon number of 1 to 20, a substituted or unsubstituted cycloalkyl group having a carbon number of 6 to 20, or a substituted or unsubstituted aryl group having a carbon number of 6 to 20, each of $Y^1$ and $Y^2$ independently represents a substituted or unsubstituted alkylene group having a carbon number of 2 to 10, a substituted or unsubstituted cycloalkylene group having a carbon number of 6 to 20, or a substituted or unsubstituted arylene group having a carbon number of 6 to 20, and each of m and n is independently an integer of 0 to 5).

The dihydroxy compound (9) includes the dihydroxy compounds described in JP-A-2012-214729.

In the case where the polycarbonate resin of the present invention contains a structural unit derived from the dihydroxy compound (9), from the viewpoint of providing preferable wavelength dispersion characteristics at the time of utilization of the polycarbonate resin of the present invention as an optical film, the content of the structural unit is preferably 40 mass % or more, more preferably 45 mass % or more, still more preferably 50 mass % or more, yet still more preferably 55 mass % or more, even yet still more preferably 60 mass % or more.

If the proportion of the structural unit contained is too small, desired wavelength dispersion characteristics may not be obtained at the time of utilization of the polycarbonate resin of the present invention as an optical film. If the proportion of the structural unit contained is too large, when utilizing the polycarbonate resin of the present invention as an optical film, the ratio between the retardation measured at a wavelength of 450 nm and the retardation measured at a wavelength of 550 nm may become excessively large, failing in obtaining desired optical properties. Accordingly, the content is preferably 95 mass % or less, more preferably 90 mass % or less, still more preferably 85 mass % or less, yet still more preferably 80 mass % or less.

The polycarbonate resin of the present invention may contain one member or two or more members of structural units derived from a compound (hereinafter, sometimes referred to as "dihydroxy compound (10)") represented by the following formula (10), and by containing a structural unit derived from the dihydroxy compound (10), the glass transition temperature can be controlled to fall in a suitable range and not only there is possibility that melt molding or film forming of the obtained polycarbonate resin can be facilitated but also predetermined optical properties can be obtained.

[Chem. 22]

(10)

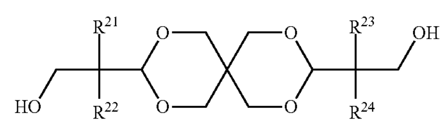

In the formula (10), each of $R^{21}$ to $R^{24}$ independently represents a hydrogen atom, a substituted or unsubstituted alkyl group having a carbon number of 1 to 20, a substituted or unsubstituted cycloalkyl group having a carbon number of 5 to 20, or a substituted or unsubstituted aryl group having a carbon number of 6 to 20.

The dihydroxy compound (10) includes the dihydroxy compounds described in JP-A-2012-74107.

In the case where the polycarbonate resin of the present invention contains a structural unit derived from the dihydroxy compound (10), from the viewpoint that the glass transition temperature can be controlled to fall in a suitable range and not only melt molding or film forming of the obtained polycarbonate resin can be facilitated but also predetermined optical properties can be obtained, the content of the structural unit is preferably 50 mol % or more, more preferably 55 mol % or more, still more preferably 60 mol % or more, yet still more preferably 65 mol % or more, of structural units derived from all dihydroxy compounds in the polycarbonate resin.

If the content of the structural unit derived from the dihydroxy compound (10) is small, not only the glass transition temperature may rise excessively, making melt molding or film forming of the obtained polycarbonate resin or the later-described filtration difficult, but also desired optical properties may not be obtained. On the other hand, if the content of the structural unit derived from the dihydroxy compound (10) is too large, desired optical properties may not be obtained and in addition, the heat resistance may change for the worse. Accordingly, the content is preferably 80 mol % or less, more preferably 75 mol % or less.

The polycarbonate resin of the present invention may contain a structure (hereinafter, sometimes referred to as "structure (11)") represented by the following formula (11) and/or a structure (hereinafter, sometimes referred to as "structure (12)") represented by the following formula (12), and reverse wavelength dispersibility can be obtained by containing these structural units.

However, if the proportion of these structures (11) and (12) contained is excessively high, the photoelastic coefficient or reliability may be deteriorated or a high birefringence may not be obtained by stretching. In addition, if the proportion of such an oligofluorene structural unit in the resin is excessively high, the range of molecular design flexibility is narrowed, and it becomes difficult to make improvement when reforming of the resin is required. On the other hand, even if desired reverse wavelength dispersivity is obtained with a very small amount of oligofluorene structural unit, the optical properties are here caused to sensitively change depending on a slight variation of the oligofluorene content, and this makes it difficult to produce the resin to keep various properties in given ranges.

[Chem. 23]

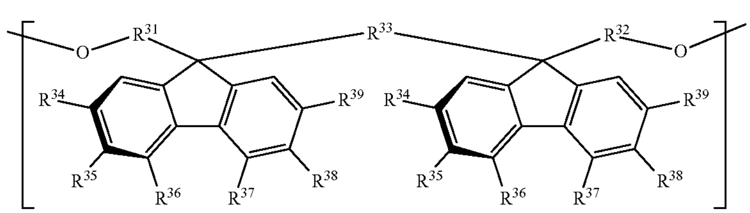

(11)

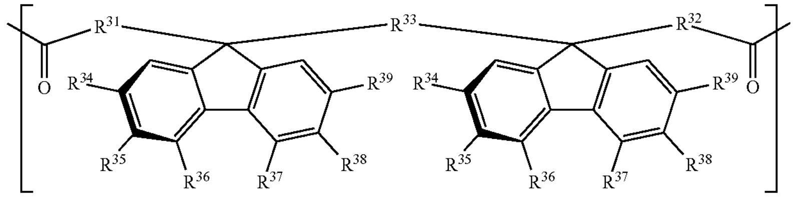

(12)

(In the formulae (11) and (12), each of $R^{31}$ to $R^{33}$ independently represents a direct bond, an alkylene group having a carbon number of 1 to 4, which may have a substituent, and each of $R^{34}$ to $R^{39}$ independently represents a hydrogen atom, an alkyl group having a carbon number of 1 to 10, which may have a substituent, an aryl group having a carbon number of 4 to 10, which may have a substituent, an acyl group having a carbon number of 1 to 10, which may have a substituent, an alkoxy group having a carbon number of 1 to 10, which may have a substituent, an aryloxy group having a carbon number of 4 to 10, which may have a substituent, an amino group which may have a substituent, an alkenyl group having a carbon number of 2 to 10, which may have a substituent, an alkynyl group having a carbon number of 2 to 10, which may have a substituent, a sulfur atom having a substituent, a silicon atom having a substituent, a halogen atom, a nitro group, or a cyano group, provided that $R^{34}$ to $R^{39}$ may be the same as or different from each other and at least two adjacent groups out of $R^{34}$ to $R^{39}$ may combine with each other to form a ring).

The raw material dihydroxy compound and raw material dicarboxylic acid compound for introducing structure (11) and structure (12) into the polycarbonate resin include those described in International Publication No. 2014/61677.

In the case where the polycarbonate resin of the present invention contains structure (11) and/or structure (12), from the viewpoint of enhancing the optical properties at the time of utilization of the polycarbonate resin of the present invention in optical applications or broadening the range of molecular design flexibility to increase the latitude in improvement of properties, the content of the structure is preferably from 1 to 40 mass %, more preferably from 10 to 35 mass %, still more preferably from 15 to 32 mass %, yet still more preferably 20 to 30 mass %.

The polycarbonate resin of the present invention may contain a structural unit derived from other dihydroxy compounds besides the above-described structures, and the structural unit derived from other dihydroxy compounds includes, for example, a structural unit derived from an aromatic dihydroxy compound.

[Production Method of Polycarbonate Resin]

Although the polycarbonate resin of the present invention is produced by a polymerization method employed in general, and the polymerization method may be either a solution polymerization method using phosgene or a melt polymerization method of performing a reaction with a carbonic acid diester, a melt polymerization method of reacting a raw material dihydroxy compound in the presence of a polymerization catalyst with a carbonic acid diester less toxic to the environment is preferred.

The carbonic acid diester used in the melt polymerization method includes usually a carbonic acid diester represented by the following formula (13):

[Chem. 24]

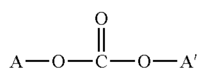

(13)

(in the formula (13), each of A and A' is an aliphatic group having a carbon number of 1 to 18, which may have a substituent, or an aromatic group which may have a substituent, and A and A' may be the same or different).

The carbonic acid diester represented by the formula (13) includes, for example, diphenyl carbonate, a substituted diphenyl carbonate typified by ditolyl carbonate, dimethyl carbonate, diethyl carbonate, and di-tert-butyl carbonate. Among these, diphenyl carbonate and a substituted diphenyl carbonate are preferred. One of these carbonic acid diesters may be used alone, or two or more thereof may be mixed and used.

The carbonic acid diester in an amount of preferably 50 mol % or less, more preferably 30 mol % or less, may be replaced by a dicarboxylic acid or a dicarboxylic acid ester. Typical dicarboxylic acid or dicarboxylic acid ester includes, for example, terephthalic acid, isophthalic acid, diphenyl terephthalate, and diphenyl isophthalate. The above-described raw material dicarboxylic acid compound for introducing structure (12) may also be used. When the carbonic acid diester is replaced by such a dicarboxylic acid or dicarboxylic acid ester, a polyester carbonate resin is obtained.

The carbonic acid diester is preferably used in a ratio by mol of 0.90 to 1.10, more preferably from 0.96 to 1.04, relative to all dihydroxy compounds used for the reaction. If this ratio by mol is less than 0.90, the terminal OH group of the produced polycarbonate resin is increased, as a result, the thermal stability of the polymer may be deteriorated or a desired high-molecular-weight polycarbonate resin may not be obtained. In addition, if this ratio by mol exceeds 1.10, not only the rate of a transesterification reaction decreases under the same conditions or a polycarbonate resin having a desired molecular weight is difficult to produce but also the amount of residual carbonic acid diester in the produced polycarbonate resin is increased, and the residual carbonic acid diester disadvantageously gives rise to an odor during molding or of a molded article.

As the raw material dihydroxy compound, dihydroxy compounds such as dihydroxy compound for introducing structure (1), aliphatic dihydroxy compound, alicyclic dihydroxy compound, isosorbide, dihydroxy compound (9), dihydroxy compound (10) and dihydroxy compound for introducing structure (11) are used to provide the proportion described above as a suitable proportion of a constituent unit derived from each dihydroxy compound constituting the polycarbonate resin of the present invention.

As the polymerization catalyst (transesterification catalyst) in the melt polymerization, an alkali metal compound and/or an alkaline earth metal compound are used. Although a basic compound such as basic boron compound, basic phosphorus compound, basic ammonium compound and amine-based compound may be subsidiarily used in combination, together with the alkali metal compound and/or alkaline earth metal compound, it is particularly preferable to use only an alkali metal compound and/or an alkaline earth metal compound.

The alkali metal compound used as the polymerization catalyst includes, for example, sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholate and phenolate of sodium, potassium, lithium and cesium, and disodium, dipotassium, dilithium and dicesium salts of bisphenol A.

The alkaline earth metal compound includes, for example, calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

One of these alkali metal compounds and/or alkaline earth metal compounds may be used alone, or two or more thereof may be used in combination.

Specific examples of the basic boron compound used in combination with the alkali metal compound and/or alkaline earth metal compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, butyltriphenylboron, etc.

The basic phosphorus compound includes, for example, triethylphosphine, tri-n-propylphosphine, triisopropylphosphine, tri-n-butylphosphine, triphenylphosphine, tributylphosphine, and quaternary phosphonium salt.

The basic ammonium compound includes, for example, tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenyl ammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

The amine-based compound includes, for example, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

One of these basic compounds may also be used alone, or two or more thereof may be used in combination.

As for the amount of the polymerization catalyst used, in the case of using an alkali metal compound and/or an alkaline earth metal compound, the polymerization catalyst is usually used in an amount of, in terms of metal, from 0.1 to 500 μmol, preferably from 0.5 to 300 μmol, more preferably from 1 to 250 μmol, per mol of all dihydroxy compounds used for the reaction.

If the amount of the polymerization catalyst used is too small, polymerization activity necessary for producing a polycarbonate resin having a desired molecular weight cannot be obtained, whereas if the amount of the polymerization catalyst used is too large, the hue of the obtained polycarbonate resin may be deteriorated or a byproduct may be generated to cause many occurrences of reduction in flowability or production of a gel, making it difficult to produce a polycarbonate resin having an intended quality.

In producing the polycarbonate resin of the present invention, various raw material dihydroxy compounds may be supplied as a solid, may be heated and supplied in a melted state, or if soluble in water, may be supplied in the form of an aqueous solution.

When the raw material dihydroxy compound is supplied in a melted state or in the form of an aqueous solution, this is advantageous in that weighing or transportation is facilitated at the time of industrial production.

In the present invention, the method of reacting the raw material dihydroxy compounds with a carbonic acid diester in the presence of a polymerization catalyst is usually performed by a multi-step process of two or more steps. Specifically, the reaction in the first step is performed at a temperature of 140 to 220° C., preferably from 150 to 200° C., for 0.1 to 10 hours, and preferably from 0.5 to 3 hours. In the second and subsequent steps, the reaction temperature is elevated with gradually reducing the pressure of the reaction system from the pressure in the first step and at the same time, removing the generated phenol outside of the reaction system, and the polycondensation reaction is performed finally under a pressure in the reaction system of 200 Pa or less at a temperature of 210 to 280° C.

At the time of pressure reduction in this polycondensation reaction, it is important to control the balance between the temperature and the pressure in the reaction system. In particular, if even either one of the temperature and the pressure is too rapidly changed, an unreacted monomer distills to upset the molar ratio of the dihydroxy compound to the carbonic acid diester, and the polymerization degree may decrease.

For example, in the case of using, as the dihydroxy compound, isosorbide and 1,4-cyclohexanedimethanol in addition to myo-inositol, when the molar ratio of 1,4-cyclohexanedimethanol is 50 mol % or more relative to all dihydroxy compounds, 1,4-cyclohexanedimethanol still as a monomer readily distills. Accordingly, it is preferable to perform the reaction with elevating the temperature at a temperature rise rate of 40° C. or less per hour under reducing the pressure in the reaction system to about 13 kPa, further elevate the temperature at a temperature rise rate of 40° C. or less per hour under a pressure up to about 6.67 kPa, and finally perform the polycondensation reaction under a pressure of 200 Pa or less at a temperature of 200 to 250° C., since a polycarbonate resin sufficiently increased in the polymerization degree is obtained.

When the molar ratio of 1,4-cyclohexanedimethanol is less than 50 mol %, particularly 30 mol % or less, relative to all dihydroxy compounds, an abrupt increase of viscosity occurs, compared to the case where the molar ratio of 1,4-cyclohexanedimethanol is 50 mol % or more. Accordingly, it is preferable to perform the reaction with elevating the temperature at a temperature rise rate of 40° C. or less per hour until the pressure in the reaction system is reduced to about 13 kPa, further perform the reaction with elevating the temperature at a temperature rise rate of 40° C. or more per hour, preferably 50° C. or more per hour, under a pressure up to about 6.67 kPa, and finally perform the polycondensation reaction under reduced pressure of 200 Pa or less at a temperature of 220 to 290° C., since a polycarbonate resin sufficiently increased in the polymerization degree is obtained.

The reaction form may be any method of a batch system, a continuous system, and a combination of batch system and continuous system.

At the time of producing the polycarbonate resin of the present invention by a melt polymerization method, a phosphoric acid compound, a phosphorous acid compound, or a metal salt thereof may be added during polymerization for the purpose of preventing coloration.

As the phosphoric acid compound, one member or two or more members of trialkyl phosphates such as trimethyl phosphate and triethyl phosphate are suitably used. This compound is preferably added in an amount of 0.0001 to 0.005 mol %, more preferably from 0.0003 to 0.003 mol %, relative to all dihydroxy compounds used for the reaction. If the amount of the phosphorus compound added is less than the lower limit above, the effect of preventing coloration is low, whereas if it exceeds the upper limit, this may cause an increase in haze or may conversely promote the coloration or decrease the heat resistance.

In the case of adding a phosphorous acid compound, a compound arbitrarily selected from the following thermal stabilizers may be used. In particular, one member or two or more members of trimethyl phosphite, triethyl phosphite, trisnonylphenyl phosphite, trimethyl phosphite, tris(2,4-di-tert-butylphenyl)phosphite, and bis(2,4-di-tert-butylphenyl) pentaerythritol diphosphite may be suitably used.

The phosphorous acid compound is preferably added in an amount of 0.0001 to 0.005 mol %, more preferably from 0.0003 to 0.003 mol %, relative to all dihydroxy compounds used for the reaction. If the amount of the phosphorous acid compound added is less than the lower limit above, the effect of preventing coloration is low, whereas if it exceeds the upper limit, this may cause an increase in haze or may conversely promote the coloration or decrease the heat resistance.

A phosphoric acid compound and a phosphorous acid compound or a metal salt thereof may be used in combination and in this case, the amount added is, in terms of the total amount of a phosphoric acid compound and a phosphorous acid compound or a metal salt thereof, is in the above-described range, i.e., preferably from 0.0001 to 0.005 mol %, more preferably from 0.0003 to 0.003 mol %, relative to all dihydroxy compounds. If the amount added is less than the lower limit above, the effect of preventing coloration is low, whereas if it exceeds the upper limit, this may cause an increase in haze or may conversely promote the coloration or decrease the heat resistance.

The metal salt of a phosphoric acid compound or phosphorous acid compound is preferably an alkali metal salt or a zinc salt, more preferably a zinc salt. Among zinc phosphates, a zinc long-chain alkylphosphate is preferred.

In the thus-produced polycarbonate resin of the present invention, a thermal stabilizer may be blended so as to prevent reduction in the molecular weight or deterioration of the hue at the time of molding, etc.

The thermal stabilizer includes, for example, a phosphorous acid, a phosphoric acid, a phosphonous acid, a phosphonic acid, and an ester thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethylbenzene phosphonate, diethylbenzene phosphonate, and dipropylbenzene phosphonate.

Among these, trisnonylphenyl phosphite, trimethyl phosphate, tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, and dimethylbenzene phosphonate are preferably used.

One of these thermal stabilizers may be used alone, or two or more thereof may be used in combination.

Such a thermal stabilizer may be further additionally blended, in addition to the amount added at the time of melt polymerization. More specifically, when a phosphorous acid compound is further blended by the later-described blending method after obtaining a polycarbonate resin by blending an appropriate amount of phosphorous acid compound or phosphoric acid compound, a large amount of heat stabilizer can be blended with avoiding increased haze, coloration and decrease in the heat resistance during polymerization, and deterioration of hue can be prevented.

The blending amount of the thermal stabilizer is preferably from 0.0001 to 1 part by mass, more preferably from 0.0005 to 0.5 parts by mass, still more preferably from 0.001 to 0.2 parts by mass, per 100 parts by mass of the polycarbonate resin.

In the polycarbonate resin of the present invention, a generally known antioxidant may also be blended for the purpose of preventing oxidation.

The antioxidant includes, for example, one member or two or more members of pentaerythritol tetrakis(3-mercaptopropionate), pentaerythritol tetrakis(3-laurylthiopropionate), glycerol-3-stearyl-thiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-tri methyl-2,4,6-tris(3,5-di-tert-butyl-4-hydroxybenzyl)benzene, N,N-hexamethylene-bis(3,5-di-tert-butyl-4-hydroxy-hydrocinnamide), diethyl-3,5-di-tert-butyl-4-hydroxy-benzyl phosphonate, tris(3,5-di-tert-butyl-4-hydroxybenzyl) isocyanurate, tetrakis(2,4-di-tert-butylphenyl)-4,4'-biphenylene diphosphinate, 3,9-bis{1,1-dimethyl-2-[β-(3-tert-butyl-4-hydroxy-5-methylphenyl)propionyloxy]ethyl}-2,4,8,10-tetraoxaspiro(5,5)undecane, etc.

The blending amount of the antioxidant is preferably from 0.0001 to 0.5 parts by mass per 100 parts by mass of the polycarbonate.

In the polycarbonate resin of the present invention, for more enhancing the releasability from a mold at the time of melt molding, a release agent may also be blended within the range not impairing the object of the present invention.

The releasing agent includes a higher fatty acid ester of monohydric or polyhydric alcohol, a higher fatty acid, paraffin wax, beeswax, an olefin-based wax, an olefin-based wax containing a carboxy group and/or a carboxylic acid anhydride group, silicone oil, organopolysiloxane, etc.

The higher fatty acid ester is preferably a partial or full ester of a monohydric or polyhydric alcohol having a carbon number of 1 to 20 and a saturated fatty acid having a carbon number of 10 to 30. The partial or full ester of a monohydric or polyhydric alcohol and a saturated fatty acid includes, for example, monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate.

Among these, monoglyceride stearate, triglyceride stearate, pentaerythritol tetrastearate, and behenyl behenate are preferably used.

The higher fatty acid is preferably a saturated fatty acid having a carbon number of 10 to 30. Such a fatty acid includes, for example, myristic acid, lauric acid, palmitic acid, stearic acid, and behenic acid.

One of these release agents may be used alone, or two or more thereof may be mixed and used.

The blending amount of the release agent is preferably from 0.01 to 5 parts by mass per 100 parts by mass of the polycarbonate.

In the polycarbonate resin of the present invention, a light stabilizer may be blended within the range not impairing the object of the present invention.

The light stabilizer includes, for example, 2-(2'-hydroxy-5'-tert-octylphenyl)benzotriazole, 2-(3-ten-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis[6-(2H-benzotriazol-2-yl-4-tert-octylphenol)], and 2,2'-p-phenylenebis(1,3-benzoxazin-4-one).

One of these light stabilizers may be used alone, or two or more thereof may be used in combination.

The blending amount of the light stabilizer is preferably from 0.01 to 2 parts by mass per 100 parts by mass of the polycarbonate resin.

In the polycarbonate resin of the present invention, a bluing agent may be blended so as to cancel the yellow tint of a lens attributable to a polymer or an ultraviolet absorber. Any bluing agent may be used with no particular problem as long as it is used for polycarbonate resins. In general, an anthraquinone-based dye is easily available and preferred.

Specific representative examples of the bluing agent include generic name Solvent Violet 13 [CA. No. (Color index No.) 60725], generic name Solvent Violet 31 [CA. No. 68210], generic name Solvent Violet 33 [CA. No. 60725], generic name Solvent Blue 94 [CA. No. 61500], generic name Solvent Violet 36 [CA. No. 68210], generic name Solvent Blue 97 [produced by Bayer AG, "MACROLEX VIOLET RR" ], and generic name Solvent Blue 45 [CA. No. 61110].

One of these bluing agents may be used alone, or two or more thereof may be used in combination.

The bluing agent is usually blended in a ratio of $0.1\times10^{-4}$ to $2\times10^{-4}$ parts by mass per 100 parts by mass of the polycarbonate resin.

The method for mixing various additives described above with the polycarbonate resin of the present invention includes, for example, a method of mixing these components by means of a tumbler, a V-blender, a super mixer, a Nauta mixer, a Banbury mixer, a kneading roll, an extruder, etc., and a solution blending method of mixing respective components each in a state of being dissolved in a common good solvent such as methylene chloride. The method is not particularly limited, and any method may be used as long as it is a generally employed polymer blending method.

The thus-obtained polycarbonate resin of the present invention or a polycarbonate resin composition obtained by adding various additives thereto can be formed, directly or after once pelletized with a melt extruder, into a molded article by a generally known method such as injection molding method, extrusion molding method or compression molding method.

In order to obtain stable releasability and physical properties by increasing the miscibility of the polycarbonate resin of the present invention, a single-screw extruder or a twin-screw extruder is preferably used in the melt extrusion. The method using a single-screw extruder or a twin-screw extruder does not involve the use of a solvent, etc., resulting in little impact on the environment, and can be suitably used also in view of productivity.

The melt kneading temperature of the extruder depends on the glass transition temperature of the polycarbonate resin of the present invention, and when the glass transition temperature of the polycarbonate resin of the present invention is less than 90° C., the melt kneading temperature of the extruder is usually from 130 to 250° C., preferably from 150 to 240° C.

If the melt kneading temperature is less than 130° C., the melt viscosity of the polycarbonate resin is high to impose a large load on the extruder and the productivity decreases, whereas if it exceeds 250° C., the melt viscosity of the polycarbonate resin decreases, making it difficult to obtain pellets, as a result, the productivity is reduced.

In addition, when the glass transition temperature of the polycarbonate resin of the present invention is 90° C. or more, the melt kneading temperature of the extruder is usually from 200 to 300° C., preferably from 220 to 260° C. If the melt kneading temperature is less than 200° C., the melt viscosity of the polycarbonate resin is high, imposing a large load on the extruder, and the productivity is reduced, whereas if it exceeds 300° C., deterioration of the polycarbonate resin is likely to occur, and the color of the polycarbonate resin may turn to yellow or the molecular weight decreases to deteriorate the strength.

In the case of using an extruder, a filter is preferably disposed so as to prevent burning of the polycarbonate resin or intermingling of foreign matters at the time of extrusion. The pore size (opening) of the filter for removing foreign matters varies depending on the required optical accuracy but is preferably 100 μm or less. Above all, in the case of avoiding intermingling of foreign matters, the size is more preferably 40 μm or less, still more preferably 10 μm or less.

Extrusion of the polycarbonate resin is preferably conducted in a clean room so as to prevent intermingling of foreign matters after the extrusion.

At the time of cooling and chipping the extruded polycarbonate resin, a cooling method such as air cooling or water cooling is preferably used. As the air used for air cooling, air after previously removing foreign matters in the air through a hepafilter, etc. is preferably used to prevent reattachment of foreign matters in air. In the case of using water cooling, water after removing metal portions in the water by an ion-exchange resin, etc. and further removing foreign matters in the water through a filter is preferably used. Although the filter used may have various pore sizes (openings), a filter of 10 to 0.45 μm is preferred.

[Physical Properties of Polycarbonate Resin]

<Glass Transition Temperature>

The glass transition temperature measured as the midpoint glass transition initiation temperature Tmg of the polycarbonate resin of the present invention is preferably 100° C. or more, more preferably 105° C. or more, still more preferably 110° C. or more.

If the glass transition temperature is too low, various molded articles formed may suffer from poor reliability. On the other hand, if the glass transition temperature is high, deterioration of the polycarbonate resin may occur due to shear heating or the melt viscosity at the time of filtration through a filter may be excessively increased to cause deterioration of the polycarbonate resin. Accordingly, the midpoint glass transition initiation temperature Tmg is preferably 260° C. or less, more preferably 230° C. or less, still more preferably 200° C. or less, yet still more preferably 175° C. or less. In addition, from the viewpoint of enhancing the heat resistance by raising the glass transition temperature, a polycarbonate resin in which at least one terminal is not a hydroxy group is preferred.

The glass transition temperature of the polycarbonate resin is measured by the method described later in the paragraph of Examples.

<Reduced Viscosity>

The polymerization degree (molecular weight) of the obtained resin, when it reaches above a certain level, can be expressed by reduced viscosity. Accordingly, with exceptions such as polycarbonate diol utilized in a relatively low polymerization degree (molecular weight), the polymerization degree (molecular weight) of the polycarbonate resin of the present invention can be measured by reduced viscosity. The polymerization degree (molecular weight) of the polycarbonate resin of the present invention can be determined as the reduced viscosity measured at a temperature of 30.0° C.±0.1° C. by using, as the solvent, a mixed solvent of phenol and 1,1,2,2-tetrachloroethane at a weight ratio of 1:1 and precisely adjusting the polycarbonate resin concentration to 1.00 g/dl (hereinafter, sometimes simply referred to as a "reduced viscosity").

If the reduced viscosity of the resin is too low, the heat resistance, chemical resistance, abrasion resistance and mechanical strength of the molded article obtained may be reduced. Accordingly, the reduced viscosity is usually 0.20 dL/g or more, and preferably 0.30 dL/g or more.

On the other hand, if the reduced viscosity of the resin is too high, it is likely that flowability at the time of molding is reduced and the productivity or moldability deteriorates or the strain of the molded article obtained increases. Accordingly, the reduced viscosity is usually 1.50 dL/g or less, preferably 1.20 dL/g or less, more preferably 1.00 dL/g or less, and still more preferably 0.90 dL/g or less.

The reduced viscosity of the polycarbonate resin is, more specifically, measured by the method described later in the paragraph of Examples.

<5% Thermal Weight Loss Temperature>

The 5% thermal weight loss temperature of the polycarbonate resin of the present invention is preferably 300° C. or more, and more preferably 320° C. or more. As the 5% thermal weight loss temperature is higher, the thermal stability is higher, and the resin can withstand use at a higher temperature. The production temperature can also be set high, and the latitude in control during production can be broadened, facilitating the production.

On the other hand, as the 5% thermal weight loss temperature is lower, the thermal stability decreases, and use at a high temperature becomes difficult. In addition, the latitude in control during production is narrowed, making the production difficult. Although the upper limit of the 5% thermal weight loss temperature is not particularly limited, it is usually 370° C. or less.

The 5% thermal weight loss temperature of the polycarbonate resin is measured by the method described later in the paragraph of Examples.

<Abbe Number>

The Abbe number of the polycarbonate resin of the present invention is, when used for a single lens as a convex lens, preferably 30 or more, and more preferably 35 or more. As the Abbe number is larger, the wavelength dispersion of refractive index becomes smaller and, for example, when used for a single lens, chromatic aberration is reduced to facilitate obtaining a clearer image.

As the Abbe number gives is smaller, the wavelength dispersion of refractive index becomes larger and when used as a single lens, chromatic aberration is increased, resulting in a larger blur degree of image. Although the upper limit of the Abbe number is not particularly limited, it is usually 70 or less. On the other hand, when used for a concave lens and an achromatic lens, the Abbe number is preferably smaller and is less than 30, preferably less than 28, and more preferably less than 26.

The Abbe number of the polycarbonate resin is measured by the method described later in the paragraph of Examples.

[Polycarbonate Resin Composition]

The polycarbonate resin of the present invention may also be used as a polymer alloy by kneading it with, for example, one member or two or more members of a synthetic resin such as aromatic polycarbonate resin, aromatic polyester, aliphatic polyester, polyamide, polystyrene, polyolefin, acryl, amorphous polyolefin, ABS and AS, a biodegradable resin such as polylactic acid and polybutylene succinate, rubber, etc.

Furthermore, together with these other resin components, a nucleating agent, a flame retardant, a flame retardant aid, an inorganic filler, an impact improver, a hydrolysis inhibitor, a foaming agent, a dye/pigment, etc., which are usually used for a resin composition, may be added to the polycarbonate resin of the present invention to make a polycarbonate resin composition.

[Molding Method of Polycarbonate Resin]

The polycarbonate resin of the present invention and a polycarbonate resin composition containing the resin can be formed into a molded article by a generally known method such as injection molding method, extrusion molding method or compression molding method, and a molded article excellent in heat resistance, transparency, light resistance, weather resistance and mechanical strength can be obtained.

[Polycarbonate Resin as Raw Material of Polyurethane]

In the polycarbonate resin of the present invention, when the percentage of the number of molecular chain terminals that are an alkoxy group (an alkyloxy group or an aryloxy group) is 5% or less relative to the total number of molecular chain terminals and furthermore, preferably 95% or more of both molecular chain terminals are a hydroxyl group, a polyurethane can be obtained by reacting the resin with a polyisocyanate (hereinafter, a polyurethane produced by using the polycarbonate resin of the present invention as a raw material is sometimes referred to as "polyurethane according to the present invention").

<Percentage of Other Structures>

In the case where the polycarbonate resin of the present invention reacted with a polyisocyanate contains the above-described structural unit derived from an aliphatic dihydroxy compound and/or an alicyclic dihydroxy compound, among others, a structural unit derived from an aliphatic dihydroxy compound and/or an alicyclic dihydroxy compound each having a primary hydroxyl group, the content of the structural unit is, in view of handleability of the polycarbonate resin or excellent flexibility of the obtained polyurethane, preferably 10 mol % or more, more preferably 20 mol % or more, and still more preferably 30 mol % or more, relative to structural units derived from all hydroxy compounds in the polycarbonate resin. The content is also preferably 95 mol % or less, and more preferably 90 mol % or less, still more preferably 85 mol % or less.

<Molecular Weight/Molecular Weight Distribution>

The lower limit of the number average molecular weight of the polycarbonate resin of the present invention reacted with a polyisocyanate is 250, preferably 300, and more preferably 400. On the other hand, the upper limit is 5,000, preferably 4,000, and more preferably 3,000. If the number average molecular weight of the polycarbonate resin is less than the lower limit above, the molecular chain length of the soft segment moiety in the polyurethane becomes insufficient, as a result, mechanical strength characterizing the present invention is not obtained satisfactorily. On the other hand, if the number molecular weight exceeds the upper limit above, the viscosity may rise to impair handling at the time of polyurethane formation.

Although the molecular weight distribution (Mw/Mn) of the polycarbonate resin of the present invention reacted with a polyisocyanate is not particularly limited, the lower limit is usually 1.5, preferably 1.7, and more preferably 1.8. The upper limit is usually 3.5, preferably 3.0, and more preferably 2.5.

If the molecular weight distribution exceeds the range above, the physical properties of a polyurethane produced by using the polycarbonate resin tend to undergo, e.g., hardening at low temperature or reduction of elongation. In addition, when a polycarbonate diol having a molecular weight distribution less than the range above is intended to produce, an advanced purification operation such as removal of oligomers may be required.

Here, Mw is a weight average molecular weight in terms of polystyrene, Mn is a number average molecular weight in terms of polystyrene, and these can be determined usually by gel permeation chromatography (GPC) measurement.

<Percentage of the Number of Molecular Chain Terminals which are an Alkyloxy Group or an Aryloxy Group/Hydroxyl Value>

In the polycarbonate resin of the present invention reacted with a polyisocyanate, the polymer terminal structure is basically a hydroxyl group. However, the polycarbonate resin product obtained by the reaction of a diol and a carbonic acid diester sometimes partially allows for the presence of an impurity having a structure in which the polymer terminal is not a hydroxyl group. Specific examples of this structure include a structure in which the molecular chain terminal is an alkyloxy group or an aryloxy group, and most are a structure derived from a carbonic acid diester.

For example, a phenoxy group (PhO—) may remain as an aryloxy group when a diphenyl carbonate is used as the carbonic acid diester, a methoxy group (MeO—) may remain as an alkyloxy group when a dimethyl carbonate is used, and an ethoxy group (EtO—) and a hydroxyethoxy group ($HOCH_2CH_2O$—) may remain respectively as a terminal group when a diethyl carbonate and an ethylene carbonate are used (where Ph represents a phenyl group, Me represents a methyl group, and Et represents an ethyl group).

In the present invention, in the case of a polycarbonate resin as a raw material of polyurethane, the percentage of the structure in which a molecular chain terminal contained in the polycarbonate resin product is an alkyloxy group or an aryloxy group is, in terms of the number of its terminal groups, 5 mol % or less, preferably 3 mol % or less, and more preferably 1 mol % or less, relative to the total number of terminals. The lower limit of the percentage of the number of molecular chain terminals that are an alkyloxy group or an aryloxy group is not particularly limited and is usually 0.01 mol %, preferably 0.001 mol %, and most preferably 0 mol %. If the percentage of the alkyloxy or aryloxy terminal group is large, there may arise a problem, for example, that the polymerization degree does not increase when a polyurethane forming reaction is performed.

In the case where the polycarbonate resin of the present invention is a polycarbonate resin as a raw material of polyurethane, as described above, the resin is configured such that the percentage of the number of molecular chain terminals that are an alkyloxy group or an aryloxy group is 5% or less, both molecular chain terminal groups are basically a hydroxyl group, and the hydroxyl group can react with an isocyanate during a polyurethane forming reaction.

In the case where the polycarbonate resin of the present invention is a polycarbonate resin as a raw material of polyurethane, although the hydroxyl value is not particularly limited, the lower limit is usually 10 mg-KOH/g, preferably 20 mg-KOH/g, and more preferably 35 mg-KOH/g. The upper limit is usually 230 mg-KOH/g, preferably 160 mg-KOH/g, and more preferably 130 mg-KOH/g. If the hydroxyl value is less than the lower limit above, the viscosity may rise too high, deteriorating the handling at the time of polyurethane formation, whereas if the hydroxyl value exceeds the upper limit above, the strength and hardness of the polyurethane formed may be insufficient.

<Number of Hydroxyl Groups Per Molecule>

The number of hydroxyl groups per molecule of the polycarbonate resin of the present invention reacted with a polyisocyanate is preferably from 1.8 to 2.0, more preferably from 1.9 to 2.0. If the number of hydroxyl groups per molecule exceeds the upper limit above, the viscosity of a polyurethane in which a crosslinked structure is formed in polyurethane may rise more than necessary to impair the handling. If the number of hydroxyl groups is less than lower limit above, there may arise a problem, for example, the polymerization degree does not increase when performing a polyurethane forming reaction.

<Ether Structure>

The polycarbonate resin of the present invention reacted with a polyisocyanate is based on a structure where a diol is polymerized by a carbonate group. However, depending on the production method, an ether structure formed by a dehydration reaction of diol may get mixed, in addition to an ether structure in the diol, and if its abundance is increased, the weather resistance or heat resistance may be reduced. Accordingly, the polycarbonate resin is preferably produced not to cause an excessive increase in the proportion of the ether structure.

From the viewpoint of ensuring properties such as weather resistance and heat resistance by reducing the proportion of the ether structure other than structure (1) in the polycarbonate resin, the ratio between an ether bond other than structure (1) contained in the molecular chain of the polycarbonate resin of the present invention and a carbonate bond is, in terms of molar ratio, usually 2/98 or less, preferably 1/99 or less, and more preferably 0.5/99.5 or less, although this is not particularly limited.

In the case where the above-described structural unit derived from an aliphatic dihydroxy compound and/or an alicyclic dihydroxy compound, other than structure (1) in the polycarbonate resin, also contains an ether bond, the polycarbonate resin is preferably produced not to cause an excessive increase in the proportion of the ether structure, other than the structure (1) and the structural unit derived from an aliphatic dihydroxy compound and/or an alicyclic dihydroxy compound.

At this time, the ratio between an ether bond, other than the structure (1) contained in the molecular chain of the polycarbonate resin as a raw material of polyurethane and the structural unit derived from an aliphatic dihydroxy compound and/or an alicyclic dihydroxy compound, and a carbonate resin is not particularly limited but is, in terms of molar ratio, usually 2/98 or less, preferably 1/99 or less, more preferably 0.5/99.5 or less.

<APHA Value>

The color of the polycarbonate resin of the present invention reacted with a polyisocyanate is preferably in a range not affecting color of the polyurethane obtained, and, although the value (hereinafter, referred to as "APHA value") when the degree of coloration is expressed by Hazen color number (in conformity with JIS K0071-1 (1998)) (APHA) is not particularly limited, it is preferably 100 or less, more preferably 70 or less, still more preferably 50 or less.

<Impurity Content>

{Phenols}

Although the amount of phenols contained in the polycarbonate resin of the present invention reacted with a polyisocyanate is not particularly limited, it is preferably smaller and is preferably 0.1 wt % or less, more preferably 0.01 wt % or less, still more preferably 0.001 wt % or less, since phenols are a monofunctional compound that may act as an inhibitor for the polyurethane forming reaction, and moreover, are an irritating material.

{Carbonic Acid Diester}

In the polycarbonate resin product of the present invention reacted with a polyisocyanate, a carbonic acid diester used as a raw material at the time of production may remain. Although the amount of carbonic acid diester remaining in the polycarbonate resin of the present invention is not limited, it is preferably smaller, and the upper limit is usually 1 wt %, preferably 0.5 wt %, more preferably 0.3 wt %. If the carbonic acid diester content in the polycarbonate diol is too large, the polyurethane forming reaction may be inhibited. On the other hand, the lower limit is not particularly limited and is 0.1 wt %, preferably 0.01 wt %, more preferably 0 wt %.

{Dihydroxy Compound}

In the polycarbonate resin product of the present invention reacted with a polyisocyanate, a raw material diol used at the time of production may remain. Although the amount of raw material dihydroxy compound remaining in the polycarbonate resin of the present invention is not limited, it is preferably smaller and is usually 1 wt % or less, preferably 0.1 wt % or less, more preferably 0.05 wt % or less. If the amount of raw material dihydroxy compound in the polycarbonate resin is too large, the molecular length of the soft segment moiety of the polyurethane formed sometimes becomes insufficient.

{Transesterification Catalyst}

In the case of producing the polycarbonate resin of the present invention reacted with a polyisocyanate, as described later, a transesterification catalyst may be used, if desired, so as to promote polymerization. In this case, the catalyst may remain in the obtained polycarbonate resin. If too much catalyst remains, the reaction may be difficult to control during the polyurethane forming reaction, leading to an unexpectedly promoted polyurethane forming reaction.

Accordingly, although it is not particularly limited, the amount of the catalyst remaining in the polycarbonate resin as a raw material of polyurethane is, as the content in terms of catalyst metal, is usually 100 ppm or less, preferably 50 ppm or less, and more preferably 10 ppm or less. However, if the amount of the catalyst is small, the transesterification reaction proceeds very slowly to reduce the production efficiency, and for this reason, the amount of the catalyst remaining in the polycarbonate resin is, as the content in terms of catalyst metal, usually 0.1 ppm or more, preferably 0.5 ppm or more, and more preferably 1 ppm or more.

<Production Method>

As for the production method of the polycarbonate resin of the present invention reacted with a polyisocyanate, the polycarbonate resin can be produced by the same method as that described above.

{Use Ratio of Raw Material, Etc.}

In order to obtain the polycarbonate resin of the present invention reacted with a polyisocyanate, the use amount of carbonic acid diester is not particularly limited, but usually, the lower limit thereof, in terms of the molar ratio per mol of the total of dihydroxy compounds used for reaction, is preferably 0.35, more preferably 0.50, and still more preferably 0.60. The upper limit is usually 1.00, preferably 0.98, and more preferably 0.97. If the use amount of carbonic acid diester exceeds the upper limit above, the proportion of a resin in which the terminal group of the polycarbonate resin obtained is not a hydroxyl group may be increased or the molecular weight may not grow to a predetermined range, making it impossible to produce the polycarbonate resin of the present invention. If the use amount is less than the lower limit above, polymerization may not proceed until a predetermined molecular weight.

In the case of using a transesterification catalyst in producing the polycarbonate resin of the present invention as a raw material of polyurethane, the use amount thereof is preferably an amount in which even if the catalyst remains in the obtained polycarbonate resin, it does not affect the performance. The upper limit of the use amount is, as the weight ratio in terms of metal relative to the weight of raw material dihydroxy compound, preferably 500 ppm, more preferably 100 ppm, and still more preferably 50 ppm. On the other hand, the lower limit is an amount enough to obtain sufficient polymerization activity and is preferably 0.01 ppm, more preferably 0.1 ppm, still more preferably 1 ppm.

{Reaction Conditions}

The method for charging a reaction raw material at the time of production of the polycarbonate resin of the present invention as a raw material of polyurethane is not particularly limited, and the method can be freely selected from, for example, a method in which entire amounts of dihydroxy compound, carbonic acid ester and catalyst are charged simultaneously and used for reaction, a method in which when the carbonic acid ester is a solid, a carbonic acid ester is first charged and heated/melted and a dihydroxy compound and a catalyst are then added, and a method in which, conversely, a dihydroxy compound is first charged and melted and a carbonic acid ester and a catalyst are injected thereinto.

A method in which part of the dihydroxy compound used is added at the end of reaction may also be employed so as to provide the polycarbonate resin of the present invention as a raw material of polyurethane, in which the percentage of the number of terminals that are an alkyloxy group or an aryloxy group is 5% or less. In this case, the upper limit of the amount of the dihydroxy compound added at the end is usually 20 mass %, preferably 15 mass %, and more preferably 10 mass %, relative to dihydroxy compounds to be charged, and the lower limit is usually 0.1 mass %, preferably 0.5 mass %, and more preferably 1.0 mass %.

As for the reaction temperature during esterification reaction, any temperature may be employed as long as it is a temperature capable of providing a practicable reaction rate. The temperature is not particularly limited, but the lower limit thereof is usually 70° C., preferably 100° C., and more preferably 130° C. The upper limit of the reaction temperature is usually less than 200° C., preferably 190° C. or less, and more preferably 180° C. or less. If the reaction temperature exceeds the upper limit above, there may arise a quality problem, for example, that the obtained polycarbonate resin is colored or an ether structure is produced.

Although the reaction may be performed at a normal pressure, the esterification reaction is an equilibrium reaction, and the reaction can be biased to a production system by distilling off a produced light boiling component to the outside of system. Accordingly, it is usually preferable to employ the reduced pressure condition in the latter half of reaction and thereby perform the reaction with distilling off a light boiling component. Alternatively, the reaction may also be allowed to proceed with distilling off a produced light boiling component by gradually reducing the pressure in the middle of reaction.

In particular, the reaction is preferably performed by increasing the degree of reduced pressure in the final period of reaction, since a byproduct such as monoalcohol and phenols can be distilled off.

In this case, although the reaction pressure at the time of completion of reaction is not particularly limited, the upper limit is usually 10 kPa, preferably 5 kPa, and more preferably 1 kPa. In order to effectively distill off these light boiling components, the reaction may also be performed with flowing a small amount of an inert gas such as nitrogen, argon and helium into the reaction system.

In the case of using low-boiling carbonic acid ester or dihydroxy compound at the time of transesterification reaction, a method of performing the reaction near the boiling point of carbonic acid diester or dihydroxy compound in an early stage of reaction and further allowing the reaction to proceed by gradually raising the temperature with the progress of reaction may also be employed. In this case, unreacted carbonic acid diester can be advantageously prevented from distilling off in the early stage of reaction. Furthermore, from the viewpoint of preventing a raw material from distilling off in such an early stage of reaction, it is also possible to attach a reflux pipe to the reactor and perform the reaction with refluxing carbonic acid diester and dihydroxy compound. This is advantageous in that the charged raw material is not lost and the quantitative ratio can be accurately adjusted.

The polymerization reaction is performed with measuring the molecular weight of the polycarbonate resin produced and is terminated upon reaching the target molecular weight. Although the reaction time necessary for polymerization greatly varies depending on the dihydroxy compound and carbonic acid diester used, the use or non-use of catalyst and the type of catalyst and cannot be therefore indiscriminately specified, the reaction time required to reach a predetermined molecular weight is usually 50 hours or less, preferably 20 hours or less, more preferably 10 hours or less.

As described above, when a catalyst is used at the time of polymerization reaction, the catalyst usually remains in the obtained polycarbonate resin, and the remaining metal catalyst sometimes makes it impossible to control the polyurethane forming reaction. In order to suppress the effect of the remaining catalyst, for example, a phosphorus-based compound in an amount substantially equimolar to the transesterification catalyst used may be added. Furthermore, when a heating treatment is applied as described later after the addition, the transesterification catalyst can be efficiently inactivated.

The phosphorus-based compound used for inactivation of the transesterification catalyst includes, for example, an inorganic phosphoric acid such as phosphoric acid and phosphorous acid, and an organic phosphoric acid ester such as dibutyl phosphate, tributyl phosphate, trioctyl phosphate, triphenyl phosphate and triphenyl phosphite.

One of these may be used alone, or two or more thereof may be used in combination.

Although the use amount of the phosphorus-based compound is not particularly limited, it may be sufficient, as described above, if it is substantially equimolar to the transesterification catalyst used. Specifically, relative to 1 mol of the transesterification catalyst used, the upper limit is preferably 5 mol, more preferably 2 mol, and the lower limit is preferably 0.8 mol, more preferably 1.0 mol. If a smaller amount of phosphorus-based compound is used, the transesterification catalyst in the reaction product is not sufficiently inactivated and when the obtained polycarbonate resin is used, for example, as a raw material for the production of polyurethane, the reactivity of the polycarbonate resin with an isocyanate group may not be adequately reduced. In addition, if a phosphorus-based compound exceeding the range above is used, the obtained polycarbonate resin may be colored.

Although inactivation of the transesterification catalyst by the addition of a phosphorus-based compound may be performed at room temperature, when a heating treatment is applied, inactivation is more efficiently achieved. The temperature of this heating treatment is not particularly limited, but the upper limit is preferably 150° C., more preferably 120° C., and still more preferably 100° C. The lower limit is preferably 50° C., more preferably 60° C., and still more preferably 70° C. At a temperature less than the lower limit, inactivation of the transesterification catalyst takes a long time, which is not efficient, and the degree of inactivation may also be insufficient. On the other hand, at a temperature exceeding 150° C., the obtained polycarbonate resin may be colored.

Although the time for the reaction with a phosphorus-based compound is not particularly limited, it is usually from 1 to 5 hours.

<Purification>

After the reaction at the time of production of the polycarbonate resin as a raw material of polyurethane, purification can be performed for the purpose of removing, from the polycarbonate resin product, an impurity in which the terminal structure is an alkyloxy group or an aryloxy group, phenols, a raw material diol, or a carbonic acid ester, a cyclic carbonate that is produced as a byproduct and has a low boiling point, and furthermore, a catalyst, etc. added. For the purification of a light boiling compound, a method of removing the compound by distillation can be employed. As the specific method for distillation, the mode of distillation, such as reduced-pressure distillation, steam distillation and thin-film distillation, is not limited, and an arbitrary method can be employed. In addition, in order to remove a water-soluble impurity, washing with, e.g., water, alkaline water, acidic water, or a solution having dissolved therein a chelating agent may be performed. In this case, the compound dissolved in water can be arbitrarily selected.

[Polyurethane]

In the method for producing a polyurethane by using the polycarbonate resin of the present invention as a raw material of polyurethane, known polyurethane-forming reaction conditions usually employed for the production of polyurethane are used.

For example, the polycarbonate resin of the present invention as a raw material of polyurethane is reacted with a polyisocyanate and a chain extender at a temperature ranging from room temperature to 200° C., whereby a polyurethane can be produced.

In addition, the polycarbonate resin of the present invention as a raw material of polyurethane is first reacted with an excess of polyisocyanate to produce an isocyanate-terminated prepolymer, and the polymerization degree is further raised using the chain extender, whereby a polyurethane can be produced.

{Reaction Reagent, Etc.}

<Polyisocyanate>

The polyisocyanate used when producing a polyurethane by using the polycarbonate resin of the present invention as a raw material of polyurethane includes various known aliphatic, alicyclic or aromatic polyisocyanate compounds.

Representative examples thereof include an aliphatic diisocyanate such as tetramethylene diisocyanate, pentamethylene diisocyanate, hexamethylene diisocyanate, 2,2,4-trimethylhexamethylene diisocyanate, 2,4,4-trimethylhexamethylene diisocyanate, lysine diisocyanate and dimer diisocyanate obtained by converting a carboxyl group of a dimer acid into an isocyanate group; an alicyclic diisocyanate such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate, 1,3-bis(isocyanatomethyl) cyclohexane and 1,4-bis(isocyanatomethyl)cyclohexane; and an aromatic diisocyanate such as xylylene diisocyanate, 4,4'-diphenyl diisocyanate, 2,4-tolylene diisocyanate, 2,6-tolylene diisocyanate, m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylene polyphenylisocyanate, phenylene diisocyanate and m-tetramethylxylylene diisocyanate. One of these compounds may be used alone, or two or more thereof may be used in combination.

Among these, in view of good balance of physical properties of the polyurethane obtained and mass availability at low cost in industry, preferable organic diisocyanates are 4,4'-diphenylmethane diisocyanate, 4,4'-dicyclohexylmethane diisocyanate, hexamethylene diisocyanate, and isophorone diisocyanate.

<Chain Extender>

The chain extender used at the time of producing a polyurethane by using the polycarbonate resin of the present invention as a raw material of polyurethane is a low-molecular-weight compound having at least two active hydrogens reacting with an isocyanate group and usually includes a polyol and a polyamine.

Specific examples thereof include linear diols such as ethylene glycol, diethylene glycol, 1,3-propylene glycol, 1,4-butanediol, 1,5-pentanediol, 1,6-hexanediol, 2,4-heptanediol, 1,8-octanediol, 1,4-dimethylolhexane, 1,9-nonanediol, 1,12-dodecanediol and dimer diol; diols having a branched chain, such as 2-methyl-1,3-propanediol, 2,2-dimethyl-1,3-propanediol, 2,2-diethyl-1,3-propanediol, 2-methyl-2-propyl-1,3-propanediol, 2-ethyl-1,3-hexanediol, 2,2,4-trimethyl-1,3-pentanediol, 2-methyl-1,8-octanediol and 2-butyl-2-ethyl-1,3-propanediol; diols having a cyclic group, such as 1,4-cyclohexanediol, 1,4-cyclohexanedimethanol and 1,4-dihydroxyethylcyclohexane; diols having an aromatic group, such as xylylene glycol, 1,4-dihydroxyethylbenzene and 4,4'-methylenebis(hydroxyethylbenzene); polyols such as glycerin, trimethylolpropane and pentaerythritol; hydroxyamines such as N-methylethanolamine and N-ethylethanolamine; polyamines such as ethylenediamine, 1,3-diaminopropane, hexamethylenediamine, triethylenetetramine, diethylenetriamine, isophoronediamine, 4,4'-diaminodicyclohexylmethane, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, 4,4'-diphenylmethanediamine, methylenebis (o-chloroaniline), xylylenediamine, diphenyldiamine, tolylenediamine, hydrazine, piperazine and N,N'-diaminopiperazine; and water.

One of these chain extenders may be used alone, or two or more thereof may be used in combination.

Among these, in view of good balance of physical properties of the polyurethane obtained and mass availability at low cost in industry, preferable chain extenders are 1,4-butanediol, 1,5-pentanediol, 1,6-hexanediol, 1,8-octanediol, 1,9-nonanediol, 1,4-cyclohexanedimethanol, 1,4-dihydroxyethylcyclohexane, ethylenediamine, and 1,3-diaminopropane.

<Chain Terminator>

At the time of producing a polyurethane by using the polycarbonate resin of the present invention as a raw material of polyurethane, a chain terminator having one active hydrogen group may be used, if desired, for the purpose of controlling the molecular weight of the polyurethane obtained.

Examples of the chain terminator include an aliphatic monool having a hydroxyl group, such as ethanol, propanol, butanol and hexanol, and an aliphatic monoamine having an amino group, such as diethylamine, dibutylamine, n-butylamine, monoethanolamine and diethanolamine.

One of these chain terminators may be used alone, or two or more thereof may be used in combination.

<Catalyst>

In a polyurethane forming reaction at the time of producing a polyurethane by using the polycarbonate resin of the present invention as a raw material of polyurethane, it is also possible to use a known urethane polymerization catalyst typified, for example, by an amine-based catalyst such as triethylamine, N-ethylmorpholine and triethylenediamine, a tin-based compound such as tin-based catalyst, e.g., trimethyltin laurate and dibutyltin dilaurate, and an organic metal salt of a titanium-based compound, etc. As for the urethane polymerization catalyst, one catalyst may be used alone, or two or more catalysts may be used in combination.

<Other Polyols>

At the time of producing a polyurethane by using the polycarbonate resin of the present invention as a raw material of polyurethane, other known polyols may be used in combination, if desired, in addition to the polycarbonate resin of the present invention. Examples of known polyols that can be used here include polyoxyalkylene glycols such as polyethylene glycol, polypropylene glycol and polyoxytetramethylene glycol (PTMG); alkylene oxide adducts of polyalcohol, such as ethylene oxide adduct and propylene oxide adduct of bisphenol A and glycerin; a polyester polyol; a polycaprolactone polyol; and a polycarbonate polyol.

Examples of the polyester polyol include those obtained from a diacid, such as adipic acid, phthalic acid, isophthalic acid, maleic acid, succinic acid and fumaric acid, and glycols, such as ethylene glycol, diethylene glycol, 1,3-propylene glycol, 1,4-butanediol, 1,5-pentanediol, 1,6-hexanediol and trimethylolpropane.

Examples of the polycarbonate polyol which can be used include a homopolycarbonate diol and a copolymerized polycarbonate diol, each produced from 1,4-butanediol, 1,5-pentanediol, 1,6-hexanediol, cyclohexanedimethanol, and 2-methylpropanediol.

In the case of using these other polyols, from the viewpoint of sufficiently obtaining the effects due to use of the polycarbonate resin of the present invention, the other polyols are preferably used such that the percentage of the polycarbonate resin of the present invention in all polyols becomes usually 30 wt % or more, especially 50 wt % or more, although the percentage is not particularly limited.

<Solvent>

A polyurethane forming reaction at the time of producing a polyurethane by using the polycarbonate resin of the present invention as a raw material of polyurethane may be performed using a solvent.

Preferable solvents include, for example, an amide-based solvent such as dimethylformamide, diethylformamide, dimethylacetamide and N-methylpyrrolidone; a sulfoxide-based solvent such as dimethylsulfoxide; an ether-based solvent such as tetrahydrofuran and dioxane; a ketone-based solvent such as methyl isobutyl ketone, methyl ethyl ketone and cyclohexanone; an ester-based solvent such as methyl acetate, ethyl acetate and butyl acetate; and an aromatic hydrocarbon-based solvent such as toluene and xylene. One of these solvents may be used alone, or two or more thereof may be used as a mixed solvent.

Among these, preferable organic solvents are, for example, methyl ethyl ketone, ethyl acetate, toluene, dimethylformamide, dimethylacetamide, N-methylpyrrolidone, and dimethyl sulfoxide.

In addition, a polyurethane resin in the form of an aqueous dispersion liquid may also be produced from a polyurethane composition in which the polycarbonate resin of the present invention, a polydiisocyanate, and the above-described chain extender are blended.

{Production Method of Polyurethane}

All production methods employed experimentally or industrially in general may be used as the method for producing the polyurethane of the present invention by using the above-described reaction reagents.

Examples thereof include a method where a polyol containing the polycarbonate resin of the present invention as a raw material of polyurethane, a polyisocyanate and a chain extender are mixed en bloc and reacted (hereinafter, sometimes referred to as "one-step method"), and a method where a polyol containing the polycarbonate resin of the present invention is first reacted with a polyisocyanate to prepare a prepolymer having an isocyanate group at both terminals and the prepolymer is reacted with a chain extender (hereinafter, referred to as "two-step method").

The two-step method passes through a step of previously reacting a polyol containing the polycarbonate resin of the present invention as a raw material of polyurethane with one equivalent or more of an organic polyisocyanate to prepare a both end isocyanate-terminated intermediate providing a moiety corresponding to the soft segment of polyurethane. When a prepolymer is once prepared and then reacted with a chain extender in this way, the molecular weight of the soft segment moiety may be easily adjusted, and this is useful in the case where phase separation of a soft segment and a hard segment needs to be unfailingly achieved.

<One-Step Method>

The one-step method is also called a one-shot method and is a method of performing the reaction by charging a polyol containing the polycarbonate resin of the present invention as a raw material of polyurethane, a polyisocyanate, and a chain extender en bloc.

The use amount of the polyisocyanate in the one-step method is not particularly limited, but when the total of the number of hydroxyl groups in the polyol containing the polycarbonate resin of the present invention as a raw material of polyurethane and the numbers of hydroxyl groups and amino groups in the chain extender is assumed to be 1 equivalent, the lower limit is usually 0.7 equivalents, preferably 0.8 equivalents, more preferably 0.9 equivalents, and still more preferably 0.95 equivalents. The upper limit is usually 3.0 equivalents, preferably 2.0 equivalents, more preferably 1.5 equivalents, and still more preferably 1.1 equivalents.

If the use amount of the polyisocyanate is too large, an unreacted isocyanate group tends to cause a side reaction, making it difficult to obtain desired physical properties. If the use amount of the polyisocyanate is too small, it is likely that the molecular weight of polyurethane does not grow sufficiently and desired performances are not expressed.

In addition, although the use amount of the chain extender is not particularly limited, when the number obtained by subtracting the number of isocyanate groups in the polyisocyanate from the number of hydroxyl groups in the polyol containing the polycarbonate resin of the present invention as a raw material of polyurethane is assumed to be 1 equivalent, the lower limit is usually 0.7 equivalents, preferably 0.8 equivalents, more preferably 0.9 equivalents, and still more preferably 0.95 equivalents. The upper limit is 3.0 equivalents, preferably 2.0 equivalents, more preferably 1.5 equivalents, and still more preferably 1.1 equivalents.

If the use amount of the chain extender is too large, the polyurethane obtained tends to be hardly dissolved in a solvent, making the processing difficult. If the use amount used of the chain extender is too small, the polyurethane obtained may be excessively soft, as a result, sufficient strength/hardness, elastic recovery performance or resilient retention performance may not be obtained or high-temperature properties may be deteriorated.

<Two-Step Method>

The two-step method is also called a prepolymer method and is a method where a polyisocyanate and a polyol containing the polycarbonate resin of the present invention as a raw material of polyurethane are reacted in advance at a polyisocyanate/polyol reaction equivalent ratio of 1.0 to 10.00 to produce an isocyanate group-terminated prepolymer and a chain extender having an active hydrogen such as polyalcohol and amine compound is added thereto to produce a polyurethane.

The two-step method can be conducted without a solvent or in the co-presence of a solvent.

Production of a polyurethane by the two-step method can be performed by any of the following methods (1) to (3):

(1) a prepolymer is synthesized by reacting directly a polyisocyanate and a polyol containing a polycarbonate resin without using a solvent and is used as is for the subsequent chain extension reaction, (2) a prepolymer is synthesized by the method (1) and then dissolved in a solvent, and the solution is used for the subsequent chain extension reaction, (3) a polyisocyanate and a polyol containing a polycarbonate resin are reacted by using a solvent from the beginning, and then a chain extension reaction is performed in the solvent.

In the case of the method (1), it is important that a polyurethane is obtained in the form of coexisting with a solvent, for example, by a method where at the time of utilizing the action of chain extender, the chain extender is dissolved in a solvent or the prepolymer and chain extender are simultaneously introduced into a solvent.

Although the use amount of the polyisocyanate in the two-step method is not particularly limited, when the number of hydroxyl groups in a polyol containing a polycarbonate resin is assumed to be 1 equivalent, the lower limit of the number of isocyanate groups is usually 1.0, and preferably 1.05, and the upper limit is usually 10.0, preferably 5.0, and more preferably 3.0.

If the amount of this isocyanate is too large, an excess of isocyanate groups tend to cause a side reaction, making it difficult to achieve desired physical properties of polyurethane, while if the use amount is too small, the molecular weight of the obtained polyurethane may not grow sufficiently, leading to reduction in strength or thermal stability.

Although the use amount of the chain extender is not particularly limited but, relative to the equivalent of the isocyanate group contained in the prepolymer, the lower limit is usually 0.1, preferably 0.5, and more preferably 0.8, and the upper limit is usually 5.0, preferably 3.0, and more preferably 2.0.

At the time of performing the chain extension reaction, a monofunctional organic amine or alcohol may be caused to be present together for the purpose of adjusting the molecular weight.

In the chain extension reaction, although respective components are reacted at 0 to 250° C., this temperature varies depending on the amount of solvent, the reactivity of raw material used, the reaction equipment, etc. and is not particularly limited. If the temperature is too low, the reaction may proceed too slowly or the production may take a long time due to low solubility of the raw material or polymerization product. If the temperature is too high, a side effect or decomposition of the obtained polyurethane may occur. The chain extension reaction may be performed with removing bubbles under reduced pressure.

In addition, a catalyst, a stabilizer, etc. may also be added, if desired, during the chain extension reaction.

The catalyst includes, for example, one member or two or more members of triethylamine, tributylamine, dibutyltin dilaurate, stannous octylate, acetic acid, phosphoric acid, sulfuric acid, hydrochloric acid, sulfonic acid, etc.

The stabilizer includes, for example, one member or two or more members of 2,6-dibutyl-4-methylphenol, distearyl thiodipropionate, di-beta-naphthyl-phenylenediamine, tri (dinonylphenyl)phosphite, etc. However, in the case where the chain extender is a compound with high reactivity, such as short-chain aliphatic amine, the reaction is preferably conducted without adding a catalyst.

<Aqueous Polyurethane Emulsion>

An aqueous polyurethane emulsion can also be produced using the polycarbonate resin of the present invention as a raw material of polyurethane.

In this case, at the time of producing a prepolymer by reacting a polyol containing the polycarbonate resin with a polyisocyanate, a prepolymer is formed by mixing a compound having at least one hydrophilic functional group and at least two isocyanate-reactive groups, and the prepolymer is reacted with a chain extender to make an aqueous polyurethane emulsion.

The hydrophilic functional group in the compound having at least one hydrophilic functional group and at least two isocyanate-reactive groups used here is, for example, a carboxylic acid group or a sulfonic acid group and is a group neutralizable with an alkaline group. The isocyanate-reactive group is generally a group forming a urethane bond or a urea bond by the reaction with an isocyanate, such as hydroxyl group, primary amino group and secondary amino group, and these groups may be mixed in the same molecule.

The compound having at least one hydrophilic functional group and at least two isocyanate-reactive groups specifically includes, for example, 2,2'-dimethylolpropionic acid, 2,2-methylolbutyric acid, and 2,2'-dimethylolvaleric acid. The compound also includes diaminocarboxylic acids such as lysine, cystine and 3,5-diaminocarboxylic acid. One of these compounds may be used alone, or two or more thereof may be used in combination. In the case of using such a compound in practice, the compound may be used by neutralizing it with an alkaline compound, e.g., an amine such as trimethylamine, triethylamine, tri-n-propylamine, tributylamine and triethanolamine, sodium hydroxide, potassium hydroxide, and ammonia.

In the case of producing an aqueous polyurethane emulsion, the lower limit of the use amount of the compound having at least one hydrophilic functional group and at least two isocyanate-reactive groups is, in order to raise the dispersion performance in water, usually 1 wt %, preferably 5 wt %, more preferably 10 wt %, relative to the weight of a polyol containing the polycarbonate resin of the present invention. On the other hand, if the compound is added in a too large amount, the properties of the polycarbonate resin of the present invention may not be maintained, and for this reason, the upper limit is usually 50 wt %, preferably 40 wt %, still more preferably 30 wt %.

In synthesizing or storing the aqueous polyurethane emulsion, the emulsion stability may be maintained by using, in combination, for example, an anionic surfactant typified by higher fatty acid, resin acid, acidic aliphatic alcohol, sulfuric acid ester, higher alkyl sulfonate, alkylaryl sulfonate, sulfonated castor oil and sulfosuccinic acid ester, a cationic surfactant such as primary amine salt, secondary amine salt, tertiary amine salt, quaternary amine salt and pyridinium salt, or a nonionic surfactant typified by a known reaction product of ethylene oxide with a long-chain aliphatic alcohol or phenols.

In making a polyurethane emulsion by reacting the prepolymer with a chain extender, the prepolymer may be neutralized, if desired, and then dispersed in water.

The aqueous polyurethane emulsion produced in this way can be used for various applications. Among others, a chemical raw material having a small environmental impact is recently demanded, and the emulsion can substitute for conventional products with an aim to use no organic solvent.

As to the specific use of the aqueous polyurethane emulsion, for example, utilization for a coating agent, an aqueous coating material, an adhesive, a synthetic leather and an artificial leather is suitable. In particular, the aqueous polyurethane emulsion produced using the polycarbonate diol of the present invention has a specific structure in the polycarbonate resin, allowing it to enjoy high hardness and excellent scratch resistance and maintain the surface properties for a long period of time, and can therefore be advantageously utilized as a coating agent, etc., compared with an aqueous polyurethane emulsion using a conventional polycarbonate diol.

<Urethane (Meth)Acrylate>

After the reaction with a polyisocyanate by using the polycarbonate resin of the present invention as a raw material of polyurethane, a urethane acrylate or a urethane methacrylate can be derived through reaction with an acrylic or methacrylic acid ester having a hydroxy group. The urethane acrylate and urethane methacrylate are widely used as a coating agent, and the polycarbonate diol of the present invention can be used as a raw material for those uses without any particular limitation. Furthermore, the urethane acrylate and urethane methacrylate can also be used by converting the polymerized functional group from (meth) acrylate to glycidyl group, allyl group, propargyl group, etc.

{Additives}

In the polyurethane according to the present invention produced by using a polycarbonate diol as a raw material of the polyurethane of the present invention, various additives such as thermal stabilizer, light stabilizer, coloring agent, bulking agent, stabilizer, ultraviolet absorber, antioxidant, anti-adhesive agent, flame retardant, age resister and inorganic filler can be added and mixed to the extent not impairing the properties of the polyurethane of the present invention.

The compound usable as a thermal stabilizer includes, for example, a phosphorus compound such as aliphatic, aromatic or alkyl-substituted aromatic ester of phosphoric acid or phosphorous acid, hypophosphorous acid derivative, phenylphosphonic acid, phenylphosphinic acid, diphenylphosphonic acid, polyphosphonate, dialkylpentaerythritol diphosphite and dialkyl bisphenol A diphosphite; a phenolic derivative, among others, a hindered phenol compound; a sulfur-containing compound such as thioether-based, dithioate-based, mercaptobenzimidazole-based, thiocarbanilide-based and thiodipropionic acid ester-based compounds; and a tin-based compound such as tin malate and dibutyltin monoxide.

Specific examples of the hindered phenol compound include Irganox 1010 (trade name, produced by BASF Japan Ltd.), Irganox 1520 (trade name, produced by BASF Japan, Ltd.), and Irganox 245 (trade name, produced by BASF Japan, Ltd.).

The phosphorus compound includes PEP-36, PEP-24G, HP-10 (trade names, all produced by ADEKA Corporation), Irgafos 168 (trade name, produced by BASF Japan, Ltd.), etc.

Specific examples of the sulfur-containing compound include a thioether compound such as dilauryl thiopropionate (DLTP) and distearyl thiopropionate (DSTP).

Examples of the light stabilizer include benzotriazole-based and benzophenone-based compounds, and specifically, “TINUVIN 622LD”, “TINUVIN 765” (both produced by Ciba Specialty Chemicals), “SANOL LS-2626”, “SANOL LS-765” (both produced by Sankyo Co., Ltd.), etc. can be used.

Examples of the ultraviolet absorber include “TINUVIN 328” and “TINUVIN 234” (both produced by Ciba Specialty Chemicals).

Examples of the coloring agent include a dye such as direct dye, acid dye, basic dye and metal complex dye; an inorganic pigment such as carbon black, titanium oxide, zinc oxide, iron oxide and mica; and an organic pigment such as coupling azo-based, condensed azo-based, anthraquinone-based, thioindigo-based, dioxazone-based and phthalocyanine-based pigments.

Examples of the inorganic filler include short glass fiber, carbon fiber, alumina, talc, graphite, melamine, and white clay.

Examples of the flame retardant include an organic compound containing phosphorus and halogen, an organic compound containing bromine or chlorine, and additive and reactive flame retardants such as ammonium polyphosphate, aluminum hydroxide and antimony oxide.

One of these additives may be used alone, or two or more thereof may be used in any combination in an arbitrary ratio.

The lower limit of the addition amount of such an additive is preferably 0.01 wt %, more preferably 0.05 wt %, still more preferably 0.1 wt %, relative to polyurethane. The upper limit is preferably 10 wt %, more preferably 5 wt %, still more preferably 1 wt %. If the addition amount of the additive is too small, the effect due to the addition cannot be sufficiently obtained, and if the addition amount is too large, the additive may precipitate in polyurethane or cause turbidity.

{Polyurethane Film/Polyurethane Sheet}

In the case of manufacturing a film by using a polyurethane produced using the polycarbonate resin of the present invention as a raw material of polyurethane, the lower limit of the film thickness is usually 10 μm, preferably 20 μm, more preferably 30 μm, and the upper limit is usually 1,000 μm, preferably 500 μm, more preferably 100 μm.

If the film thickness is too large, adequate moisture permeability may not be obtained, and if the film thickness is too small, it is likely that a pinhole is formed or film blocking is readily caused, making the handling difficult.

A polyurethane film produced using the polycarbonate resin of the present invention as a raw material of polyurethane can be preferably used, for example, for a medical material such as medical self-adhesive film, a sanitary material, a packing material, a decoration film, and other moisture permeable materials. The polyurethane film according to the present invention may be a film deposited on a support such as cloth or nonwoven fabric. In this case, the thickness of the polyurethane film itself may be smaller than 10 μm.

A polyurethane sheet can also be manufactured using a polyurethane produced using the polycarbonate resin of the present invention as a raw material of polyurethane. In this case, the upper limit of the sheet thickness is not particularly limited, and the lower limit is usually 0.5 mm, preferably 1 mm, more preferably 3 mm.

{Physical Properties}

<Molecular Weight>

Although the molecular weight of a polyurethane produced using the polycarbonate resin of the present invention as a raw material of polyurethane is appropriately adjusted according to usage and is not particularly limited, the polystyrene-reduced weight average molecular weight (Mw) as measured by GPC is preferably from 50,000 to 500,000, more preferably from 100,000 to 300,000. If the molecular weight is less than the lower limit above, sufficient strength or hardness may not be obtained, and if it exceeds the upper limit above, the handling property such as processability tends to be impaired.

<Chemical Resistance>

Although the chemical resistance of the polyurethane according to the present invention can be measured by various methods, when the polyurethane according to the present invention is obtained by two-step method of reacting 2 equivalents of 4,4'-dicyclohexylmethane diisocyanate with the polycarbonate resin of the present invention and further performing a chain extension reaction with isophoronediamine, the chemical resistance can be measured by the following method.

In the case where the test solvent is oleic acid, a polyurethane solution is applied onto a fluororesin sheet (fluorine tape NITOFLON 900, produced by Nitto Denko Corp., thickness: 0.1 mm) by means of a 9.5-mil applicator, dried at 60° C. for 1 hour and subsequently at 100° C. for 0.5 hours, further dried at 100° C. for 0.5 hours in vacuum state and then at 80° C. for 15 hours, and thereafter left standing still at a constant temperature and a constant humidity of 23° C. and 55% RH for 12 hours or more, and a specimen of 3 cm×3 cm is cut out from the obtained film, charged into a glass vial having a volume of 250 ml and containing 50 ml of a test solvent, and left standing still in a constant temperature bath at 80° C. in a nitrogen atmosphere for 16 hours. After the immersion, the front and back of the specimen is lightly wiped with a paper wiper and by performing a weight measurement, the percentage of weight increase from before test is calculated.

The percentage weight increase (%) of the polyurethane specimen after immersion in a chemical solution, relative to the weight of the polyurethane specimen before immersion in the chemical solution, is preferably 100% or less, more preferably 50% or less, still more preferably 10% or less, yet still more preferably 0%.

If this weight change ratio exceeds the upper limit above, desired chemical resistance is not obtained.

<Hardness>

A polyurethane produced using the polycarbonate resin of the present invention as a raw material of polyurethane is characterized in that higher hardness is obtained due to having a specific structural unit structure rich in rigidity. Specifically, for example, a film sample of approximately from 50 to 100 μm in thickness is fixed to a tester (TI type, Gakushin-type) and subjected to a friction test for 500 reciprocations under a load of 4.9 N in conformity with JIS L 0849, and when the resultant percentage weight loss is represented by (((weight of sample before test−weight of sample after test)/(weight of sample before test))×100), the upper limit of the percentage weight reduction is usually 2%, preferably 1.5%, more preferably 1.0%. On the other hand, the upper limit of the percentage weight reduction is usually 0.1%, preferably 0.05%, more preferably 0.01%.

{Usage}

A polyurethane produced using the polycarbonate resin of the present invention as a raw material of polyurethane has excellent heat resistance, excellent weather resistance and good hardness and can therefore be widely used, for example, for a foam, an elastomer, a coating material, a fiber, an adhesive, a floor material, a sealant, a medical material, an artificial leather, a synthetic leather, a coating agent, and an aqueous polyurethane coating material.

Among others, when a polyurethane produced using the polycarbonate resin of the present invention is used for applications such as artificial leather, synthetic leather, aqueous polyurethane, adhesive, medical material, floor material and coating agent, since the polyurethane has excellent heat resistance, excellent weather resistance and good hardness, the color of particularly a product used outdoors is not deteriorated and moreover, satisfactory surface properties of high resistance to physical impact, friction, etc. can be imparted.

A polyurethane produced using the polycarbonate resin of the present invention as a raw material of polyurethane can be used for a cast polyurethane elastomer. Specific applications thereof include, for example, rolls such as pressure roll, papermaking roll, office machine and pretension roll; a solid tire, caster, etc. of, e.g., a fork lift, an automotive vehicle new tram, a carriage, or a truck; and an industrial product such as conveyor belt idler, guide roll, pulley, steel pipe lining, rubber screen for ore, gears, connection ring, liner, pump impeller, cyclone cone and cyclone liner. In addition, the polyurethane can also be used for a belt of OA device, a paper feed roll, a cleaning blade for copier, a snow plow, a toothed belt, a surf roller, etc.

A polyurethane produced using the polycarbonate resin of the present invention as a raw material of polyurethane is also applied to usage as a thermoplastic elastomer. For example, the polyurethane can be used for tubes or hoses in a pneumatic instrument employed in the food and medical fields, a coating apparatus, an analytical instrument, a physicochemical instrument, a metering pump, a water treatment apparatus, an industrial robot, etc., and for a spiral tube, a fire hose, etc.

In addition, the polyurethane is used as a belt such as round belt, V-belt and flat belt, in various transmission mechanisms, spinning machines, packaging machines, printing machines, etc. Furthermore, the polyurethane can be used for a footwear heel top, a shoe sole, machine parts such as coupling, packing, ball joint, bush, gear and roll, sporting goods, leisure goods, a watchband, etc.

The automotive parts include an oil stopper, a gearbox, a spacer, a chassis part, an interior trim, a tire chain substitute, etc. In addition, the polyurethane can be used for a film such as keyboard film and automotive film, a curl code, a cable sheath, a bellows, a conveying belt, a flexible container, a binder, a synthetic leather, a dipping product, an adhesive, etc.

A polyurethane produced using the polycarbonate resin of the present invention as a raw material of polyurethane can also be applied to usage as a solvent-based two-component paint and can be applied to a wood product such as musical instrument, family altar, furniture, decorative plywood and sports gear. The polyurethane can also be used as a tar epoxy urethane for automotive repair.

A polyurethane produced using the polycarbonate resin of the present invention as a raw material of polyurethane can be used as a component of a moisture-curable one-component paint, a blocked isocyanate-based solvent paint, an alkyd resin paint, a urethane-modified synthetic resin paint, an ultraviolet-curable paint, an aqueous urethane paint, a powder paint, etc. and can be applied, for example, to a coating material for plastic bumper, a strippable paint, a coating agent for magnetic tape, an overprint varnish of floor tile, floor material, paper, wood-grain printing film, etc., a wood varnish, a coil coat for high processing, an optical fiber protective coating, a solder resist, a topcoat for metal printing, a basecoat for vapor deposition, and a white coating for food cans.

A polyurethane produced using the polycarbonate resin of the present invention as a raw material of polyurethane can be applied, as an adhesive, to food packaging, shoes, footwear, a magnetic tape binder, decorative paper, wood, a structural member, etc. and can also be used as a component of a low-temperature adhesive or a hot melt.

The mode when a polyurethane produced using the polycarbonate resin of the present invention as a raw material of polyurethane is used as an adhesive is not particularly limited, and the obtained polyurethane can be used as a solvent-based adhesive by dissolving it in a solvent or can be used as a hot-melt adhesive without using a solvent.

In the case of using a solvent, the solvent that can be used is not particularly limited as long as it is a solvent suitable for properties of the obtained urethane, and both an aqueous solvent and an organic solvent can be used. In particular, from the viewpoint of reducing the environmental impact, demand for an aqueous adhesive obtained by dissolving an aqueous polyurethane emulsion in an aqueous solvent is recently increasing, and a polyurethane produced using the polycarbonate resin of the present invention as a raw material of polyurethane can be suitably used for this purpose.

Furthermore, in an adhesive produced using the polyurethane according to the present invention, additives and auxiliaries used for a normal adhesive can be mixed without limitation, if desired. Examples of the additive include a pigment, an antiblocking agent, a dispersion stabilizer, a viscosity modifier, a leveling agent, an antigelling agent, a light stabilizer, an antioxidant, an ultraviolet absorber, a heat resistance improver, an inorganic or organic filler, a plasticizer, a lubricant, an antistatic agent, a reinforcing material, and a catalyst, and as to the method for blending the additive, a known method such as stirring and dispersion can be employed.

The thus-obtained polyurethane-based adhesive produced using the polycarbonate resin of the present invention as a raw material of polyurethane can achieve effective adhesion of a metal material such as iron, copper, aluminum, ferrite and coated steel sheet, etc., a resin material such as acrylic resin, polyester resin, ABS resin, polyamide resin, polycarbonate resin and vinyl chloride resin, and an inorganic material such as glass and ceramics.

A polyurethane produced using the polycarbonate resin of the present invention as a raw material of polyurethane can be used, as a binder, for a magnetic recording medium, an ink, a casting, a burned brick, a graft material, a microcapsule, a granular fertilizer, granular agrochemical, a polymer cement mortar, a resin mortar, a rubber chip binder, a recycled foam, a glass fiber sizing, etc.

A polyurethane produced using the polycarbonate resin of the present invention as a raw material of polyurethane can be used, as a component of fiber-processing agent, in shrinkproofing process, anti-wrinkling process, water repellent finishing, etc.

In the case of using the polyurethane according to the present invention as an elastic fiber, the method for fiberization can be conducted without any particular limitation if it is a method capable of spinning the polyurethane. For example, a melt spinning method in which the polyurethane is once pelletized and then melted and the melt is directly spun through a spinneret, may be employed. In the case of obtaining an elastic fiber from the polyurethane of the present invention by melt spinning, the spinning temperature is preferably 250° C. or less, more preferably from 200 to 235° C.

A polyurethane elastic fiber produced using the polycarbonate resin of the present invention as a raw material of polyurethane can be used directly as bare fiber or may be used as coated fiber by coating the fiber with another fiber.

Another fiber includes conventionally known fibers such as polyamide fiber, wool, cotton and polyester-fiber, and among others, a polyester fiber is preferably used in the present invention. In addition, the polyurethane elastic fiber according to the present invention may contain a disperse dye of dyeing type.

A polyurethane produced using the polycarbonate resin of the present invention as a raw material of polyurethane can be used, as a sealant/caulking, for a concrete wall, a control joint, a sash periphery, a wall-type PC joint, an ALC joint, a joint of boards, a composite glass sealant, a heat-insulating sash sealant, an automotive sealant, etc.

A polyurethane produced using the polycarbonate resin of the present invention as a raw material of polyurethane can be used as a medical material and can be used, as a blood compatible material, for a tube, a catheter, an artificial heart, an artificial blood vessel, an artificial valve, etc. or, as a disposable material, for a catheter, a tube, a bag, a surgical glove, an artificial kidney potting material, etc.

A polyurethane produced using the polycarbonate resin of the present invention as a raw material of polyurethane can be used, by modifying the terminal, as a raw material for an UV curable paint, an electron beam curable paint, a photosensitive resin composition for flexographic printing plate, a photocurable coating material composition for optical fiber, etc.

EXAMPLES

The present invention is described in greater detail below by referring to Examples, but the present invention is not limited to these Examples as long as its gist is observed.

[Raw Materials Used]

The raw materials used for the production of a polycarbonate resin in Examples and Comparative Examples are as follows.

DPC: diphenyl carbonate

DCMI (Synthesis Example 1): DL-2,3:5,6-di-O-cyclohexylidene-myo-inositol

IN1 (Synthesis Example 2): DL-2,3:5,6-di-O-isopropylidene-myo-inositol

IN2 (Synthesis Example 3): DL-2,3:5,6-di-O-cyclopentylidene-myo-inositol

IN4 (Synthesis Example 4): DL-2,3:5,6-di-O-adamantylidene-myo-inositol

IN12 (Synthesis Example 5): DL-2,3:5,6-di-O-3,3,5-trimethylcyclohexylidene-myo-inositol IN16 (Synthesis Example 6): DL-2,3:5,6-di-O-cyclohexylmethylidene-myo-inositol IN37 (Synthesis Example 7): DL-2,3:5,6-di-O-cyclododecylidene-myo-inositol IN44 (Synthesis Example 8): DL-2-O-benzyl-1,3,5-O-ethylidene-myo-inositol IN45 (Synthesis Example 9): DL-2-O-benzyl-1,3,5-O-methylidene-myo-inositol IN57 (Synthesis Example 10): DL-2-O-n-hexyl-1,3,5-O-ethylidene-myo-inositol IN58 (Synthesis Example 11): DL-2-O-cyclohexylmethyl-1,3,5-O-ethylidene-myo-inositol DPC: diphenyl carbonate: produced by Mitsubishi Chemical Corporation CHDM: 1,4-cyclohexanedimethanol: produced by SK Chemicals Co., Ltd.

ISB: isosorbide: produced by Roquette Freres

TCDDM: tricyclodecanedimethanol: produced by OXEA Corporation

SPG: Spiro-glycol (3,9-bis(1,1-dimethyl-2-hydroxyethyl)-2,4,8,10-tetraoxaspiro[5,5]undecane): produced by Mitsubishi Gas Chemical Company, Inc.

BPEF: 9,9-bis[4-(2-hydroxyethoxy)phenyl]fluorene: produced by Osaka Gas Chemicals Co., Ltd.

2Q: Bis[9-(2-phenoxycarbonylethyl)fluoren-9-yl]methane: produced by Mitsubishi

Chemical Corporation 1,3-PD: 1,3-propanediol: produced by Wako Pure Chemical Industries, Ltd.

1,4-BG: 1,4-butanediol: produced by Mitsubishi Chemical Corporation 1,5-PD: 1,5-pentanediol: produced by Tokyo Chemical Industry Co., Ltd.

1,6-HD: 1,6-hexanediol: produced by Wako Pure Chemical Industries, Ltd.

1,7-HD: 1,7-heptanediol: produced by Tokyo Chemical Industry Co., Ltd.

1,8-OD: 1,8-octanediol: produced by Tokyo Chemical Industry Co., Ltd.

1,9-ND: 1,9-nonanediol: produced by Tokyo Chemical Industry Co., Ltd.

1,10-DD: 1,10-decanediol: produced by Tokyo Chemical Industry Co., Ltd.

1,12-DD: 1,12-dodecanediol: produced by Tokyo Chemical Industry Co., Ltd.

AE-2S: 2,2-bis-[4-2-(hydroxyethoxy)phenyl]propane: produced by Meisei Chemical Works, Ltd.

DEG: diethylene glycol: produced by Mitsubishi Chemical Corporation

TEG: triethylene glycol: produced by Mitsubishi Chemical Corporation 2,4-diethyl-1,5-pentanediol (PD-9): produced by KH Neochem Co., Ltd.

3-MPD: 3-methyl-1,5-pentanediol: produced by Tokyo Chemical Industry Co., Ltd.

BEPG: 2-butyl-2-ethyl-1,3-propanediol: produced by KH Neochem Co., Ltd.

NPG: neopentyl glycol: produced by Tokyo Chemical Industry Co., Ltd.

2-MPD: 2-methyl-1,3-propanediol: produced by Tokyo Chemical Industry Co., Ltd.

Structural formulae of respective raw material compounds are shown below.

[Chem. 25]

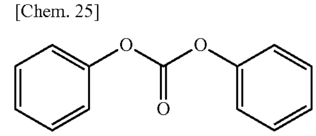

DPC (Synthesis Example 1)

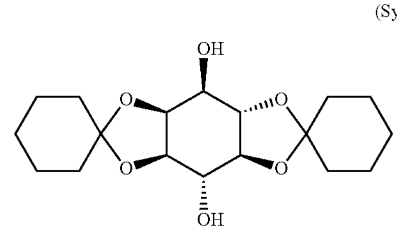

DCMI

-continued
(Synthesis of Example 2)
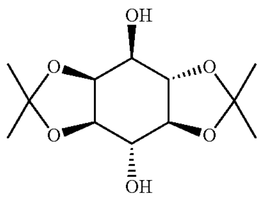
IN1
(Synthesis of Example 3)
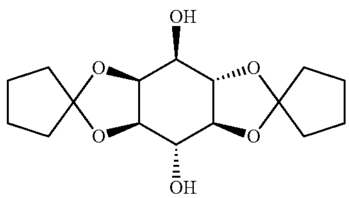
IN2
(Synthesis of Example 4)
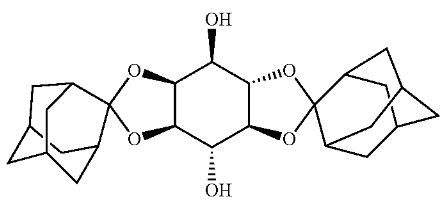
IN4
(Synthesis of Example 5)
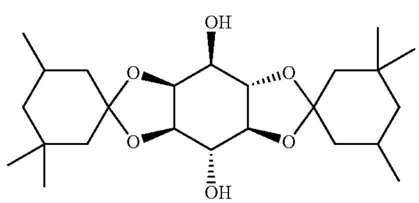
IN12
(Synthesis of Example 6)
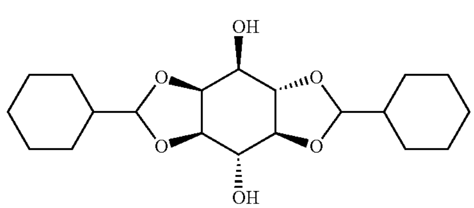
IN16
(Synthesis of Example 7)
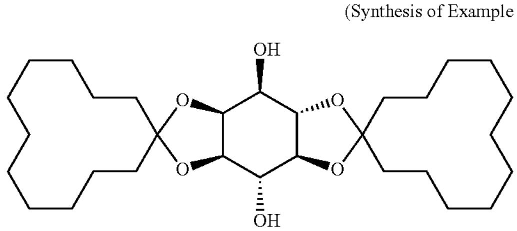
IN37
-continued
(Synthesis of Example 8)
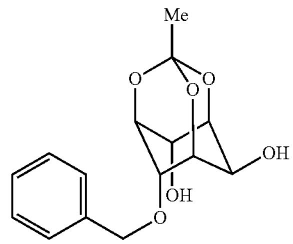
IN44
(Synthesis of Example 9)
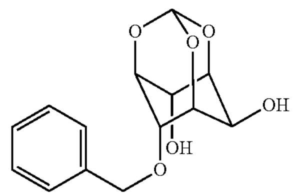
IN45
(Synthesis of Example 10)
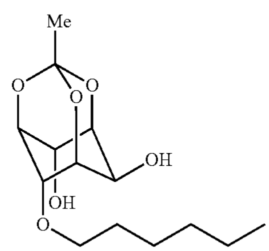
IN57
(Synthesis of Example 11)
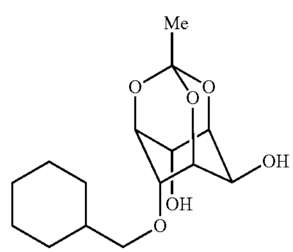
IN58
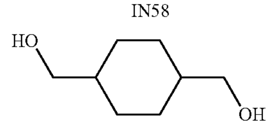
CHDM
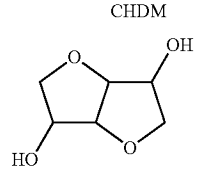
ISB
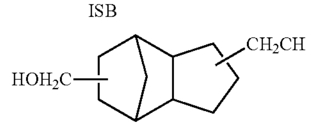
TCDDM
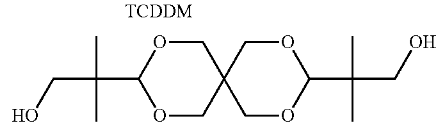
SPG -continued

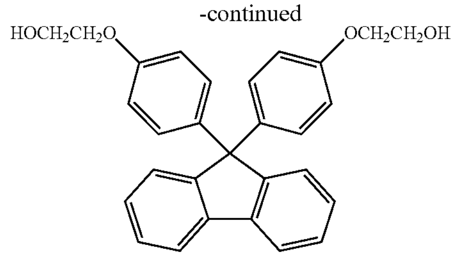

BPEF

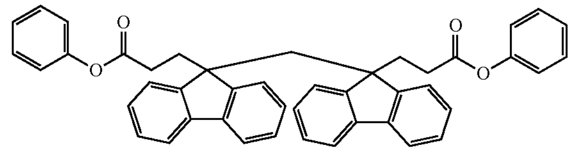

2Q

As the catalyst, the following Catalysts A to D were used, and while Catalysts A to C were added in the form of a 0.20 mass % aqueous solution, Catalyst D was added in the form of a 2.0 mass % aqueous solution.

Catalyst A: Sodium hydrogencarbonate ($NaHCO_3$)

Catalyst B: Cesium carbonate ($Cs_2CO_3$)

Catalyst C: Calcium acetate monohydrate ($Ca(CH_3COO)_2.H_2O$)

Catalyst D: Calcium acetate monohydrate ($Ca(CH_3COO)_2.H_2O$)

Here, DL-2,3:5,6-di-O-cyclohexylidene-myo-inositol and inositol derivatives were synthesized according to Synthesis Examples 1 to 11 below.

In Synthesis Examples 1 to 11, as the raw material Myo-inositol, solvent, etc., the followings were used.

Myo-inositol: Wako Pure Chemical Industries, Ltd., special grade

DMF (N,N-Dimethylformamide): Wako Pure Chemical Industries, Ltd., special grade p-Toluenesulfonic acid monohydrate: Wako Pure Chemical Industries, Ltd., for amino acid automated analysis Dimethoxycyclohexane: Wako Pure Chemical Industries, Ltd., special grade 2,2-Dimethoxypropane: Wako Pure Chemical Industries, 1st grade Cyclopentanone: Tokyo Chemical Industry Co., Ltd.

2-Adamantanone: Tokyo Chemical Industry Co., Ltd.

3,3,5-Trimethylcyclohexanone: Tokyo Chemical Industry Co., Ltd.

Cyclohexane carboxyaldehyde: Tokyo Chemical Industry Co., Ltd.

Cyclododecanone: Tokyo Chemical Industry Co., Ltd.

Triethylamine: Tokyo Chemical Industry Co., Ltd.

Ethyl acetate: Wako Pure Chemical Industries, Ltd., special grade n-Hexane: Wako Pure Chemical Industries, Ltd., special grade Triethyl orthoacetate: Wako Pure Chemical Industries, Ltd., 1st grade Triethyl orthoformate: Wako Pure Chemical Industries, Ltd., 1st grade Benzyl bromide: Wako Pure Chemical Industries, Ltd., special grade Cyclohexylmethyl bromide: Sigma-Aldrich Co. LLC.

1-Iodohexane: Tokyo Chemical Industry Co., Ltd.

tert-Butyl methyl ether: Wako Pure Chemical Industries, Ltd., special grade

Methanol: Wako Pure Chemical Industries, Ltd., special grade n-Heptane: Wako Pure Chemical Industries, Ltd., special grade For the identification of the synthesized compound of DL-2,3:5,6-di-O-cyclohexylidene-myo-inositol (Synthesis Example 1) and inositol derivative (Synthesis Examples 2 to 11), gas chromatograph (GC) and NMR were used. The GC and $^1$H-NMR analysis conditions are shown below.

(Gas Chromatograph (GC) Analysis)

Apparatus; GC2014, Shimadzu Corporation

Column: DB-1 (0.25 mm×60 mm), film thickness: 0.25 μm, manufactured by Agilent Technologies Japan, Ltd.

Temperature rise conditions: The temperature was raised to 300° C. from 50° C. at 10° C./min and held at 300° C. for 10 minutes.

Detector: FID

Carrier gas: He ($^1$H-NMR Analysis)

Using deuterochloroform as the solvent and using "AVANCE" manufactured by Bruker BioSpin, $^1$H-NMR was measured at a resonance frequency of 400 MHz, a flip angle of 450, and a measurement temperature of room temperature.

[Evaluation Method]

Physical properties or characteristic properties of the polycarbonate copolymer or polycarbonate polymer obtained in each of the following Examples and Comparative Examples were evaluated by the following methods.

(1) Refractive Index and Abbe Number

The refractive index, nC, nD, ne and nF at each wavelength were measured by an Abbe refractometer ("DR-M4" manufactured by Atago Co., Ltd.) by using an interference filter at a wavelength of 656 nm (C line), 589 nm (D line), 546 nm (e line) or 486 nm (F line).

A sample for measurement was prepared by press-molding the obtained resin at 250° C. to produce a film of about 200 μm in thickness and cutting the obtained film into a strip shape having a width of about 8 mm and a length of 10 to 20 mm and used as the test specimen for measurement.

The measurement was performed at 20° C. by using 1-bromonaphthalene as the interfacial solution.

The Abbe number νd was calculated according to the following formula:

$$\nu d=(1-nD)/(nC-nF)$$

As the Abbe number is larger, the wavelength dependency of the refractive index is smaller and, for example, in use as a single lens, the displacement of focus point depending on the wavelength is reduced.

(2) Glass Transition Temperature (Tig/Tmg)

Using a differential scanning calorimeter ("EXSTAR 6220", manufactured by SII NanoTechnology Inc.), about 10 mg of the sample was heated at a temperature rise rate of 10° C./min and measured to determine an extrapolated glass transition initiation temperature Tig in conformity with JIS K 7121 (1987), which is a temperature at an intersection between a straight line extending from a base line on low temperature side toward high temperature side and a broken line drawn on points of giving a maximum gradient of curve in a stepwise changing portion of glass transition. In addition, a midpoint glass transition initiation temperature Tmg was determined from the temperature at an intersection between a straight line equidistant in a vertical axis direction from a straight line extending from each base line and a curve in a stepwise changing portion of glass transition.

(3) Reduced Viscosity

The reduced viscosity was measured at a temperature of 30.0° C.±0. ° C. by using a Ubbelohde viscometer in an automatic viscometer, Model DT-504, manufactured by Chuorika Co., Ltd. and using, as a solvent, a 1:1 (ratio by mass) mixed solvent of phenol and 1,1,2,2-tetrachloroethane. The concentration was precisely adjusted to 1.00 g/dl. The sample was dissolved over 30 minutes with stirring at 110° C. and after cooling, used for measurement. From the transit time t0 of solvent and the transit time t of solution, the relative viscosity ηrel was determined according to the following formula:

$$\eta rel=t/t0\ (g\cdot cm^{-1}\cdot sec^{-1})$$

From the relative viscosity ηrel, the specific viscosity ηsp was determined according to the following formula:

$$\eta sp=(\eta-\eta 0)/\eta 0=\eta rel-1$$

The reduced viscosity (converted viscosity) tired was determined by dividing the specific viscosity ηsp by the concentration c (g/dl):

$$\eta red=\eta sp/c$$

A larger numerical value indicates a higher molecular weight.

(4) 5% Thermal Weight Loss Temperature (Td)

In the measurement of Example 1-7, using "TG-DTA" (2000SA) manufactured by NETZSCH Japan K.K., about 10 mg of the sample was placed on a platinum-made vessel and measured in a range from 30 to 500° C. at a temperature rise rate of 10° C./min in an nitrogen atmosphere (flow rate of nitrogen: 50 ml/min), and the temperature (Td) at which the weight was reduced by 5% was determined. A higher temperature indicates less occurrence of thermal decomposition.

In the measurement of Example 8-55, using TG/DTA 7200 manufactured by SII NanoTechnology Inc., about 10 mg of the sample was placed on a vessel and measured in a range from 30 to 500° C. at a temperature rise rate of 10° C./min in an nitrogen atmosphere (flow rate of nitrogen: 50 ml/min), and the temperature (Td) at which the weight was reduced by 5% was determined. A higher temperature indicates less occurrence of thermal decomposition.

(5) NMR

In the measurement of Example 1-7, using deuterochloroform as the solvent and using "AVANCE" manufactured by Bruker BioSpin, $^{1}$H-NMR was measured at a resonance frequency of 400 MHz, a flip angle of 45°, and a measurement temperature of room temperature.

In the measurement of Example 8-57, about 30 mg of the sample was put in an NMR sample tube having an outer diameter of 5 mm and dissolved in 0.7 ml of deuterochloroform (containing 0.03 v/v % tetramethylsilane). Using "AVANCE III 950" manufactured by Bruker, $^{1}$H-NMR was measured at a resonance frequency of 950.3 MHz, a flip angle of 30°, and a measurement temperature of 25° C.

(6) Measurement of Water Absorption Percentage

A polycarbonate resin pellet was vacuum-dried at 90° C. for 5 hours, and about 4 g of the dried pellet was preheated at a temperature of 200 to 230° C. for 3 minutes by spreading a polyimide film above and below the sample with use of a spacer of 14 cm in width, 14 cm in length and 0.1 mm in thickness and pressed for 5 minutes under the condition of a pressure of 40 MPa. Thereafter, the sample with the spacer was taken out and cooled to prepare a film having a thickness of 100 to 300 μm. The sample was cut out into a square of 100 mm in width and 100 mm in length and measured in conformity with "Test Methods for Water Absorption and Boiling Water Absorption of Plastics" described in JIS K 7209.

(7) Measurement of Pencil Hardness

Molding of Plate

A polycarbonate resin sample (4.0 g) vacuum-dried at 80° C. for 5 hours was pressed by a hot press at a hot press temperature of 200 to 250° C. for 1 minute under the conditions of a preheating for 1 to 3 minutes and a pressure of 20 MPa by using a spacer of 8 cm in width, 8 cm in length and 0.5 mm in thickness, and then the sample with the spacer was taken out and press-cooled by a water-tube cooling press under a pressure of 20 MPa for 3 minutes to prepare a sheet.

Using the sheet, the pencil hardness was measured by the method described in JIS K5600-5-4 by means of a pencil scratch coating hardness tester manufactured by Toyo Seiki Seisaku-Sho, Ltd.

(8) Photoelastic Coefficient

<Preparation of Sample>

A polycarbonate resin sample (4.0 g) vacuum-dried at 80° C. for 5 hours was pressed by a hot press at a hot press temperature of 200 to 250° C. for 1 minute under the conditions of a preheating for 1 to 3 minutes and a pressure of 20 MPa by using a spacer of 8 cm in width, 8 cm in length and 0.5 mm in thickness, and then the sample with the spacer was taken out and press-cooled by a water-tube cooling press under a pressure of 20 MPa for 3 minutes to prepare a sheet. A sample of 5 mm in width and 20 mm in length was cut out from the sheet.

<Measurement>

The measurement was performed using an apparatus combining a birefringence measuring apparatus composed of a He—Ne laser, a polarizer, a compensation plate, an analyzer and a photodetector with a vibration-type viscoelasticity measuring apparatus (DVE-3, manufactured by Rheology) (for details, see *Journal of the Society of Rheology Japan*, Vol. 19, pp. 93-97 (1991)).

The sample cut out was fixed in the viscoelasticity measuring apparatus, and the storage modulus E' was measured at a room temperature of 25° C. at a frequency of 96 Hz. At the same time, laser light emitted was passed through the polarizer, the sample, the compensation plate and the analyzer in this order and collected in the photodetector (photodiode). With respect to the waveform at an angular frequency of ω or 2ω, phase difference for the amplitude and strain was determined through a lock-in amplifier, and the strain-optical coefficient O' was determined. At this time, the directions of the polarizer and the analyzer were crossing at a right angle and each was adjusted to make an angle of π/4 with the extension direction of the sample.

The photoelastic coefficient C was determined using the storage modulus E' and the strain-optical coefficient O' according to the following formula:

$$C=O'/E'$$

Synthesis Example 1

Synthesis of DL-2,3:5,6-di-O-cyclohexylidene-myo-inositol (hereinafter, simply referred to as "DCMI")

After nitrogen-purging a 500-ml reaction vessel equipped with a Dimroth condenser, 30 g (167 mmol) of myo-inositol, 200 mL of DMF, 863 mg of p-toluenesulfonic acid monohydrate, and 75 mL of dimethoxycyclohexane were charged thereinto and stirred at 100° C. for 3 hours. The mixture was cooled to 40° C., and 2.5 mL of triethylamine was added thereto. DMF as a reaction medium was distilled off under reduced pressure, and 250 mL of ethyl acetate was added to the residue. Separation was conducted with 300 mL of an aqueous 5% sodium carbonate solution and after washing once with 300 mL of ion-exchanged water, the obtained organic phase was distilled off under reduced pressure. The residue was crystallized from 50 mL of ethyl acetate/70 mL of n-hexane, and the white precipitate obtained was filtered and then again crystallized from 50 mL of ethyl acetate/70 mL of n-hexane. The obtained solid was vacuum-dried at 60° C. for 5 hours to obtain 9.8 g (yield: 17.2%) of DCMI that is the target compound. The compound was confirmed to be the target compound by $^{1}$H-NMR analysis and have 99.0 area % by gas chromatograph analysis.

Figure 8:
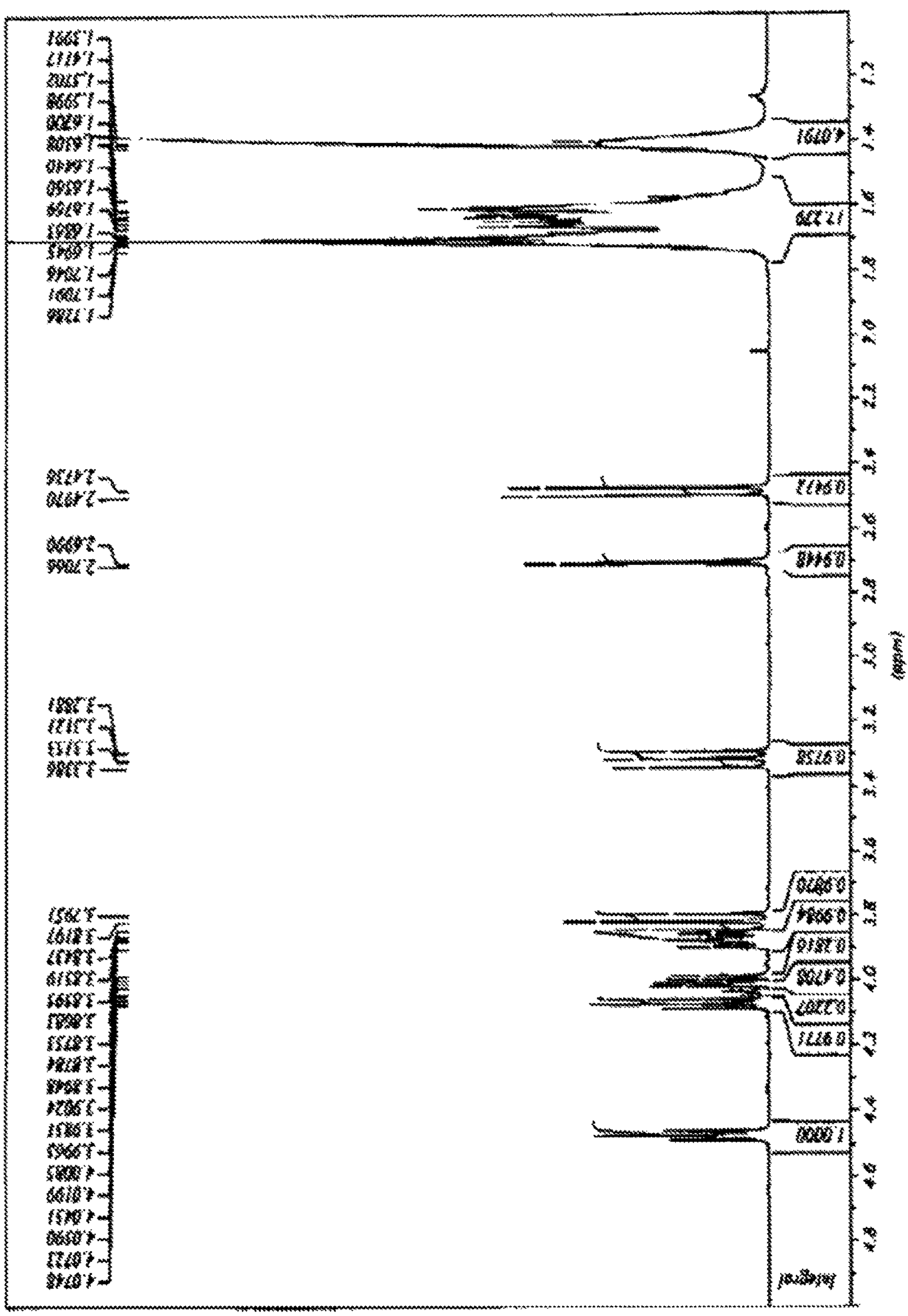
FIG. 8 is an NMR chart of DL-2,3:5,6-di-O-cyclohexylidene-myo-inositol (DCMI) obtained in Synthesis Example 1.

FIG. 8 illustrates the NMR chart of this DCMI.

Synthesis Example 2

Synthesis of DL-2,3:5,6-di-O-isopropylidene-myo-inositol (hereinafter, simply referred to as "IN1")

After nitrogen-purging a 500-ml reaction vessel equipped with a Dimroth condenser, 30 g (167 mmol) of myo-inositol, DMF (200 mL), 863 mg (4.5 mmol) of p-toluenesulfonic acid monohydrate, and 52 g (500 mmol) of 2,2-dimethoxypropane were charged thereinto and stirred at 130° C. for 3 hours. The mixture was cooled to room temperature, and 9.5 g of an aqueous 6 wt % sodium hydrogencarbonate solution was added thereto. DMF was distilled off under reduced pressure, and 300 mL of ion-exchanged was added to the residue. The solution was passed through an anion exchange resin, and ion-exchanged water was then distilled off under reduced pressure. Thereafter, 250 mL of ethyl acetate was added to the residue, and the white precipitate obtained was filtered. The filtrate was again distilled off under reduced pressure, and the obtained solid was crystallized from methanol to obtain 3.0 g (yield: 6.9%) of IN1 that is the target compound. The compound was confirmed to be the target compound by $^{1}$H-NMR analysis and have 99.8 area % by gas chromatograph analysis.

Figure 9:
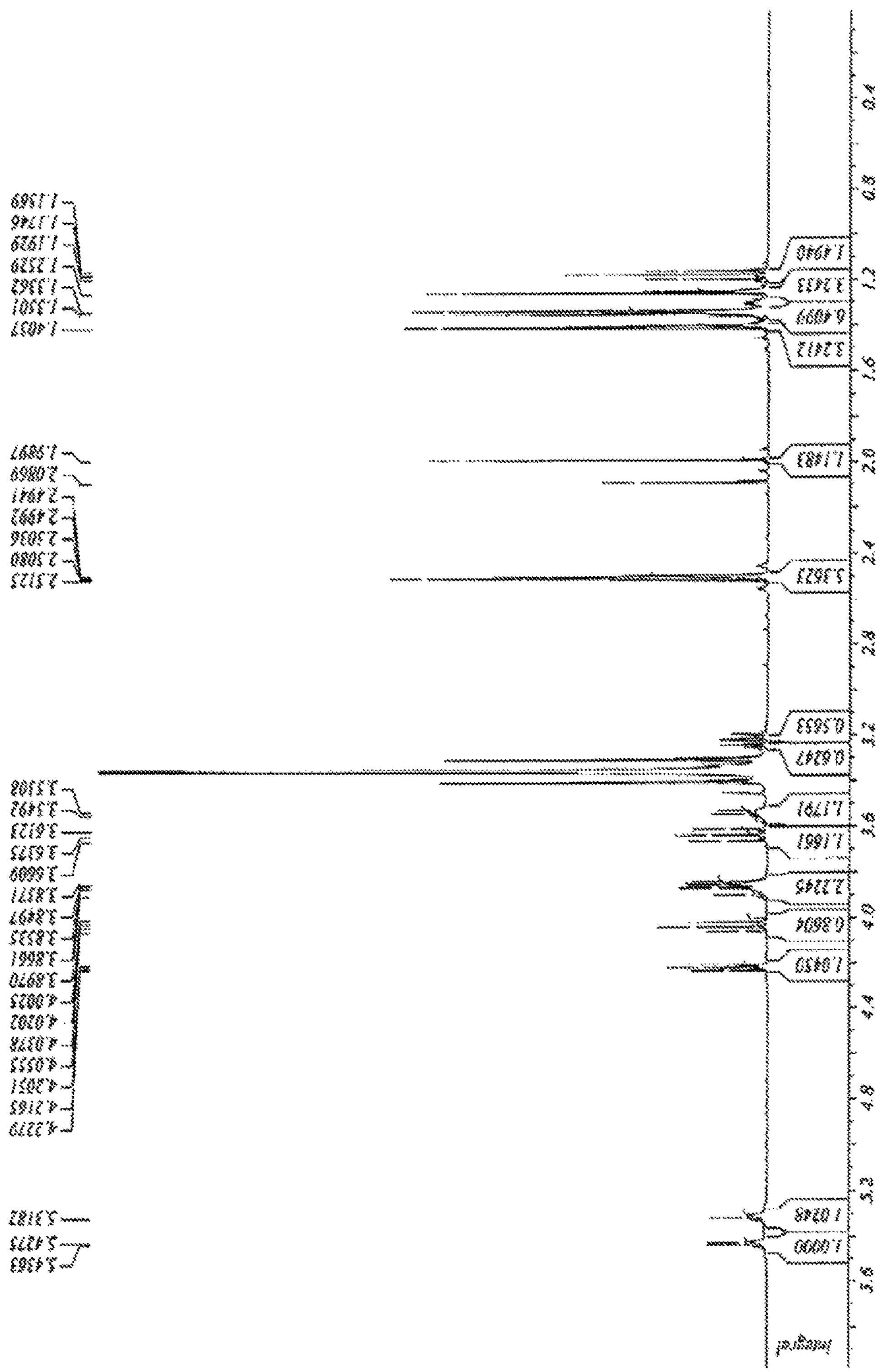
FIG. 9 is an NMR chart of DL-2,3:5,6-di-O-isopropylidene-myo-inositol (IN1) obtained in Synthesis Example 2.

FIG. 9 illustrates the NMR chart of this IN1.

Synthesis Example 3

Synthesis of DL-2,3:5,6-di-O-cyclopentylidene-myo-inositol (hereinafter, simply referred to as "IN2")

After nitrogen-purging a 500-ml reaction vessel equipped with a Dimroth condenser, 44 mL (500 mmol) of cyclopentanone, 55 mL (500 mmol) of trimethyl orthoformate, methanol (150 mL), and 863 mg (4.5 mmol) of p-toluenesulfonic acid monohydrate were added thereto and stirred at room temperature for 5 minutes. Furthermore, 30 g (167 mmol) of myo-inositol and DMF (200 mL) were charged into the reaction vessel and stirred at 130° C. for 3 hours. In the meantime, the liquid distilled off to the Dean-Stark tube was removed. The reaction solution was cooled to room temperature, and 9.5 g of an aqueous 6 wt % sodium hydrogencarbonate solution was added. DMF was distilled off under reduced pressure, and 250 mL of ethyl acetate was added to the residue. After washing three times with 300 mL of ion-exchanged water, the organic phase was distilled off under reduced pressure. The residue was crystallized from 70 mL of ethyl acetate/30 mL of n-hexane, and the white precipitate obtained was filtered. The filtrate was again crystallized from ethyl acetate to obtain 2.5 g (yield: 4.8%) of IN2 that is the target compound. The compound was confirmed to be the target compound by $^{1}$H-NMR analysis and have 99.0 area % by gas chromatograph analysis.

Figure 10:
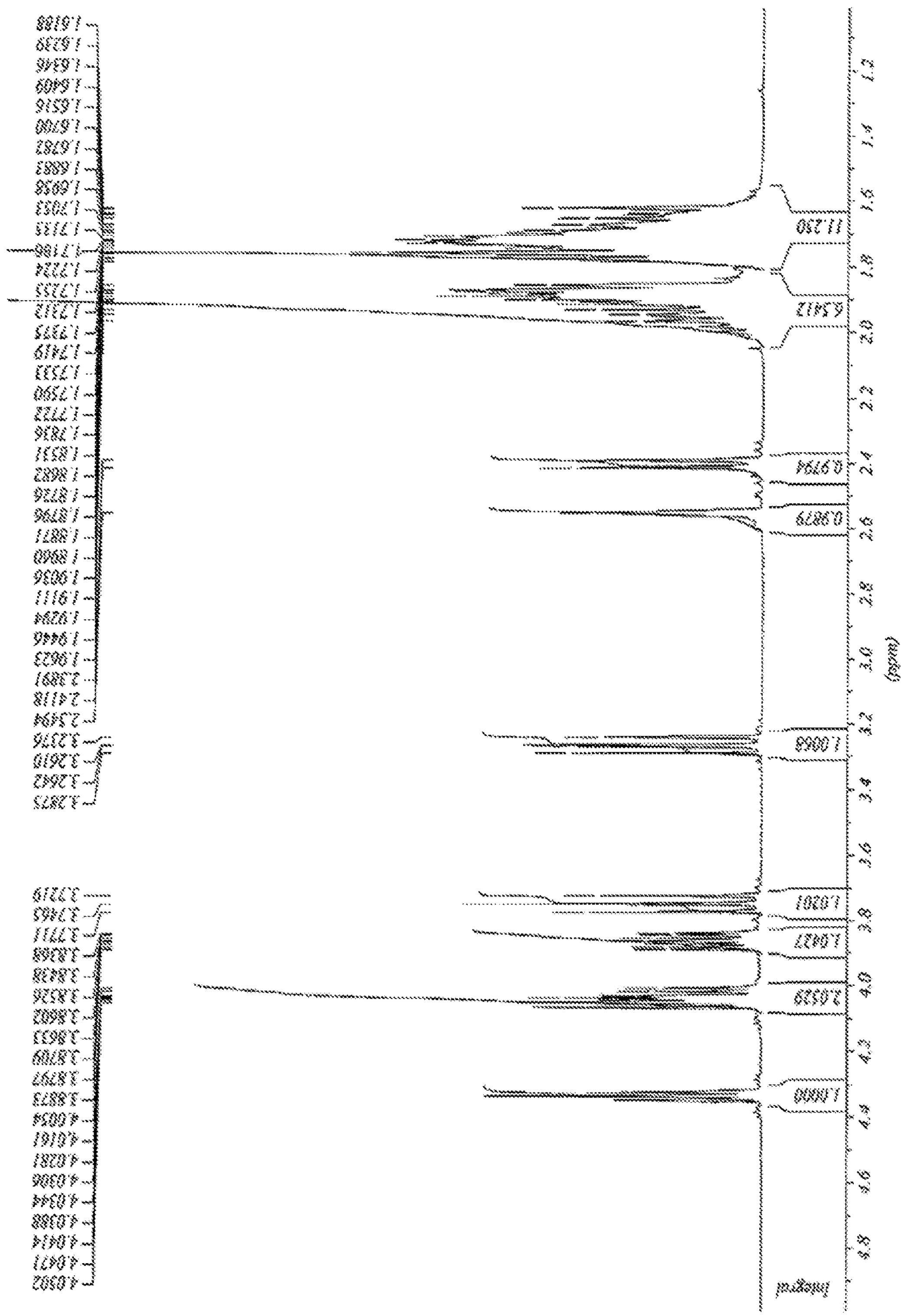
FIG. 10 is an NMR chart of DL-2,3:5,6-di-O-cyclopentylidene-myo-inositol (IN2) obtained in Synthesis Example 3.

FIG. 10 illustrates the NMR chart of this IN2.

Synthesis Example 4

Synthesis of DL-2,3:5,6-di-O-adamantylidene-myo-inositol (hereinafter, simply referred to as "IN4")

After nitrogen-purging a 500-ml reaction vessel equipped with a Dimroth condenser, 50 g (334 mmol) of 2-adamantanone, 37 mL (334 mmol) of trimethyl orthoformate, methanol (100 mL) and 575 mg (3 mmol) of p-toluenesulfonic acid monohydrate were added thereto and stirred at room temperature for 5 minutes. Furthermore, 20 g (111 mmol) of myo-inositol and DMF (140 mL) were charged into the reaction vessel and stirred at 130° C. for 3 hours. In the meantime, the liquid distilled off to the Dean-Stark tube was removed. The reaction solution was cooled to room temperature, and 6.5 g of an aqueous 6 wt % sodium hydrogencarbonate solution was added. DMF was distilled off under reduced pressure, and 250 mL of ethyl acetate was added to the residue. The obtained solid was filtered, and washed with 50 mL of water/50 mL of methanol to obtain 7.2 g (yield: 15%) of IN4 that is the target compound. The compound was confirmed to be the target compound by $^{1}$H-NMR analysis and have 98.9 area % by gas chromatograph analysis.

Figure 11:
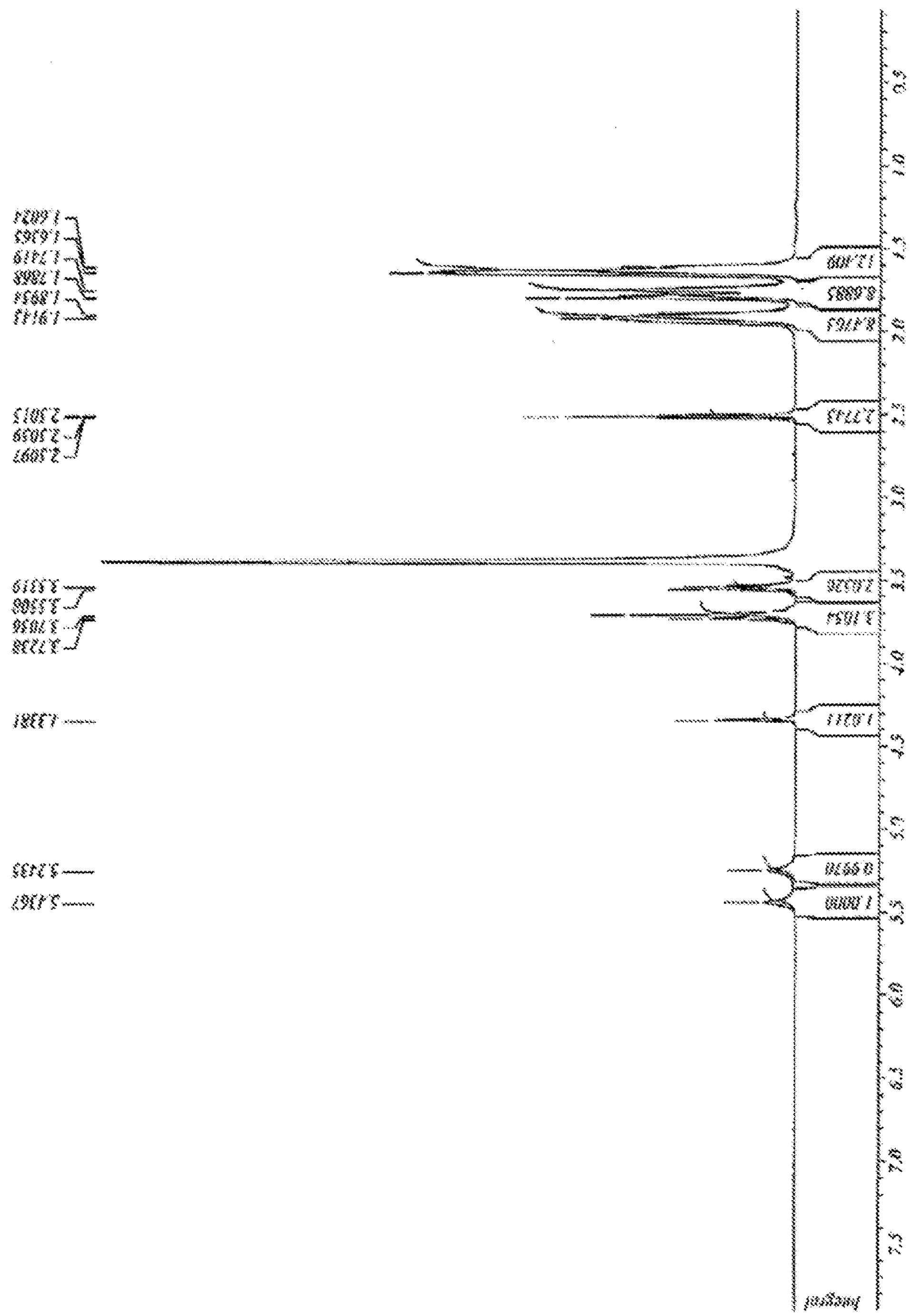
FIG. 11 is an NMR chart of DL-2,3:5,6-di-O-adamantylidene-myo-inositol (IN4) obtained in Synthesis Example 4.

FIG. 11 illustrates the NMR chart of this IN4.

Synthesis Example 5

Synthesis of DL-2,3:5,6-di-O-3,3,5-trimethylcyclohexylidene-myo-inositol (hereinafter, simply referred to as "IN12")

After nitrogen-purging a 500-ml reaction vessel equipped with a Dimroth condenser, 79 mL (500 mmol) of 3,3,5-trimethylcyclohexanone, 55 mL (500 mmol) of trimethyl orthoformate, methanol (150 mL) and 863 mg (4.5 mmol) of p-toluenesulfonic acid monohydrate were added thereto and stirred at room temperature for 5 minutes. Furthermore, 30 g (167 mmol) of myo-inositol and DMF (200 mL) were charged into the reaction vessel and stirred at 130° C. for 3 hours. In the meantime, the liquid distilled off to the Dean-Stark tube was removed. The reaction solution was cooled to room temperature, and 9.5 g of an aqueous 6 wt % sodium hydrogencarbonate solution was added. DMF was distilled off under reduced pressure, and 250 mL of ethyl acetate was added to the residue. After washing three times with 300 mL of ion-exchanged water, the organic phase was distilled off under reduced pressure. The residue was crystallized from 100 mL of ethyl acetate, and the white precipitate obtained was filtered to obtain 1.3 g (yield: 1.8%) of IN12 that is the target compound. The compound was confirmed to be the target compound by $^{1}$H-NMR analysis and have 99.2 area % by gas chromatograph analysis.

Figure 12:
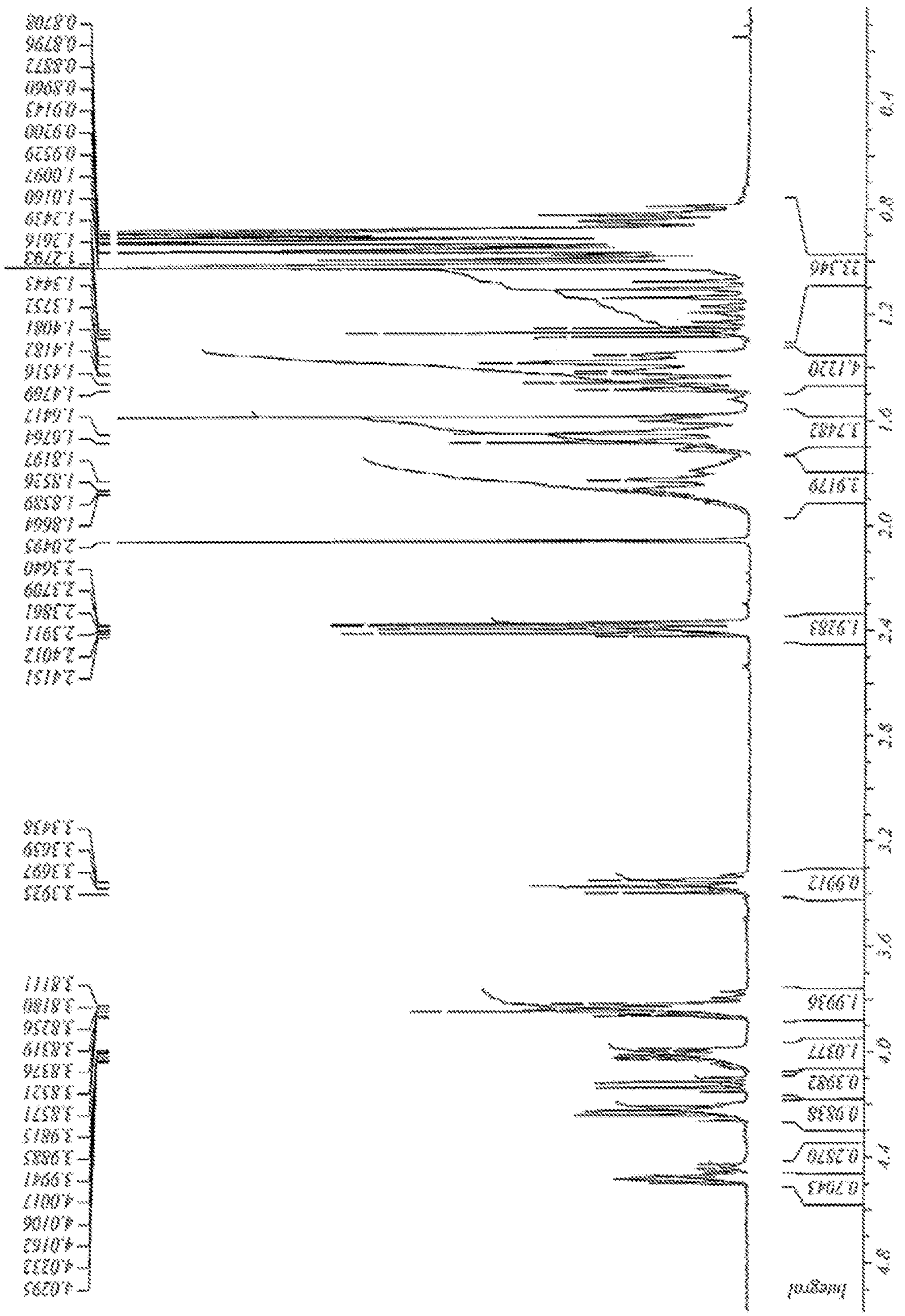
FIG. 12 is an NMR chart of DL-2,3:5,6-di-O-3,3,5-trimethylcyclohexylidene-myo-inositol (IN12) obtained in Synthesis Example 5.

FIG. 12 illustrates the NMR chart of this IN12.

Synthesis Example 6

Synthesis of DL-2,3:5,6-di-O-cyclohexylmethylidene-myo-inositol (hereinafter, simply referred to as "IN16")

After nitrogen-purging a 500-ml reaction vessel equipped with a Dimroth condenser, 56 g (500 mmol) of cyclohexanecarboxyaldehyde, 55 mL (500 mmol) of trimethyl orthoformate, methanol (150 mL) and 863 mg (4.5 mmol) of p-toluenesulfonic acid monohydrate were added thereto and stirred at room temperature for 5 minutes. Furthermore, 30 g (167 mmol) of myo-inositol and DMF (200 mL) were charged into the reaction vessel and stirred at 130° C. for 3 hours. In the meantime, the liquid distilled off to the Dean-Stark tube was removed. The reaction solution was cooled to room temperature, and 9.5 g of an aqueous 6 wt % sodium hydrogencarbonate solution was added. DMF was distilled off under reduced pressure, and 250 mL of ethyl acetate was added to the residue. After washing three times with 300 mL of ion-exchanged water, the organic phase was distilled off under reduced pressure. The residue was crystallized from 70 mL of ethyl acetate/30 mL of hexane, and the white precipitate obtained was filtered to obtain 0.8 g (yield: 1.3%) of IN16 that is the target compound. The compound was confirmed to be the target compound by $^1$H-NMR analysis and have 98.0 area % by gas chromatograph analysis.

Figure 13:
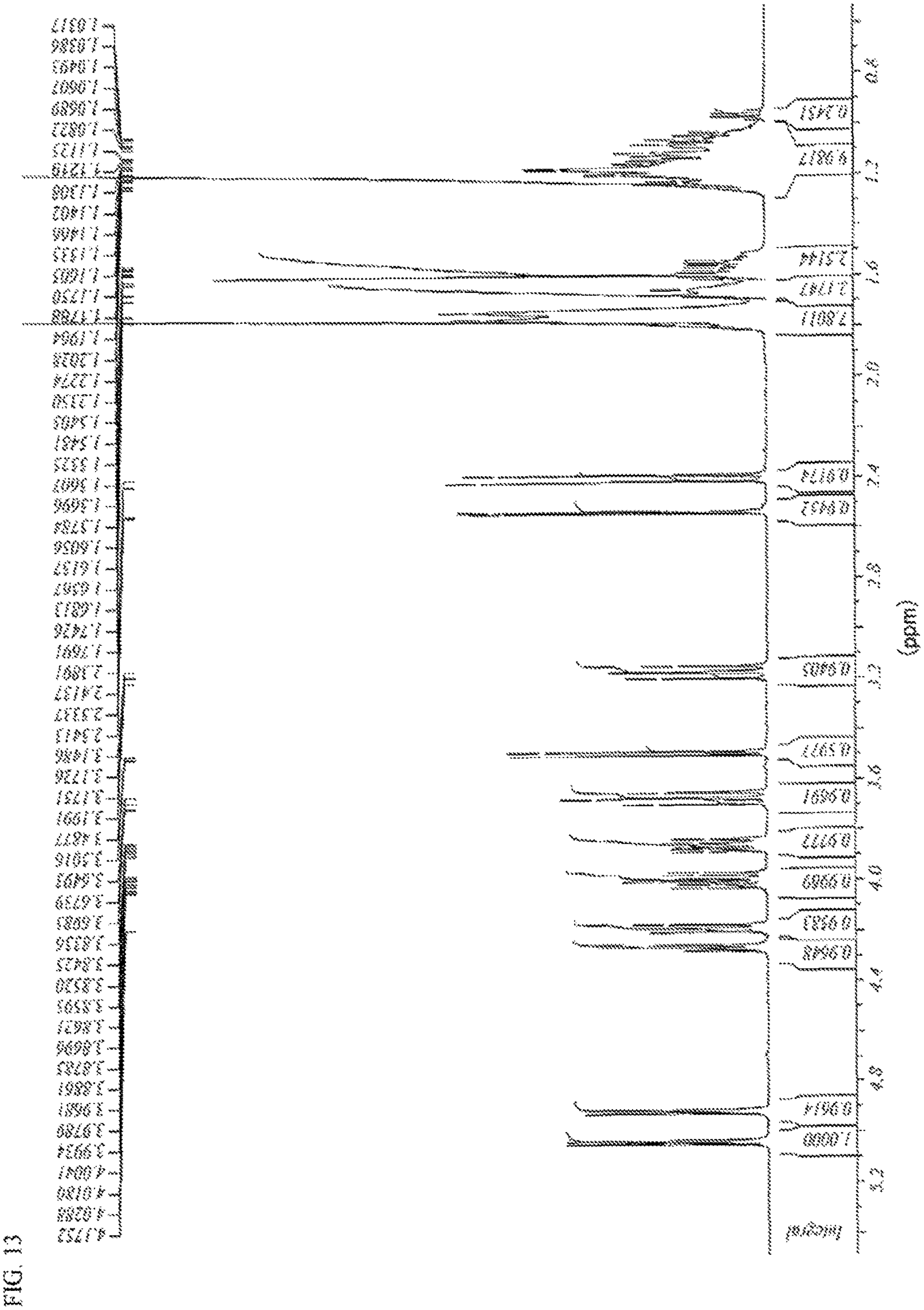
FIG. 13 is an NMR chart of DL-2,3:5,6-di-O-cyclohexylmethylidene-myo-inositol (IN16) obtained in Synthesis Example 6.

FIG. 13 illustrates the NMR chart of this IN16.

Synthesis Example 7

Synthesis of DL-2,3:5,6-di-O-cyclododecylidene-myo-inositol (hereinafter, simply referred to as "IN37")

After nitrogen-purging a 500-ml reaction vessel equipped with a Dimroth condenser, 91 g (500 mmol) of cyclododecanone, 55 mL (500 mmol) of trimethyl orthoformate, methanol (150 mL) and 863 mg (4.5 mmol) of p-toluenesulfonic acid monohydrate were added thereto and stirred at room temperature for 5 minutes. Furthermore, 30 g (167 mmol) of myo-inositol and DMF (200 mL) were charged into the reaction vessel and stirred at 130° C. for 3 hours. In the meantime, the liquid distilled off to the Dean-Stark tube was removed. The reaction solution was cooled to room temperature, and 9.5 g of an aqueous 6 wt % sodium hydrogencarbonate solution was added. DMF was distilled off under reduced pressure, and 250 mL of ethyl acetate was added to the residue. The obtained precipitate was filtered and dissolved by heating in 500 mL of THF and after adding 400 mL of ion-exchanged water, the white precipitate was filtered to obtain 9.0 g (yield: 11%) of IN37 that is the target compound. The compound was confirmed to be the target compound by $^1$H-NMR analysis and have 96.4 area % by gas chromatograph analysis.

Figure 14:
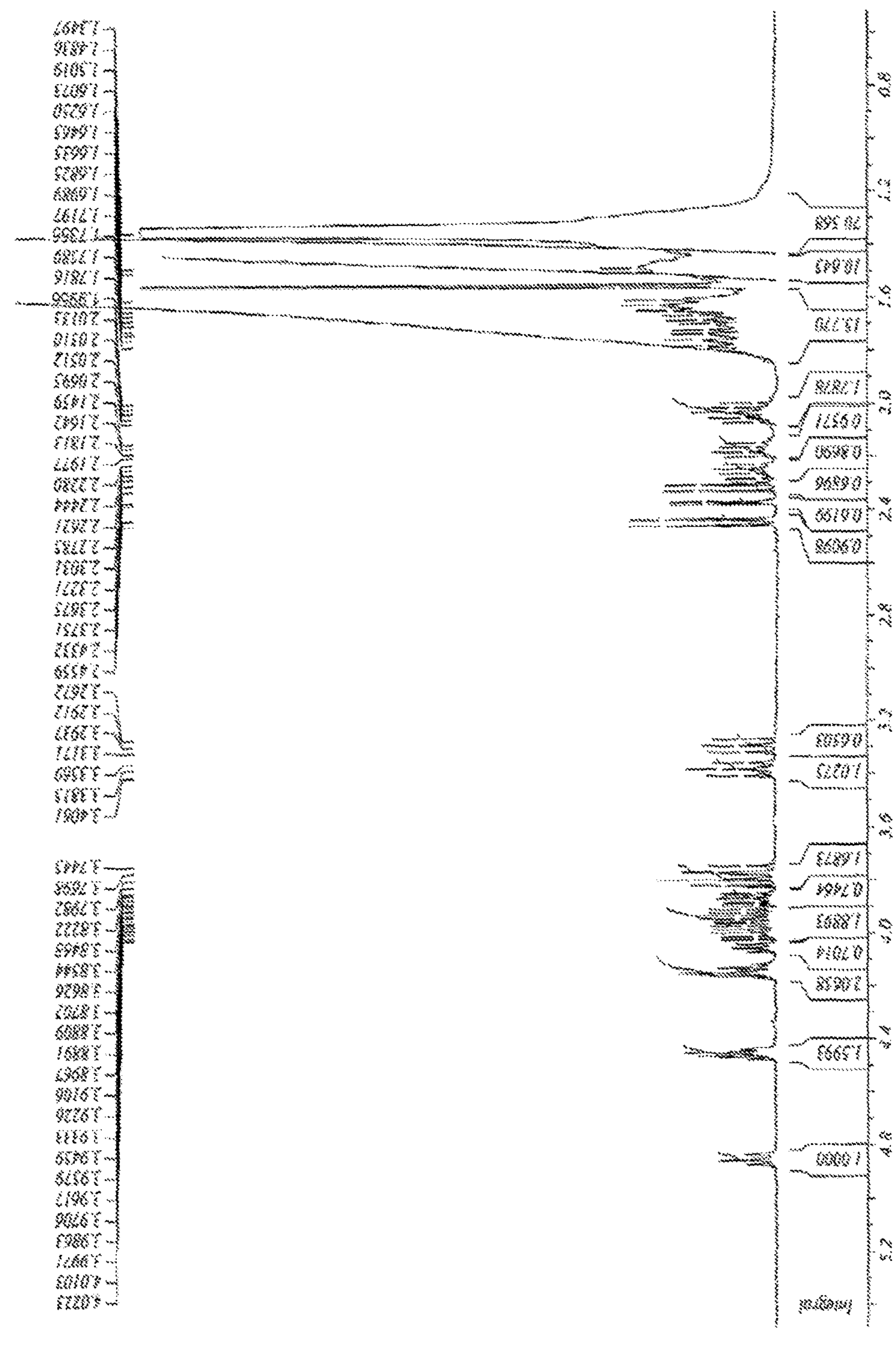
FIG. 14 is an NMR chart of DL-2,3:5,6-di-O-cyclododecylidene-myo-inositol (IN37) obtained in Synthesis Example 7.

FIG. 14 illustrates the NMR chart of this IN37.

Synthesis Example 8

Synthesis of DL-2-O-benzyl-1,3,5-O-ethylidene-myo-inositol (hereinafter, simply referred to as "IN44")

Synthesis Example 8-1

Synthesis of DL-1,3,5-O-ethylidene-myo-inositol (hereinafter, simply referred to as OEM)

After nitrogen-purging a reaction vessel equipped with a Dimroth condenser and a Dean-Stark tube, 140 g (777 mmol) of myo-inositol, 582 g of DMF, 11.8 g (62.2 mmol) of p-toluenesulfonic acid monohydrate, and 135 g (1,127 mmol) of trimethyl orthoacetate were charged thereinto and stirred for 40 minutes in a dipping state in an oil bath at 130° C. In the meantime, the liquid distilled off to the Dean-Stark tube was removed. The reaction solution was cooled to room temperature, and 93.7 g of an aqueous 6.2 wt % sodium hydrogencarbonate solution was added. DMF was distilled off under reduced pressure, and 300 mL of methanol was then added to the resulting concentrate and dissolved with warming. Thereafter, the solution was cooled, crystallized, and filtered, and the obtained solid was vacuum-dried at 50° C. for 8 hours to obtain 117.5 g (yield: 74%) of OEM that is the target compound. The compound was confirmed to be the target compound by $^1$H-NMR analysis.

Figure 15:
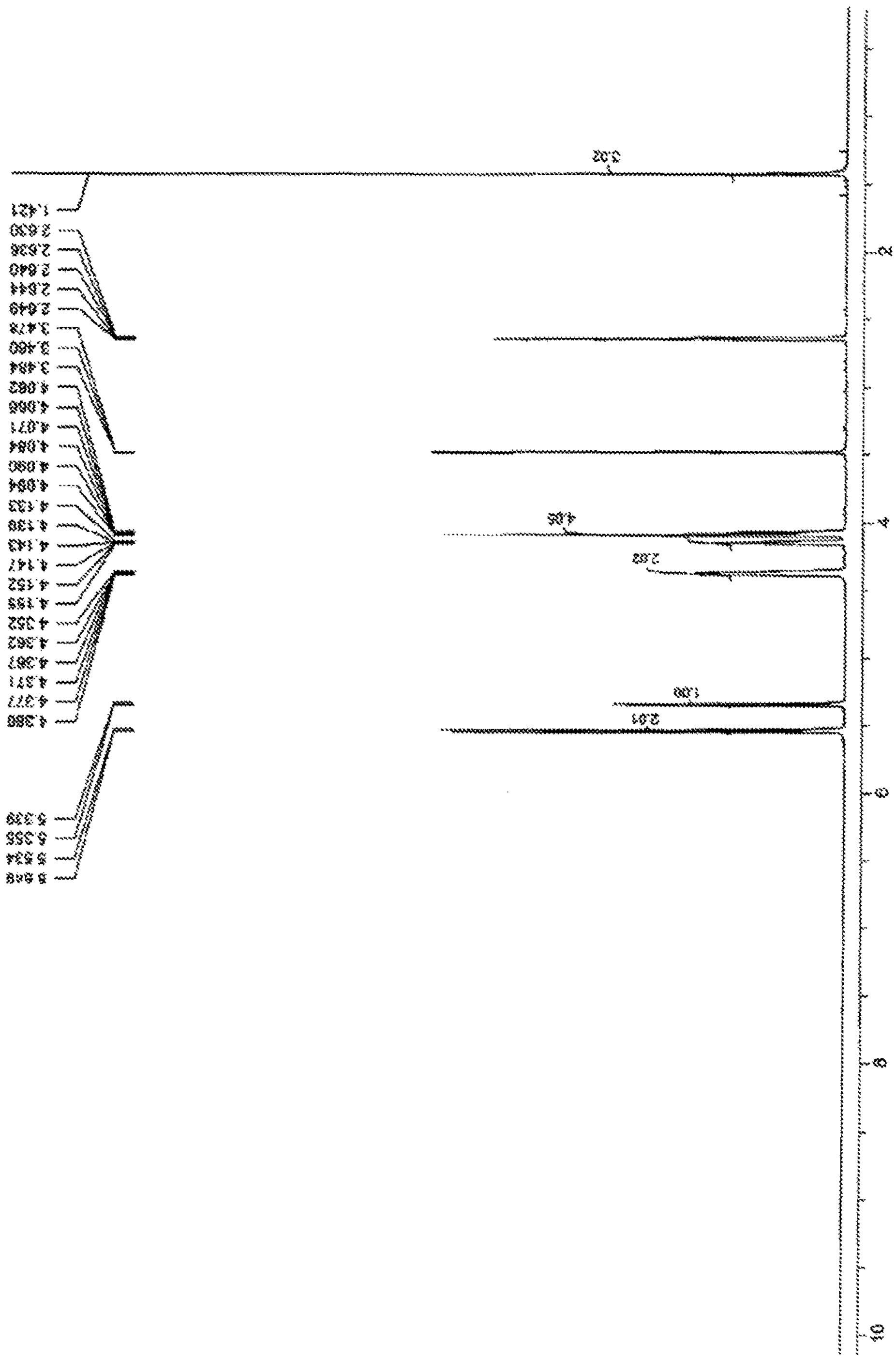
FIG. 15 is an NMR chart of DL-1,3,5-O-ethylidene-myo-inositol (OEM) obtained in Synthesis Example 8-1.

FIG. 15 illustrates the NMR chart of this OEM.

Synthesis Example 8-2

Synthesis of DL-2-O-benzyl-1,3,5-O-ethylidene-myo-inositol (hereinafter, simply referred to as IN44)

After nitrogen-purging a 1,000-mL reaction vessel, 15.67 g (391.8 mmol) of 60 wt % sodium hydride and 360 mL of DMF were charged thereinto, and a solution obtained by dissolving 80 g (381.8 mmol) of OEM synthesized in Synthesis Example 8-1 in 360 mL of DMF was added dropwise. Thereafter, 67.02 g (391.8 mmol) of benzyl bromide was added dropwise to the reaction vessel, and the mixture was stirred for 1 hour at an inner temperature of 10 to 25° C. Subsequently, 80 g of ion-exchanged water was added, and DMF was distilled off under reduced pressure. Extraction was performed by adding 400 mL of ethyl acetate and 300 mL of ion-exchanged water, and the organic layer was recovered. After washing by adding 300 mL of ion-exchanged water, the organic layer was recovered by separation. Furthermore, after washing by adding 300 mL of ion-exchanged water, the organic layer was recovered by separation. Ethyl acetate was distilled off under reduced pressure, and 120 mL of methanol and 100 mL of heptane were added to the residue. The mixture was stirred and then subjected to separation to recover the methanol layer. After distilling off methanol under reduced pressure, crystallization was performed by adding 100 mL of tert-butyl methyl ether, and the obtained white solid was filtered and recovered. The obtained white solid was recrystallized from 80 mL of ethyl acetate and 80 mL of heptane, and the obtained white solid was filtered and recovered. The obtained solid was vacuum-dried at 50° C. for 8 hours to obtain 60 g (yield: 52%) of IN44 that is the target compound. The compound was confirmed to be the target compound by $^1$H-NMR analysis and have 99.7 area % by gas chromatograph analysis.

Figure 16:
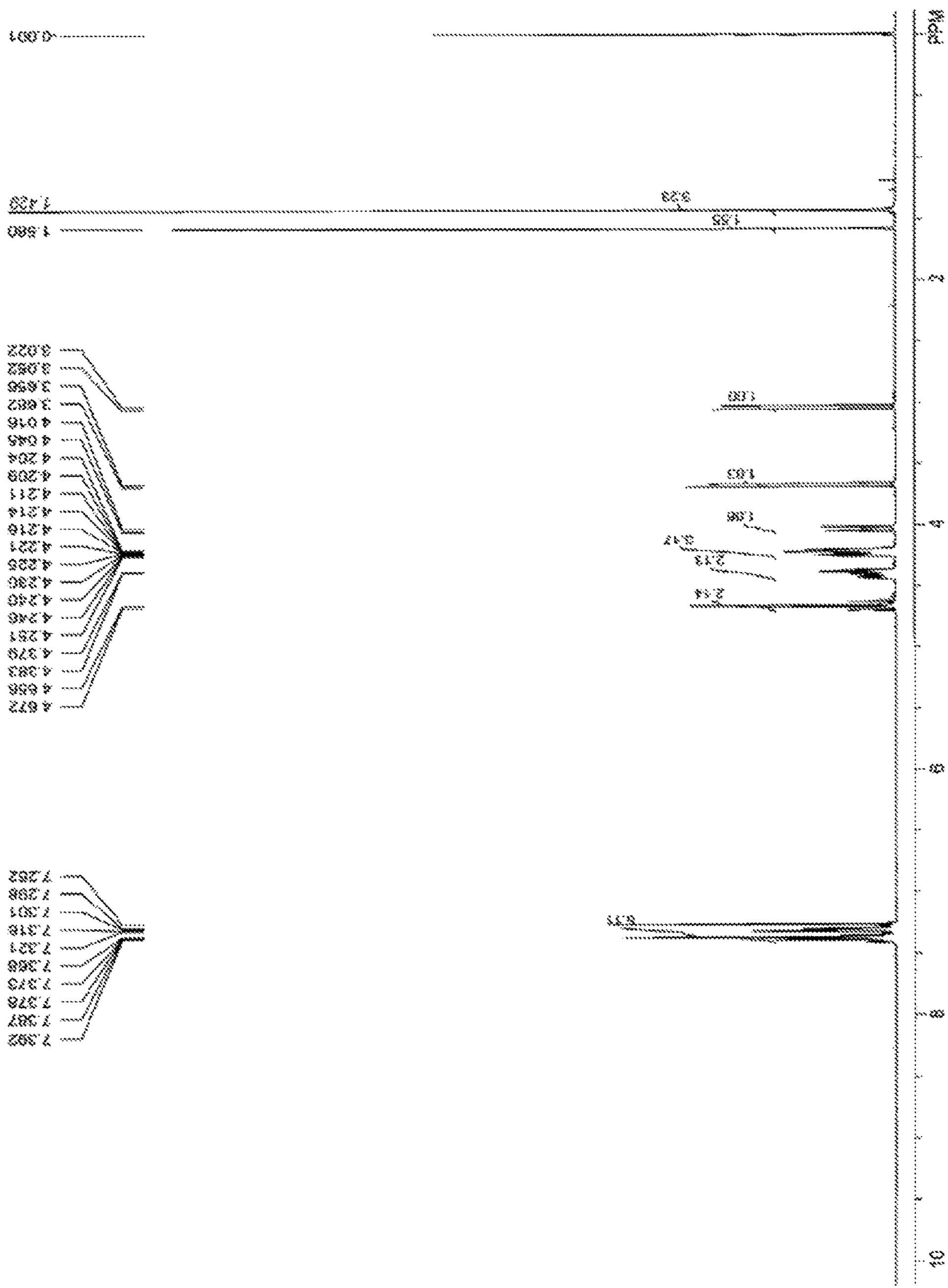
FIG. 16 is an NMR chart of DL-2-O-benzyl-1,3,5-O-ethylidene-myo-inositol (IN44) obtained in Synthesis Example 8-2.

FIG. 16 illustrates the NMR chart of this IN44.

Synthesis Example 9

Synthesis of DL-2-O-benzyl-1,3,5-O-methylidene-myo-inositol (hereinafter, simply referred to as "IN45")

Synthesis Example 9-1

Synthesis of DL-1,3,5-O-methylidene-myo-inositol (hereinafter, simply referred to as OEH)

After nitrogen-purging a reaction vessel equipped with a Dimroth condenser and a Dean-Stark tube, 134.76 g (748.0 mmol) of myo-inositol, 560 g of DMF, 11.38 g (59.8 mmol) of p-toluenesulfonic acid monohydrate, and 111.13 g (1,047.2 mmol) of trimethyl orthoformate were charged thereinto and stirred for 5 hours in a dipping state in an oil bath at 130° C. In the meantime, the liquid distilled off to the Dean-Stark tube was removed. The reaction solution was cooled to room temperature, and 72 g of an aqueous 7.7 wt % sodium hydrogencarbonate solution was added. DMF was distilled off under reduced pressure, and 500 mL of methanol was then added to the resulting concentrate and dissolved with warming. Thereafter, the solution was cooled, crystallized, and filtered, and the obtained solid was vacuum-dried at 50° C. for 8 hours to obtain 63.3 g (yield: 45%) of OEH that is the target compound. The compound was confirmed to be the target compound by $^{1}$H-NMR analysis.

Figure 17:
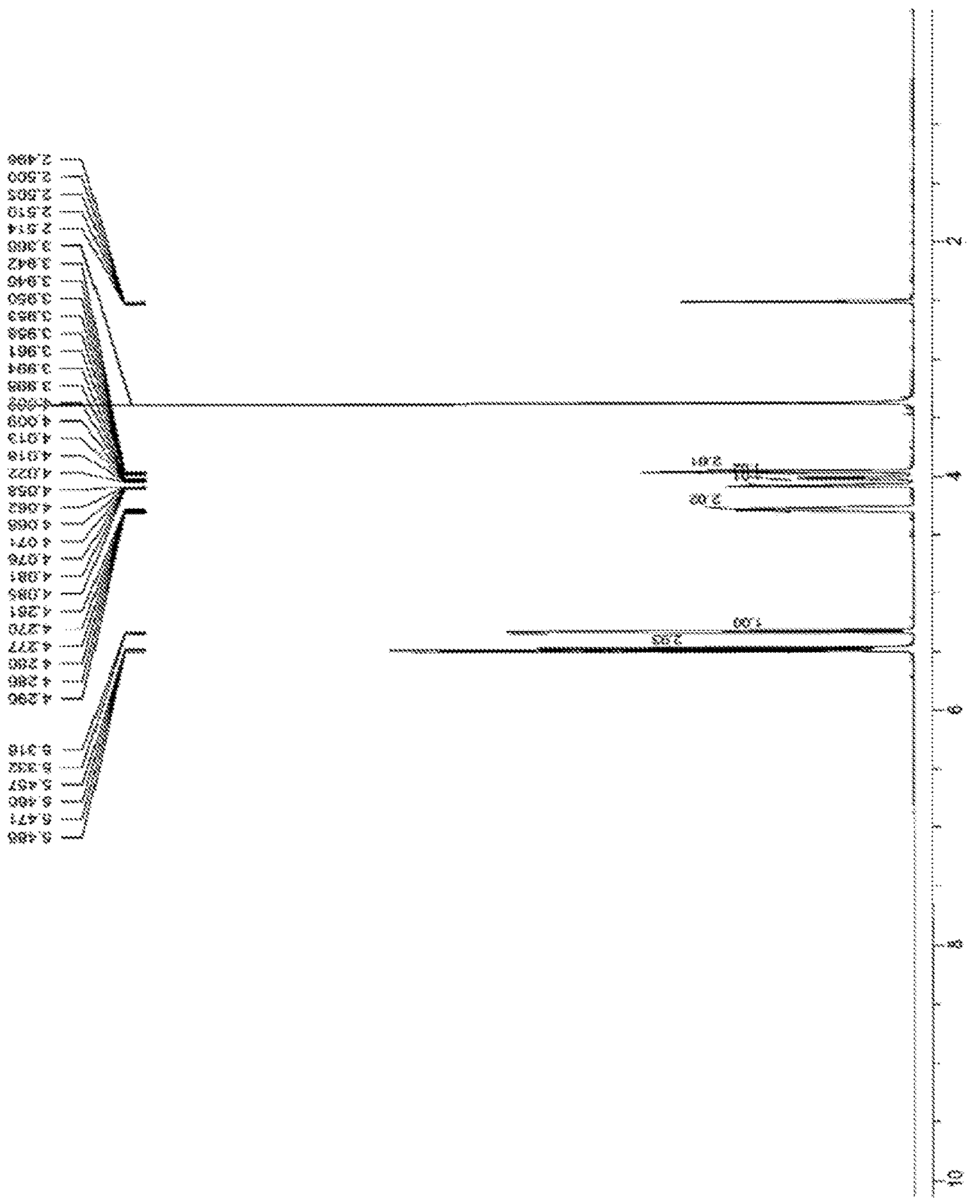
FIG. 17 is an NMR chart of DL-1,3,5-O-methylidene-myo-inositol (OEH) obtained in Synthesis Example 9-1.

FIG. 17 illustrates the NMR chart of this OEH.

Synthesis Example 9-2

Synthesis of DL-2-O-benzyl-1,3,5-O-methylidene-myo-inositol (hereinafter, simply referred to as IN45)

After nitrogen-purging a 200-mL reaction vessel, 2.73 g (68.4 mmol) of 60 wt % sodium hydride and 65 mL of DMF were charged thereinto, and a solution obtained by dissolving 13 g (68.4 mmol) of OEH synthesized in Synthesis Example 9-1 in 65 mL of DMF was added dropwise. Thereafter, 11.69 g (68.4 mmol) of benzyl bromide was added dropwise to the reaction vessel, and the mixture was stirred for 1 hour at an inner temperature of 9 to 12° C. Subsequently, 30 g of ion-exchanged water was added, and DMF was distilled off under reduced pressure. Extraction was performed by adding 100 mL of ethyl acetate and 100 g of ion-exchanged water to the concentrate, and the organic layer was recovered. After washing by adding 100 g of ion-exchanged water, the organic layer was recovered by separation. Ethyl acetate was distilled off under reduced pressure, and 50 mL of methanol and 50 mL of heptane were added to the residue. The mixture was stirred and then subjected to separation to recover the methanol layer. After distilling off methanol under reduced pressure, crystallization was performed by adding 60 mL of tert-butyl methyl ether to the concentrate, and the obtained white solid was filtered and recovered. The obtained white solid was recrystallized from 40 mL of ethyl acetate and 40 mL of heptane, and the obtained white solid was filtered and recovered. The obtained solid was vacuum-dried at 50° C. for 8 hours to obtain 10.9 g (yield: 57%) of IN45 that is the target compound. The compound was confirmed to be the target compound by $^{1}$H-NMR analysis and have 99.8 area % by gas chromatograph analysis.

Figure 18:
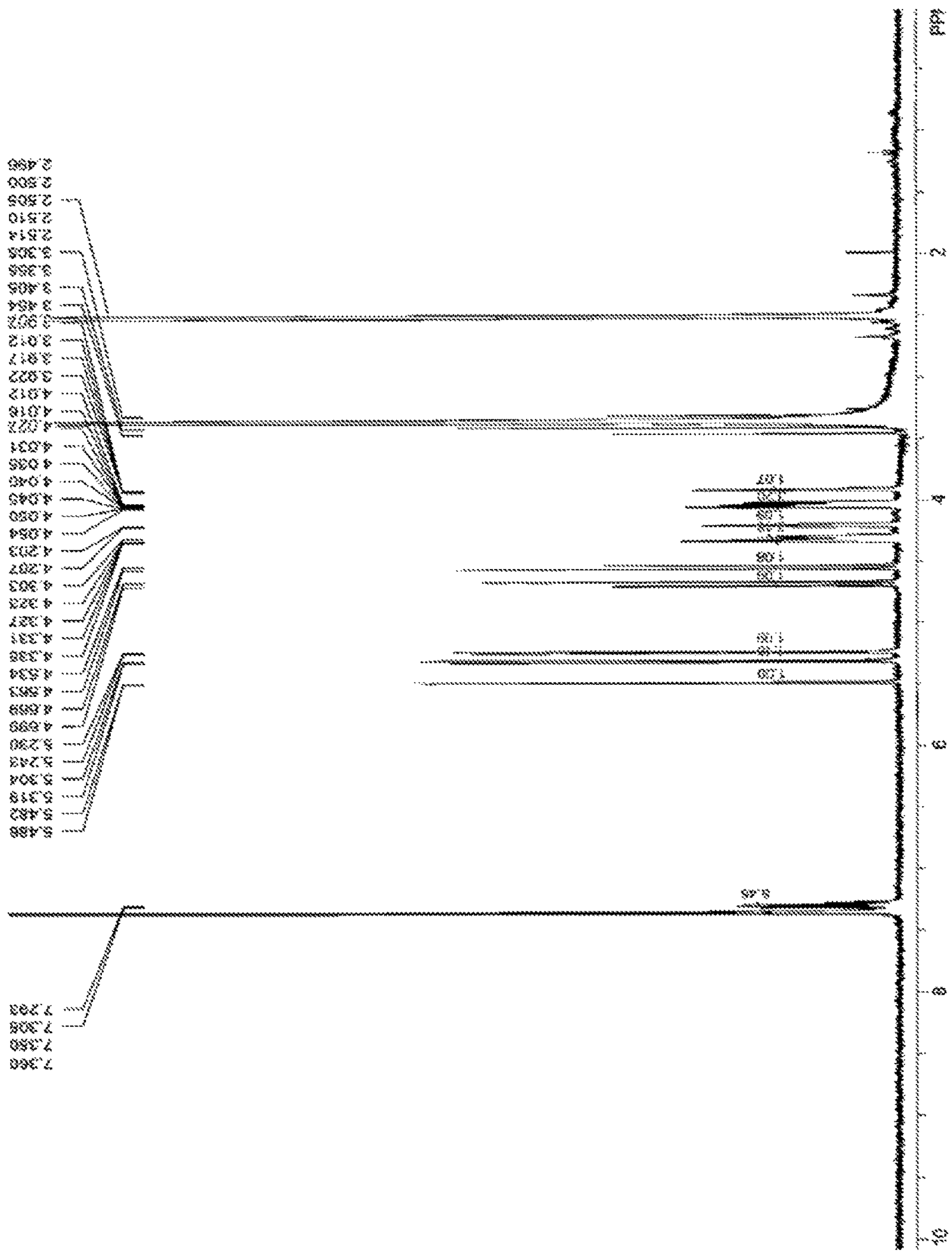
FIG. 18 is an NMR chart of DL-2-O-benzyl-1,3,5-O-methylidene-myo-inositol (IN45) obtained in Synthesis Example 9-2.

FIG. 18 illustrates the NMR chart of IN45.

Synthesis Example 10

DL-2-O-n-hexyl-1,3,5-O-ethylidene-myo-inositol (hereinafter, simply referred to as "IN57")

After nitrogen-purging a 1,000-mL reaction vessel, 15.36 g (357.5 mmol) of 60 wt % sodium hydride and 360 mL of DMF were charged thereinto, and a solution obtained by dissolving 73 g (383.9 mmol) of OEM synthesized in Synthesis Example 8-1 in 360 mL of DMF was added dropwise. Thereafter, 81.42 g (383.9 mmol) of n-hexyl iodide was added dropwise to the reaction vessel, and the mixture was stirred for 1.5 hours at an inner temperature of 60 to 70° C. and then cooled to room temperature. Subsequently, 50 g of ion-exchanged water was added, and DMF was distilled off under reduced pressure. Extraction was performed by adding 400 mL of ethyl acetate and 200 g of ion-exchanged water, and the organic layer was recovered. After washing by adding 200 g of ion-exchanged water, the organic layer was recovered by separation. Furthermore, after washing by adding 200 g of ion-exchanged water, the organic layer was recovered by separation. Ethyl acetate was distilled off under reduced pressure, and 100 mL of methanol and 100 mL of n-hexane were added to the residue. The mixture was stirred and then subjected to separation to recover the methanol layer. Recrystallization was performed by adding 100 mL of tert-butyl methyl ether and 200 mL of n-hexane to the concentrate, and the obtained white solid was filtered and recovered. Furthermore, the obtained white solid was crystallized from 100 mL of tert-butyl methyl ether and 200 mL of n-hexane, and the obtained white solid was filtered and recovered. The obtained solid was vacuum-dried at room temperature for 8 hours to obtain 52.0 g (yield: 50%) of IN57 that is the target compound. The compound was confirmed to be the target compound by $^{1}$H-NMR analysis and have 97.5 area % by gas chromatograph analysis.

Figure 19:
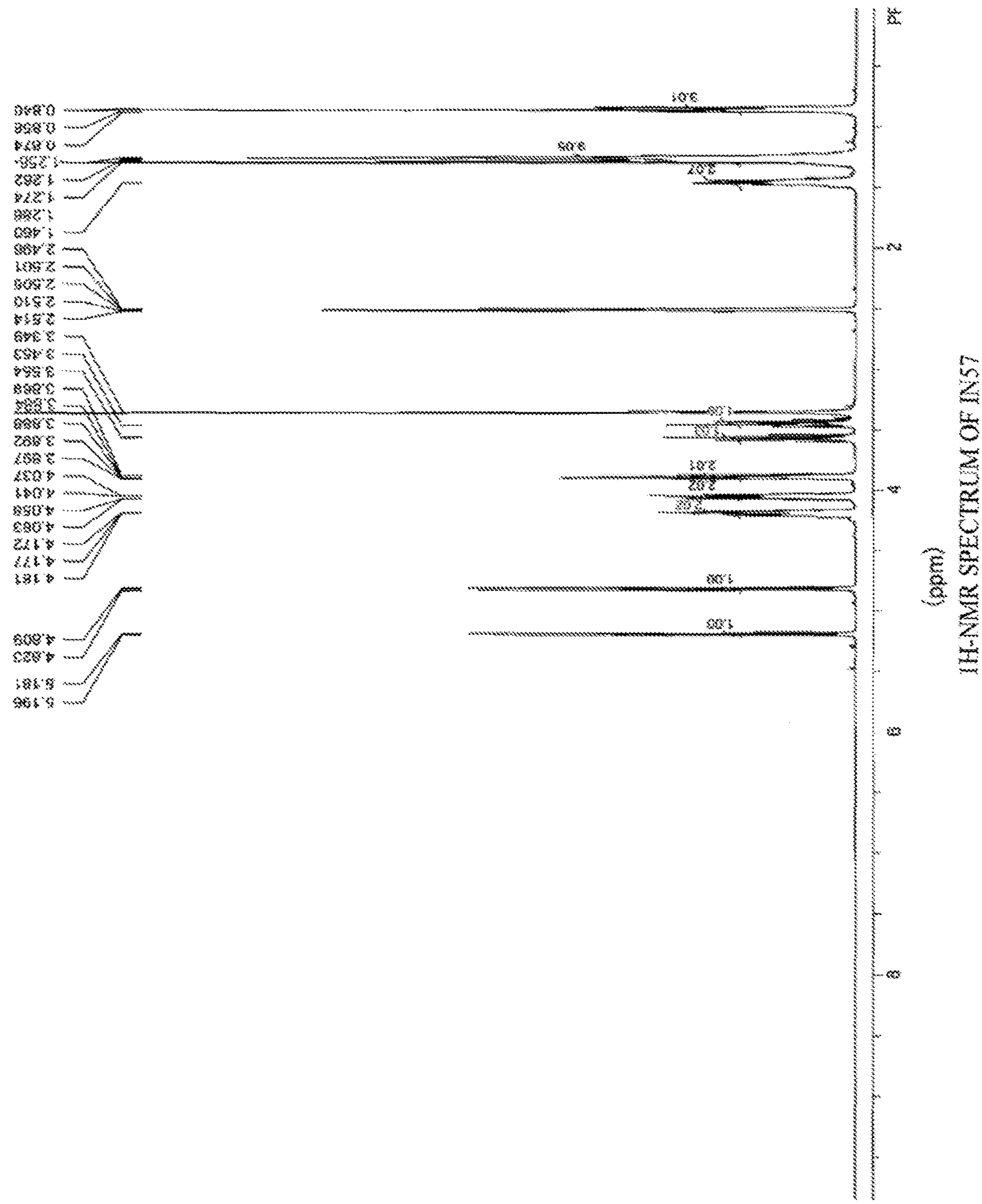
FIG. 19 is an NMR chart of DL-2-O-n-hexyl-1,3,5-O-ethylidene-myo-inositol (IN57) obtained in Synthesis Example 10.

FIG. 19 illustrates the NMR chart of IN57.

Synthesis Example 11

DL-2-O-cyclohexylmethyl-1,3,5-O-ethylidene-myo-inositol (hereinafter, simply referred to as "IN58")

After nitrogen-purging a 1,000-mL reaction vessel, 14.7 g (3,367.3 mmol) of 60 wt % sodium hydride and 320 mL of DMF were charged thereinto, and a solution obtained by dissolving 75 g (367.3 mmol) of OEM synthesized in Synthesis Example 8-1 in 360 mL of DMF was added dropwise. Thereafter, 65.05 g (367.3 mmol) of cyclohexylmethyl bromide was added dropwise to the reaction vessel, and the mixture was stirred for 2 hours at an inner temperature of 80 to 90° C. and then cooled to room temperature. Subsequently, 14.7 g (3,367.3 mmol) of 60 wt % sodium hydride was added, and the mixture was stirred at room temperature for 30 minutes. Furthermore, 65.05 g (367.3 mmol) of cyclohexylmethyl bromide was added dropwise to the reaction vessel, and mixture was stirred for 2 hours at an inner temperature of 80 to 90° C. and then cooled to room temperature. Thereafter, 90 g of ion-exchanged water was added, and DMF was distilled off under reduced pressure. Extraction was performed by adding 400 mL of ethyl acetate and 300 g of ion-exchanged water, and the organic layer was recovered. After washing by adding 300 g of ion-exchanged water, the organic layer was recovered by separation. Furthermore, after washing by adding 300 g of ion-exchanged water, the organic layer was recovered by separation. Ethyl acetate was distilled off under reduced pressure, and 200 mL of methanol and 100 mL of n-hexane were added to the residue. The mixture was stirred and then subjected to separation to recover the methanol layer, and methanol was distilled off under reduced pressure. Recrystallization was then performed by adding 50 mL of tert-butyl methyl ether and 100 mL of n-hexane, and the obtained white solid was filtered and recovered. Furthermore, the obtained white solid was crystallized from 100 mL of tert-butyl methyl ether and 100 mL of n-hexane, and the obtained white solid was filtered and recovered. The obtained solid was vacuum-dried at 50° C. for 8 hours to obtain 29 g (yield: 26%) of IN58 that is the target compound. The compound was confirmed to be the target compound by $^{1}$H-NMR analysis and have 99.4 area % by gas chromatograph analysis.

Figure 20:
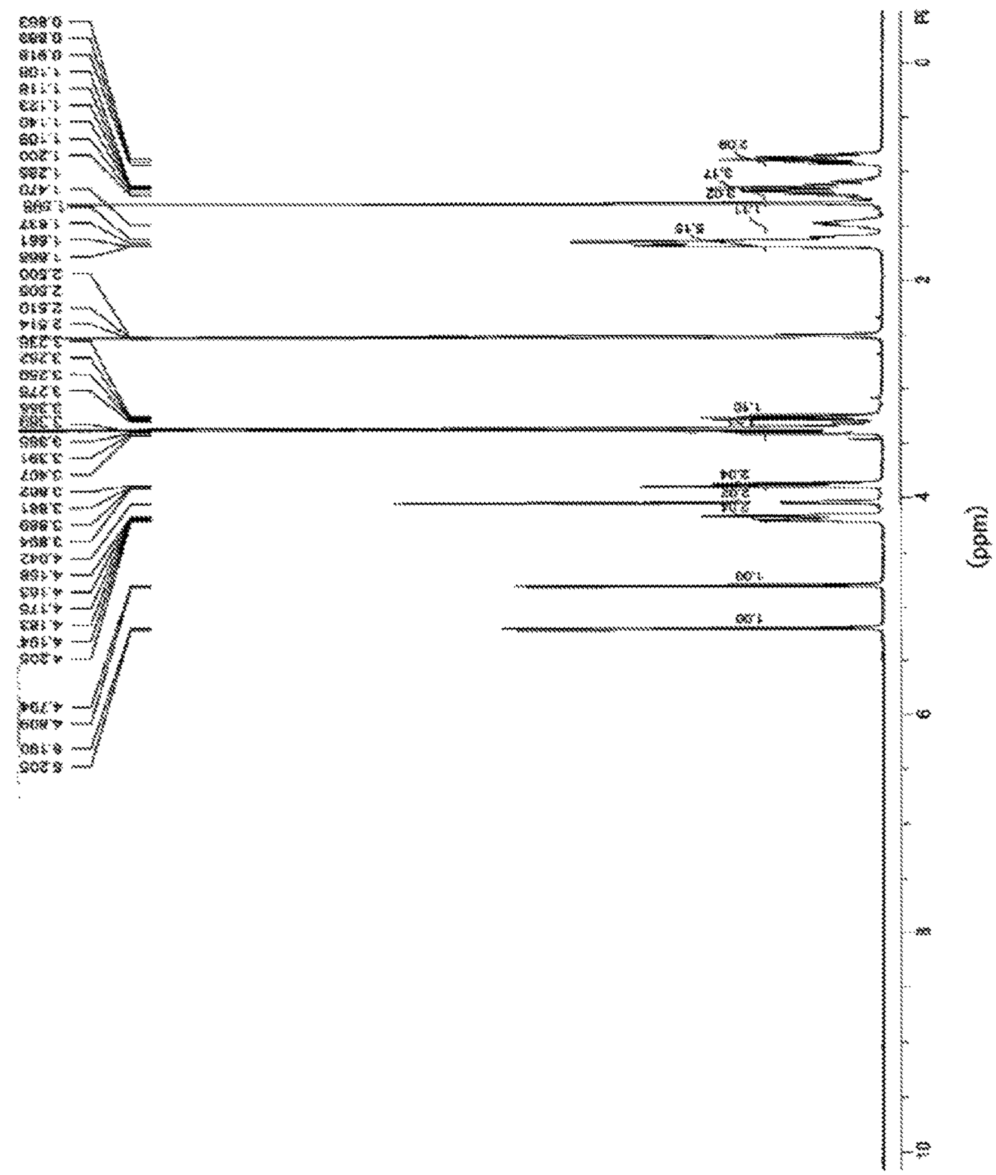
FIG. 20 is an NMR chart of DL-2-O-cyclohexylmethyl-1,3,5-O-ethylidene-myo-inositol (IN58) obtained in Synthesis Example 11.

FIG. 20 illustrates the NMR chart of IN58.

Example 1

A reaction vessel was charged with 6.61 g (0.0458 mol) of 1,4-cyclohexane dimethanol (hereinafter, simply referred to as "CHDM"), 14.59 g (0.0681 mol) of diphenyl carbonate (hereinafter, simply referred to as "DPC"), and $5.50\times10^{-5}$ g ($6.55\times10^{-7}$ mol) of sodium hydrogencarbonate as a catalyst, relative to 6.69 g (0.0197 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 240° C. over 20 minutes, and phenol generated was drawn out of the reaction vessel with performing a control so as to reduce the pressure to 0.200 kPa or less in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.390 dl/g, the glass transition temperature Tig was 97° C., and Tmg was 105° C. The 5% thermal weight loss temperature (Td) in nitrogen atmosphere was 319° C.

The production conditions and evaluation results of Example 1 are shown in Tables 1A and 1B.

In addition, the NMR chart of this polycarbonate copolymer is illustrated in FIG. 1.

Example 2

A reaction vessel was charged with 4.03 g (0.0279 mol) of CHDM, 12.46 g (0.0582 mol) of DPC, and $4.70\times10^{-5}$ g ($1.44\times10^{-7}$ mol) of cesium carbonate as a catalyst, relative to 9.51 g (0.0279 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 240° C. over 20 minutes, and phenol generated was drawn out of the reaction vessel with performing a control so as to reduce the pressure to 0.200 kPa or less in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.680 dl/g, the glass transition temperature Tig was 150° C., and Tmg was 160° C. The 5% thermal weight loss temperature (Td) in nitrogen atmosphere was 315° C.

The production conditions and evaluation results of Example 2 are shown in Tables 1A and 1B.

Figure 2:
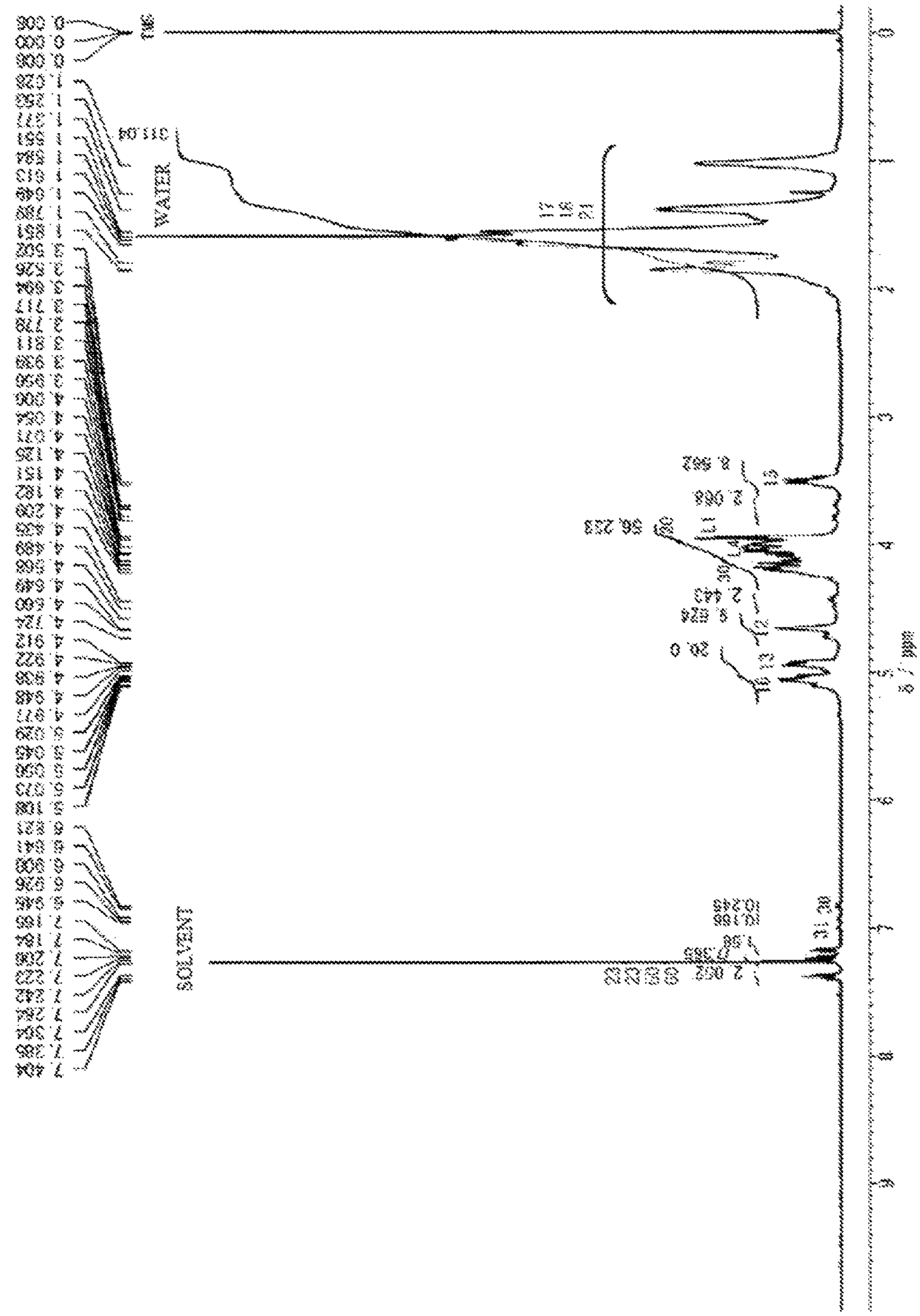
FIG. 2 is an NMR chart of the polycarbonate copolymer obtained in Example 2.

In addition, the NMR chart of this polycarbonate copolymer is illustrated in FIG. 2.

Example 3

A reaction vessel was charged with 8.31 g (0.0569 mol) of isosorbide (hereinafter, simply referred to as "ISB"), 15.39 g (0.0718 mol) of DPC, and $2.98\times10^{-5}$ g ($1.69\times10^{-7}$ mol) of calcium acetate monohydrate as a catalyst, relative to 4.84 g (0.0142 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 250° C. over 15 minutes, and from 15 minutes after the initiation of temperature rise in the second stage, phenol generated was drawn out of the reaction vessel with performing a control so as to reduce the pressure to 0.200 kPa or less from 13.3 kPa in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.347 dl/g, the glass transition temperature Tig was 165° C., and Tmg was 170° C. The 5% thermal weight loss temperature (Td) in nitrogen atmosphere was 339° C.

The production conditions and evaluation results of Example 3 are shown in Tables 1A and 1B.

Furthermore, when the polycarbonate copolymer was press-molded at 250° C. to form a film of about 200 μm in thickness, the refractive index of D line was 1.5027, the refractive index of C line was 1.5002, the refractive index of e line was 1.5050, the refractive index of F line was 1.5124, and the Abbe number was 41. These results are shown in Table 3.

Figure 3:
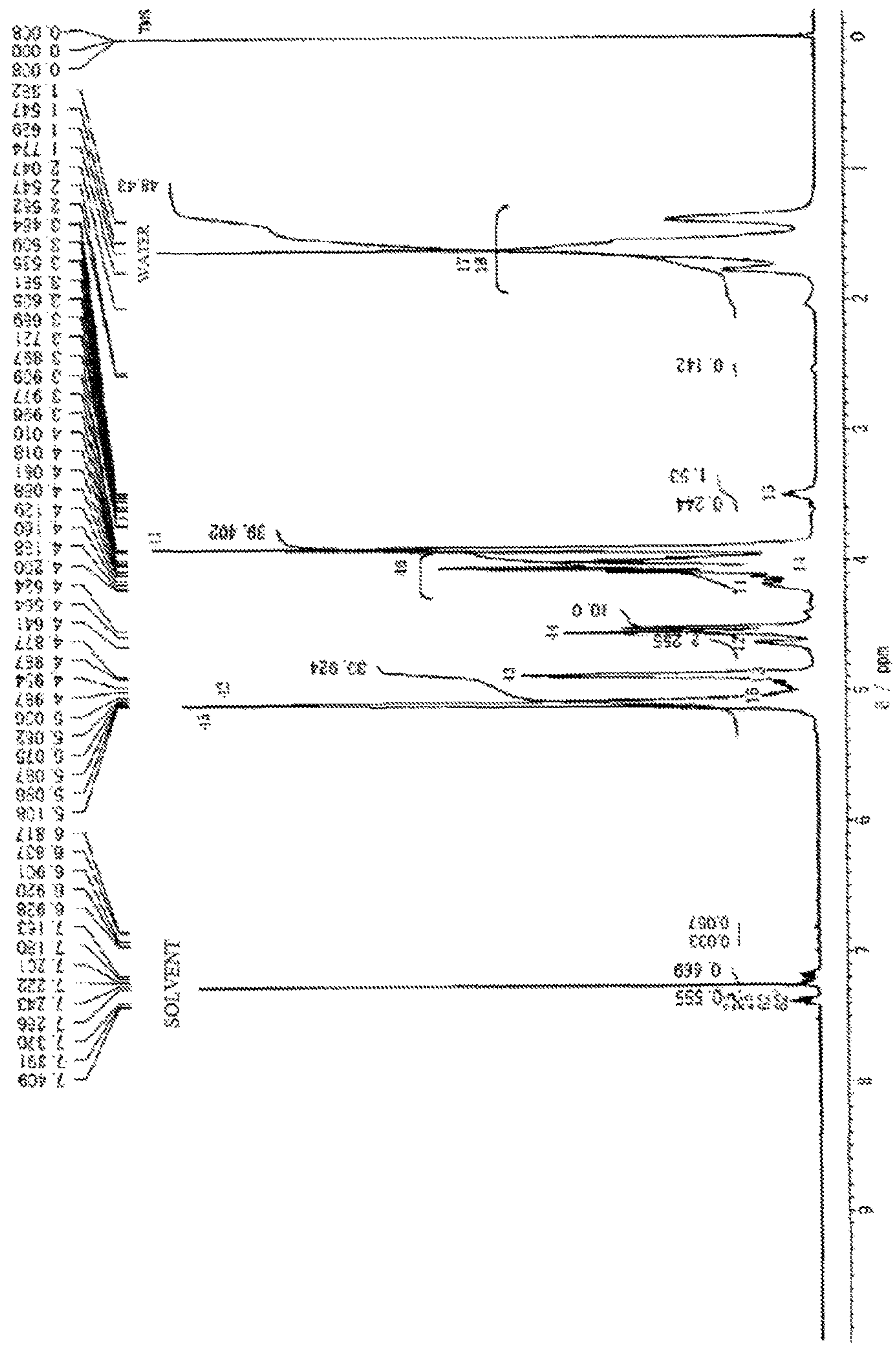
FIG. 3 is an NMR chart of the polycarbonate copolymer obtained in Example 3.

In addition, the NMR chart of this polycarbonate copolymer is illustrated in FIG. 3.

Example 4

A reaction vessel was charged with 5.00 g (0.0255 mol) of tricyclodecane dimethanol (hereinafter, simply referred to as "TCDDM"), 11.03 g (0.0515 mol) of DPC, and $2.14\times10^{-5}$ g ($1.21\times10^{-7}$ mol) of calcium acetate monohydrate as a catalyst, relative to 8.67 g (0.0255 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 250° C. over 15 minutes, and from 10 minutes after the initiation of temperature rise in the second stage, phenol generated was drawn out of the reaction vessel with performing a control so as to reduce the pressure to 0.200 kPa or less from 13.3 kPa in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.471 dl/g, the glass transition temperature Tig was 149° C., and Tmg was 156° C. The 5% thermal weight loss temperature (Td) in nitrogen atmosphere was 341° C.

The production conditions and evaluation results of Example 4 are shown in Tables 1A and 1B.

Figure 4:
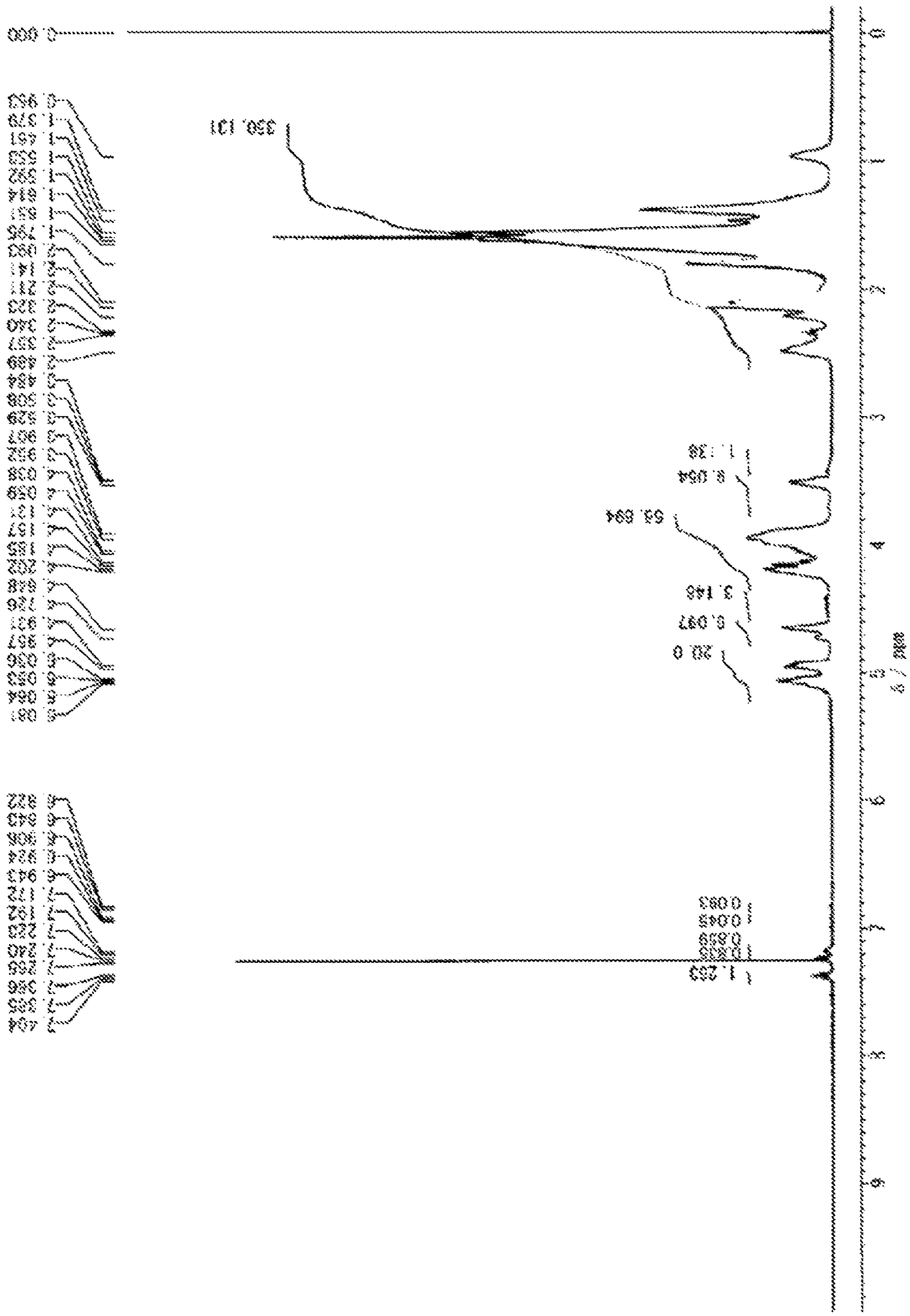
FIG. 4 is an NMR chart of the polycarbonate copolymer obtained in Example 4.

In addition, the NMR chart of this polycarbonate copolymer is illustrated in FIG. 4.

Example 5

A reaction vessel was charged with 4.37 g (0.0144 mol) of spiro-glycol (3,9-bis(1,1-dimethyl-2-hydroxyethyl)-2,4,8,10-tetraoxaspiro[5,5]undecane) (hereinafter, simply referred to as "SPG"), 6.40 g (0.0299 mol) of DPC, and $6.02\times10^{-5}$ g ($3.42\times10^{-7}$ mol) of calcium acetate monohydrate as a catalyst, relative to 4.88 g (0.0143 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 250° C. over 15 minutes, and from 10 minutes after the initiation of temperature rise in the second stage, phenol generated was drawn out of the reaction vessel with performing a control so as to reduce the pressure to 0.200 kPa or less from 13.3 kPa in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.201 dl/g, the glass transition temperature Tig was 127° C., and Tmg was 136° C. The 5% thermal weight loss temperature (Td) in nitrogen atmosphere was 346° C.

Figure 5:
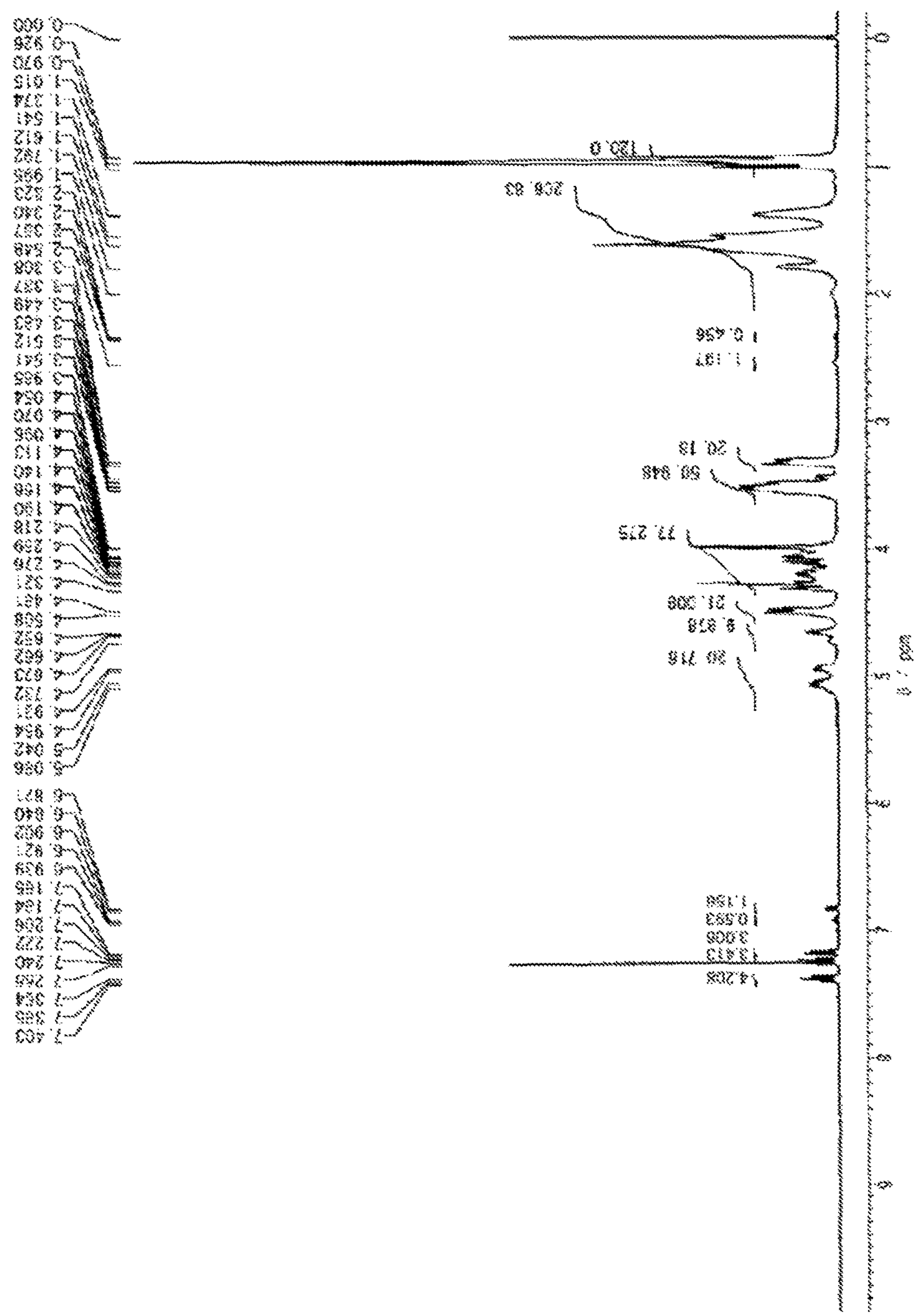
FIG. 5 is an NMR chart of the polycarbonate copolymer obtained in Example 5.

The production conditions and evaluation results of Example 5 are shown in Tables 1A and 1B. In addition, the NMR chart of this polycarbonate copolymer is illustrated in FIG. 5.

Example 6

A reaction vessel was charged with 10.58 g (0.0241 mol) of 9,9-bis[4-(2-hydroxyethoxy)phenyl]fluorene (hereinafter, simply referred to as "BPEF"), 7.46 g (0.0348 mol) of DPC, and $1.44\times10^{-5}$ g ($8.17\times10^{-8}$ mol) of calcium acetate monohydrate as a catalyst, relative to 3.52 g (0.0103 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 250° C. over 15 minutes, and from 10 minutes after the initiation of temperature rise in the second stage, phenol generated was drawn out of the reaction vessel with performing a control so as to reduce the pressure to 0.200 kPa or less from 13.3 kPa in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.337 dl/g, the glass transition temperature Tig was 127° C., and Tmg was 136° C. The 5% thermal weight loss temperature (Td) in nitrogen atmosphere was 358° C.

The production conditions and evaluation results of Example 6 are shown in Tables 1A and 1B.

Figure 6:
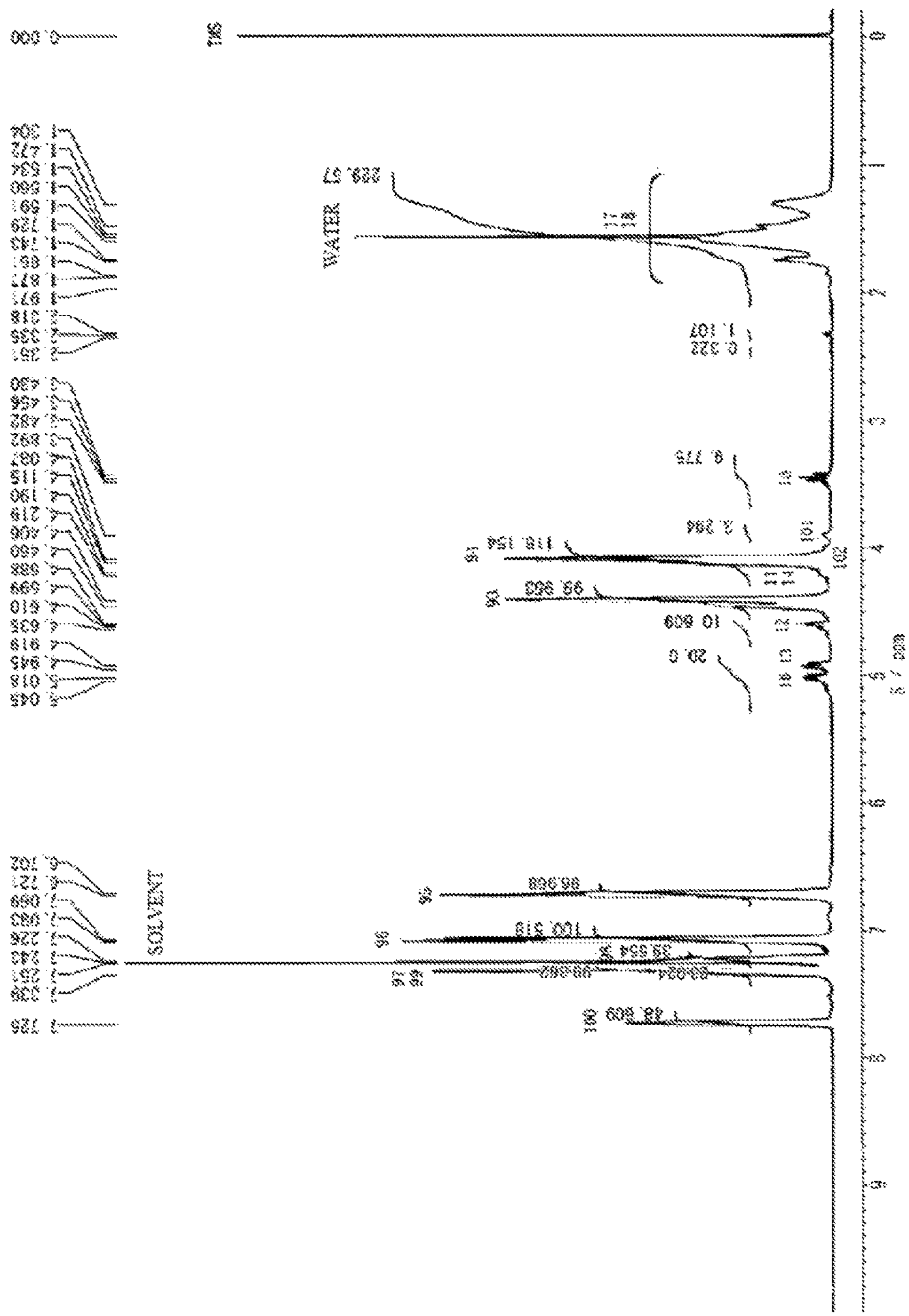
FIG. 6 is an NMR chart of the polycarbonate copolymer obtained in Example 6.

Furthermore, when the polycarbonate copolymer was press-molded at 250° C. to form a film of about 200 μm in thickness, the refractive index of D line was 1.6019, the refractive index of C line was 1.5964, the refractive index of e line was 1.6077, the refractive index of F line was 1.6193, and the Abbe number was 26. These results are shown in Table 3. In addition, the NMR chart of this polycarbonate copolymer is illustrated in FIG. 6.

Example 7

A reaction vessel was charged with 7.65 g (0.0523 mol) of ISB, 4.12 g (0.0064 mol) of bis[9-(2-phenoxycarbonylethyl)fluoren-9-yl]methane (hereinafter, simply referred to as "2Q"), 11.73 g (0.0548 mol) of DPC, and $2.56\times10^{-5}$ g ($1.45\times10^{-7}$ mol) of calcium acetate monohydrate as a catalyst, relative to 3.02 g (0.0089 mol) of DCMI, and in a nitrogen atmosphere, the raw materials were heated at a heating bath temperature of 150° C., stirred as needed, subjected to temperature rise to 220° C. at normal pressure over 60 minutes, and thereby dissolved.

As a step of first stage of reaction, the pressure was reduced from normal pressure to 13.3 kPa over 40 minutes with keeping a temperature of 220° C. and held at 13.3 kPa for 60 minutes, and phenol generated was drawn out of the reaction vessel. As a step of second stage, the heating bath temperature was raised to 250° C. over 15 minutes, and from 10 minutes after the initiation of temperature rise in the second stage, phenol generated was drawn out of the reaction vessel with performing a control so as to reduce the pressure to 0.200 kPa or less from 13.3 kPa in 30 minutes. After reaching a predetermined stirring torque, the reaction was terminated, and the produced reaction product was taken out from the reaction vessel to obtain a polycarbonate copolymer.

The reduced viscosity of the obtained polycarbonate copolymer was 0.387 dl/g, the glass transition temperature Tig was 165° C., and Tmg was 169° C. The 5% thermal weight loss temperature (Td) in nitrogen atmosphere was 346° C.

The production conditions and evaluation results of Example 7 are shown in Tables 2A and 2B.

Furthermore, when the polycarbonate copolymer was press-molded at 250° C. to form a film of about 200 μm in thickness, the refractive index of D line was 1.5311, the refractive index of C line was 1.5275, the refractive index of e line was 1.5344, the refractive index of F line was 1.5421, and the Abbe number was 36. These results are shown in Table 3.

Figure 7:
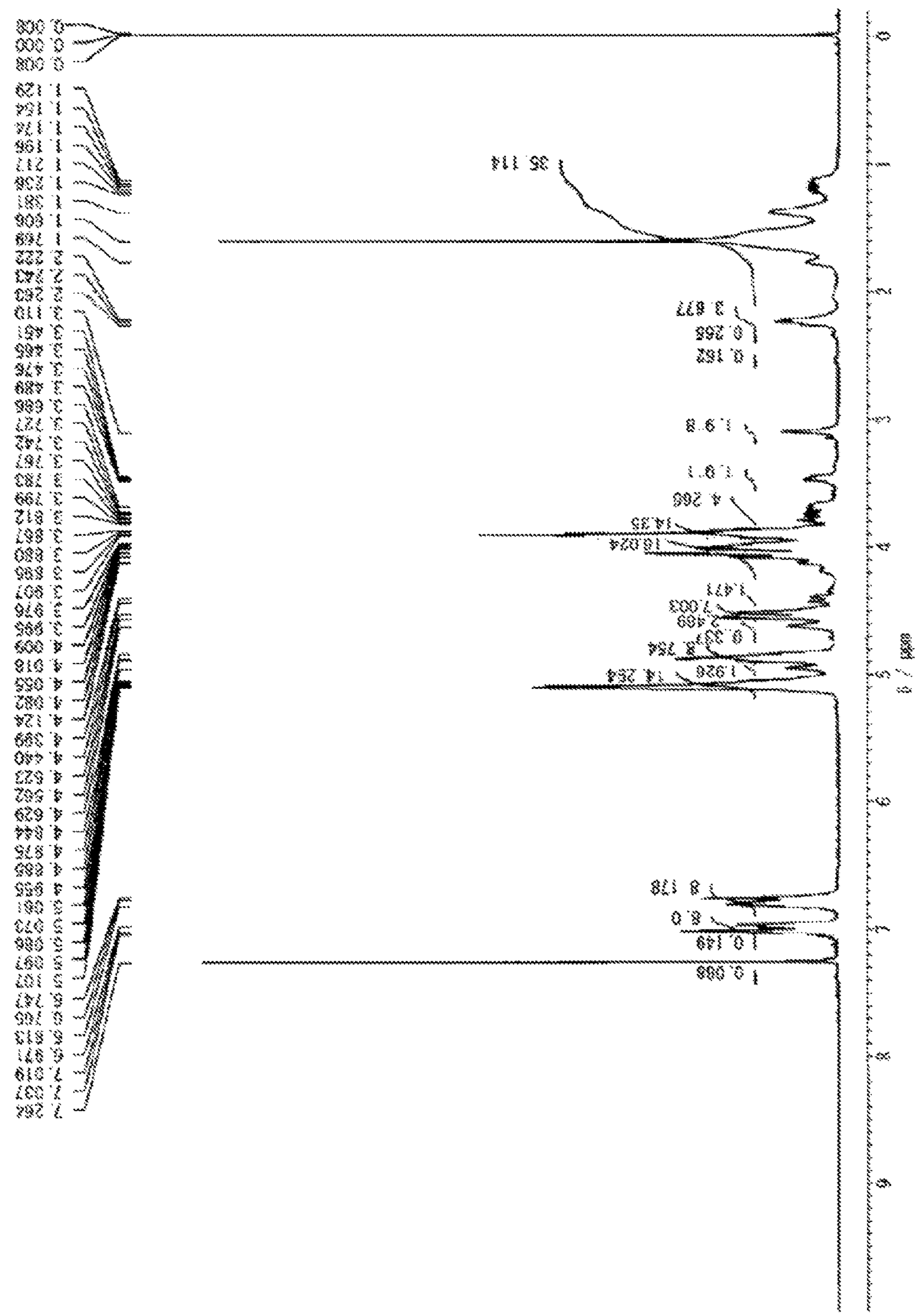
FIG. 7 is an NMR chart of the polycarbonate copolymer obtained in Example 7.

In addition, the NMR chart of this polycarbonate copolymer is illustrated in FIG. 7.

Comparative Example 1

A reaction vessel was charged with 110.37 g (0.755 mol) of ISB, 163.40 g (0.763 mol) of DPC, and $1.99\times10^{-4}$ g ($1.13\times10^{-6}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 210° C. over 30 minutes, and the reaction was allowed to proceed at normal pressure for 60 minutes. Subsequently, the pressure was reduced from normal pressure to 13.3 kPa over 90 minutes and held at 13.3 kPa for 30 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 230° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.678 dl/g, the glass transition temperature Tig was 162° C., and Tmg was 165° C.

The production conditions and evaluation results of Comparative Example 1 are shown in Tables 1A and 1B.

Comparative Example 2

A reaction vessel was charged with 77.52 g (0.530 mol) of ISB, 32.78 g (0.227 mol) of CHDM, 162.33 g (0.758 mol) of DPC, and $2.00\times10^{-4}$ g ($1.14\times10^{-6}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 210° C. over 30 minutes, and the reaction was allowed to proceed at normal pressure for 60 minutes. Subsequently, the pressure was reduced from normal pressure to 13.3 kPa over 90 minutes and held at 13.3 kPa for 30 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 220° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.744 dl/g, the glass transition temperature Tig was 120° C., and Tmg was 123° C.

The production conditions and evaluation results of Comparative Example 2 are shown in Tables 1A and 1B.

Comparative Example 3

A reaction vessel was charged with 55.50 g (0.380 mol) of ISB, 54.76 g (0.380 mol) of CHDM, 161.07 g (0.752 mol) of DPC, and $4.01\times10^{-4}$ g ($2.28\times10^{-6}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 210° C. over 30 minutes, and the reaction was allowed to proceed at normal pressure for 60 minutes. Subsequently, the pressure was reduced from normal pressure to 13.3 kPa over 90 minutes and held at 13.3 kPa for 30 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 220° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 1.000 dl/g, the glass transition temperature Tig was 100° C., and Tmg was 102° C.

The production conditions and evaluation results of Comparative Example 3 are shown in Tables 1A and 1B.

Comparative Example 4

A reaction vessel was charged with 71.05 g (0.486 mol) of ISB, 40.90 g (0.208 mol) of TCDDM, 150.27 g (0.701 mol) of DPC, and $1.84\times10^{-4}$ g ($1.04\times10^{-6}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 210° C. over 30 minutes, and the reaction was allowed to proceed at normal pressure for 60 minutes. Subsequently, the pressure was reduced from normal pressure to 13.3 kPa over 90 minutes and held at 13.3 kPa for 30 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 230° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.687 dl/g, the glass transition temperature Tig was 128° C., and Tmg was 131° C.

The production conditions and evaluation results of Comparative Example 4 are shown in Tables 1A and 1B.

Comparative Example 5

A reaction vessel was charged with 48.17 g (0.330 mol) of ISB, 64.70 g (0.330 mol) of TCDDM, 142.62 g (0.666 mol) of DPC, and $3.48\times10^{-4}$ g ($1.98\times10^{-6}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 210° C. over 30 minutes, and the reaction was allowed to proceed at normal pressure for 60 minutes. Subsequently, the pressure was reduced from normal pressure to 13.3 kPa over 90 minutes and held at 13.3 kPa for 30 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 230° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.730 dl/g, the glass transition temperature Tig was 112° C., and Tmg was 115° C.

The production conditions and evaluation results of Comparative Example 5 are shown in Tables 1A and 1B.

Comparative Example 6

A reaction vessel was charged with 114.83 g (0.585 mol) of TCDDM, 127.83 g (0.597 mol) of DPC, and $9.55\times10^{-4}$ g ($2.93\times10^{-6}$ mol) of cesium carbonate as a catalyst, and in a nitrogen atmosphere, the raw materials were dissolved by setting the heating bath temperature to 150° C. with stirring as needed (for about 15 minutes).

After the dissolution, as a step of first stage of reaction, the temperature was raised to 220° C. over 70 minutes, the pressure was simultaneously reduced from normal pressure to 13.3 kPa over 40 minutes and held at 13.3 kPa for 50 minutes, and phenol generated was drawn out of the reaction vessel. As a step of second stage, phenol generated was drawn out of the reaction vessel by reducing the pressure to 0.10 kPa or less over 30 minutes with raising the heating bath temperature to 240° C. over 20 minutes. After reaching a predetermined stirring torque, the reaction was terminated, and the produced polymer was extruded into water to obtain pellets of a polycarbonate copolymer.

The reduced viscosity of the obtained polycarbonate copolymer was 1.002 dl/g, and the glass transition temperature Tig was 74° C.

The production conditions and evaluation results of Comparative Example 6 are shown in Tables 1A and 1B.

Comparative Example 7

A reaction vessel was charged with 60.56 g (0.414 mol) of ISB, 54.05 g (0.178 mol) of SPG, 130.61 g (0.610 mol) of DPC, and $2.08\times10^{-3}$ g ($1.18\times10^{-5}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 220° C. over 30 minutes, and the reaction was allowed to proceed at normal pressure for 60 minutes. Subsequently, the pressure was reduced from normal pressure to 13.3 kPa over 90 minutes and held at 13.3 kPa for 45 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 240° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.787 dl/g, the glass transition temperature Tig was 132° C., and Tmg was 135° C.

The production conditions and evaluation results of Comparative Example 7 are shown in Tables 1A and 1B.

Comparative Example 8

A reaction vessel was charged with 37.81 g (0.259 mol) of ISB, 78.74 g (0.259 mol) of SPG, 114.16 g (0.533 mol) of DPC, and $1.82\times10^{-3}$ g ($1.03\times10^{-5}$ mol) of calcium acetate monohydrate as a catalyst, and in a nitrogen atmosphere, the raw materials were dissolved by setting the heating bath temperature to 150° C. with stirring as needed (for about 10 minutes).

After the dissolution, as a step of first stage of reaction, the temperature was raised to 220° C. over 30 minutes, and the reaction was allowed to proceed at normal pressure for 60 minutes. Subsequently, the pressure was reduced from normal pressure to 13.3 kPa over 90 minutes and held at 13.3 kPa for 45 minutes, and phenol generated was drawn out of the reaction vessel. As a step of second stage, phenol generated was drawn out of the reaction vessel by reducing the pressure to 0.10 kPa or less over 15 minutes with raising the heating bath temperature to 240° C. over 15 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.846 dl/g, the glass transition temperature Tig was 121° C., and Tmg was 124° C.

The production conditions and evaluation results of Comparative Example 8 are shown in Tables 1A and 1B.

Comparative Example 9

A reaction vessel was charged with 44.98 g (0.308 mol) of ISB, 72.67 parts by weight (0.166 mol) of BPEF, 101.54 g (0.474 mol) of DPC, and $7.71\times10^{-4}$ g ($2.37\times10^{-7}$ mol) of cesium carbonate as a catalyst, and in a nitrogen atmosphere, the raw materials were dissolved by setting the heating bath temperature to 180° C. with stirring as needed (for about 15 minutes).

After the dissolution, the reaction was allowed to proceed at 180° C. for 30 minutes as normal pressure. Thereafter, as a step of first stage of reaction, the temperature was raised to 200° C. over 20 minutes, held for 20 minutes and then raised to 230° C. over 30 minutes, the pressure was simultaneously reduced from normal pressure to 20.0 kPa over 20 minutes and held at 20.0 kPa for 50 minutes, and phenol generated was drawn out of the reaction vessel. As a step of second stage, phenol generated was drawn out of the reaction vessel by reducing the pressure to 0.10 kPa or less over 60 minutes with raising the heating bath temperature to 230° C. over 10 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.413 dl/g, and the glass transition temperature Tig was 147° C.

The production conditions and evaluation results of Comparative Example 9 are shown in Tables 1A and 1B.

Comparative Example 10

A reaction vessel was charged with 122.72 g (0.280 mol) of BPEF, 61.15 g (0.285 mol) of DPC, and $1.82\times10^{-3}$ g ($5.59\times10^{-6}$ mol) of cesium carbonate as a catalyst, and in a nitrogen atmosphere, the raw materials were dissolved by setting the heating bath temperature to 170° C. with stirring as needed (for about 15 minutes).

After the dissolution, as a step of first stage of reaction, the temperature was raised to 220° C. over 70 minutes, the pressure was reduced from normal pressure to 13.3 kPa over 40 minutes and held at 13.3 kPa for 50 minutes, and phenol generated was drawn out of the reaction vessel. As a step of second stage, phenol generated was drawn out of the reaction vessel by reducing the pressure to 0.10 kPa or less over 30 minutes with raising the heating bath temperature to 230° C. over 10 minutes. After reaching a predetermined stirring torque, the reaction was terminated, and the produced polymer was extruded into water to obtain pellets of a polycarbonate copolymer.

The reduced viscosity of the obtained polycarbonate copolymer was 0.457 dl/g, and the glass transition temperature Tig was 152° C.

The production conditions and evaluation results of Comparative Example 10 are shown in Tables 1A and 1B.

TABLE 1A

| | Charge Amount (g) | | | | | | | Ratio of Molar Number of DPC to Total Molar Number of Dihydroxy Compound | Catalyst | | Polymerization Temperature |
|---|---|---|---|---|---|---|---|---|---|---|---|
| | Carbonate | Dihydroxy Compound | | | | | | | | Charge Amount | |
| | DPC | DCMI | CHDM | ISB | TCDDM | SPG | BPEF | | Kind | g | (° C.) |
| Example 1 | 14.59 | 6.69 | 6.61 | | | | | 1.04 | A | 5.50E−05 | 240 |
| Example 2 | 12.46 | 9.51 | 4.03 | | | | | 1.04 | B | 4.70E−05 | 240 |
| Example 3 | 15.39 | 4.84 | | 8.31 | | | | 1.01 | C | 2.98E−05 | 250 |
| Example 4 | 11.03 | 8.67 | | | 5.00 | | | 1.01 | C | 2.14E−05 | 250 |
| Example 5 | 6.40 | 4.88 | | | | 4.37 | | 1.04 | C | 6.02E−05 | 250 |
| Example 6 | 7.46 | 3.52 | | | | | 10.58 | 1.01 | C | 1.44E−05 | 250 |
| Comparative Example 1 | 163.40 | | | 110.37 | | | | 1.01 | C | 1.99E−04 | 230 |
| Comparative Example 2 | 162.33 | | 32.78 | 77.52 | | | | 1.00 | C | 2.00E−04 | 220 |
| Comparative Example 3 | 161.07 | | 54.76 | 55.50 | | | | 0.99 | C | 4.01E−04 | 220 |
| Comparative Example 4 | 150.27 | | | 71.05 | 40.90 | | | 1.01 | C | 1.84E−04 | 230 |
| Comparative Example 5 | 142.62 | | | 48.17 | 64.70 | | | 1.01 | C | 3.48E−04 | 230 |
| Comparative Example 6 | 127.83 | | | | 114.83 | | | 1.02 | B | 9.55E−04 | 240 |
| Comparative Example 7 | 130.61 | | | 60.56 | | 54.05 | | 1.03 | C | 2.08E−03 | 240 |
| Comparative Example 8 | 114.16 | | | 37.81 | | 78.74 | | 1.03 | C | 1.82E−03 | 240 |
| Comparative Example 9 | 101.43 | | | 44.98 | | | 72.67 | 1.00 | B | 7.71E−04 | 230 |
| Comparative Example 10 | 61.15 | | | | | | 122.72 | 1.02 | B | 1.82E−03 | 230 |

TABLE 1B

| | Physical Properties | | | |
|---|---|---|---|---|
| | Reduced Viscosity ηsp/C (dl/g) | Extrapolated Glass Transition Initiation Temperature Tig (° C.) | Midpoint Glass Transition Initiation Temperature Tmg (° C.) | 5% Thermal Weight Loss Temperature Td (° C.) |
| Example 1 | 0.390 | 97 | 105 | 319 |
| Example 2 | 0.680 | 150 | 160 | 315 |
| Example 3 | 0.347 | 165 | 170 | 339 |
| Example 4 | 0.471 | 149 | 156 | 341 |
| Example 5 | 0.201 | 127 | 136 | 346 |
| Example 6 | 0.337 | 161 | 166 | 358 |
| Comparative Example 1 | 0.678 | 162 | 165 | |
| Comparative Example 2 | 0.744 | 120 | 123 | |
| Comparative Example 3 | 1.000 | 100 | 102 | |
| Comparative Example 4 | 0.687 | 128 | 131 | |

TABLE 1B-continued

| | Physical Properties | | | |
|---|---|---|---|---|
| | Reduced Viscosity ηsp/C (dl/g) | Extrapolated Glass Transition Initiation Temperature Tig (° C.) | Midpoint Glass Transition Initiation Temperature Tmg (° C.) | 5% Thermal Weight Loss Temperature Td (° C.) |
| Comparative Example 5 | 0.730 | 112 | 115 | |
| Comparative Example 6 | 1.002 | 74 | | |
| Comparative Example 7 | 0.787 | 132 | 135 | |
| Comparative Example 8 | 0.846 | 121 | 124 | |
| Comparative Example 9 | 0.413 | 147 | | |
| Comparative Example 10 | 0.457 | 152 | | |

TABLE 2A

| | Charge Amount (g) | | | | Ratio of Sum of Molar Number of DPC and Molar Number of Phenyl Ester to Total Molar Number of Dihydroxy Compound | Catalyst | | Polymerization Temperature |
|---|---|---|---|---|---|---|---|---|
| | Carbonate | Phenyl Ester | Dihydroxy Compound | | | | Charge Amount | |
| | DPC | 2Q | DCMI | ISB | | Kind | g | (° C.) |
| Example 7 | 11.73 | 4.12 | 3.02 | 7.65 | 1.00 | C | 2.56E−05 | 250 |

TABLE 2B

| | Physical Properties | | | |
|---|---|---|---|---|
| | Reduced Viscosity ηsp/C (dl/g) | Extrapolated Glass Transition Initiation Temperature Tig (° C.) | Midpoint Glass Transition Initiation Temperature Tmg (° C.) | 5% Thermal Weight Loss Temperature Td (° C.) |
| Example 7 | 0.387 | 165 | 169 | 346 |

TABLE 3

| | Refractive Index | | | | |
|---|---|---|---|---|---|
| | nD 589 nm | nC 656 nm | ne 546 nm | nF 486 nm | Abbe Number νd |
| Example 3 | 1.5027 | 1.5002 | 1.5050 | 1.5124 | 41 |
| Example 6 | 1.6019 | 1.5964 | 1.6077 | 1.6193 | 26 |
| Example 7 | 1.5311 | 1.5275 | 1.5344 | 1.5421 | 36 |

From these results, it is seen that the polycarbonate resin of the present invention having a structure derived from an inositol derivative has high heat resistance and transparency.

Example 8

A reaction vessel was charged with 7.32 g (0.0501 mol) of ISB, 2.17 g (0.0107 mol) of 1,12-dodecanediol (hereinafter, simply referred to as "1,12-DD"), 15.94 g (0.0744 mol) of DPC, and $3.15\times10^{-4}$ g ($1.79\times10^{-6}$ mol) of calcium acetate as a catalyst, relative to 3.65 g (0.0107 mol) of DCMI, and in a nitrogen atmosphere, the raw materials were heated at a heating bath temperature of 150° C., stirred as needed, subjected to temperature rise to 220° C. at normal pressure over 60 minutes, held at 220° C. for 30 minutes, and thereby dissolved.

As a step of first stage of reaction, the pressure was reduced from normal pressure to 13.3 kPa over 40 minutes with keeping a heating bath temperature of 220° C. and held at 13.3 kPa for 60 minutes, and phenol generated was drawn out of the reaction vessel. As a step of second stage, phenol generated was drawn out of the reaction vessel with raising the heating bath temperature to 240° C. from 220° C. over 20 minutes and performing a control so as to reduce the pressure to 0.200 kPa or less in 30 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.577 dl/g, the glass transition temperature Tig was 111° C., and Tmg was 128° C. The 5% thermal weight loss temperature (Td) in nitrogen atmosphere was 328° C.

The production conditions and evaluation results of Example 8 are shown in Tables 4A and 4B.

Figure 21:
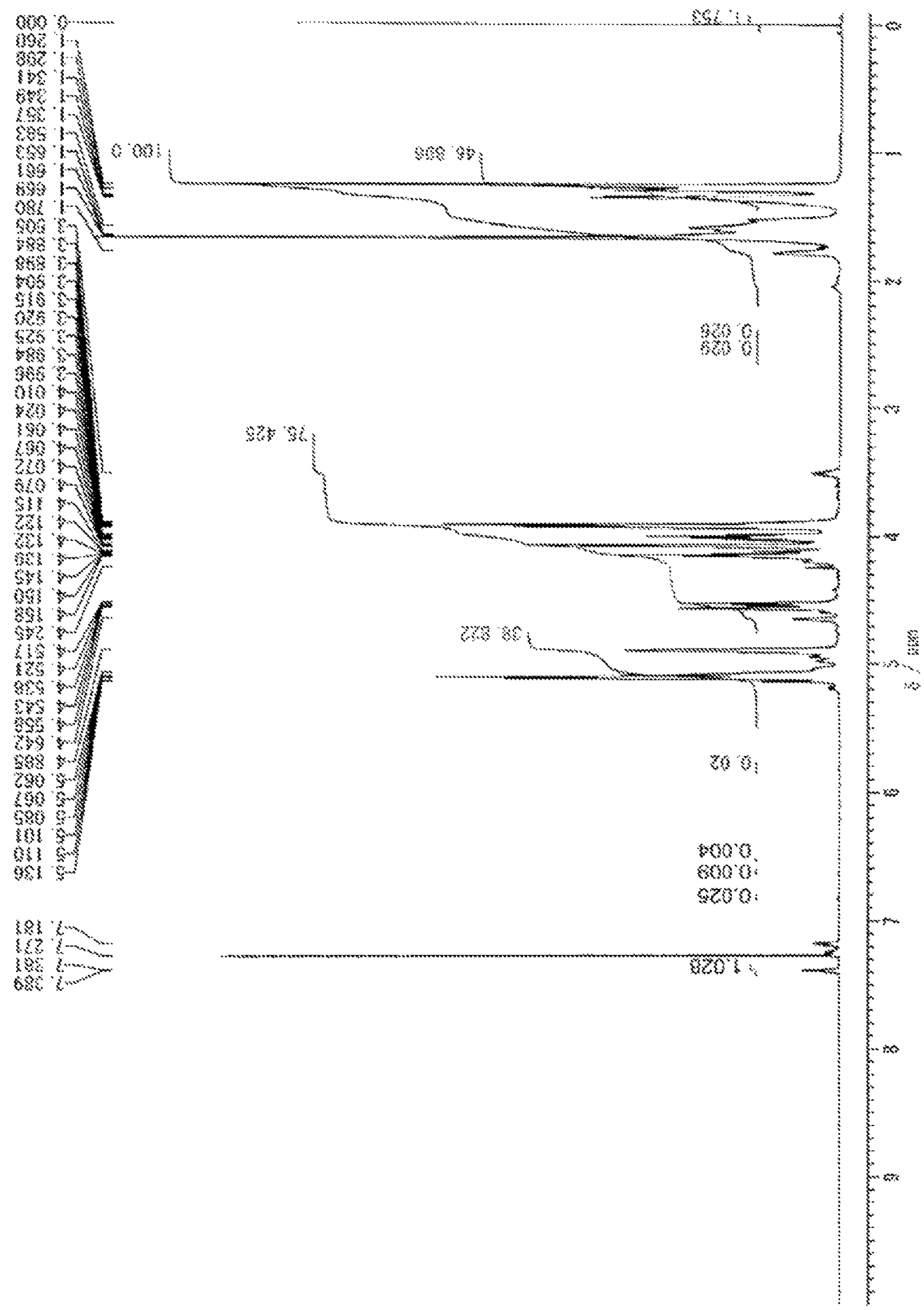
FIG. 21 is an NMR chart of the polycarbonate copolymer obtained in Example 8.

In addition, the NMR chart of the polycarbonate copolymer of Example 8 is illustrated in FIG. 21.

Examples 9-20

Figure 22:
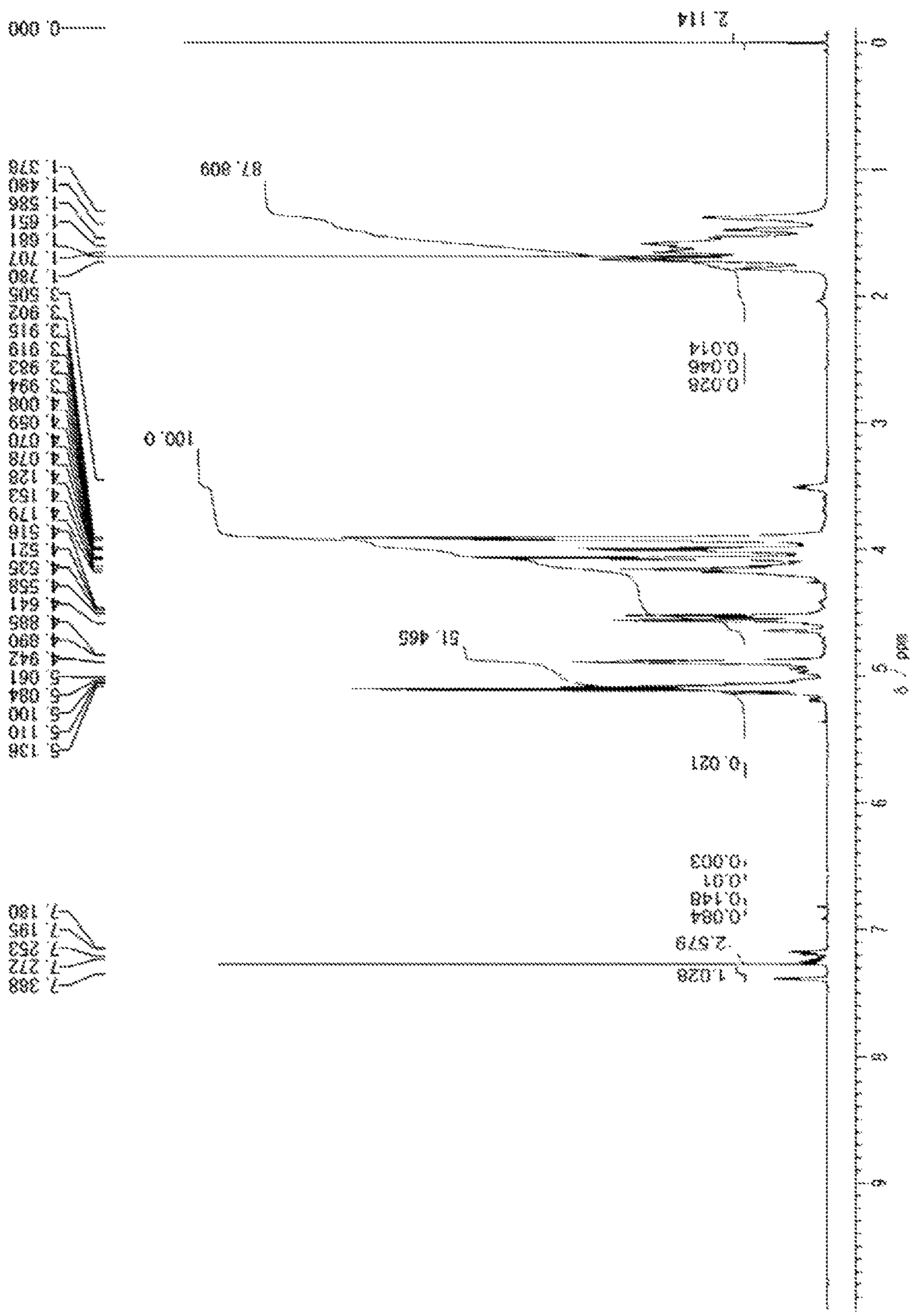
FIG. 22 is an NMR chart of the polycarbonate copolymer obtained in Example 18.

Transparent amorphous polycarbonates were obtained by performing polymerization reaction in the same manner as the conditions of Example 8 except that each of the raw materials was charged in the charge amount shown in Table 4A. The evaluation results are shown in Table 4B. In addition, the NMR chart of the polycarbonate copolymer of Example 18 is illustrated in FIG. 22.

TABLE 4A

| | Carbonate Charge Amount, upper: g lower: mol | Dihydroxy Compound Charge Amount, upper: g lower: mol | | | | | | | | | | |
|---|---|---|---|---|---|---|---|---|---|---|---|---|
| | DPC | DCMI | ISB | 1,3-PD | 1,4-BD | 1,5-PD | 1,6-HD | 1,7-HD | 1,8-OD | 1,9-ND | 1,10-DD | 1,12-DD |
| Example 8 | 15.94 | 3.65 | 7.32 | | | | | | | | | 2.17 |
| | 0.0744 | 0.0107 | 0.0501 | | | | | | | | | 0.0107 |
| Example 9 | 15.43 | 4.71 | 7.09 | | | | | | | | | 1.40 |
| | 0.0720 | 0.0138 | 0.0485 | | | | | | | | | 0.0069 |
| Example 10 | 14.96 | 5.71 | 6.87 | | | | | | | | | 0.68 |
| | 0.0698 | 0.0168 | 0.0470 | | | | | | | | | 0.0034 |
| Example 11 | 16.27 | 3.73 | 7.47 | | | | | | | | 1.91 | |
| | 0.0760 | 0.0110 | 0.0511 | | | | | | | | 0.0110 | |
| Example 12 | 15.63 | 4.77 | 7.18 | | | | | | | | 1.22 | |
| | 0.0730 | 0.0140 | 0.0491 | | | | | | | | 0.0070 | |
| Example 13 | 15.05 | 5.75 | 6.91 | | | | | | | | 0.59 | |
| | 0.0703 | 0.0169 | 0.0473 | | | | | | | | 0.0034 | |
| Example 14 | 16.43 | 3.76 | 7.55 | | | | | | | 1.77 | | |
| | 0.0767 | 0.0110 | 0.0517 | | | | | | | 0.0110 | | |
| Example 15 | 16.61 | 3.80 | 7.62 | | | | | | 1.63 | | | |
| | 0.0775 | 0.0112 | 0.0521 | | | | | | 0.0111 | | | |
| Example 16 | 16.43 | 3.76 | 7.55 | | | | | 1.77 | | | | |
| | 0.0767 | 0.0110 | 0.0517 | | | | | 0.0134 | | | | |
| Example 17 | 16.96 | 3.88 | 7.79 | | | | 1.35 | | | | | |
| | 0.0792 | 0.0114 | 0.0533 | | | | 0.0114 | | | | | |
| Example 18 | 17.14 | 3.93 | 7.87 | | | 1.20 | | | | | | |
| | 0.0800 | 0.0115 | 0.0539 | | | 0.0115 | | | | | | |
| Example 19 | 17.33 | 3.97 | 7.96 | | 1.05 | | | | | | | |
| | 0.0809 | 0.0117 | 0.0545 | | 0.0117 | | | | | | | |
| Example 20 | 17.52 | 4.01 | 8.05 | 0.90 | | | | | | | | |
| | 0.0818 | 0.0118 | 0.0551 | 0.0118 | | | | | | | | |

TABLE 4A-continued

| | Molar Ratio of Charge Amount of Dihdroxy Compound DCMI/ISB/Dihydroxy Compound | Ratio of Molar Number of DPC to Total Molar Number of Dihydroxy Compound | Catalyst Kind | Catalyst Charge Amount, upper: g lower: mol | Polymerization Temperature ° C. |
|---|---|---|---|---|---|
| Example 8 | 15/70/15 | 1.04 | C | 3.15E−04<br>1.79E−06 | 240 |
| Example 9 | 20/70/10 | 1.04 | C | 3.05E−04<br>1.73E−06 | 240 |
| Example 10 | 25/70/5 | 1.04 | C | 2.96E−04<br>1.68E−06 | 240 |
| Example 11 | 15/70/15 | 1.04 | C | 3.22E−04<br>1.83E−06 | 240 |
| Example 12 | 20/70/10 | 1.04 | C | 3.09E−04<br>1.75E−06 | 240 |
| Example 13 | 25/70/5 | 1.04 | C | 2.98E−04<br>1.69E−06 | 240 |
| Example 14 | 15/70/15 | 1.04 | C | 3.25E−04<br>1.84E−06 | 240 |
| Example 15 | 15/70/15 | 1.04 | C | 3.28E−04<br>1.86E−06 | 240 |
| Example 16 | 15/70/15 | 1.04 | C | 3.25E−04<br>1.84E−06 | 240 |
| Example 17 | 15/70/15 | 1.04 | C | 3.35E−04<br>1.90E−06 | 240 |
| Example 18 | 15/70/15 | 1.04 | C | 3.39E−04<br>1.92E−06 | 240 |
| Example 19 | 15/70/15 | 1.04 | C | 3.43E−04<br>1.94E−06 | 240 |
| Example 20 | 15/70/15 | 1.04 | C | 3.46E−04<br>1.97E−06 | 240 |

TABLE 4B

| | Physical Properties | | | |
|---|---|---|---|---|
| | Reduced Viscosity ηsp/C dl/g | Extrapolated Glass Transition Initiation Temperature Tig ° C. | Midpoint Glass Transition Initiation Temperature Tmg ° C. | 5% Thermal Weight Loss Temperature Td ° C. |
| Example 8 | 0.577 | 111 | 128 | 338 |
| Example 9 | 0.524 | 133 | 139 | 336 |
| Example 10 | 0.367 | 155 | 160 | 335 |
| Example 11 | 0.532 | 118 | 124 | 335 |
| Example 12 | 0.403 | 135 | 141 | 334 |
| Example 13 | 0.347 | 155 | 162 | 335 |
| Example 14 | 0.371 | 120 | 126 | 335 |
| Example 15 | 0.444 | 122 | 128 | 333 |
| Example 16 | 0.532 | 119 | 126 | 336 |
| Example 17 | 0.465 | 128 | 137 | 333 |
| Example 18 | 0.347 | 131 | 137 | 325 |
| Example 19 | 0.882 | 137 | 141 | 326 |
| Example 20 | 0.390 | 139 | 145 | 329 |

Example 21

A reaction vessel was charged with 2.79 g (0.0191 mol) of ISB, 2.76 g (0.0191 mol) of CHDM, 1.29 g (0.0064 mol) of 1,12-DD, 14.20 g (0.0663 mol) of DPC, and $3.37\times10^{-3}$ g ($1.91\times10^{-5}$ mol) of calcium acetate as a catalyst, relative to 6.50 g (0.0191 mol) of DCMI, and in a nitrogen atmosphere, the raw materials were heated at a heating bath temperature of 150° C., stirred as needed, subjected to temperature rise to 220° C. at normal pressure over 60 minutes, held at 220° C. for 30 minutes, and thereby dissolved.

As a step of first stage of reaction, the pressure was reduced from normal pressure to 13.3 kPa over 40 minutes with keeping a heating bath temperature of 220° C. and held at 13.3 kPa for 60 minutes, and phenol generated was drawn out of the reaction vessel. As a step of second stage, phenol generated was drawn out of the reaction vessel with raising the heating bath temperature to 240° C. from 220° C. over 20 minutes and performing a control so as to reduce the pressure to 0.200 kPa or less in 30 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.783 dl/g, the glass transition temperature Tig was 117° C., and Tmg was 125° C. The 5% thermal weight loss temperature (Td) in nitrogen atmosphere was 334° C.

The production conditions and evaluation results of Example 21 are shown in Tables 5A and 5B.

Examples 22-24

Transparent amorphous polycarbonates were obtained by performing polymerization reaction in the same manner as the conditions of Example 21 except that each of the raw materials was charged in the charge amount shown in Table 5A. The evaluation results are shown in Table 5B.

Figure 23:
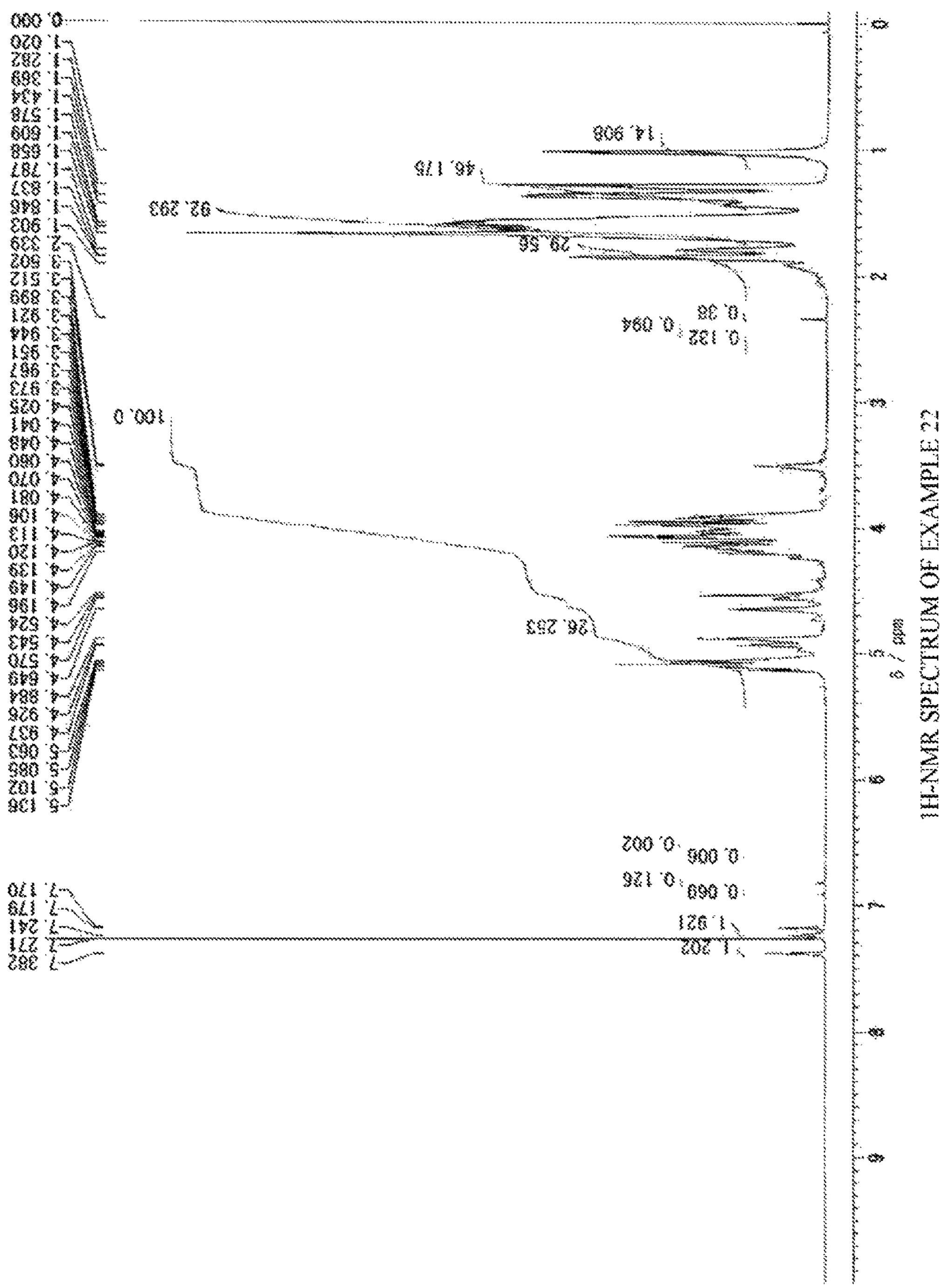
FIG. 23 is an NMR chart of the polycarbonate copolymer obtained in Example 22.

In addition, the NMR chart of the polycarbonate copolymer of Example 22 is illustrated in FIG. 23.

TABLE 5A

| | Carbonate Charge Amount, upper: g lower: mol | Dihydroxy Compound Charge Amount, upper: g lower: mol | | | | | | |
|---|---|---|---|---|---|---|---|---|
| | DPC | DCMI | ISB | CHDM | 1,5-PD | 1,6-HD | 1,10-DD | 1,12-DD |
| Example 21 | 14.20<br>0.0663 | 6.50<br>0.0191 | 2.79<br>0.0191 | 2.76<br>0.0191 | | | | 1.29<br>0.0064 |
| Example 22 | 14.37<br>0.0671 | 6.58<br>0.0193 | 2.83<br>0.0194 | 2.79<br>0.0193 | | | 1.12<br>0.0064 | |
| Example 23 | 14.71<br>0.0687 | 6.74<br>0.0198 | 3.86<br>0.0264 | 1.90<br>0.0132 | | 0.78<br>0.0066 | | |
| Example 24 | 14.80<br>0.0691 | 6.78<br>0.0199 | 3.88<br>0.0265 | 1.92<br>0.0133 | 0.69<br>0.0066 | | | |

| | Molar Ratio of Charge Amount of Dihydroxy Compound DCMI/ISB/CHDM/Dihydroxy Compound | Ratio of Molar Number of DPC to Total Molar Number of Dihydroxy Compound | Catalyst Kind | Catalyst Charge Amount, upper: g lower: mol | Polymerization Temperature ° C. |
|---|---|---|---|---|---|
| Example 21 | 30/30/30/10 | 1.04 | D | 3.37E−03<br>1.91E−05 | 240 |
| Example 22 | 30/30/30/10 | 1.04 | D | 3.41E−03<br>1.93E−05 | 240 |
| Example 23 | 30/40/20/10 | 1.04 | C | 1.45E−03<br>8.25E−06 | 240 |
| Example 24 | 30/40/20/10 | 1.04 | C | 1.46E−03<br>8.31E−06 | 240 |

TABLE 5B

| | Physical Properties | | | |
|---|---|---|---|---|
| | Reduced Viscosity ηsp/C dl/g | Extrapolated Glass Transition Initiation Temperature Tig ° C. | Midpoint Glass Transition Initiation Temperature Tmg ° C. | 5% Thermal Weight Loss Temperature Td ° C. |
| Example 21 | 0.783 | 117 | 125 | 334 |
| Example 22 | 0.587 | 120 | 128 | 336 |
| Example 23 | 0.460 | 143 | 150 | 336 |
| Example 24 | 0.495 | 141 | 147 | 335 |

Example 25

A reaction vessel was charged with 8.12 g (0.0556 mol) of ISB, 1.72 g (0.0119 mol) of CHDM, 17.69 g (0.0826 mol) of DPC, and $3.50\times10^{-4}$ g ($1.98\times10^{-6}$ mol) of calcium acetate as a catalyst, relative to 3.10 g (0.0119 mol) of IN1: DL-2,3:5,6-di-O-isopropylidene-myo-inositol, and in a nitrogen atmosphere, the raw materials were heated at a heating bath temperature of 150° C., stirred as needed, subjected to temperature rise to 220° C. at normal pressure over 60 minutes, held at 220° C. for 30 minutes, and thereby dissolved.

As a step of first stage of reaction, the pressure was reduced from normal pressure to 13.3 kPa over 40 minutes with keeping a heating bath temperature of 220° C. and held at 13.3 kPa for 60 minutes, and phenol generated was drawn out of the reaction vessel. As a step of second stage, phenol generated was drawn out of the reaction vessel with raising the heating bath temperature to 240° C. from 220° C. over 20 minutes and performing a control so as to reduce the pressure to 0.200 kPa or less in 30 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.459 dl/g, the glass transition temperature Tig was 143° C., and Tmg was 148° C. The 5% thermal weight loss temperature (Td) in nitrogen atmosphere was 331° C.

The production conditions and evaluation results of Example 25 are shown in Tables 6A and 6B.

Figure 24:
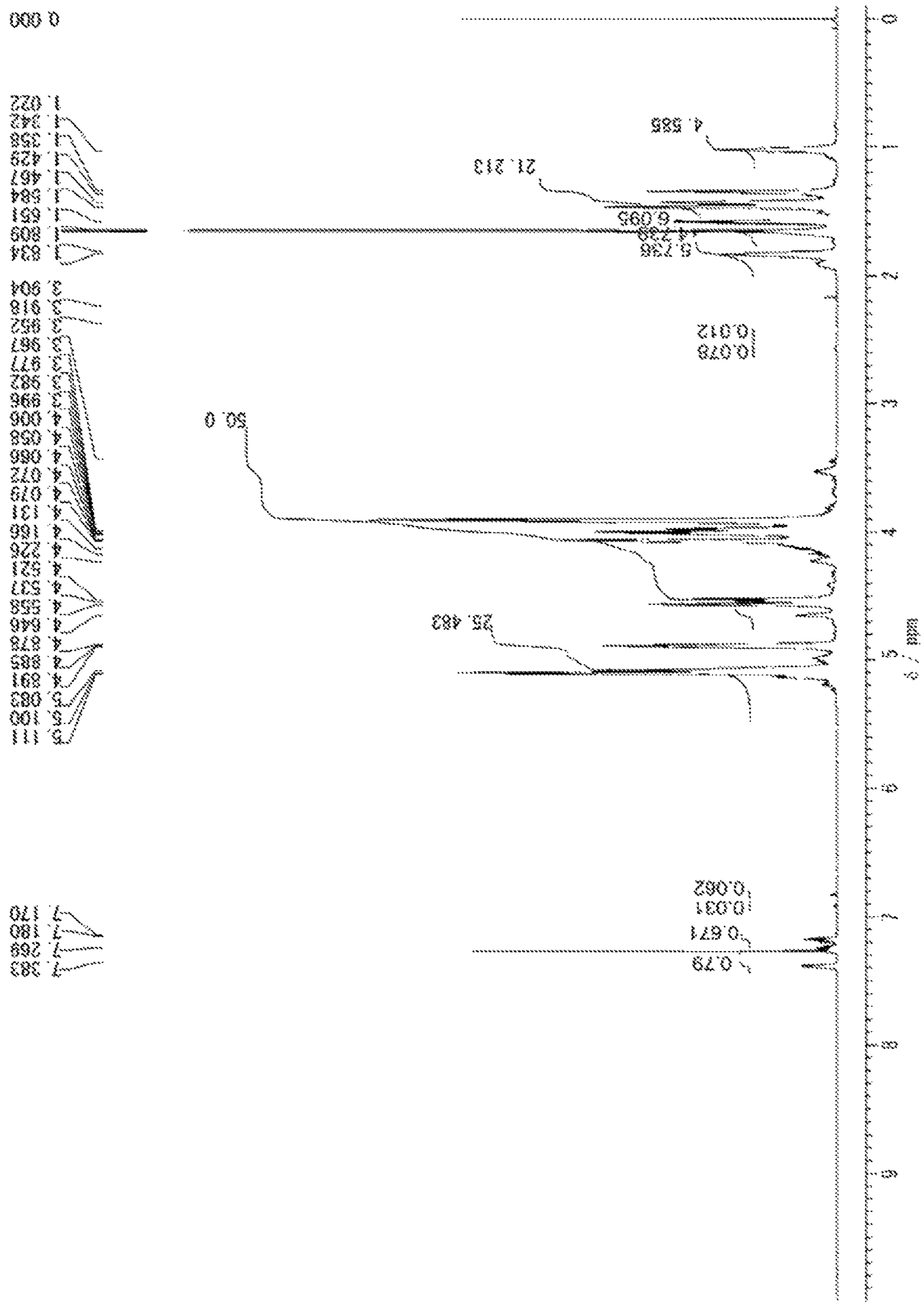
FIG. 24 is an NMR chart of the polycarbonate copolymer obtained in Example 25.
Figure 25:
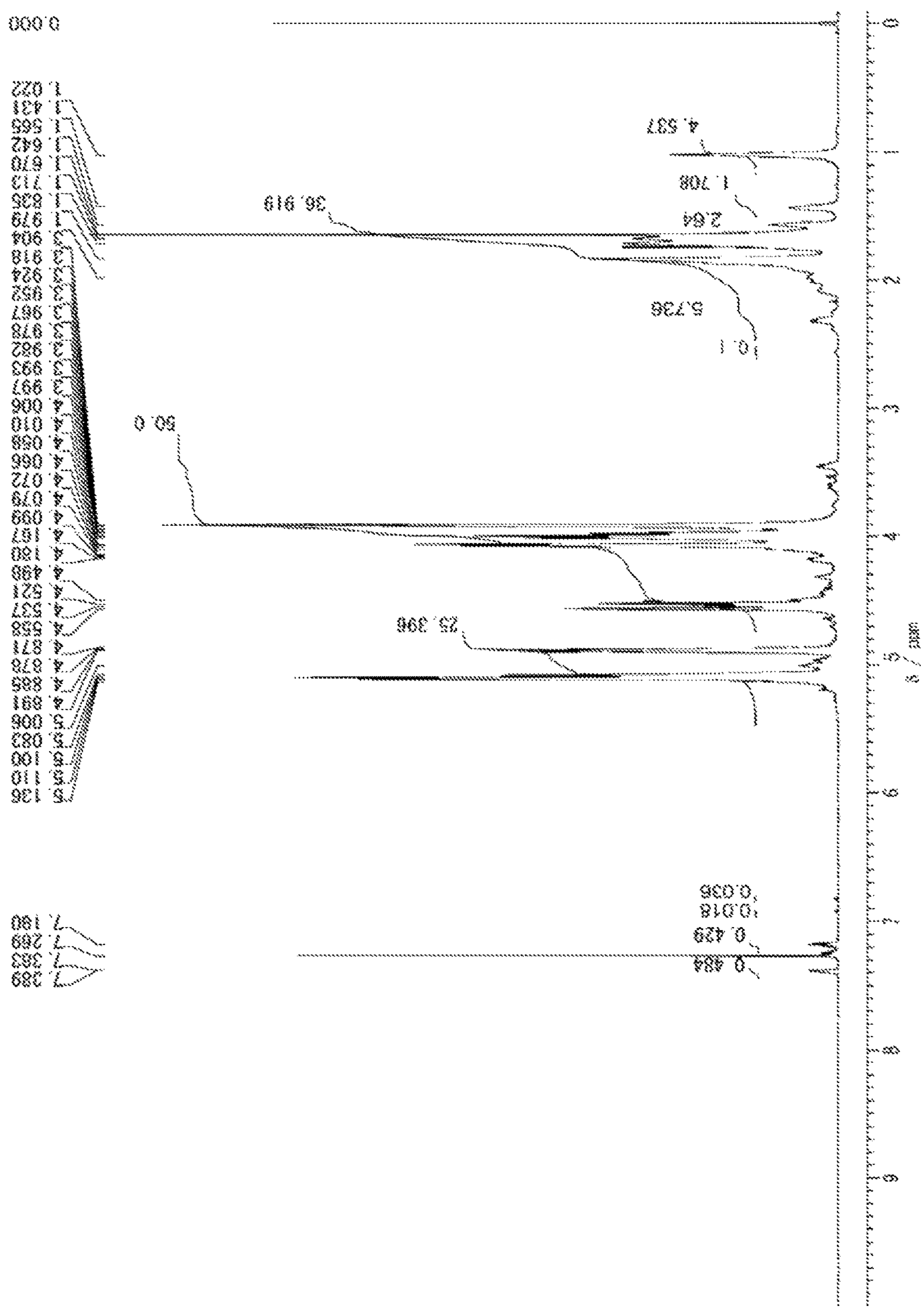
FIG. 25 is an NMR chart of the polycarbonate copolymer obtained in Example 26.
Figure 26:
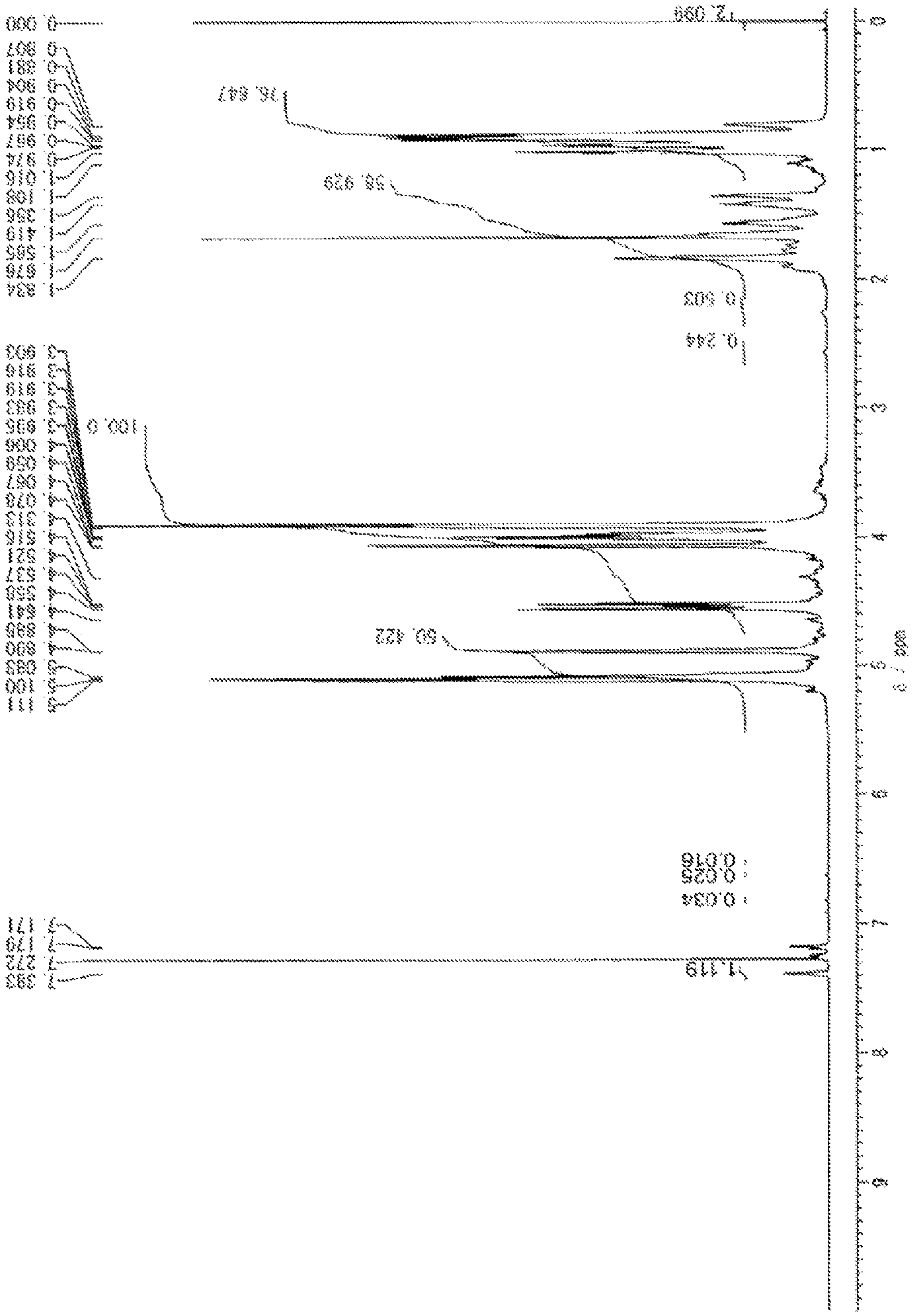
FIG. 26 is an NMR chart of the polycarbonate copolymer obtained in Example 28.
Figure 27:
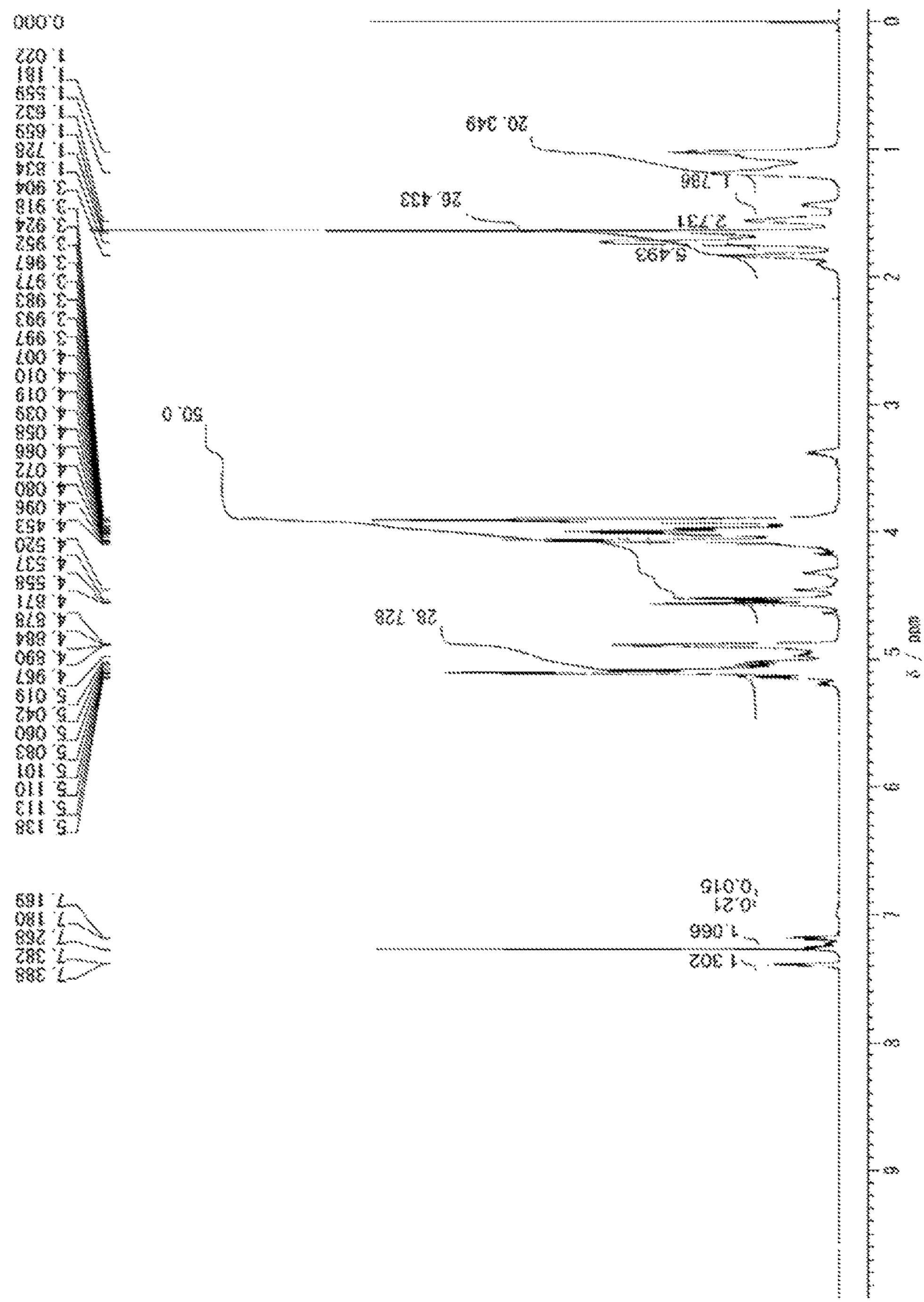
FIG. 27 is an NMR chart of the polycarbonate copolymer obtained in Example 29.
Figure 28:
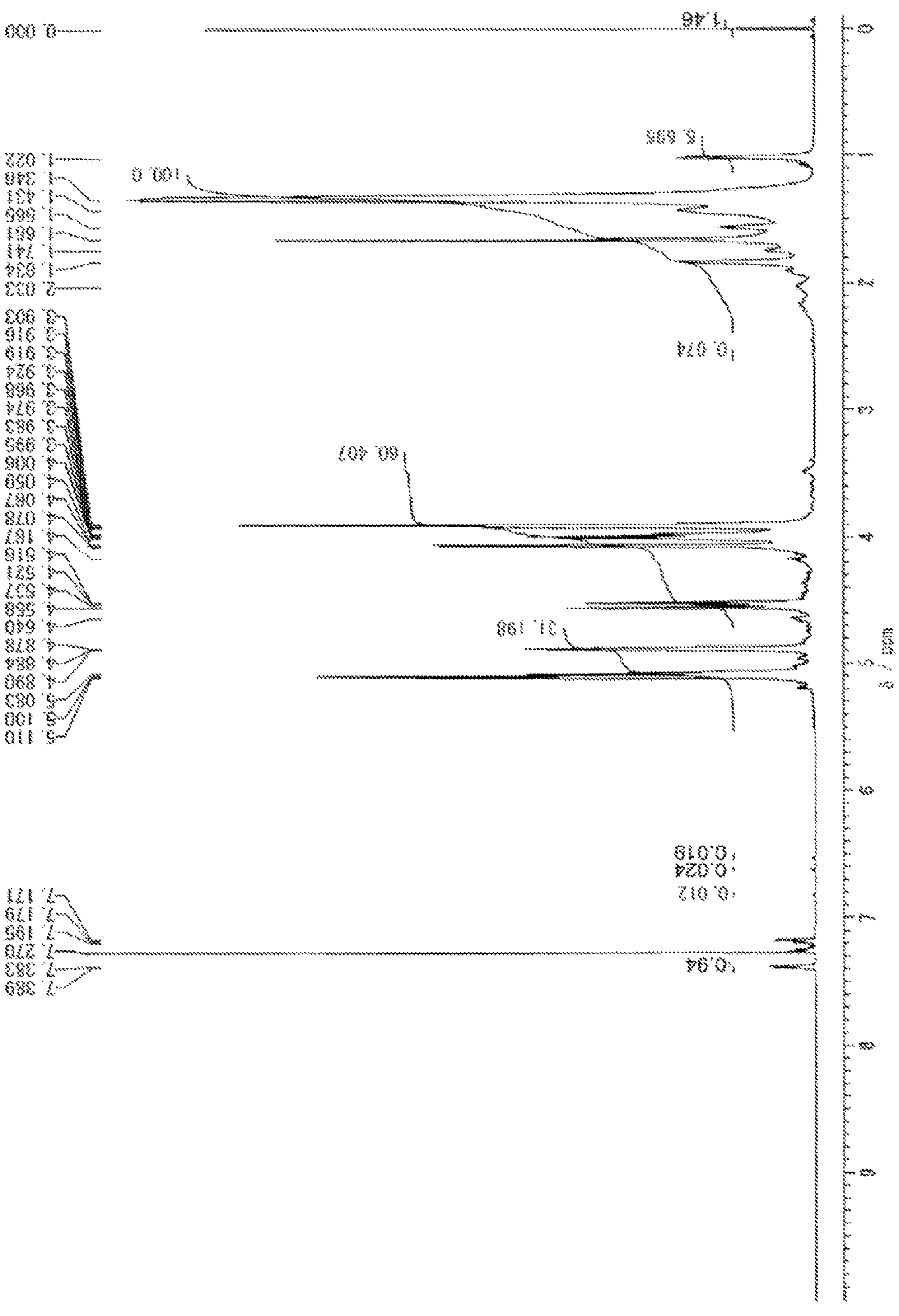
FIG. 28 is an NMR chart of the polycarbonate copolymer obtained in Example 30.

In addition, the NMR chart of the polycarbonate copolymer of Example 25 is illustrated in FIG. 24.

Examples 26-30

Transparent amorphous polycarbonates were obtained by performing polymerization reaction in the same manner as the conditions of Example 25 except that each of the raw materials was charged in the charge amount shown in Table 6A. The evaluation results are shown in Table 6B. In addition, the NMR charts of Examples 26 and 28 to 30 are illustrated in FIGS. 25 to 28, respectively.

Example 31

A reaction vessel was charged with 7.91 g (0.0541 mol) of ISB, 1.67 g (0.0116 mol) of CHDM, 17.22 g (0.0804 mol) of DPC, and $1.70\times10^{-3}$ g ($9.66\times10^{-6}$ mol) of calcium acetate as a catalyst, relative to 3.41 g (0.0116 mol) of IN44: DL-2-O-benzyl-1,3,5-O-ethylidene-myo-inositol, and in a nitrogen atmosphere, the raw materials were heated at a heating bath temperature of 150° C., stirred as needed, subjected to temperature rise to 220° C. at normal pressure over 60 minutes, held at 220° C. for 30 minutes, and thereby dissolved.

As a step of first stage of reaction, the pressure was reduced from normal pressure to 13.3 kPa over 40 minutes with keeping a heating bath temperature of 220° C. and held at 13.3 kPa for 60 minutes, and phenol generated was drawn out of the reaction vessel. As a step of second stage, phenol generated was drawn out of the reaction vessel with raising the heating bath temperature to 240° C. from 220° C. over 20 minutes and performing a control so as to reduce the pressure to 0.200 kPa or less in 30 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.389 dl/g, the glass transition temperature Tig was 142° C., and Tmg was 147° C. The 5% thermal weight loss temperature (Td) in nitrogen atmosphere was 349° C.

The production conditions and evaluation results of Example 31 are shown in Tables 6A and 6B.

Figure 29:
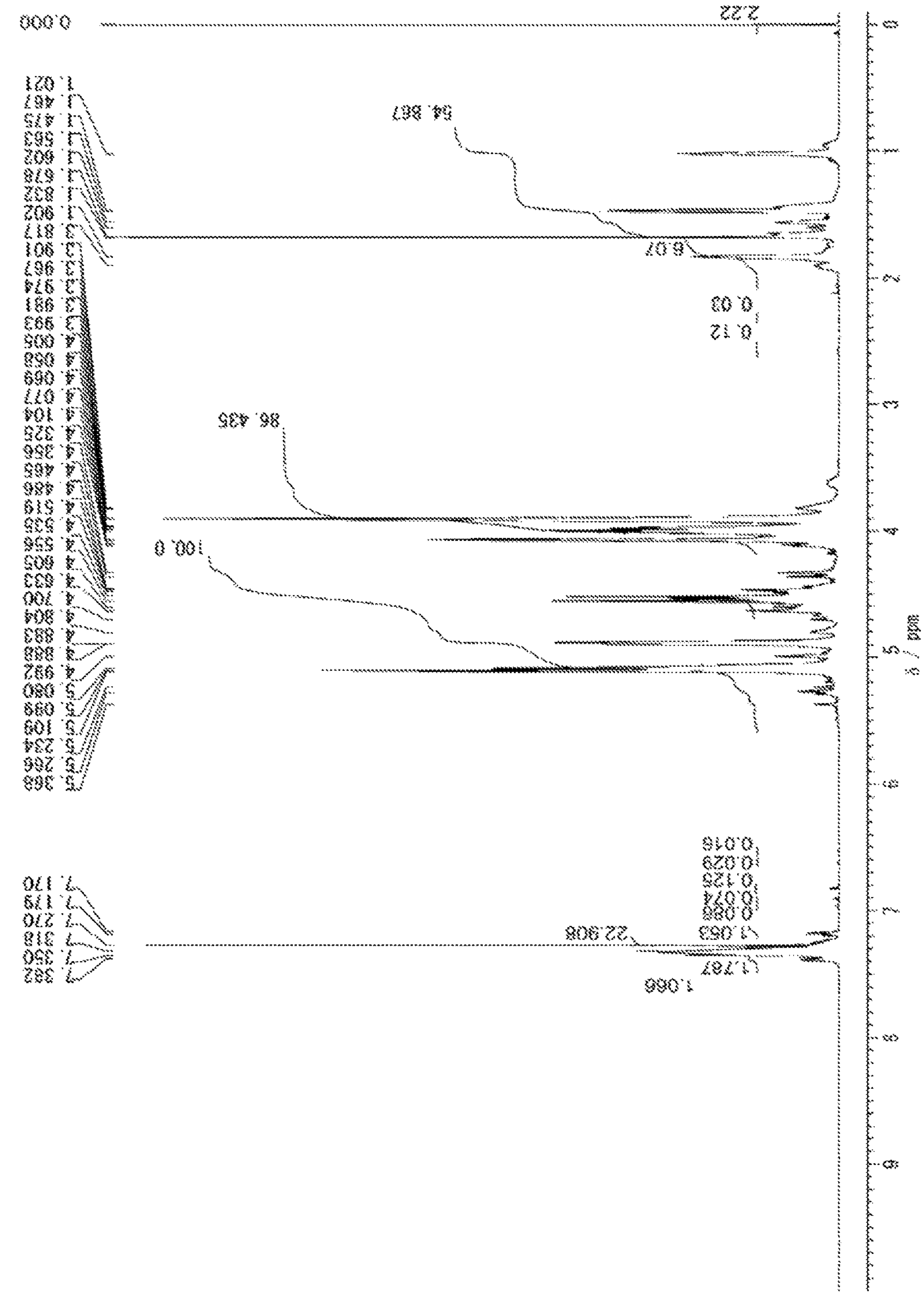
FIG. 29 is an NMR chart of the polycarbonate copolymer obtained in Example 31.

In addition, the NMR chart of the polycarbonate copolymer of Example 31 is illustrated in FIG. 29.

Examples 32-34

Figure 30:
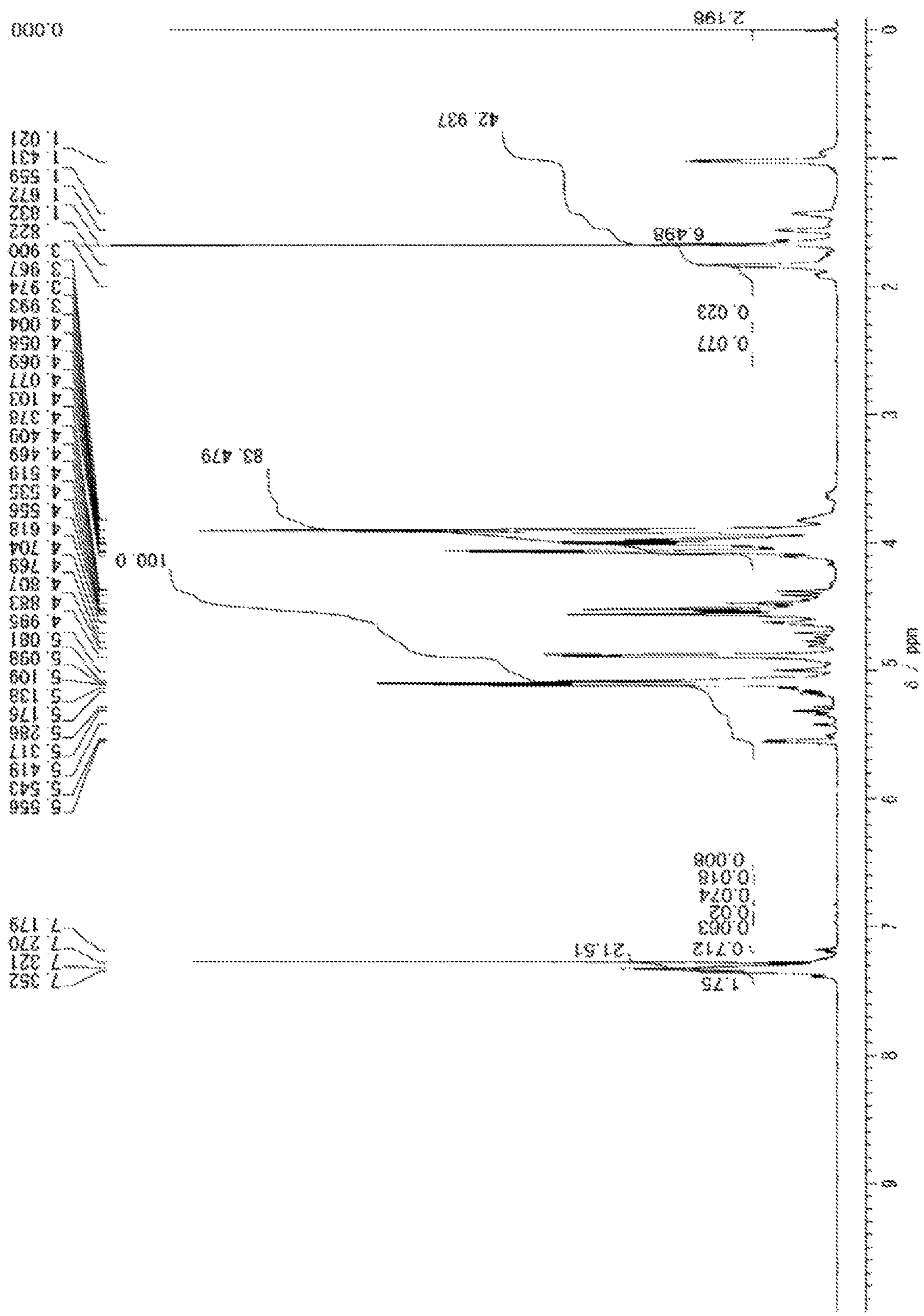
FIG. 30 is an NMR chart of the polycarbonate copolymer obtained in Example 32.
Figure 31:
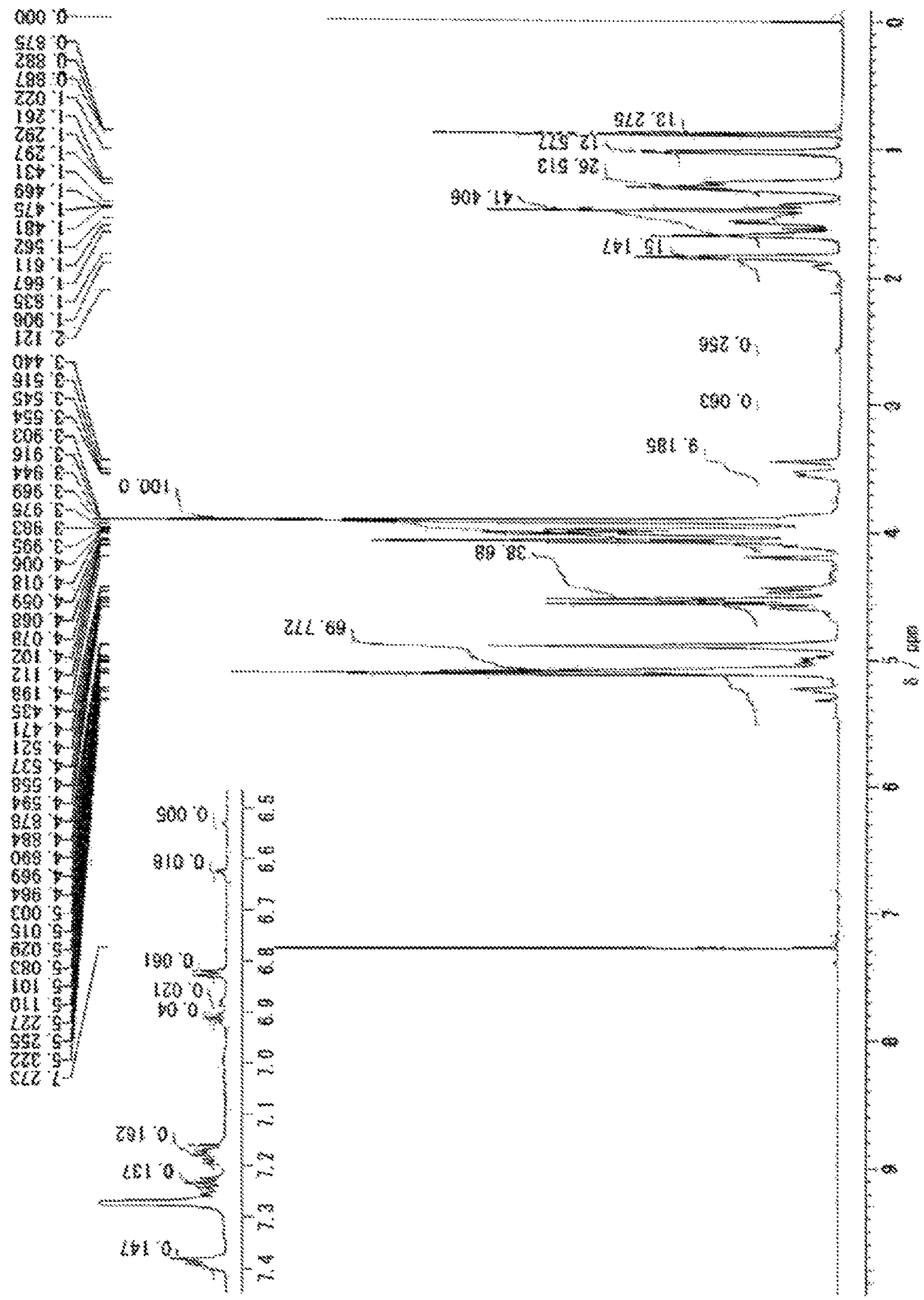
FIG. 31 is an NMR chart of the polycarbonate copolymer obtained in Example 33.
Figure 32:
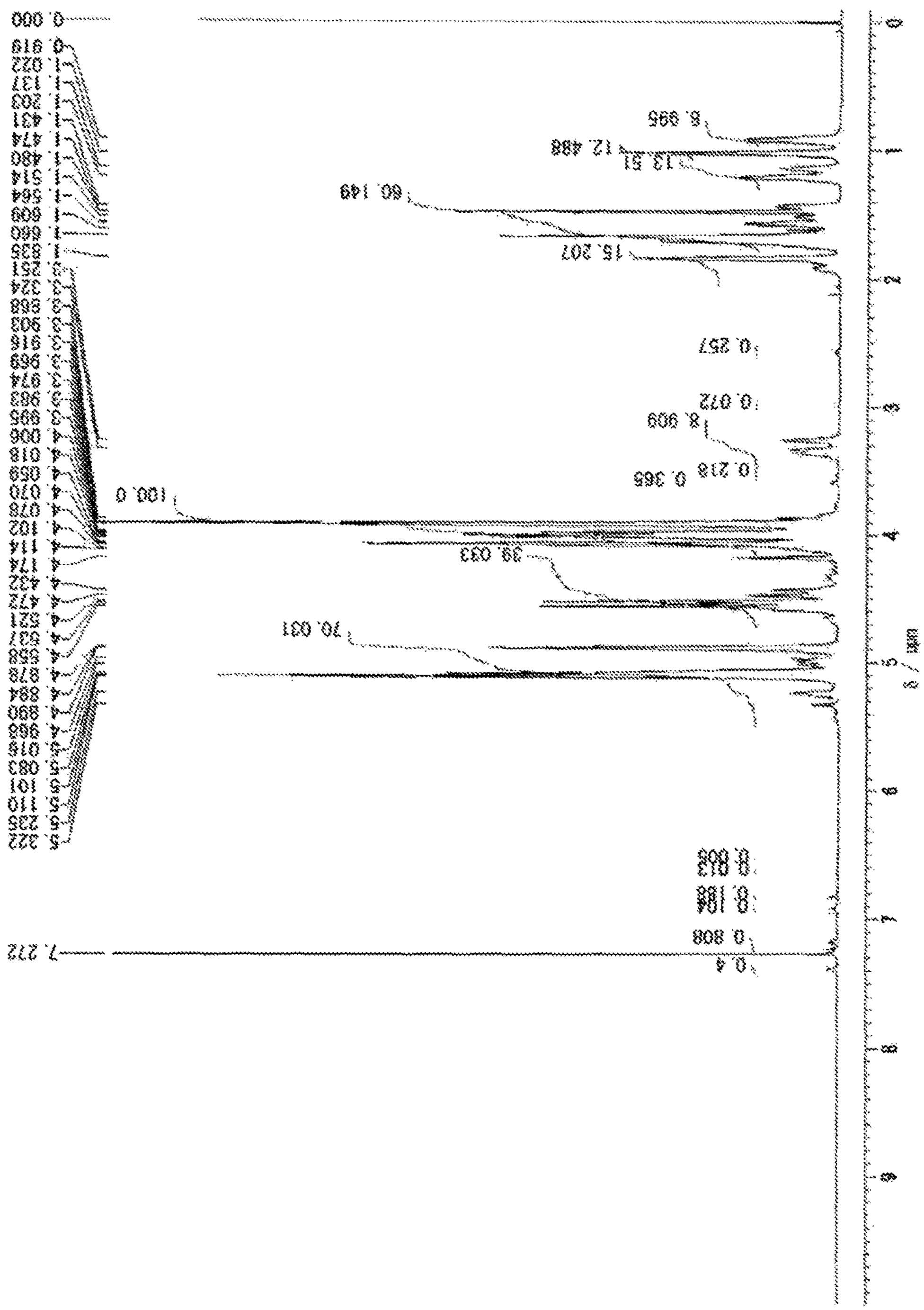
FIG. 32 is an NMR chart of the polycarbonate copolymer obtained in Example 34.

Transparent amorphous polycarbonates were obtained by performing polymerization reaction in the same manner as the conditions of Example 31 except that each of the raw materials was charged in the charge amount shown in Table 6A. The evaluation results are shown in Table 6B. In addition, the NMR charts of polycarbonate copolymers of Examples 32 to 34 are illustrated in FIGS. 30 to 32.

TABLE 6A

| | Carbonate Charge Amount, upper: g lower: mol | Dihydroxy Compound Charge Amount upper: g lower: mol | | | | | | | | | | | |
|---|---|---|---|---|---|---|---|---|---|---|---|---|---|
| | DPC | ISB | CHDM | IN1 | IN2 | IN4 | IN12 | IN16 | IN37 | IN44 | IN45 | IN57 | IN58 |
| Example 25 | 17.69<br>0.0826 | 8.12<br>0.0556 | 1.72<br>0.0119 | 3.10<br>0.0119 | | | | | | | | | |
| Example 26 | 16.98<br>0.0793 | 7.80<br>0.0534 | 1.65<br>0.0114 | | 3.57<br>0.0114 | | | | | | | | |
| Example 27 | 14.98<br>0.0699 | 7.08<br>0.0484 | 1.50<br>0.0104 | | | 4.62<br>0.0104 | | | | | | | |
| Example 28 | 15.64<br>0.0730 | 7.18<br>0.0491 | 1.52<br>0.0105 | | | | 4.47<br>0.0105 | | | | | | |
| Example 29 | 11.94<br>0.0557 | 5.48<br>0.0375 | 1.16<br>0.0080 | | | | | 2.96<br>0.0080 | | | | | |
| Example 30 | 14.77<br>0.0689 | 6.78<br>0.0464 | 1.43<br>0.0099 | | | | | | 5.06<br>0.0099 | | | | |
| Example 31 | 17.22<br>0.0804 | 7.91<br>0.0541 | 1.67<br>0.0116 | | | | | | | 3.41<br>0.0116 | | | |
| Example 32 | 17.41<br>0.0813 | 7.99<br>0.0547 | 1.69<br>0.0117 | | | | | | | | 3.29<br>0.0117 | | |
| Example 33 | 16.80<br>0.0784 | 7.94<br>0.0543 | 1.68<br>0.0116 | | | | | | | | | 3.36<br>0.0117 | |
| Example 34 | 16.65<br>0.0777 | 7.87<br>0.0539 | 1.66<br>0.0115 | | | | | | | | | | 3.47<br>0.0116 |

| | Molar Ratio of Charge Amount of Dihydroxy Compound IN(X)/ISB/CHDM[a) | Ratio of Molar Number of DPC to Total Molar Number of Dihydroxy Compound | Catalyst Kind | Catalyst Charge Amount, upper: g lower: mol | Polymerization Temperature ° C. |
|---|---|---|---|---|---|
| Example 25 | 15/70/15 | 1.04 | C | 3.50E−04<br>1.98E−06 | 240 |
| Example 26 | 15/70/15 | 1.04 | C | 3.36E−04<br>1.91E−06 | 240 |
| Example 27 | 15/70/15 | 1.01 | D | 3.66E−03<br>2.08E−05 | 240 |
| Example 28 | 15/70/15 | 1.04 | C | 3.09E−04<br>1.76E−06 | 240 |
| Example 29 | 15/70/15 | 1.04 | C | 2.36E−04<br>1.34E−06 | 240 |
| Example 30 | 15/70/15 | 1.04 | C | 2.92E−04<br>1.66E−06 | 240 |
| Example 31 | 15/70/15 | 1.04 | C | 1.70E−03<br>9.66E−06 | 240 |
| Example 32 | 15/70/15 | 1.04 | C | 1.72E−03<br>9.77E−06 | 240 |
| Example 33 | 15/70/15 | 1.01 | D | 4.10E−03<br>2.33E−05 | 240 |
| Example 34 | 15/70/15 | 1.01 | D | 4.07E−03<br>2.31E−05 | 240 |

TABLE 6B

| | Physical Properties | | | |
|---|---|---|---|---|
| | Reduced Viscosity ηsp/C dl/g | Extrapolated Glass Transition Initiation Temperature Tig ° C. | Midpoint Glass Transition Initiation Temperature Tmg ° C. | 5% Thermal Weight Loss Temperature Td ° C. |
| Example 25 | 0.459 | 143 | 148 | 331 |
| Example 26 | 0.706 | 143 | 148 | 324 |
| Example 27 | 0.379 | 159 | 164 | 338 |
| Example 28 | 0.348 | 141 | 148 | 330 |
| Example 29 | 0.353 | 138 | 145 | 343 |
| Example 30 | 0.295 | 131 | 136 | 325 |
| Example 31 | 0.389 | 142 | 147 | 349 |
| Example 32 | 0.537 | 145 | 149 | 348 |
| Example 33 | 0.458 | 136 | 139 | 350 |
| Example 34 | 0.443 | 150 | 153 | 349 |

Example 35

A reaction vessel was charged with 3.48 g (0.0241 mol) of CHDM, 10.77 g (0.0503 mol) of DPC, and $2.13\times10^{-4}$ g ($1.21\times10^{-6}$ mol) of calcium acetate as a catalyst, relative to 10.26 g (0.0242 mol) of IN12: DL-2,3:5,6-di-O-3,3,5-trimethylcyclohexylidene-myo-inositol, and in a nitrogen atmosphere, the raw materials were heated at a heating bath temperature of 150° C., stirred as needed, subjected to temperature rise to 220° C. at normal pressure over 60 minutes, held at 220° C. for 30 minutes, and thereby dissolved.

As a step of first stage of reaction, the pressure was reduced from normal pressure to 13.3 kPa over 40 minutes with keeping a heating bath temperature of 220° C. and held at 13.3 kPa for 60 minutes, and phenol generated was drawn out of the reaction vessel. As a step of second stage, phenol generated was drawn out of the reaction vessel with raising the heating bath temperature to 240° C. from 220° C. over 20 minutes and performing a control so as to reduce the pressure to 0.200 kPa or less in 30 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.267 dl/g, the glass transition temperature Tig was 154° C., and Tmg was 158° C. The 5% thermal weight loss temperature (Td) in nitrogen atmosphere was 327° C.

The production conditions and evaluation results of Example 35 are shown in Tables 7A and 7B.

Figure 33:
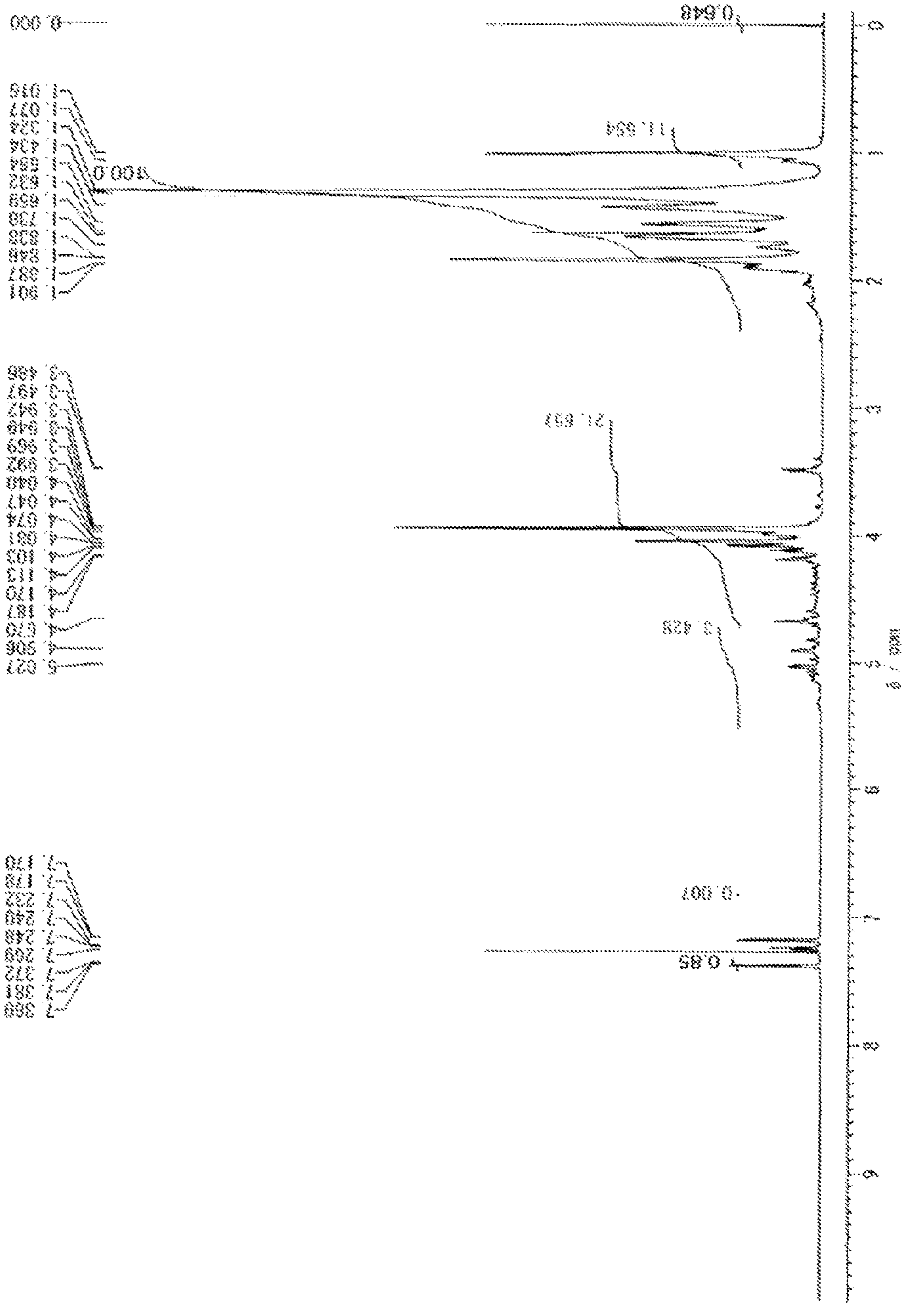
FIG. 33 is an NMR chart of the polycarbonate copolymer obtained in Example 35.

In addition, the NMR chart of the polycarbonate copolymer of Example 35 is illustrated in FIG. 33.

Examples 36-42

Figure 34:
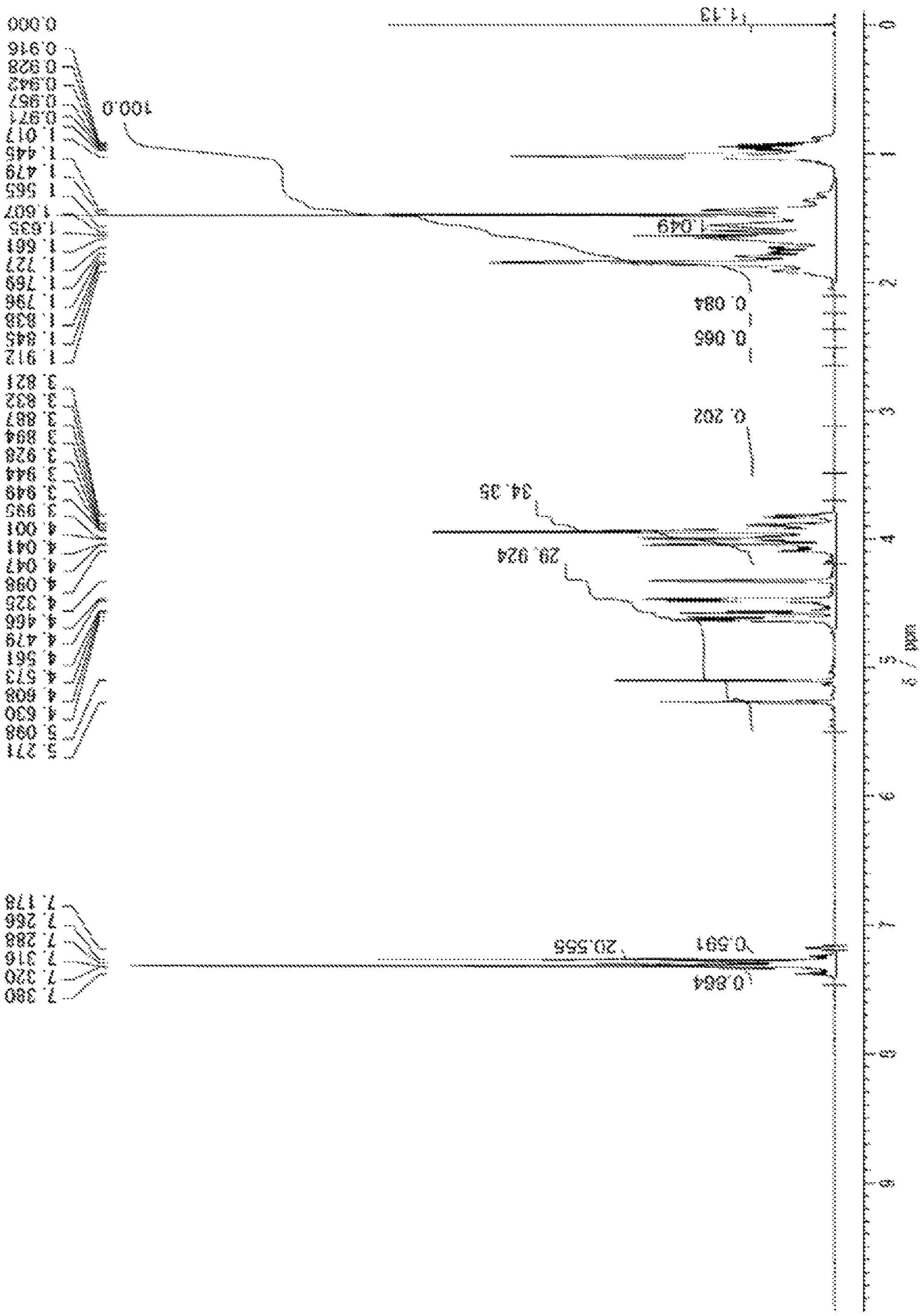
FIG. 34 is an NMR chart of the polycarbonate copolymer obtained in Example 37.
Figure 35:
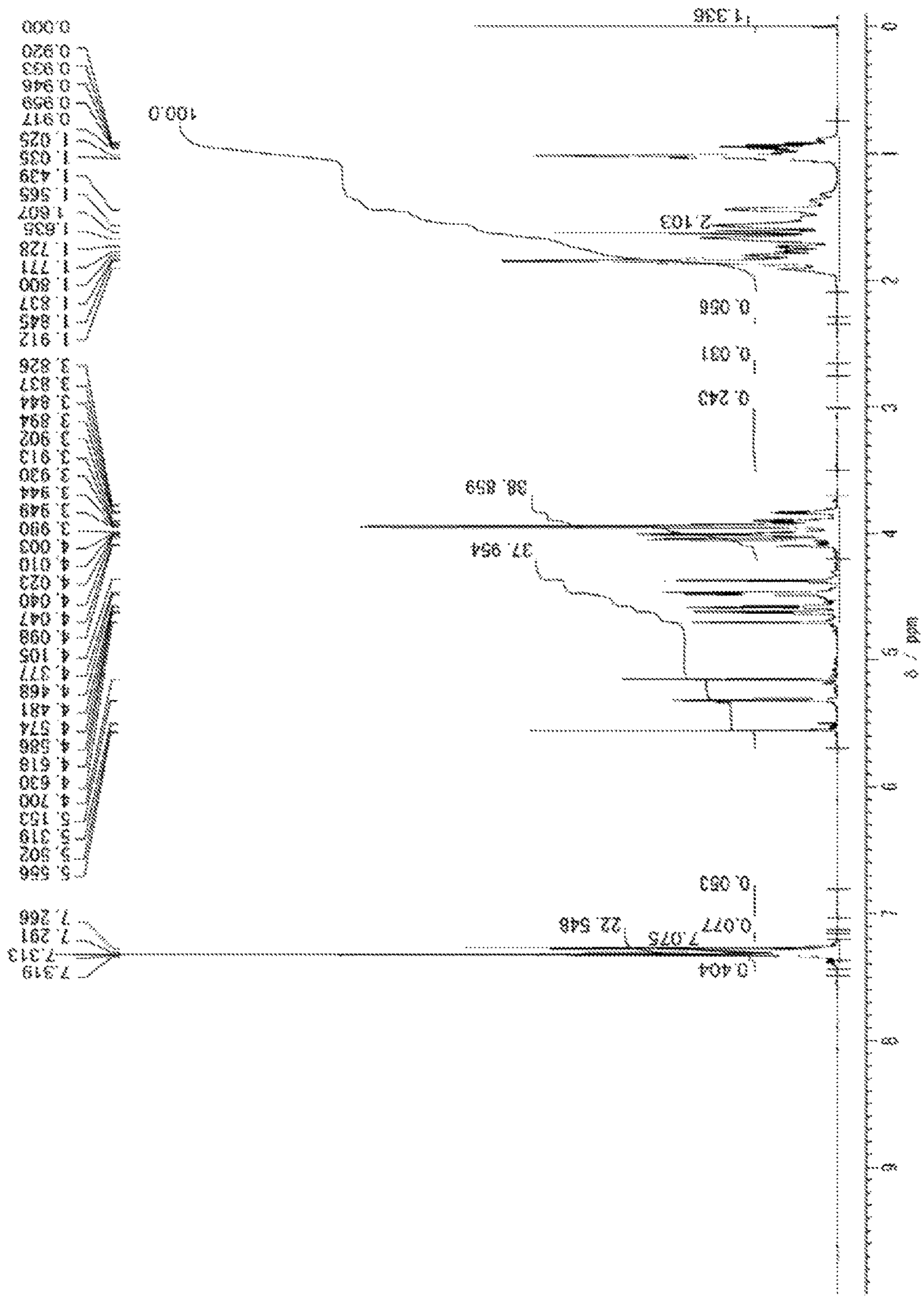
FIG. 35 is an NMR chart of the polycarbonate copolymer obtained in Example 39.
Figure 36:
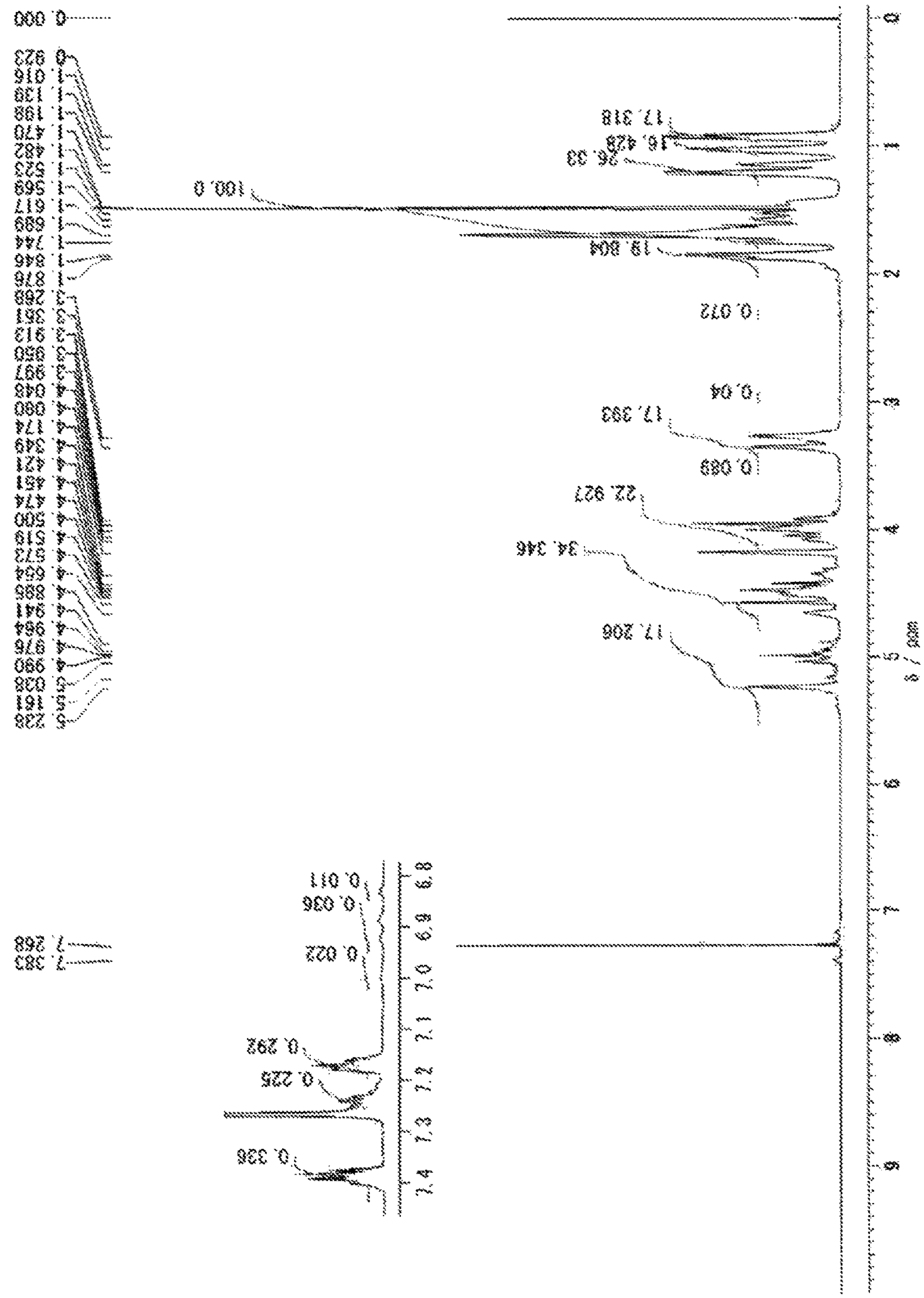
FIG. 36 is an NMR chart of the polycarbonate copolymer obtained in Example 42.

Transparent amorphous polycarbonates were obtained by performing polymerization reaction in the same manner as the conditions of Example 35 except that each of the raw materials was charged in the charge amount shown in Table 7A. The evaluation results are shown in Table 7B. In addition, the NMR charts of the polycarbonate copolymers of Examples 37, 39 and 42 are illustrated in FIGS. 34 to 36, respectively.

TABLE 7A

| | Carbonate Charge Amount, upper: g lower: mol | Dihydroxy Compound Charge Amount, upper: g lower: mol | | | | | |
|---|---|---|---|---|---|---|---|
| | DPC | CHDM | IN12 | IN37 | IN44 | IN45 | IN58 |
| Example 35 | 10.77<br>0.0503 | 3.48<br>0.0241 | 10.26<br>0.0242 | | | | |
| Example 36 | 11.95<br>0.0558 | 5.42<br>0.0376 | | 8.19<br>0.0161 | | | |
| Example 37 | 15.53<br>0.0725 | 7.04<br>0.0488 | | | 6.15<br>0.0209 | | |
| Example 38 | 12.59<br>0.0588 | 3.32<br>0.0230 | | | 10.18<br>0.0346 | | |
| Example 39 | 15.38<br>0.0718 | 7.18<br>0.0498 | | | | 5.98<br>0.0213 | |
| Example 40 | 13.01<br>0.0607 | 3.44<br>0.0239 | | | | 20.02<br>0.0358 | |
| Example 41 | 15.40<br>0.0719 | 6.98<br>0.0484 | | | | | 6.23<br>0.0207 |
| Example 42 | 12.42<br>0.0580 | 3.28<br>0.0227 | | | | | 10.24<br>0.0341 |

| | Molar Ratio of Charge Amount of Dihydroxy Compound IN(X)CHDM[a)] | Ratio of Molar Number of DPC to Total Molar Number of Dihydroxy Compound | Catalyst Kind | Catalyst Charge Amount upper: g lower: mol | Polymerization Temperature ° C. |
|---|---|---|---|---|---|
| Example 35 | 50/50 | 1.04 | C | 2.13E−04<br>1.21E−06 | 240 |
| Example 36 | 30/70 | 1.04 | C | 2.36E−04<br>1.34E−06 | 240 |
| Example 37 | 30/70 | 1.01 | C | 1.53E−03<br>8.71E−06 | 240 |
| Example 38 | 60/40 | 1.04 | D | 3.05E−03<br>1.73E−05 | 240 |

TABLE 7A-continued

| | | | | | |
|---|---|---|---|---|---|
| Example 39 | 30/70 | 1.04 | C | 1.57E−03<br>8.89E−06 | 240 |
| Example 40 | 60/40 | 1.04 | D | 3.15E−03<br>1.79E−05 | 240 |
| Example 41 | 30/70 | 1.04 | D | 3.65E−03<br>2.07E−05 | 240 |
| Example 42 | 60/40 | 1.04 | D | 3.00E−03<br>1.71E−05 | 240 |

TABLE 7B

| | Physical Properties | | | |
|---|---|---|---|---|
| | Reduced Viscosity ηsp/C dl/g | Extrapolated Glass Transition Initiation Temperature Tig ° C. | Midpoint Glass Transition Initiation Temperature Tmg ° C. | 5% Thermal Weight Loss Temperature Td ° C. |
| Example 35 | 0.267 | 154 | 158 | 327 |
| Example 36 | 0.434 | 87 | 94 | 324 |
| Example 37 | 0.537 | 85 | 88 | 355 |
| Example 38 | 0.393 | 130 | 132 | 355 |
| Example 39 | 0.776 | 84 | 89 | 355 |
| Example 40 | 0.596 | 127 | 130 | 348 |
| Example 41 | 0.305 | 85 | 89 | 354 |
| Example 42 | 0.393 | 139 | 143 | 367 |

Example 43

A reaction vessel was charged with 42.45 g (0.2905 mol) of ISB, 25.42 g (0.1763 mol) of CHDM, 112.79 g (0.5265 mol) of DPC, and $4.59\times10^{-4}$ g ($2.61\times10^{-6}$ mol) of calcium acetate as a catalyst, relative to 18.58 g (0.0546 mol) of DCMI, and in a nitrogen atmosphere, the raw materials were heated at a heating bath temperature of 150° C., stirred as needed, subjected to temperature rise to 220° C. at normal pressure over 30 minutes, held at 220° C. for 30 minutes, and thereby dissolved.

As a step of first stage of reaction, the pressure was reduced from normal pressure to 13.3 kPa over 90 minutes with keeping a heating bath temperature of 220° C. and held at 13.3 kPa for 30 minutes, and phenol generated was drawn out of the reaction vessel. As a step of second stage, the heating bath temperature was raised to 240° C. from 220° C. over 15 minutes, and phenol generated was thereafter drawn out of the reaction vessel with performing a control so as to reduce the pressure to 0.200 kPa or less in 15 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.455 dl/g, the glass transition temperature Tig was 126° C., and Tmg was 130° C. The water absorption percentage of this polymer was 1.6 wt %, the pencil hardness was H, and the photoelastic coefficient was $19\times10^{-12}$ $Pa^{-1}$.

Example 44

A reaction vessel was charged with 48.14 g (0.3294 mol) of ISB, 21.99 g (0.0343mol) of bis[9-(2-phenioxycarbonylethy)fluoren-9]-methane (hereinafter, simply referred to as "2Q"), 68.27 g (0.3187 mol) of DPC, and $1.24\times10^{-3}$ g ($7.06\times10^{-6}$ mol) of calcium acetate as a catalyst, relative to 8.05 g (0.0236 mol) of DCVMI, and in a nitrogen atmosphere, the raw materials were heated at a heating bath temperature of 150° C., stirred as needed, subjected to temperature rise to 220° C. at normal pressure over 30 minutes, held at 220° C. for 30 minutes, and thereby dissolved.

As a step of first stage of reaction, the pressure was reduced from normal pressure to 13.3 kPa over 90 minutes with keeping a heating bath temperature of 220° C. and held at 13.3kPa for 30 minutes, and phenol generated was drawn out of the reaction vessel. As a step of second stage, the heating bath temperature was raised to 245° C. from 220° C. over 15 minutes, and phenol generated was thereafter drawn out of the reaction vessel with performing a control so as to reduce the pressure to 0.200 kPa or less in 15 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.318 dl/g, the glass transition temperature Tig was 163° C., and Tmg was 167° C. The photoelastic coefficient was 11 $x10^{-12}$ $Pa^{-1}$

Example 45

A reaction vessel was charged with 6.77 g (0.0463 mol) of ISB, 2.17 g (0.0099 mol) of AE-2S: 2,2-bis-[4-2-(hydroxyethoxy)phenyl]propane, 14.74 g (0.0688 mol) of DPC, and $2.91\times10^{-4}$ g ($1.65\times10^{-6}$ mol) of calcium acetate as a catalyst, relative to 3.38 g (0.0099mol) of DCMI, and in a nitrogen atmosphere, the raw materials were heated at a heating bath temperature of 150° C., stirred as needed, subjected to temperature rise to 220° C. at normal pressure over 60 minutes, held at 220° C. for 30 minutes, and thereby dissolved.

As a step of first stage of reaction, the pressure was reduced from normal pressure to 13.3 kPa over 40 minutes with keeping a heating bath temperature of 220° C. and held at 13.3kPa for 60 minutes, and phenol generated was drawn out of the reaction vessel. As a step of second stage, phenol generated was drawn out of the reaction vessel with raising the heating bath temperature to 240° C. from 220° C. over 20 minutes and performing a control so as to reduce the pressure to 0.200 kPa or less in 30 minutes. After reaching a predetermined stirring torque, the reaction was terminated, and the produced reaction product was taken out from the reaction vessel to obtain a transparent amorphous polycarbonate copolymer.

The reduced viscosity of the obtained polycarbonate copolymer was 0.516 dl/g, the glass transition temperature Tig was 140° C., and Tmg was 144° C. The 5% thermal weight loss temperature (Td) in nitrogen atmosphere was 338° C.

The production conditions and evaluation results of Example 45 are shown in Tables 8A and 8B.

Figure 37:
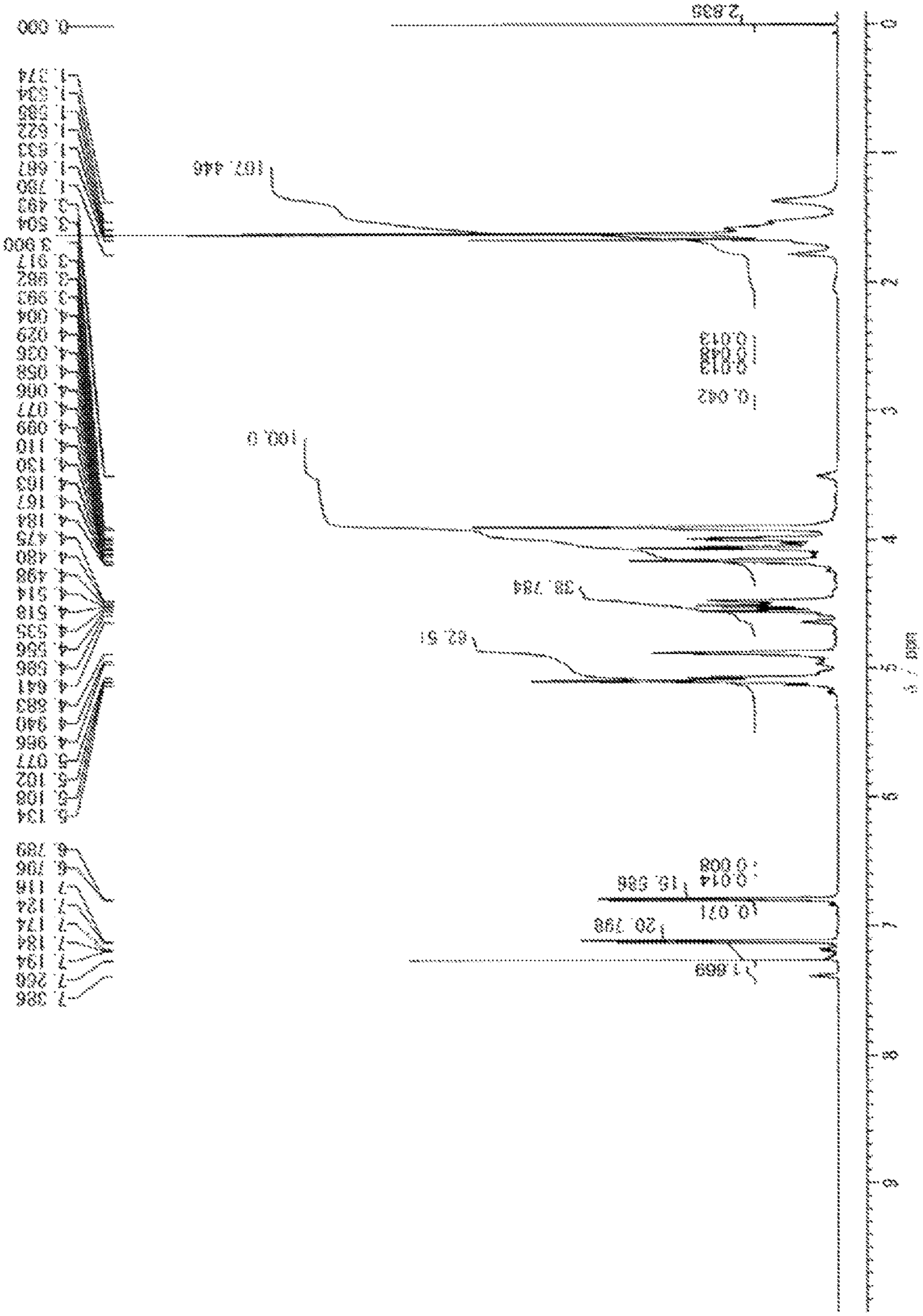
FIG. 37 is an NMR chart of the polycarbonate copolymer obtained in Example 45.
Figure 38:
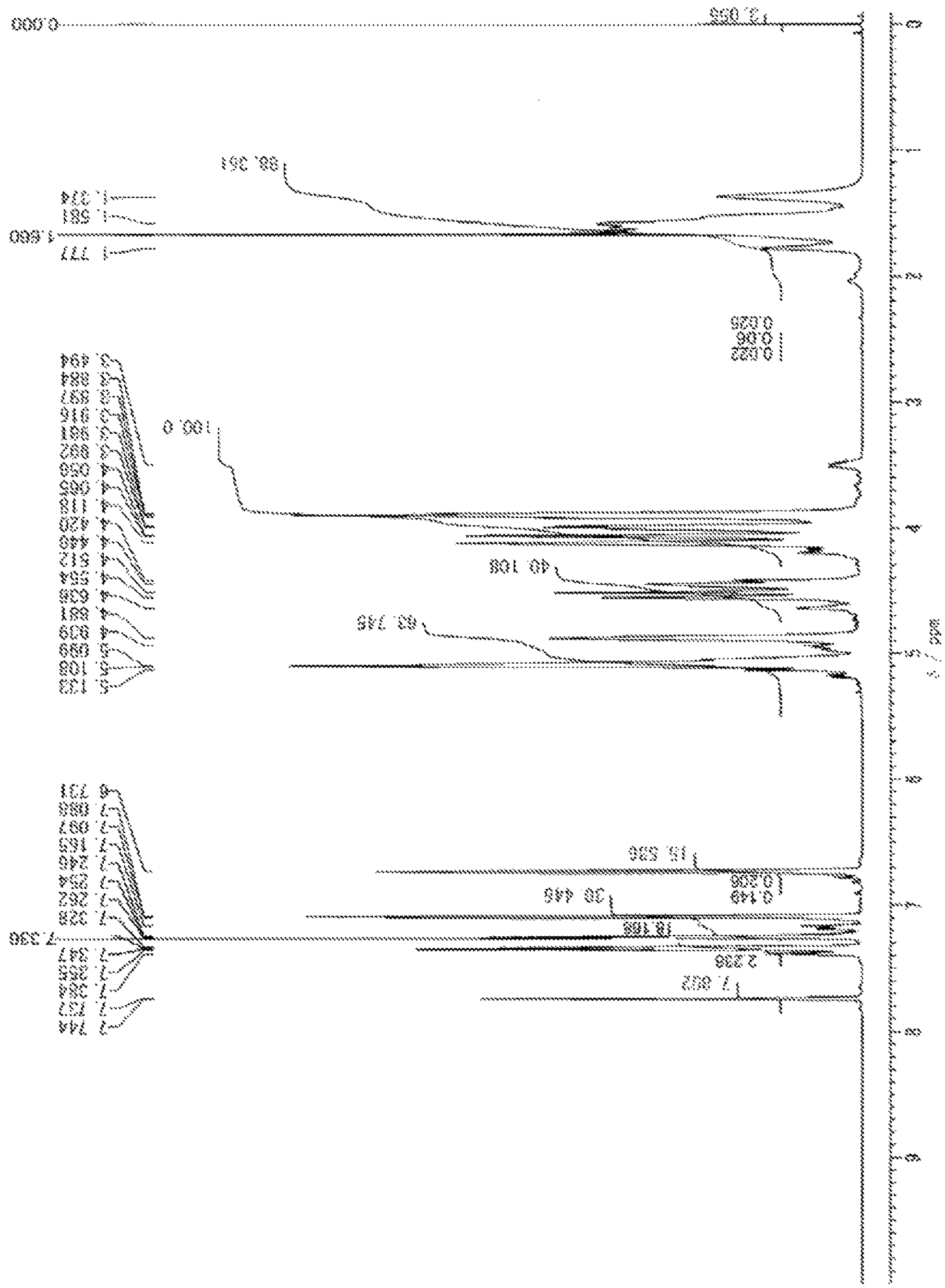
FIG. 38 is an NMR chart of the polycarbonate copolymer obtained in Example 46.
Figure 39:
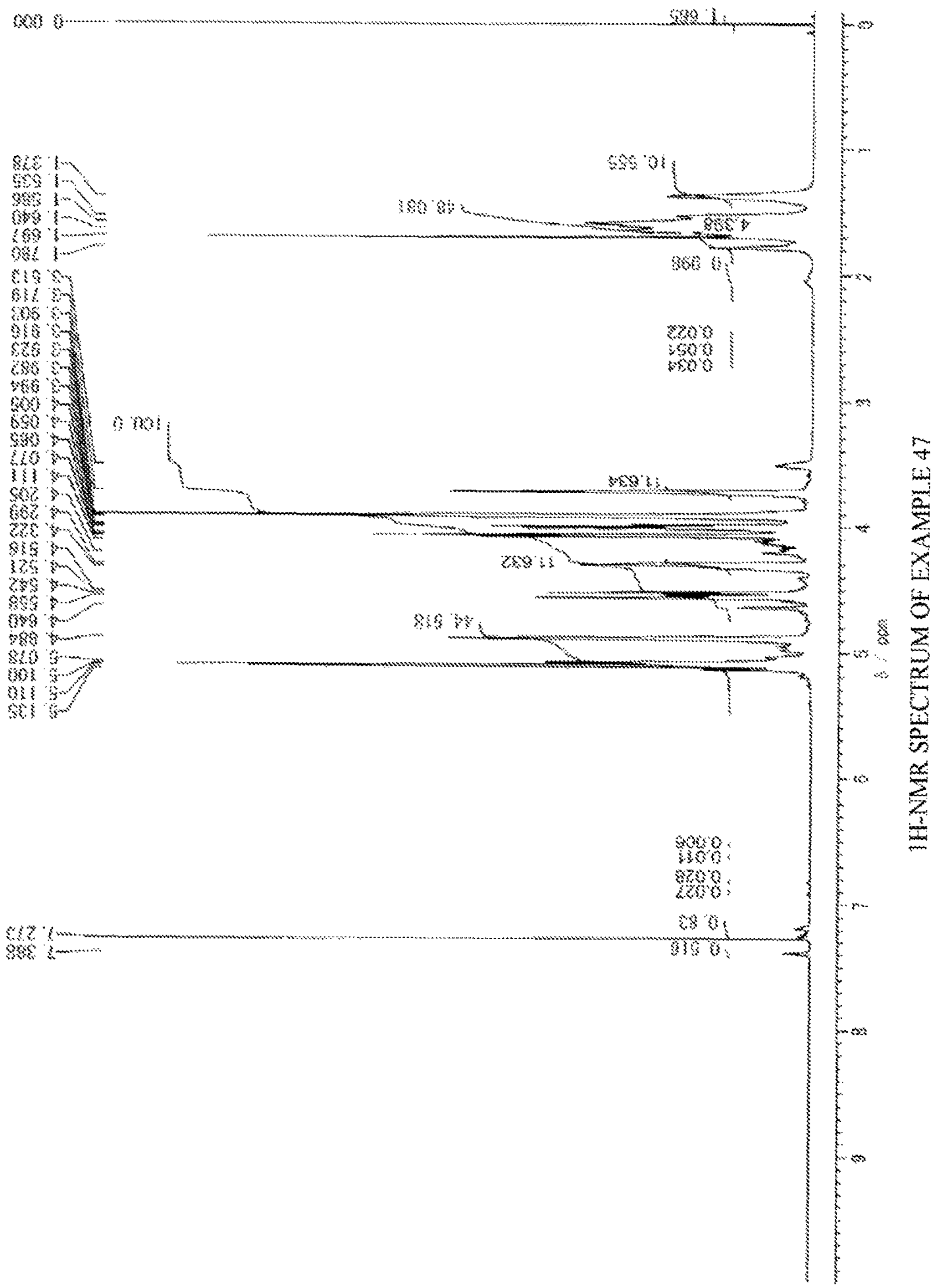
FIG. 39 is an NMR chart of the polycarbonate copolymer obtained in Example 47.
Figure 40:
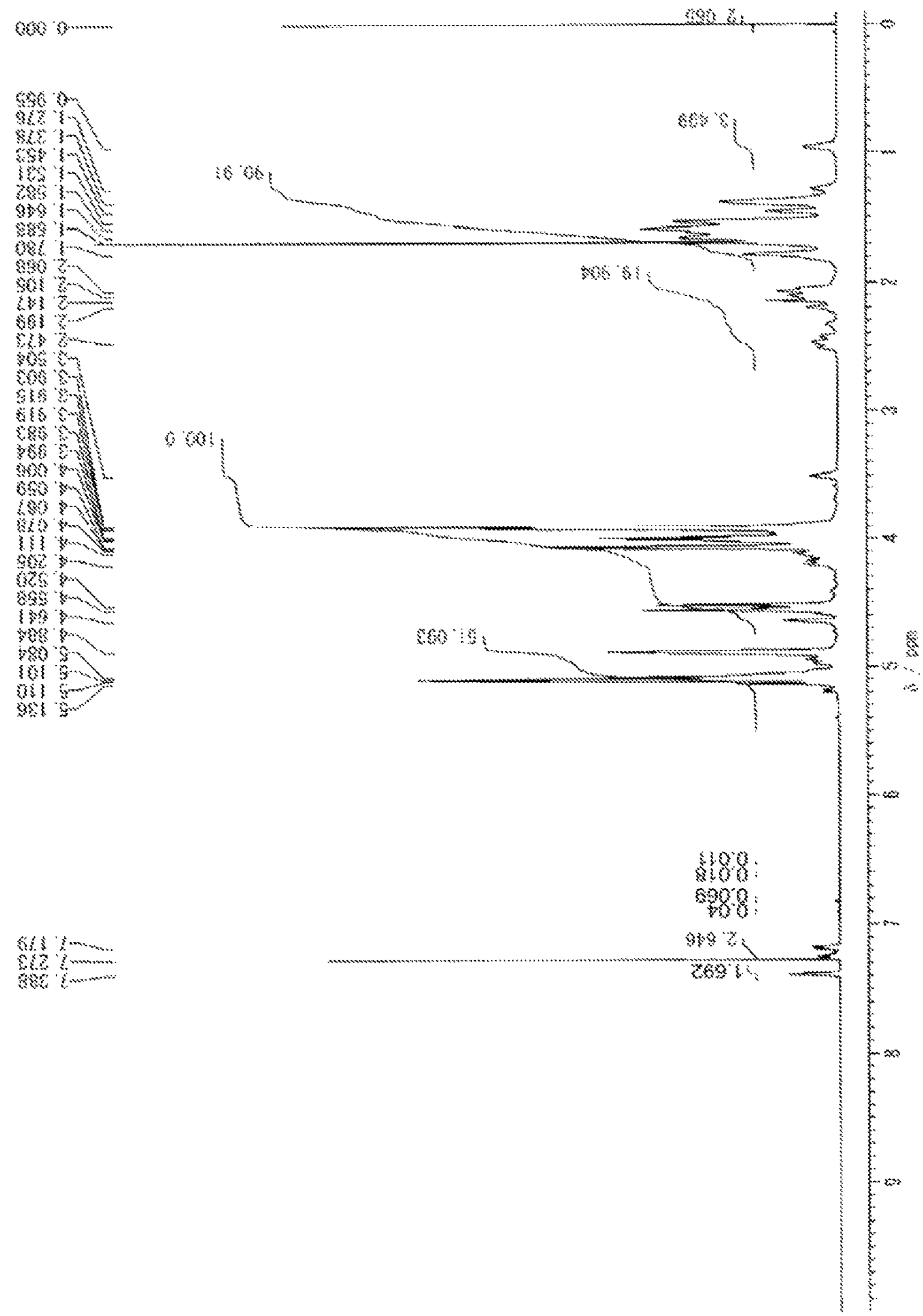
FIG. 40 is an NMR chart of the polycarbonate copolymer obtained in Example 49.
Figure 41:
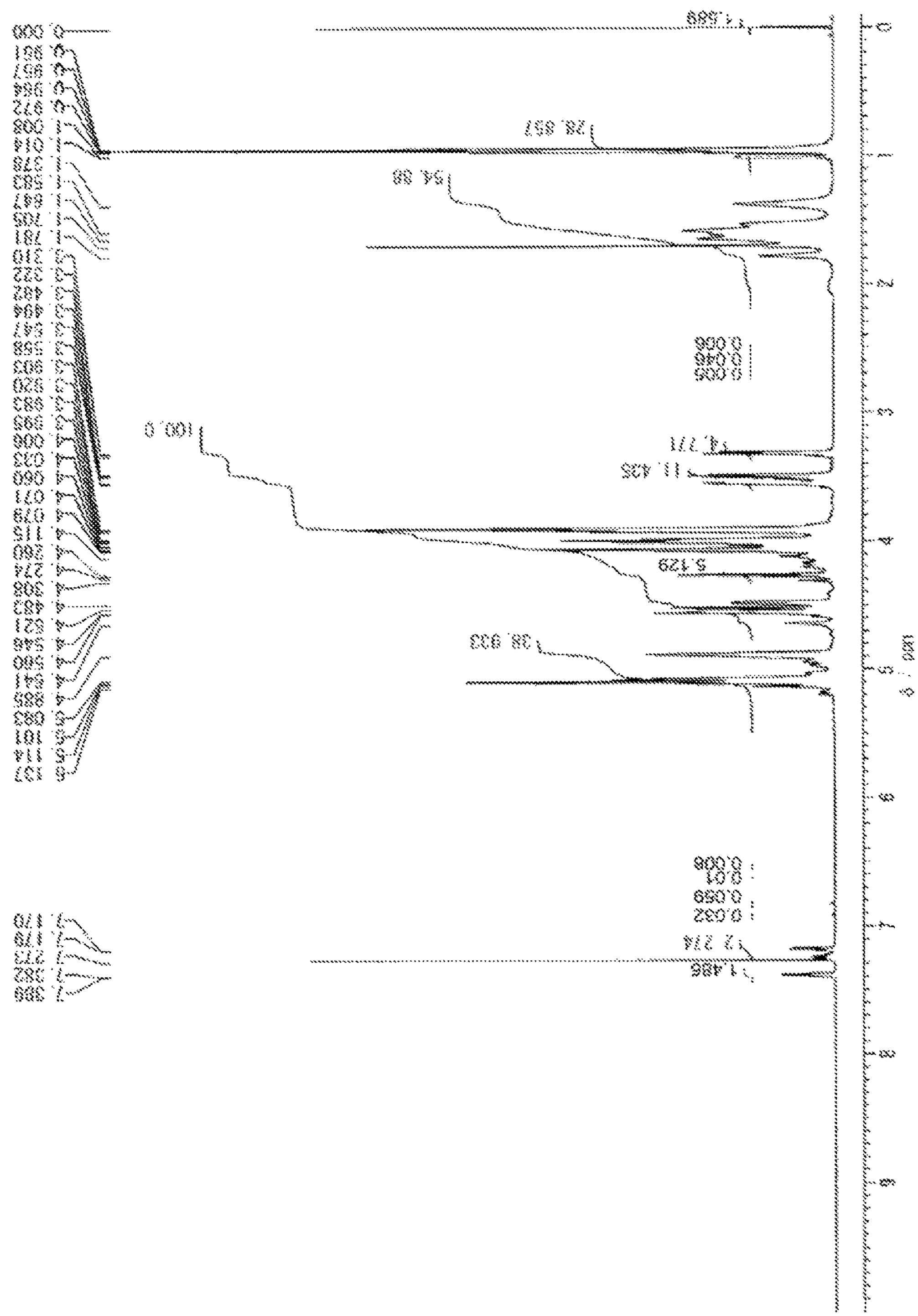
FIG. 41 is an NMR chart of the polycarbonate copolymer obtained in Example 50.
Figure 42:
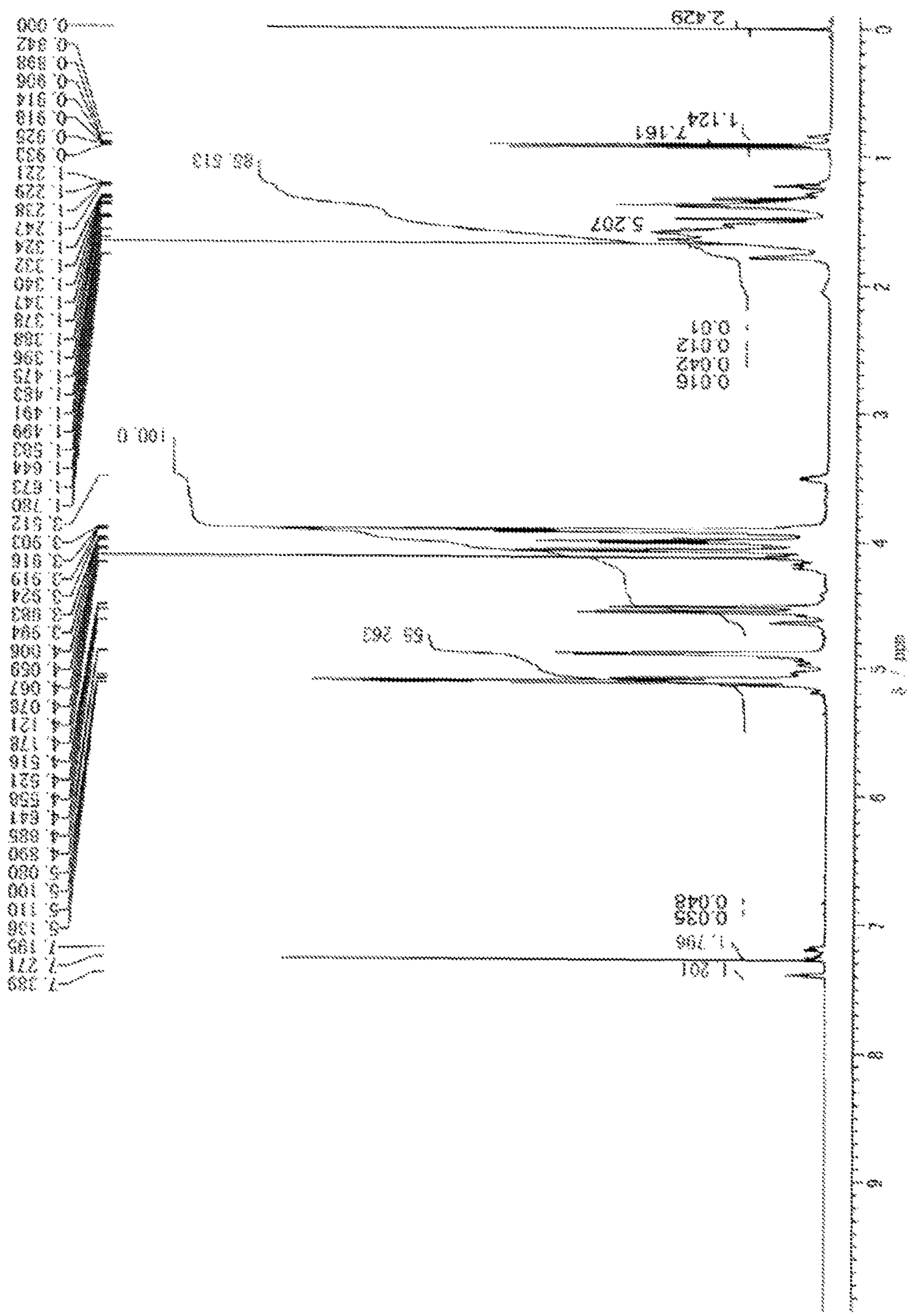
FIG. 42 is an NMR chart of the polycarbonate copolymer obtained in Example 53.
Figure 43:
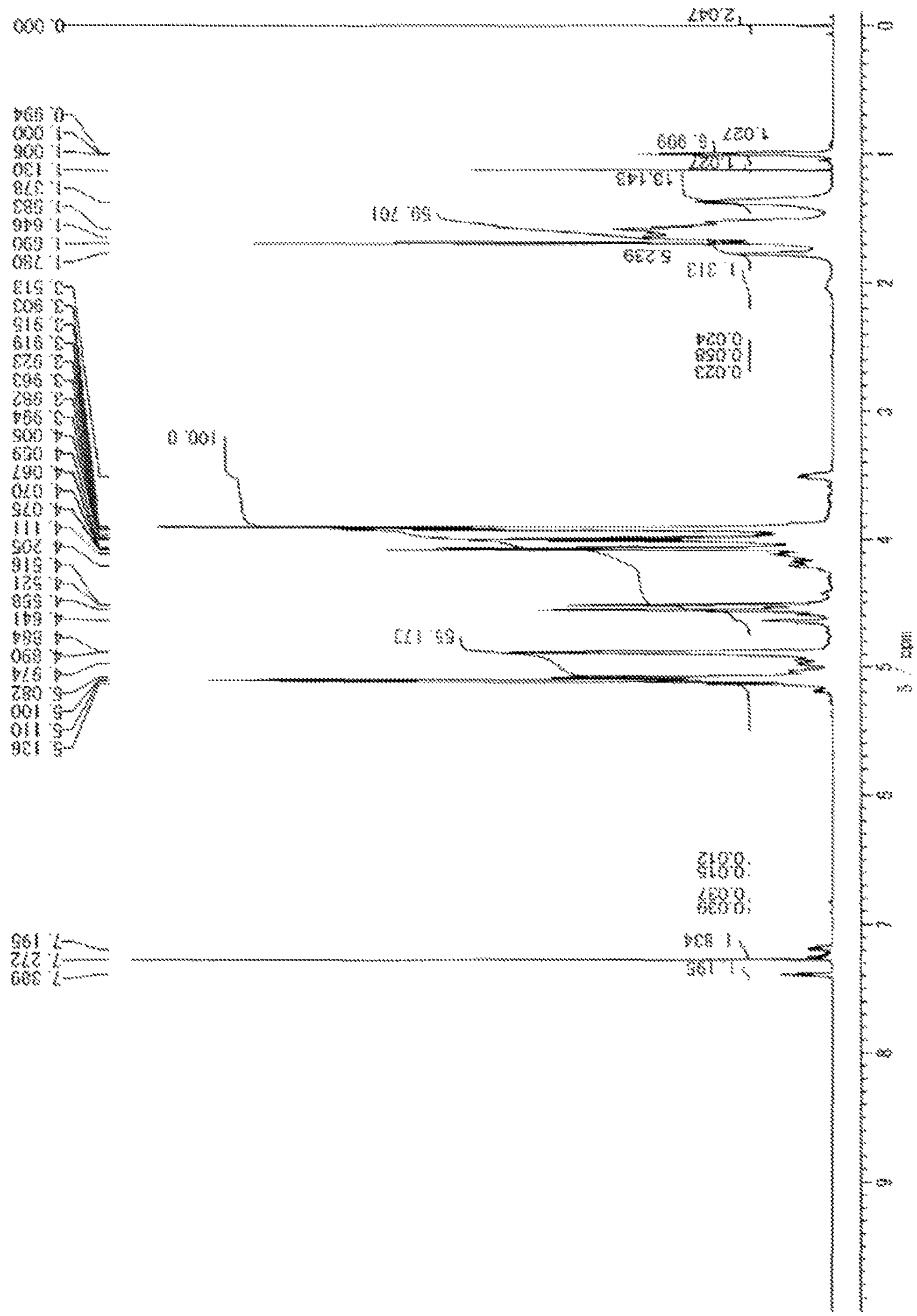
FIG. 43 is an NMR chart of the polycarbonate copolymer obtained in Example 54.

In addition, the NMR chart of the polycarbonate copolymer of Example 45 is illustrated in FIG. 37.

Examples 46-55

Transparent amorphous polycarbonates were obtained by performing polymerization reaction in the same manner as the conditions of Example 45 except that each of the raw materials was charged in the charge amount shown in Table 8A. The evaluation results are shown in Table 8B. In addition, the NMR charts of the polycarbonate copolymers of Examples 46, 47, 49, 50, 53 and 54 are illustrated in FIGS. 38 to 43, respectively.

TABLE 8A

| | Carbonate Charge Amount, upper: g lower: mol | Dihydroxy Compound Charge Amount, upper: g lower: mol | | | | | | |
|---|---|---|---|---|---|---|---|---|
| | DPC | DCMI | ISB | AE-2S | BPEF | DEG | TEG | TCDDM |
| Example 45 | 14.74<br>0.0688 | 3.38<br>0.0099 | 6.77<br>0.0463 | 3.14<br>0.0099 | | | | |
| Example 46 | 13.63<br>0.0636 | 3.12<br>0.0092 | 6.26<br>0.0428 | | 4.03<br>0.0092 | | | |
| Example 47 | 17.12<br>0.0799 | 3.92<br>0.0115 | 7.86<br>0.0538 | | | 1.22<br>0.0115 | | |
| Example 48 | 16.56<br>0.0773 | 3.79<br>0.0111 | 7.60<br>0.0520 | | | | 1.67<br>0.0111 | |
| Example 49 | 16.01<br>0.0747 | 3.67<br>0.0108 | 7.35<br>0.0503 | | | | | 2.12<br>0.0108 |
| Example 50 | 14.86<br>0.0694 | 3.40<br>0.0100 | 6.82<br>0.0467 | | | | | |
| Example 51 | 16.43<br>0.0767 | 3.76<br>0.0110 | 7.55<br>0.0517 | | | | | |
| Example 52 | 16.96<br>0.0792 | 3.88<br>0.0114 | 7.79<br>0.0533 | | | | | |
| Example 53 | 16.43<br>0.0767 | 3.76<br>0.0110 | 7.55<br>0.0517 | | | | | |
| Example 54 | 17.14<br>0.0800 | 3.93<br>0.0115 | 7.87<br>0.0539 | | | | | |
| Example 55 | 17.33<br>0.0809 | 3.97<br>0.0117 | 7.96<br>0.0545 | | | | | |

| | Dihydroxy Compound Charge Amount, upper: g lower: mol | | | | | |
|---|---|---|---|---|---|---|
| | SPG | PD-9 | 3-MPD | BEPG | NPG | 2-MPD |
| Example 45 | | | | | | |
| Example 46 | | | | | | |
| Example 47 | | | | | | |
| Example 48 | | | | | | |
| Example 49 | | | | | | |
| Example 50 | 3.04<br>0.0100 | | | | | |
| Example 51 | | 1.77<br>0.0110 | | | | |
| Example 52 | | | 1.35<br>0.0114 | | | |
| Example 53 | | | | 1.77<br>0.0110 | | |
| Example 54 | | | | | 1.20<br>0.0115 | |
| Example 55 | | | | | | 1.05<br>0.0117 |

| | Molar Ratio of Charge Amount of Dihydroxy Compound DCMI/ISB/dihydroxy compound | Ratio of Molar Number of DPC to Total Molar Number of Dihydroxy Compound | Catalyst Kind | Catalyst Charge Amount, upper: g lower: mol | Polymerization Temperature ° C. |
|---|---|---|---|---|---|
| Example 45 | 15/70/15 | 1.04 | C | 2.91E−04<br>1.65E−06 | 240 |
| Example 46 | 15/70/15 | 1.04 | C | 2.70E−04<br>1.53E−06 | 240 |
| Example 47 | 15/70/15 | 1.04 | C | 3.38E−04<br>1.92E−06 | 240 |
| Example 48 | 15/70/15 | 1.04 | C | 3.27E−04<br>1.86E−06 | 240 |
| Example 49 | 15/70/15 | 1.04 | C | 3.16E−04<br>1.80E−06 | 240 |
| Example 50 | 15/70/15 | 1.04 | C | 2.94E−04<br>1.67E−06 | 240 |
| Example 51 | 15/70/15 | 1.04 | C | 3.25E−04<br>1.84E−06 | 240 |

TABLE 8A-continued

| | | | | | |
|---|---|---|---|---|---|
| Example 52 | 15/70/15 | 1.04 | C | 3.35E−04<br>1.90E−06 | 240 |
| Example 53 | 15/70/15 | 1.04 | C | 3.25E−04<br>1.84E−06 | 240 |
| Example 54 | 15/70/15 | 1.04 | C | 3.39E−04<br>1.92E−06 | 240 |
| Example 55 | 15/70/15 | 1.04 | C | 3.43E−04<br>1.94E−06 | 240 |

TABLE 8B

| | Physical Properties | | | |
|---|---|---|---|---|
| | Reduced Viscosity ηsp/C dl/g | Extrapolated Glass Transition Initiation Temperature Tig ° C. | Midpoint Glass Transition Initiation Temperature Tmg ° C. | 5% Thermal Weight Loss Temperature Td ° C. |
| Example 45 | 0.516 | 140 | 144 | 338 |
| Example 46 | 0.369 | 159 | 164 | 339 |
| Example 47 | 0.577 | 139 | 145 | 335 |
| Example 48 | 0.521 | 99 | 115 | 337 |
| Example 49 | 0.392 | 150 | 156 | 338 |
| Example 50 | 0.456 | 149 | 154 | 341 |
| Example 51 | 0.458 | 132 | 138 | 338 |
| Example 52 | 0.359 | 137 | 142 | 329 |

TABLE 8B-continued

| | Physical Properties | | | |
|---|---|---|---|---|
| | Reduced Viscosity ηsp/C dl/g | Extrapolated Glass Transition Initiation Temperature Tig ° C. | Midpoint Glass Transition Initiation Temperature Tmg ° C. | 5% Thermal Weight Loss Temperature Td ° C. |
| Example 53 | 0.411 | 145 | 153 | 327 |
| Example 54 | 0.517 | 159 | 166 | 334 |
| Example 55 | 0.366 | 140 | 149 | 323 |

The water absorption percentage, pencil hardness and photoelastic coefficient of each of Examples 31, 32, 38, 40 and 43 are shown in Table 9.

TABLE 9

| | Carbonate Charge Amount, upper: g lower: mol | Dihydroxy Compound Charge Amount, upper: g lower: mol | | | Molar Ratio of Charge Amount of Dihydroxy Compound |
|---|---|---|---|---|---|
| Example 43 | DPC<br>112.79<br>0.5265 | DCMI<br>18.58<br>0.0546 | ISB<br>42.45<br>0.2905 | CHDM<br>25.42<br>0.1763 | 10.5/55.7/33.8 |
| Example 31 | DPC<br>17.22<br>0.0804 | IN44<br>3.41<br>0.0116 | ISB<br>7.91<br>0.0541 | CHDM<br>1.67<br>0.0116 | 15/70/15 |
| Example 32 | DPC<br>17.41<br>0.0813 | IN45<br>3.29<br>0.0117 | ISB<br>7.99<br>0.0547 | CHDM<br>1.69<br>0.0117 | 15/70/15 |
| Example 38 | DPC<br>12.59<br>0.0588 | IN44<br>10.18<br>0.0346 | | CHDM<br>3.32<br>0.0230 | 60/40 |
| Example 40 | DPC<br>13.01<br>0.0607 | IN45<br>10.02<br>0.0358 | | CHDM<br>3.44<br>0.0239 | 60/40 |
| Comparative Example | commercially available bisphenol A polycarbonate | | | | |

| | Physical Properties | | | | | |
|---|---|---|---|---|---|---|
| | Reduced Viscosity ηsp/C. dl/g | Extrapolated Glass Transition Initiation Temperature Tig ° C. | Midpoint Glass Transition Initiation Temperature Tmg ° C. | Water Absorption Percentage wt % | Pencil Hardness | Photoelastic Coefficient Pa−1 |
| Example 43 | 0.267 | 154 | 158 | 1.6 | H | $19 \times 10^{-12}$ |
| Example 31 | 0.389 | 142 | 147 | 2.7 | H | $20 \times 10^{-12}$ |
| Example 32 | 0.537 | 145 | 149 | 2.6 | 2H | $20 \times 10^{-12}$ |
| Example 38 | 0.393 | 130 | 132 | — | — | $38 \times 10^{-12}$ |
| Example 40 | 0.596 | 127 | 130 | 0.6 | H | $38 \times 10^{-12}$ |
| Comparative Example | | | 145 | 0.3 | 2B-3B | $76 \times 10^{-12}$ |

The measurement results of refractive index and Abbe number of each of Examples 31, 32, 33, 34, 37 and 39 are shown in Table 10.

TABLE 10

| | Molar Ratio of Charge Amount of Dihydroxy Compound | Refractive Index C Line 656 nm | D Line 589 nm | e Line 546 nm | F Line 486 nm | Abbe Number vd |
|---|---|---|---|---|---|---|
| Example 31 | IN44/ISB/CHDM 15/70/15 | 1.508 | 1.510 | 1.513 | 1.517 | 51 |
| Example 32 | IN45/ISB/CHDM 15/70/15 | 1.510 | 1.513 | 1.516 | 1.520 | 52 |
| Example 33 | IN57/ISB/CHDM 15/70/15 | 1.494 | 1.497 | 1.499 | 1.504 | 49 |
| Example 34 | IN58/ISB/CHDM 15/70/15 | 1.496 | 1.498 | 1.501 | 1.506 | 51 |
| Example 37 | IN44/CHDM 30/70 | 1.514 | 1.517 | 1.520 | | |
| Example 39 | IN45/CHDM 30/70 | 1.516 | 1.518 | 1.521 | 1.526 | 48 |

Comparative Example 11

A reaction vessel was charged with 61.73 g (0.428 mol) of CHDM, 120.18 g (0.561 mol) of DPC, and $4.66\times10^{-4}$ g ($1.43\times10^{-6}$ mol) of calcium acetate monohydrate as a catalyst, relative to 24.11 g (0.165 mol) of isosorbide (ISB) (charge molar ratio of ISB/CHDM: 28/72), and in a nitrogen atmosphere, as a step of first stage of reaction, the raw materials were heated at a heating bath temperature of 150° C. and dissolved with stirring as needed (about 15 minutes).

Subsequently, the pressure was reduced from normal pressure to 13.3 kPa, and phenol generated was drawn out of the system with raising the heating bath temperature to 190° C. over 1 hour. The system was held at 190° C. for 30 minutes and thereafter, as a step of second stage, phenol generated was drawn out of the reaction vessel by setting the pressure in the reaction vessel to 6.67 kPa and raising the heating bath temperature to 220° C. over 45 minutes. Although the stirring torque was increased, in order to further remove phenol generated, the pressure in the reaction vessel was allowed to reach 0.200 kPa or less. After reaching a predetermined stirring torque, the reaction was terminated, and the produced polymer was extruded into water to obtain pellets.

The reduced viscosity of the obtained polycarbonate copolymer was 0.979 dl/g, the glass transition temperature Tig was 74° C., and Tmg was 77° C. The 5% thermal weight loss temperature was 345° C.

Comparative Example 12

A reaction vessel was charged with 86.10 g (0.597 mol) of 1,4-CHDM, 117.34 g (0.548 mol) of DPC, and $4.37\times10^{-4}$ g ($1.75\times10^{-6}$ mol) of cesium carbonate as a catalyst, and in a nitrogen atmosphere, as a step of first stage of reaction, the raw materials were heated at a heating bath temperature of 150° C. and dissolved with stirring as needed (about 15 minutes).

Subsequently, the pressure was reduced from normal pressure to 13.3 kPa over 3 minutes and held, and phenol generated was drawn out of the reaction vessel with raising the heating bath temperature to 190° C. over 60 minutes.

The reaction vessel as a whole was held at 190° C. for 15 minutes and thereafter, as a step of second stage, phenol generated was drawn out of the reaction vessel by setting the pressure in the reaction vessel to 6.67 kPa and raising the heating bath temperature to 220° C. over 45 minutes. Although the stirring torque was increased, in order to further remove phenol generated, the pressure in the reaction vessel was allowed to reach 0.200 kPa or less.

After reaching a predetermined stirring torque, the reaction was terminated, and the produced polymer was extruded into water to obtain pellets of a polycarbonate copolymer.

The reduced viscosity of the obtained polycarbonate copolymer was 0.662 dl/g, the glass transition temperature Tig was 40° C., and Tmg was 43° C. The 5% thermal weight loss temperature was 348° C.

Compared with Tg of Comparative Examples 11 and 12, Tg of Examples is high, and it is understood that the heat resistance of a polycarbonate copolymerized with the inositol derivative of the present invention is high.

Example 56

Into a reaction vessel equipped with a stirrer, a distillate trap and a pressure adjusting device, 17.60 g (22.3 mmol) of DCM, 7.91 g (66.9 mmol) of 16 HD, 14.5 g (67.7 mmol) of DPC, and 0.12 ml (8.4 g/L, 4.7μmmol) of an aqueous magnesium acetate solution were put, followed by purging with nitrogen gas. The reaction vessel was immersed at an oil bath having temperature of 160° C., and the contents were heated and dissolved by raising the temperature. Subsequently, the pressure was reduced to 17 kPa over 3 minutes, and the reaction was then allowed to proceed by reducing the pressure to 14 kPa over 3 hours with removing phenol by distillation. Thereafter, the oil bath temperature was raised to 170° C., the pressure was reduced to 11 kPa from 14 kPa over 3 hours, the oil bath temperature was further raised to 180° C., the pressure was reduced to 0.3 kPa from 11 kPa over 1 hour, and the reaction was then allowed to proceed for 4 hours to obtain a polycarbonate resin.

In the obtained polycarbonate resin, Mn was 725, the molar ratio of DCMI/16HD was 22/78, and the number of hydroxyl groups per molecule was 2.00.

Example 57

Into a reaction vessel equipped with a stirrer, a distillate trap and a pressure adjusting device, 17.60 g (22.3 mmol) of DCM, 14.5 g (67.7 mmol) of DPC, and 0.046 ml (0.1 mol/L, 4.6 μmmol) of an aqueous sodium hydroxide solution were put, followed by purging with nitrogen gas. The reaction vessel was immersed at an oil bath having temperature of 160° C., and the contents were heated and dissolved by raising the temperature. Subsequently, the pressure was reduced to 17 kPa over 3 minutes, and the reaction was then allowed to proceed by reducing the pressure to 15 kPa over 2 hours with removing phenol by distillation. Thereafter, the oil bath temperature was raised to 170° C., the pressure was reduced to 13 kPa from 15 kPa over 2 hours, the oil bath temperature was further raised to 180° C., the pressure was reduced to 1 kPa from 13 kPa over 3 hours, and the reaction was then allowed to proceed at 1 kPa for 1 hour. Furthermore, 7.85 g (66.4 mmol) of 16 HD was added, the reaction vessel was immersed in an oil bath at 160° C., the pressure was reduced to 15 kPa from 17 kPa over 2 hours, the oil bath temperature was then set to 170° C., and the pressure was reduced to 5 kPa from 15 kPa over 2 hours and held at 5 kPa for 1 hour. The pressure was reduced to 0.7 kPa, and the reaction was then allowed to proceed for 1 hour by raising the oil bath temperature to 180° C. After setting the oil bath temperature to 170° C., the reaction was allowed to proceed at 0.3 kPa for 2 hours and at an oil bah temperature of 180° C. at 0.3 kPa for 4 hours to obtain a polycarbonate resin.

In the obtained polycarbonate resin, Mn was 712, the molar ratio of DCMI/16HD was 16/84, and the number of hydroxyl groups per molecule was 1.97.

INDUSTRIAL APPLICABILITY

The polycarbonate resin of the present invention is excellent in heat resistance, transparency, light resistance, weather resistance and mechanical strength and is therefore industrially useful as a molding material applied in various fields such as injection molding field, extrusion molding field and compression molding field.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2014-257435) filed on Dec. 19, 2014, the entirety of which is incorporated herein by way of reference.

The invention claimed is:

1. A polycarbonate resin comprising a structure represented by the following formula (1) in the molecule:

(1)

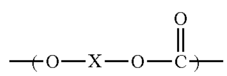

wherein X has a structure represented by any one of the following formulae (2) to (4); in the formula (2) to (4), each of $R^1$ to $R^4$ independently represents a hydrogen atom or an organic group having a carbon number of 1 to 30; the organic group may have an arbitrary substituent; and any two or more members of $R^1$ to $R^4$ may combine with each other to form a ring.

(2)

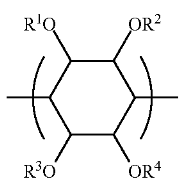

(3)

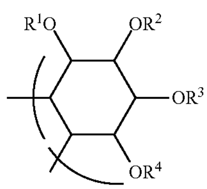

(4)

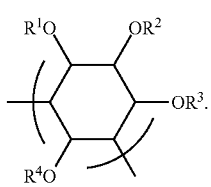

2. A polycarbonate resin comprising a structure represented by the following formula (1) in the molecule:

(1)

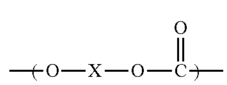

wherein X has a structure represented by any one of the following formulae (2) to (4); in the formula (2) to (4), each of $R^1$ to $R^4$ independently represents an organic group having a carbon number of 1 to 30; the organic group may have an arbitrary substituent; and any two or more members of $R^1$ to $R^4$ may combine with each other to form a ring.

(2)

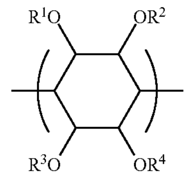

(3)

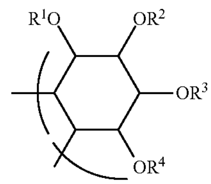

(4)

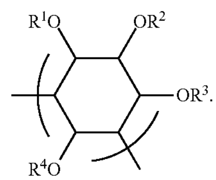

3. The polycarbonate resin according to claim 1, wherein X in the formula (1) is a structure represented by the formula (2).

4. The polycarbonate resin according to claim 1, wherein each of $R^1$ and $R^2$ and $R^3$ and $R^4$ in the formula (2) to (4) mutually forms a ring via an acetal bond.

5. The polycarbonate resin according to claim 4, wherein the cyclohexane ring in the formula (2) to (4) is an inositol residue derived from myo-inositol.

6. The polycarbonate resin according to claim 5, wherein X in the formula (1) is a structure represented by the following formula (5):

[Chem. 5]

(5)

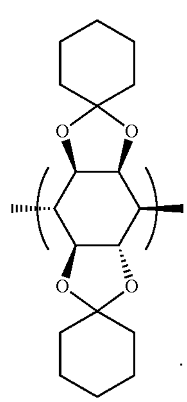

7. The polycarbonate resin according to claim 6, wherein in all myo-inositol derivative compounds obtained by hydrolyzing the polycarbonate resin, the ratio of a compound having a structure represented by the following formula (6) is 90 mol % or more and the ratio of a total of a compound represented by the following structural formula (7) and a compound represented by the following structural formula (8) is 5 mol % or less:

(6)

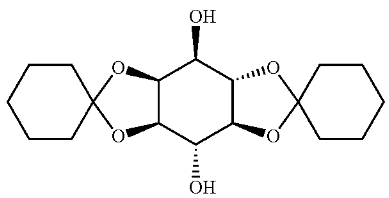

(7)

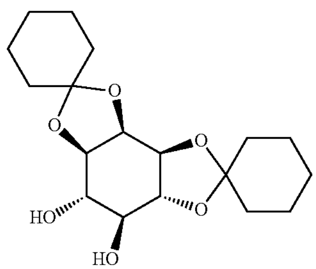

(8)

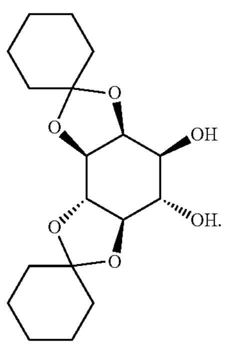

8. The polycarbonate resin according to claim 1, wherein X in the formula (1) is a structure represented by the formula (4) and $R^1$, $R^3$ and $R^4$ in the formula (4) form a ring.

9. The polycarbonate resin according to claim 8, wherein the cyclohexane ring in the formula (4) is an inositol residue derived from myo-inositol.

10. The polycarbonate resin according to claim 1, wherein the midpoint glass transition initiation temperature Tmg is 100° C. or more.

11. The polycarbonate resin according to claim 1, wherein the reduced viscosity is from 0.20 to 1.50 dl/g.

12. The polycarbonate resin according to claim 1, wherein when all carbonate repeating units are assumed to be 100, the polycarbonate resin contains 80 or less of a structure represented by the formula (1) as a repeating unit.

13. The polycarbonate resin according to claim 1, wherein the polycarbonate resin has from 0.1 to 50 mass % of a structural unit derived from an aliphatic dihydroxy compound and/or an alicyclic dihydroxy compound.

14. The polycarbonate resin according to claim 1, wherein the polycarbonate resin contains from 5 to 80 mass % of a structural unit derived from isosorbide.

15. The polycarbonate resin according to claim 1, wherein the polycarbonate resin contains from 0.1 to 50 mass % of a structural unit derived from an aliphatic dihydroxy compound having a primary hydroxyl group.

16. The polycarbonate resin according to claim 1, wherein the polycarbonate resin contains from 0.1 to 50 mass % of a structural unit derived from an alicyclic dihydroxy compound having a primary hydroxyl group.

17. The polycarbonate resin according to claim 1, wherein the polycarbonate resin contains from 40 to 95 mass % of a structural unit derived from a compound represented by the following formula (9):

(9)

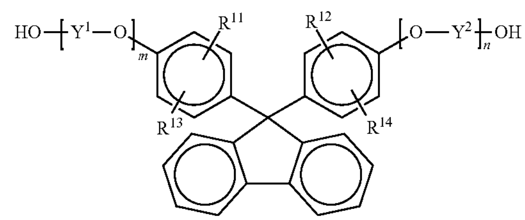

wherein each of $R^{11}$ to $R^{14}$ independently represents a hydrogen atom, a substituted or unsubstituted alkyl group having a carbon number of 1 to 20, a substituted or unsubstituted cycloalkyl group having a carbon number of 6 to 20, or a substituted or unsubstituted aryl group having a carbon number of 6 to 20, each of $Y^1$ and $Y^2$ independently represents a substituted or unsubstituted alkylene group having a carbon number of 2 to 10, a substituted or unsubstituted cycloalkylene group having a carbon number of 6 to 20, or a substituted or unsubstituted arylene group having a carbon number of 6 to 20, and each of m and n is independently an integer of 0 to 5.

18. The polycarbonate resin according to claim 1, wherein the polycarbonate resin contains from 50 to 80 mol % of a structural unit derived from a compound represented by the following formula (10), relative to structural units derived from all dihydroxy compounds in the polycarbonate resin:

(10)

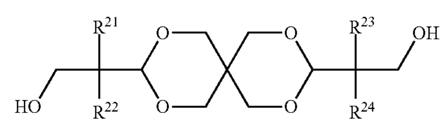

wherein each of $R^{21}$ to $R^{24}$ independently represents a hydrogen atom, a substituted or unsubstituted alkyl group having a carbon number of 1 to 20, a substituted or unsubstituted cycloalkyl group having a carbon number of 5 to 20, or a substituted or unsubstituted aryl group having a carbon number of 6 to 20.

19. The polycarbonate resin according to claim 1, wherein the polycarbonate resin contains from 1 to 40 mass % of a structure represented by the following formula (11) and/or a structure represented by the following formula (12):

(11)

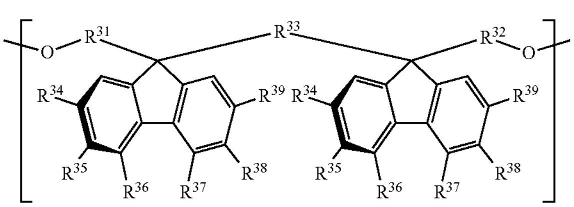

-continued (12)

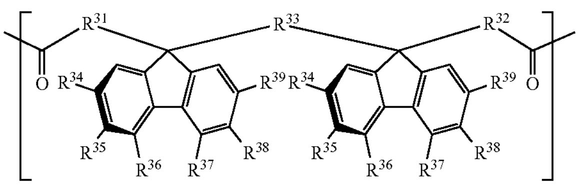

(12)

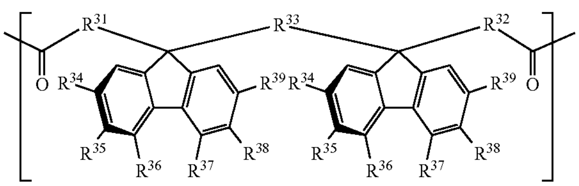

wherein each of $R^{31}$ to $R^{33}$ independently represents a direct bond, an alkylene group having a carbon number of 1 to 4, which may have a substituent, and each of $R^{34}$ to $R^{39}$ independently represents a hydrogen atom, an alkyl group having a carbon number of 1 to 10, which may have a substituent, an aryl group having a carbon number of 4 to 10, which may have a substituent, an acyl group having a carbon number of 1 to 10, which may have a substituent, an alkoxy group having a carbon number of 1 to 10, which may have a substituent, an aryloxy group having a carbon number of 4 to 10, which may have a substituent, an amino group which may have a substituent, an alkenyl group having a carbon number of 2 to 10, which may have a substituent, an alkynyl group having a carbon number of 2 to 10, which may have a substituent, a sulfur atom having a substituent, a silicon atom having a substituent, a halogen atom, a nitro group, or a cyano group, provided that $R^{34}$ to $R^{39}$ may be the same as or different from each other and at least two adjacent groups out of $R^{34}$ to $R^{39}$ may combine with each other to form a ring.

* * * * *